US008956551B2

(12) United States Patent
Gotoh et al.

(10) Patent No.: US 8,956,551 B2
(45) Date of Patent: Feb. 17, 2015

(54) LIQUID CRYSTAL COMPOUND HAVING FLUOROVINYL GROUP, LIQUID CRYSTAL COMPOSITION AND LIQUID CRYSTAL DISPLAY DEVICE

(71) Applicants: Yasuyuki Gotoh, Tokyo (JP); Keiji Kimura, Ichihara (JP)

(72) Inventors: Yasuyuki Gotoh, Tokyo (JP); Keiji Kimura, Ichihara (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

(21) Appl. No.: 13/938,912

(22) Filed: Jul. 10, 2013

(65) Prior Publication Data

US 2014/0021406 A1 Jan. 23, 2014

(30) Foreign Application Priority Data

Jul. 12, 2012 (JP) ................................ 2012-156512

(51) Int. Cl.

| | |
|---|---|
| ***C09K 19/34*** | (2006.01) |
| ***C09K 19/30*** | (2006.01) |
| ***C09K 19/02*** | (2006.01) |
| ***G02F 1/1333*** | (2006.01) |
| ***C07C 43/20*** | (2006.01) |
| ***C07D 319/06*** | (2006.01) |
| ***C07C 19/08*** | (2006.01) |
| ***C09K 19/08*** | (2006.01) |
| ***C09K 19/12*** | (2006.01) |
| ***C09K 19/06*** | (2006.01) |
| ***C09K 19/14*** | (2006.01) |
| ***C09K 19/20*** | (2006.01) |
| ***C09K 19/32*** | (2006.01) |
| *C09K 19/04* | (2006.01) |

(52) U.S. Cl.

CPC ............... *C09K 19/08* (2013.01); *C09K 19/126* (2013.01); *C09K 19/3402* (2013.01); *C09K 19/3469* (2013.01); *C09K 19/06* (2013.01); *C09K 19/3444* (2013.01); *C09K 19/3003* (2013.01); *C09K 19/14* (2013.01); *C09K 19/2007* (2013.01); *C09K 19/12* (2013.01); *C09K 19/322* (2013.01); *C09K 2019/0459* (2013.01); *C09K 2019/0466* (2013.01); *C09K 2019/123* (2013.01); *C09K 2019/2035* (2013.01); *C09K 2019/301* (2013.01); *C09K 2019/3016* (2013.01); *C09K 2019/304* (2013.01); *C09K 2019/308* (2013.01); *C09K 2019/3422* (2013.01); *C09K 2019/3425* (2013.01)

USPC .................. 252/299.61; 252/299.63; 428/1.1; 349/182; 549/369; 568/661; 570/128

(58) Field of Classification Search

USPC ............... 252/299.01, 299.6, 299.61, 299.63; 428/1.1; 349/182; 549/369; 568/661; 570/128

See application file for complete search history.

(56) References Cited

U.S. PATENT DOCUMENTS 5,364,556 A * 11/1994 Schadt et al. ............ 252/299.01
5,403,512 A 4/1995 Bartmann et al.

FOREIGN PATENT DOCUMENTS

| | | | |
|---|---|---|---|
| JP | H9-291050 | A | 11/1997 |
| WO | 9113850 | A1 | 9/1991 |
| WO | 9221734 | A1 | 12/1992 |

* cited by examiner

*Primary Examiner* — Geraldina Visconti
(74) *Attorney, Agent, or Firm* — Hogan Lovells US LLP

(57) ABSTRACT

A liquid crystal compound having a high stability to heat, light and so forth, a high clearing point, a low minimum temperature of a liquid crystal phase, a small viscosity, a suitable optical anisotropy, a large dielectric anisotropy, a suitable elastic constant and an excellent solubility in other liquid crystal compounds, a liquid crystal composition containing the compound, and a liquid crystal display device including the composition. The compound is represented by formula (1):

(1)

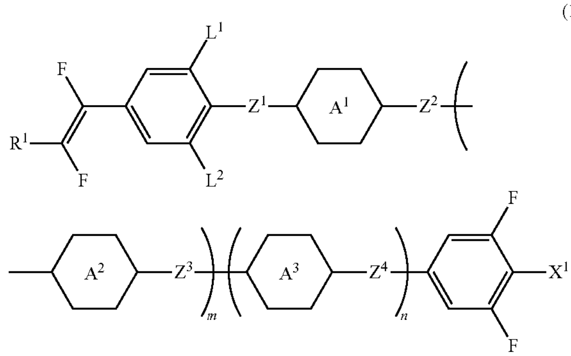

wherein, for example, $R^1$ is fluorine or alkyl having 1 to 10 carbons; ring $A^1$ and ring $A^2$ are 1,4-phenylene, or 1,4-phenylene in which at least one of hydrogen is replaced by fluorine; $Z^1$, $Z^2$ and $Z^3$ are a single bond; $L^1$ and $L^2$ are hydrogen or fluorine; $X^1$ is fluorine or —$CF_3$; and m is 1, and n is 0.

14 Claims, No Drawings

LIQUID CRYSTAL COMPOUND HAVING FLUOROVINYL GROUP, LIQUID CRYSTAL COMPOSITION AND LIQUID CRYSTAL DISPLAY DEVICE

This is a Non-Provisional application, which claims priority to Japanese Patent Application No. 2012-156512, filed on Jul. 12, 2012; the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The invention relates to a liquid crystal compound, a liquid crystal composition and a liquid crystal display device. More specifically, the invention relates to a compound having a fluorovinyl group, a liquid crystal composition containing the compound and having a nematic phase, and a liquid crystal display device including the composition.

BACKGROUND ART

A liquid crystal display device is widely utilized for a display of a personal computer, a television and so forth. The device utilizes optical anisotropy, dielectric anisotropy or the like of a liquid crystal compound. As an operating mode of the liquid crystal display device, various modes are known, such as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode and a polymer sustained alignment (PSA) mode.

In such a liquid crystal display device, a liquid crystal composition having suitable physical properties is used. In order to further improve characteristics of the liquid crystal display device, the liquid crystal compound contained in the composition preferably has physical properties as shown in (1) to (8):

(1) high stability to heat, light and so forth;
(2) high clearing point;
(3) low minimum temperature of a liquid crystal phase;
(4) small viscosity (η);
(5) suitable optical anisotropy (Δn);
(6) large dielectric anisotropy (Δ∈);
(7) suitable elastic constant (K); and
(8) excellent solubility in other liquid crystal compounds.

An effect of the physical properties of the liquid crystal compound on the characteristics of the device is as described below. A compound having a high stability to heat, light and so forth as described in (1) increases a voltage holding ratio of the device. Thus, a lifetime of the device becomes long. A compound having a high clearing point as described in (2) extends a temperature range in which the device can be used. A compound having a low minimum temperature of a liquid crystal phase such as a nematic phase or a smectic phase as described in (3), particularly, a compound having a low minimum temperature of the nematic phase also, extends the temperature range in which the device can be used. A compound having a small viscosity as described in (4) shortens a response time of the device.

A compound having a suitable optical anisotropy as described in (5) improves a contrast of the device. According to a design of the device, a compound having a large optical anisotropy or small optical anisotropy, more specifically, a compound having a suitable optical anisotropy is required. When shortening a response time by decreasing a cell gap of the device, a compound having a large optical anisotropy is suitable. A compound having a large dielectric anisotropy as described in (6) decreases a threshold voltage of the device. Thus, an electric power consumption of the device becomes small.

With regard to (7), a compound having a large elastic constant shortens a response time of the device. A compound having a small elastic constant decreases a threshold voltage of the device. Accordingly, a suitable elastic constant is required according to characteristics to be desirably improved. A compound having an excellent solubility in other liquid crystal compounds as described in (8) is preferred. The reason is that physical properties of the composition are adjusted by mixing liquid crystal compounds having different physical properties.

Various kinds of liquid crystal compounds having a large dielectric anisotropy have been synthesized. The reason is that excellent physical properties that are not developed by a conventional compound are expected. The reason is that a suitable balance between two of physical properties required upon preparing the liquid crystal composition is expected for a new compound. Patent literature No. 1 discloses a compound having four fluorine atoms, namely, compound (S-1) and compound (S-2). However, the compound has an insufficiently high clearing point.

Patent literature Nos. 2 and 3 show a compound having a fluorovinyl group, namely, compound (S-3) and compound (S-4). However, the compound has an insufficiently large dielectric anisotropy, and therefore a liquid crystal composition containing the compound presumably cannot satisfy a threshold voltage required by a commercially available device. Moreover, Patent literature No. 3 also exemplifies compound (S-5) to compound (S-12). However, the compound has an insufficiently high clearing point.

Formula 1

(S-1)

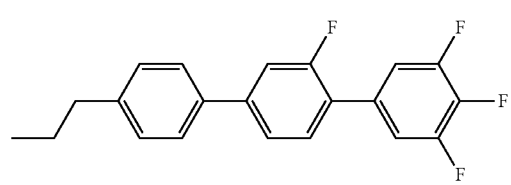

-continued (S-2)

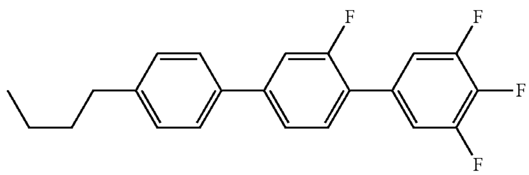

(S-3)

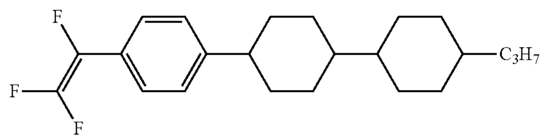

(S-4)

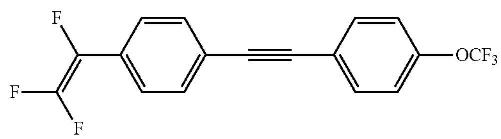

(S-5)

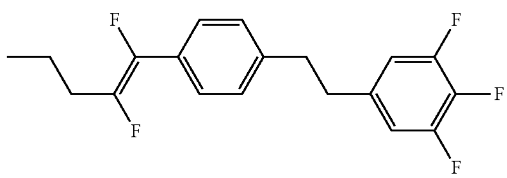

(S-6)

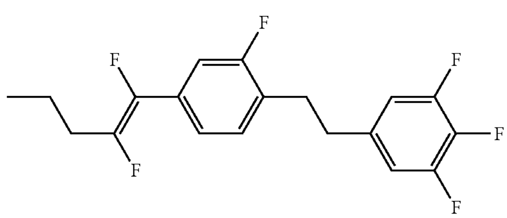

(S-7)

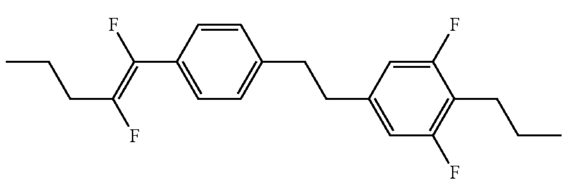

(S-8)

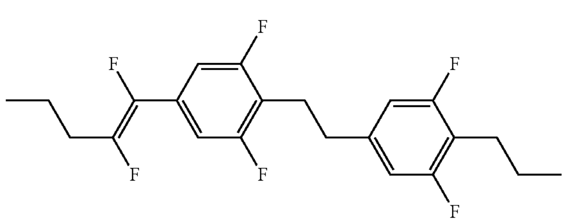

(S-9)

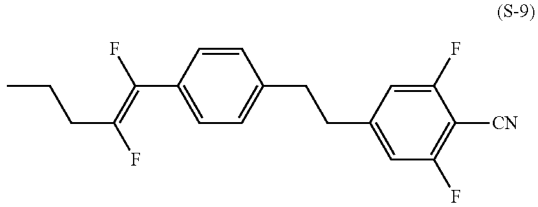

-continued (S-10)

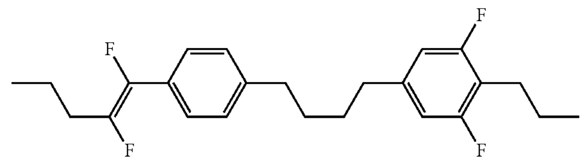

(S-11)

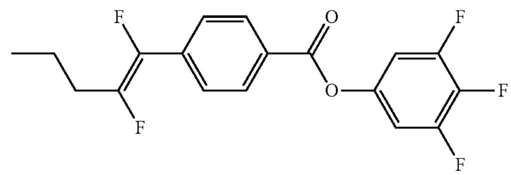

(S-12)

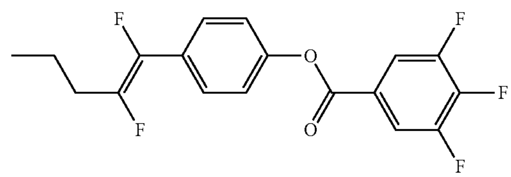

In view of such a situation, a development is desired for a compound having excellent physical properties and a suitable balance with regard to the physical properties described in (1) to (8).

CITATION LIST

Patent Literature

Patent literature No. 1: DE 4107120 A.
Patent literature No. 2: WO 1992/021734 A.
Patent literature No. 3: JP H9-291050 A.

SUMMARY OF INVENTION

Technical Problem

A first object of the invention is to provide a liquid crystal compound having a high stability to heat, light and so forth, a high clearing point, a low minimum temperature of a liquid crystal phase, a small viscosity, a suitable optical anisotropy, a large dielectric anisotropy, a suitable elastic constant and an excellent solubility in other liquid crystal compounds. The object is to provide a compound having a particularly large dielectric anisotropy. The object is to provide a compound having a particularly high clearing point. A second object is to provide a liquid crystal composition containing the compound and having a high maximum temperature of a nematic phase, a low minimum temperature of the nematic phase, a small viscosity, a suitable optical anisotropy, a large dielectric anisotropy and a suitable elastic constant. The object is to provide a liquid crystal composition having a suitable balance regarding at least two of physical properties. A third object is to provide a liquid crystal display device including the composition and having a wide temperature range in which the device can be used, a short response time, a large voltage holding ratio, a large contrast ratio and a long lifetime.

Solution to Problem

The invention concerns a compound represented by formula (1), a liquid crystal composition containing the compound, and a liquid crystal display device including the composition.

Formula 2

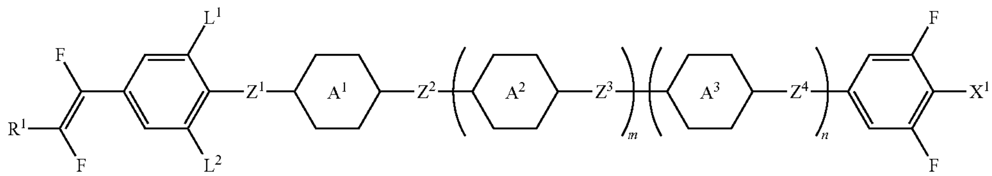

(1)

wherein, in formula (1), $R^1$ is halogen or alkyl having 1 to 20 carbons, and in the alkyl, at least one of —$CH_2$— may be replaced by —O— or —S—, at least one of —$(CH_2)_2$— may be replaced by —CH═CH—, and in the groups, at least one of hydrogen may be replaced by halogen;

ring $A^1$, ring $A^2$ and ring $A^3$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, pyrimidine-2,5-diyl or pyridine-2,5-diyl;

$Z^1$, $Z^2$, $Z^3$ and $Z^4$ are independently a single bond, —$(CH_2)_2$—, —CH═CH—, —CF═CF—, —COO—, —OCO—, —$CF_2O$—, —$OCF_2$—, —$CH_2O$—, —$OCH_2$—, —$(CH_2)_4$—, —$(CH_2)_2CF_2O$—, —$(CH_2)_2OCF_2$—, —$CF_2O(CH_2)_2$—, —$OCF_2(CH_2)_2$—, —CH═CH—$(CH_2)_2$— or —$(CH_2)_2$—CH═CH—;

$L^1$ and $L^2$ are independently hydrogen or halogen;

$X^1$ is halogen, —C≡N, —N═C═S, —$SF_5$ or alkyl having 1 to 10 carbons, and in the alkyl, at least one of —$CH_2$— may be replaced by —O— or —S—, at least one of —$(CH_2)_2$— may be replaced by —CH═CH—, and in the groups, at least one of hydrogen may be replaced by halogen; and m and n are independently 0 or 1.

Advantageous Effects of Invention

A first advantage of the invention is to provide a liquid crystal compound having a high stability to heat, light and so forth, a high clearing point, a low minimum temperature of a liquid crystal phase, a small viscosity, a suitable optical anisotropy, a large dielectric anisotropy, a suitable elastic constant and an excellent solubility in other liquid crystal compounds. The advantage is to provide a compound having a particularly large dielectric anisotropy. The advantage is to provide a compound having a particularly high clearing point. When a left-terminal group is formed of a fluorovinyl group, a compound represented by formula (1) has a high clearing point. When 3-position and 5-position of a benzene ring at a right terminal are formed of fluorine, a compound represented by formula (1) has a large dielectric anisotropy. A second advantage is to provide a liquid crystal composition containing the compound and having a high maximum temperature of a nematic phase, a low minimum temperature of the nematic phase, a small viscosity, a suitable optical anisotropy, a large dielectric anisotropy and a suitable elastic constant. The advantage is to provide a liquid crystal composition having a suitable balance regarding at least two of physical properties. A third advantage is to provide a liquid crystal display device including the composition and having a wide temperature range in which the device can be used, a short response time, a large voltage holding ratio, a large contrast ratio and a long lifetime.

DESCRIPTION OF EMBODIMENTS

Usage of terms herein is as described below. “Liquid crystal compound” is a generic term for a compound having a liquid crystal phase such as a nematic phase or a smectic phase, and a compound having no liquid crystal phase but being useful as a component of a liquid crystal composition. “Liquid crystal compound,” liquid crystal composition,” and “liquid crystal display device” may be occasionally abbreviated as “compound,” “composition,” and “device,” respectively. “Liquid crystal display device” is a generic term for a liquid crystal display panel and a liquid crystal display module. “Clearing point” is a phase transition temperature between the liquid crystal phase and an isotropic phase in the liquid crystal compound. “Minimum temperature of the liquid crystal phase” is a phase transition temperature between a solid and the liquid crystal phase (nematic phase, smectic phase or the like) in the liquid crystal compound. “Maximum temperature of the nematic phase” is a phase transition temperature between the nematic phase and the isotropic phase in the liquid crystal composition, and may be occasionally abbreviated as “maximum temperature.” A minimum temperature of the nematic phase may be occasionally abbreviated as “minimum temperature.” A compound represented by formula (1) may be occasionally abbreviated as “compound (1).” In the explanation of formulas (1) to (14), a symbol such $A^1$, $B^1$ and $C^1$ surrounded by a hexagonal shape corresponds to ring $A^1$, ring $B^1$, ring $C^1$ or the like, respectively. A plurality of $R^1$ are described in identical formulas or different formulas. In the compounds, two groups represented by two of arbitrary $R^1$ may be identical or different. The rule also applies to a symbol such as ring $A^1$ and $Z^1$. An amount of compound expressed in terms of percentage is expressed in terms of weight percent (% by weight) based on the total weight of the composition.

An expression “at least one of “A” may be replaced by “B”” means that, when the number of “A” is one, a position of “A” is arbitrary, and also when the number of “A” is two or more, positions thereof can be selected without limitation. An expression “at least one of A may be replaced by B, C or D” includes a case where arbitrary A is replaced by B, a case where arbitrary A is replaced by C, a case where arbitrary A is replaced by D, and also a case where a plurality of A are replaced by at least two of B, C and D. For example, alkyl in which at least one of —$CH_2$— may be replaced by —O— or —CH═CH—” includes alkyl, alkenyl, alkoxy, alkoxyalkyl, alkoxyalkenyl and alkenyloxyalkyl. In addition, replacement of two successive —$CH_2$— by —O— to form —O—O— or the like is not preferred. In alkyl or the like, replacement of —$CH_2$— in a methyl part (—$CH_2$—H) by —O— to form —O—H is not preferred, either.

The invention includes the content as described in Item 1 to Item 16 as described below.

Item 1. A compound represented by formula (1):

Formula 3

(1)

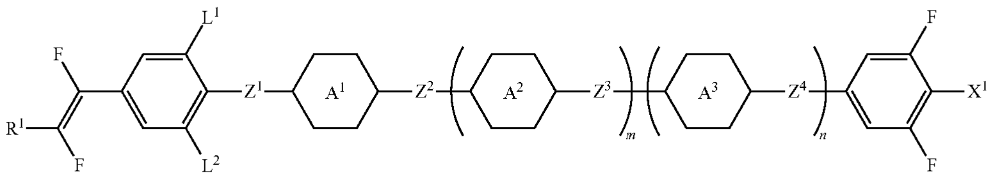

wherein, in formula (1), $R^1$ is halogen or alkyl having 1 to 20 carbons, and in the alkyl, at least one of —$CH_2$— may be replaced by —O— or —S—, at least one of —$(CH_2)_2$— may be replaced by —CH═CH—, and in the groups, at least one of hydrogen may be replaced by halogen;

ring $A^1$, ring $A^2$ and ring $A^3$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, pyrimidine-2,5-diyl or pyridine-2,5-diyl;

$Z^1$, $Z^2$, $Z^3$ and $Z^4$ are independently a single bond, —$(CH_2)_2$—, —CH═CH—, —CF═CF—, —COO—, —OCO—, —$CF_2O$—, —$OCF_2$—, —$CH_2O$—, —$OCH_2$—, —$(CH_2)_4$—, —$(CH_2)_2CF_2O$—, —$(CH_2)_2OCF_2$—, —$CF_2O(CH_2)_2$—, —$OCF_2(CH_2)_2$—, —CH═CH—$(CH_2)_2$— or —$(CH_2)_2$—CH═CH—;

$L^1$ and $L^2$ are independently hydrogen or halogen;

$X^1$ is halogen, —C≡N, —N═C═S, —$SF_5$ or alkyl having 1 to 10 carbons, and in the alkyl, at least one of —$CH_2$— may be replaced by —O— or —S—, at least one of —$(CH_2)_2$— may be replaced by —CH═CH—, and in the groups, at least one of hydrogen may be replaced by halogen; and m and n are independently 0 or 1.

Item 2. The compound according to item 1, wherein, in formula (1), $R^1$ is halogen, alkyl having 1 to 15 carbons, alkenyl having 2 to 15 carbons, alkoxy having 1 to 14 carbons or alkenyloxy having 2 to 14 carbons; $Z^1$, $Z^2$, $Z^3$ and $Z^4$ are independently a single bond, —$(CH_2)_2$—, —CH═CH—, —CF═CF—, —COO—, —OCO—, —$CF_2O$— or —$OCF_2$—; $X^1$ is halogen, —C≡N, —N═C═S, —$SF_5$ or alkyl having 1 to 10 carbons, and in the alkyl, at least one of —$CH_2$— may be replaced by —O— or —S—, at least one of —$(CH_2)_2$— may be replaced by —CH═CH—, and in the groups, at least one of hydrogen may be replaced by halogen.

Item 3. The compound according to item 2, wherein $R^1$ is fluorine, alkyl having 1 to 15 carbons, alkenyl having 2 to 15 carbons, alkoxy having 1 to 14 carbons or alkenyloxy having 2 to 14 carbons; $Z^1$, $Z^2$, $Z^3$ and $Z^4$ are independently a single bond, —$(CH_2)_2$—, —CH═CH—, —COO— or —$CF_2O$—; $L^1$ and $L^2$ are independently hydrogen or fluorine; and $X^1$ is fluorine, —$CF_3$, —$CHF_2$, —$CH_2F$, —$OCF_3$, —$OCHF_2$ or —$OCH_2F$.

Item 4. The compound according to item 3, wherein $R^1$ is fluorine, alkyl having 1 to 10 carbons or alkenyl having 2 to 10 carbons; ring $A^1$, ring $A^2$ and ring $A^3$ are independently 1,4-cyclohexylene, 1,4-phenylene, 1,4-phenylene in which at least one of hydrogen is replaced by fluorine, 1,3-dioxane-2,5-diyl or tetrahydropyran-2,5-diyl; $Z^1$, $Z^2$, $Z^3$ and $Z^4$ are independently a single bond, —$(CH_2)_2$—, —CH═CH—, —COO— or —$CF_2O$—; $L^1$ and $L^2$ are independently hydrogen or fluorine; and $X^1$ is fluorine, —$CF_3$ or —$OCF_3$.

Item 5. The compound according to item 4, represented by any one of formulas (1-1) and (1-2):

Formula 4

(1-1)

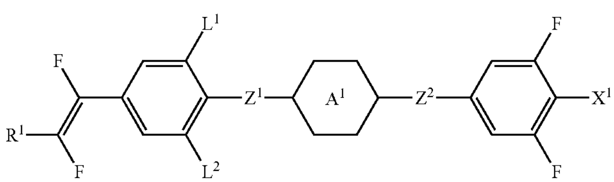

(1-2)

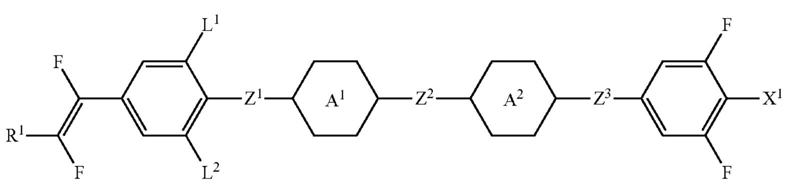

wherein, in formulas (1-1) and (1-2), $R^1$ is fluorine, alkyl having 1 to 10 carbons or alkenyl having 2 to 10 carbons;

ring $A^1$ and ring $A^2$ are independently 1,4-cyclohexylene, 1,4-phenylene, 1,4-phenylene in which at least one of hydrogen is replaced by fluorine, 1,3-dioxane-2,5-diyl or tetrahydropyran-2,5-diyl;

$Z^1$, $Z^2$ and $Z^3$ are independent a single bond, —$(CH_2)_2$—, —CH═CH—, —COO— or —$CF_2O$—;

$L^1$ and $L^2$ are independently hydrogen or fluorine; and $X^1$ is fluorine, —$CF_3$ or —$OCF_3$.

Item 6. The compound according to item 5, represented by any one of formulas (1-1-1) to (1-1-5) and formulas (1-2-1) to (1-2-7):

Formula 5

(1-1-1)

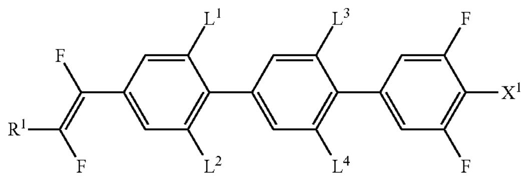

(1-1-2)

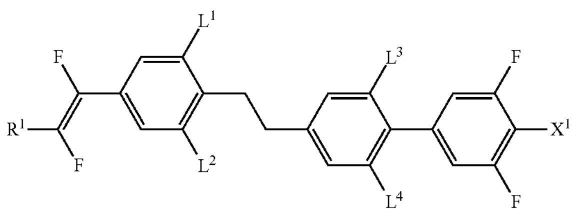

(1-1-3)

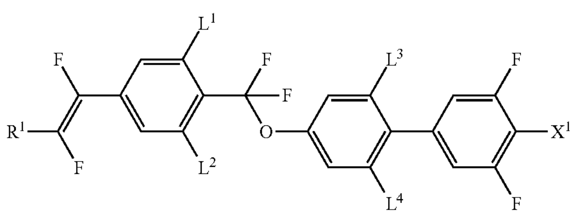

(1-1-4)

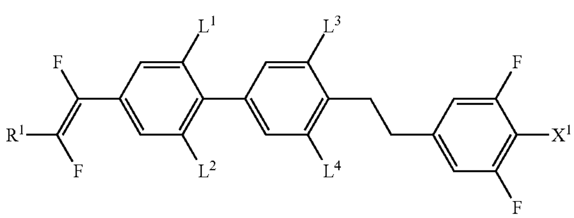

(1-1-5)

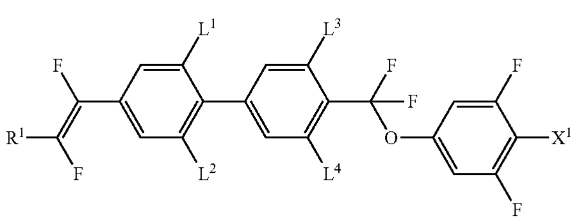

(1-2-1)

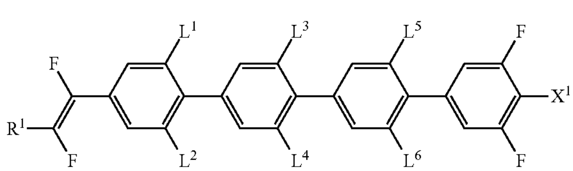

-continued (1-2-2)

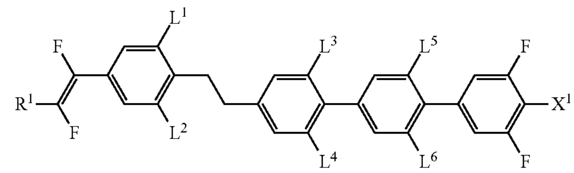

(1-2-3)

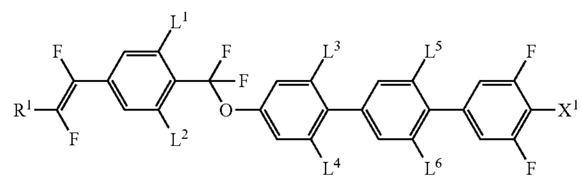

(1-2-4)

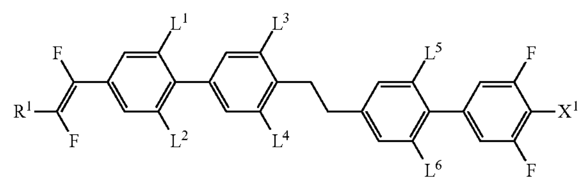

(1-2-5)

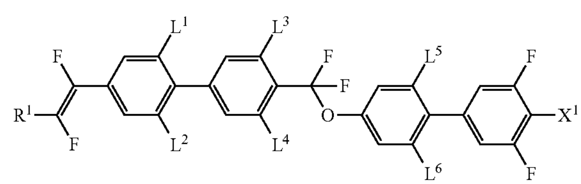

(1-2-6)

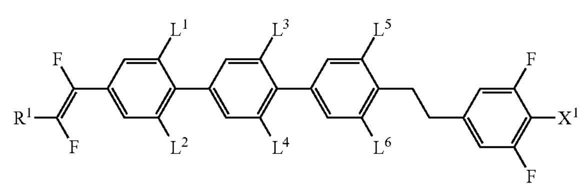

(1-2-7)

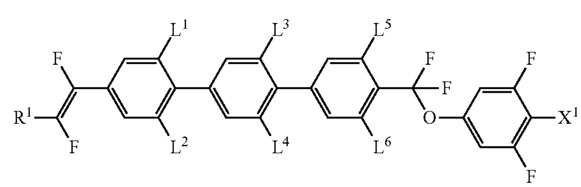

wherein, in formulas (1-1-1) to (1-1-5) and formulas (1-2-1) to (1-2-7), $R^1$ is fluorine, alkyl having 1 to 10 carbons or alkenyl having 2 to 10 carbons; $L^1$, $L^2$, $L^3$, $L^4$, $L^5$ and $L^6$ are independently hydrogen or fluorine; and $X^1$ is fluorine, —$CF_3$ or —$OCF_3$.

Item 7. A liquid crystal composition containing at least one compound according to any one of items 1 to 6.

Item 8. The liquid crystal composition according to item 7, further containing at least one compound selected from the group of compounds represented by formulas (2) to (4):

Formula 6

(2)

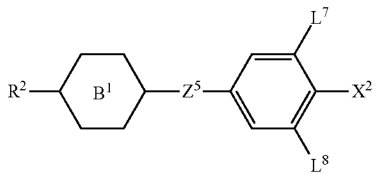

(3)

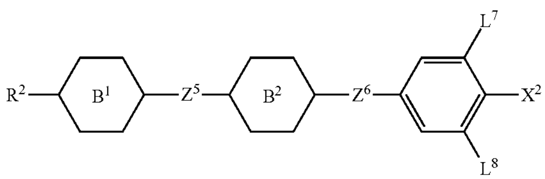

(4)

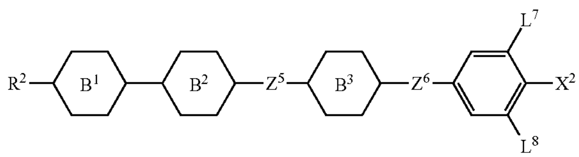

wherein, in formulas (2) to (4), $R^2$ is alkyl having 1 to 10 carbons or alkenyl having 2 to 10 carbons, and in the alkyl and the alkenyl, at least one of —$CH_2$— may be replaced by —O—;

$X^2$ is fluorine, chlorine, —$OCF_3$, —$OCHF_2$, —$CF_3$, —$CHF_2$, —$CH_2F$, —CF=$F_2$, —$OCF_2CHF_2$ or —$OCF_2CHFCF_3$;

ring $B^1$, ring $B^2$ and ring $B^3$ are independently 1,4-cyclohexylene, 1,4-phenylene, 2-fluoro-1,4-phenylene, 2,6-difluoro-1,4-phenylene, tetrahydropyran-2,5-diyl, 1,3-dioxane-2,5-diyl or pyrimidine-2,5-diyl;

$Z^5$ and $Z^6$ are independently a single bond, —$(CH_2)_2$—, —CH=CH—, —C≡C—, —COO, —$CF_2O$—, —$OCF_2$—, —$CH_2O$— or —$(CH_2)_4$—; and $L^7$ and $L^8$ are independently hydrogen or fluorine.

Item 9. The liquid crystal composition according to item 7, further containing at least one compound selected from the group of compounds represented by formula (5):

Formula 7

(5)

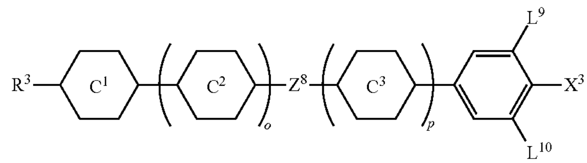

wherein, in formula (5), $R^3$ is alkyl having 1 to 10 carbons or alkenyl having 2 to 10 carbons, and in the alkyl and the alkenyl, at least one of —$CH_2$— may be replaced by —O—;

$X^3$ is —C≡N or —C≡C—C≡N;

ring $C^1$, ring $C^2$ and ring $C^3$ are independently 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;

$Z^8$ is a single bond, —$(CH_2)_2$—, —C≡C—, —COO—, —$CF_2O$—, —$OCF_2$— or —$CH_2O$—;

$L^9$ and $L^{10}$ are independently hydrogen or fluorine; and o is 0, 1 or 2, p is 0 or 1, and a sum of o and p is 0, 1, 2 or 3.

Item 10. The liquid crystal composition according to item 7, further containing at least one compound selected from the group of compounds represented by formulas (6) to (11):

Formula 8

(6)

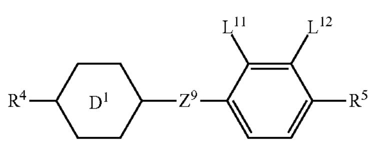

(7)

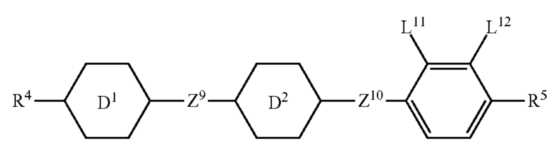

(8)

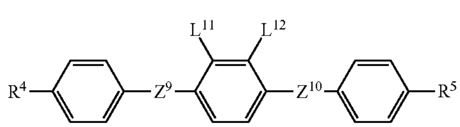

(9)

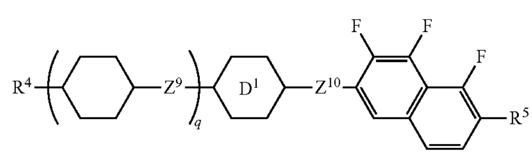

(10)

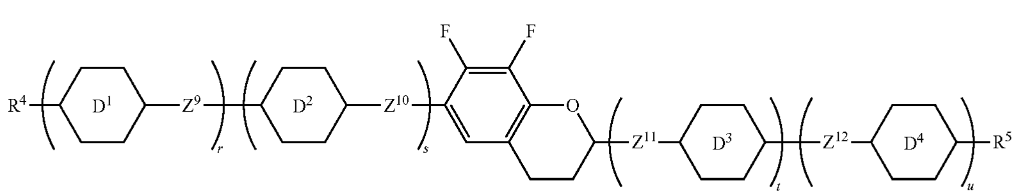

-continued (11)

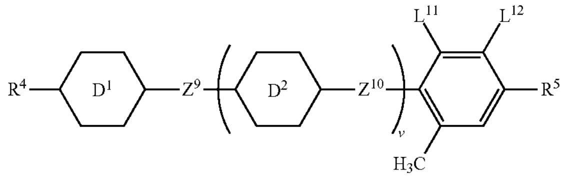

wherein, in formulas (6) to (11), $R^4$ and $R^5$ are independently alkyl having 1 to 10 carbons or alkenyl having 2 to 10 carbons, and in the alkyl and the alkenyl, at least one of —$CH_2$— may be replaced by —O—;

ring $D^1$, ring $D^2$, ring $D^3$ and ring $D^4$ are independently 1,4-cyclohexylene, 1,4-cyclohexenylene, 1,4-phenylene in which at least one of hydrogen may be replaced by fluorine, tetrahydropyran-2,5-diyl or decahydronaphthalene-2,6-diyl;

$Z^9$, $Z^{10}$, $Z^{11}$ and $Z^{12}$ are independently a single bond, —$(CH_2)_2$—, —COO—, —$CH_2O$—, —$OCF_2$— or —$OCF_2(CH_2)_2$—;

$L^{11}$ and $L^{12}$ are independently fluorine or chlorine; and q, r, s, t, u and v are independently 0 or 1, and a sum of r, s, t and u is 1 or 2.

Item 11. The liquid crystal composition according to item 7, 8 or 10, further containing at least one compound selected from the group of compounds represented by formulas (12) to (14):

Formula 9

(12)

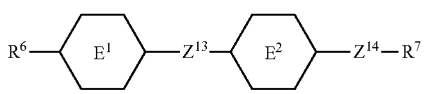

-continued (13)

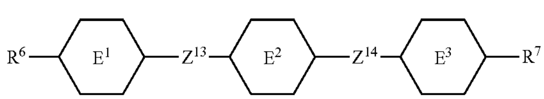

(14)

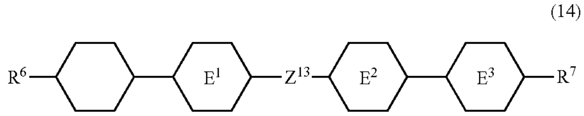

wherein, in formulas (12) to (14), $R^6$ and $R^7$ are independently alkyl having 1 to 10 carbons or alkenyl having 2 to 10 carbons, and in the alkyl and the alkenyl, at least one of —$CH_2$— may be replaced by —O—;

ring $E^1$, ring $E^2$ and ring $E^3$ are independently 1,4-cyclohexylene, 1,4-phenylene, 2-fluoro-1,4-phenylene, 2,5-difluoro-1,4-phenylene or pyrimidine-2,5-diyl; and $Z^{13}$ and $Z^{14}$ are independently a single bond, —$(CH_2)_2$—, —CH=CH—, —C≡C— or —COO—.

Item 12. The liquid crystal composition according to item 7, further containing at least one of optically active compound and/or polymerizable compound.

Item 13. The liquid crystal composition according to item 7, further containing at least one of antioxidant and/or ultraviolet absorber.

Item 14. A liquid crystal display device including the liquid crystal composition according to any one of items 7 to 13.

The compound, the liquid crystal composition and the liquid crystal display device according to the invention will be explained in the order.

1-1. Compound (1)

Compound (1) and preferred examples of compound (1) according to the invention will be explained. Preferred examples of a terminal group, a ring structure, a bonding group and a substituent in compound (1) are also applied to a subordinate formula of compound (1).

Formula 10

(1)

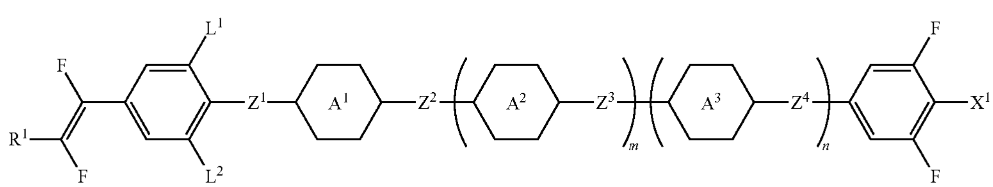

wherein, in formula (1), $R^1$ is halogen or alkyl having 1 to 20 carbons, and in the alkyl, at least one of —$CH_2$— may be replaced by —O— or —S—, at least one of —$(CH_2)_2$— may be replaced by —CH=CH—, and in the groups, at least one of hydrogen may be replaced by halogen.

Specific examples of such $R^1$ include alkyl, alkoxy, alkoxyalkyl, alkoxyalkoxy, alkylthio, alkylthioalkoxy, alkenyl, alkenyloxy, alkenyloxyalkyl, alkoxyalkenyl and alkenylthio. The groups have a straight chain or a branched chain, and do not include a cyclic group such as cyclohexyl. In the groups, a straight chain is preferred to a branched chain. Even when $R^1$ has a branched chain, if $R^1$ is optically active, such $R^1$ is preferred.

A preferred configuration of —CH=CH— in alkenyl depends on a position of a double bond. A trans configuration is preferred in alkenyl having the double bond in an odd-numbered position, such as $-CH{=}CHCH_3$, $-CH{=}CHC_2H_5$, $-CH{=}CHC_3H_7$, $-CH{=}CHC_4H_9$, $-C_2H_4CH{=}CHCH_3$ and $-C_2H_4CH{=}CHC_2H_5$. A cis configuration is preferred in alkenyl having the double bond in an even-numbered position, such as $-CH_2CH{=}CHCH_3$, $-CH_2CH{=}CHC_2H_5$ and $-CH_2CH{=}CHC_3H_7$. An alkenyl compound having a preferred configuration has a high clearing point or a wide temperature range of the liquid crystal phase. A detailed description is found in Mol. Cryst. Liq. Cryst., 1985, 131, 109 and Mol. Cryst. Liq. Cryst., 1985, 131, 327.

Examples of alkyl include $-CH_3$, $-C_2H_5$, $-C_3H_7$, $-C_4H_9$, $-C_5H_{11}$, $-C_6H_{13}$, $-C_7H_{15}$, $-C_8H_{17}$, $-C_9H_{19}$, $-C_{10}H_{21}$, $-C_{11}H_{23}$, $-C_{12}H_{25}$, $-C_{13}H_{27}$, $-C_{14}H_{29}$ and $-C_{15}H_{31}$.

Examples of alkoxy include $-OCH_3$, $-OC_2H_5$, $-OC_3H_7$, $-OC_4H_9$, $-OC_5H_{11}$, $-OC_6H_{13}$, $-OC_7H_{15}$, $-OC_8H_{17}$, $-OC_9H_{19}$, $-OC_{10}H_{21}$, $-OC_{11}H_{23}$, $-OC_{12}H_{25}$, $-OC_{13}H_{27}$ and $-OC_{14}H_{29}$.

Examples of alkoxyalkyl include $-CH_2OCH_3$, $-CH_2OC_2H_5$, $-CH_2OC_3H_7$, $-(CH_2)_2-OCH_3$, $-(CH_2)_2-OC_2H_5$, $-(CH_2)_2-OC_3H_7$, $-(CH_2)_3-OCH_3$, $-(CH_2)_4-OCH_3$ and $-(CH_2)_5-OCH_3$.

Examples of alkenyl include $-CH{=}CH_2$, $-CH{=}CHCH_3$, $-CH_2CH{=}CH_2$, $-CH{=}CHC_2H_5$, $-CH_2CH{=}CHCH_3$, $-(CH_2)_2-CH{=}CH_2$, $-CH{=}CHC_3H_7$, $-CH_2CH{=}CHC_2H_5$, $-(CH_2)_2-CH{=}CHCH_3$ and $-(CH_2)_3-CH{=}CH_2$.

Examples of alkenyloxy include $-OCH_2CH{=}CH_2$, $-OCH_2CH{=}CHCH_3$ and $-OCH_2CH{=}CHC_2H_5$.

Examples of alkyl in which at least one of hydrogen is replaced by halogen include $-CH_2F$, $-CHF_2$, $-CF_3$, $-(CH_2)_2-F$, $-CF_2CH_2F$, $-CF_2CHF_2$, $-CH_2CF_3$, $-CF_2CF_3$, $-(CH_2)_3-F$, $-(CF_2)_3-F$, $-CF_2CHFCF_3$, $-CHFCF_2CF_3$, $-(CH_2)_4-F$, $-(CF_2)_4-F$, $-(CH_2)_5-F$, $-(CF_2)_5-F$, $-CH_2Cl$, $-CHCl_2$, $-CCl_3$, $-(CH_2)_2-Cl$, $-CCl_2CH_2Cl$, $-CCl_2CHCl_2$, $-CH_2CCl_3$, $-CCl_2CCl_3$, $-(CH_2)_3-Cl$, $-(CCl_2)_3-Cl$, $-CCl_2CHClCCl_3$, $-CHClCCl_2CCl_3$, $-(CH_2)_4-Cl$, $-(CCl_2)_4-Cl$, $-(CH_2)_5-Cl$ and $-(CCl_2)_5-Cl$.

Examples of alkoxy in which at least one of hydrogen is replaced by halogen include $-OCH_2F$, $-OCHF_2$, $-OCF_3$, $-O-(CH_2)_2-F$, $-OCF_2CH_2F$, $-OCF_2CHF_2$, $-OCH_2CF_3$, $-O-(CH_2)_3-F$, $-O-(CF_2)_3-F$, $-OCF_2CHFCF_3$, $-OCHFCF_2CF_3$, $-O(CH_2)_4-F$, $-O-(CF_2)_4-F$, $-O-(CH_2)_5-F$, $-O-(CF_2)_5-F$, $-OCH_2Cl$, $-OCHCl_2$, $-OCCl_3$, $-O-(CH_2)_2-Cl$, $-OCCl_2CH_2Cl$, $-OCCl_2CHCl_2$, $-OCH_2CCl_3$, $-O-(CH_2)_3-Cl$, $-O-(CCl_2)_3-Cl$, $-OCCl_2CHClCCl_3$, $-OCHClCCl_2CCl_3$, $-O(CH_2)_4-Cl$, $-O-(CCl_2)_4-Cl$, $-O-(CH_2)_5-Cl$ and $-O-(CCl_2)_5-Cl$.

Examples of alkenyl in which at least one of hydrogen is replaced by halogen include $-CH{=}CHF$, $-CH{=}CF_2$, $-CF{=}CHF$, $-CH{=}CHCH_2F$, $-CH{=}CHCF_3$, $-(CH_2)_2-CH{=}CF_2$, $-CH_2CH{=}CHCF_3$, $-CH{=}CHCF_2CF_3$, $-CH{=}CHCl$, $-CH{=}CCl_2$, $-CCl{=}CHCl$, $-CH{=}CHCH_2Cl$, $-CH{=}CHCCl_3$, $-(CH_2)_2-CH{=}CCl_2$, $-CH_2CH{=}CHCCl_3$ and $-CH{=}CHCCl_2CCl_3$.

Preferred examples of $R^1$ include halogen, alkyl having 1 to 15 carbons, alkenyl having 2 to 15 carbons, alkoxy having 1 to 14 carbons or alkenyloxy having 2 to 14 carbons, and further preferred examples of $R^1$ include fluorine, alkyl having 1 to 15 carbons, alkenyl having 2 to 15 carbons, alkoxy having 1 to 14 carbons or alkenyloxy having 2 to 14 carbons, and still further preferred examples of $R^1$ include fluorine, alkyl having 1 to 10 carbons, or alkenyl having 2 to 10 carbons. Still furthermore preferred examples of $R^1$ include fluorine, $-CH_3$, $-C_2H_5$, $-C_3H_7$, $-C_4H_9$, $-C_5H_{11}$, $-C_6H_{13}$, $-C_7H_{15}$, $-C_8H_{17}$, $-C_9H_{19}$, $-C_{10}H_{21}$, $-CH{=}CH_2$, $-CH{=}CHCH_3$, $-CH_2CH{=}CH_2$, $-CH{=}CHC_2H_5$, $-CH_2CH{=}CHCH_3$, $-(CH_2)_2-CH{=}CH_2$, $-CH{=}CHC_3H_7$, $-CH_2CH{=}CHC_2H_5$, $-(CH_2)_2-CH{=}CHCH_3$ and $-(CH_2)_3-CH{=}CH_2$.

In formula (1), ring $A^1$, ring $A^2$ and ring $A^3$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, pyrimidine-2,5-diyl or pyridine-2,5-diyl.

Preferred examples of ring $A^1$, ring $A^2$ and ring $A^3$ include 1,4-cyclohexylene, 1,4-phenylene, 1,4-phenylene in which at least one of hydrogen is replaced by halogen, tetrahydropyran-2,5-diyl and 1,3-dioxane-2,5-diyl. Then, 1,4-cyclohexylene has a cis configuration and a trans configuration. From a viewpoint of a high maximum temperature, a trans configuration is preferred. Preferred examples of 1,4-phenylene in which at least one of hydrogen is replaced by halogen include groups (15-1) to (15-18).

Formula 11

(15-1)

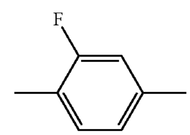

(15-2)

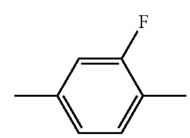

(15-3)

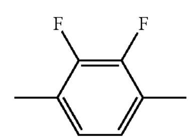

(15-4)

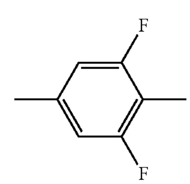

(15-5)

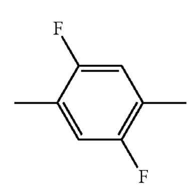

(15-6)

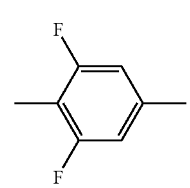

-continued (15-7)

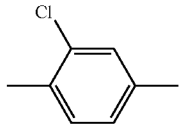

(15-8)

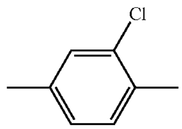

(15-9)

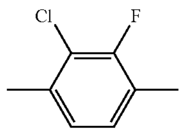

(15-10)

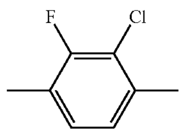

(15-11)

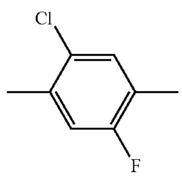

(15-12)

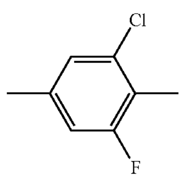

(15-13)

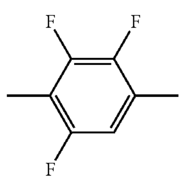

(15-14)

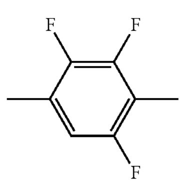

(15-15)

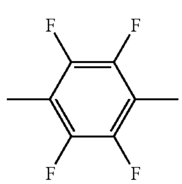

-continued (15-16)

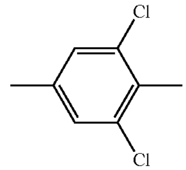

(15-17)

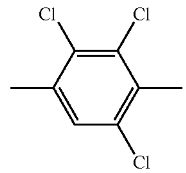

(15-18)

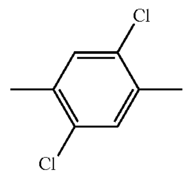

Then, 2-fluoro-1,4-phenylene is not left-right symmetrical. Further, 2-fluoro-1,4-phenylene includes a case where fluorine on a lateral position is located on a side of a left-terminal group (leftward; 15-1) and a case where fluorine on the lateral position is located on a side of a right-terminal group (rightward; 15-2). Preferred 2-fluoro-1,4-phenylene has a rightward configuration. Then, 2,6-difluoro-1,4-phenylene (15-4 and 15-6) is not left-right symmetrical, either. Preferred 2,6-difluoro-1,4-phenylene has a rightward configuration (15-4). Also in another group, when a configuration not left-right symmetrical, a rightward configuration is preferred.

Further preferred examples of 1,4-phenylene in which at least one of hydrogen is replaced by halogen include 2-fluoro-1,4-phenylene and 2,6-difluoro-1,4-phenylene.

Then, 1,3-dioxane-2,5-diyl is not left-right symmetrical. Further, 1,3-dioxane-2,5-diyl includes a case where —O— is located on a side of a left-terminal group (leftward; 15-19), and a case where —O— is located on a side of a right-terminal group (rightward; 15-20). Preferred 1,3-dioxane-2,5-diyl has a rightward configuration (15-20). Tetrahydropyran-2,5-diyl (15-21 and 15-22) is not left-right symmetrical, either. Preferred tetrahydropyran-2,5-diyl has a right configuration (15-22). Also in pyrimidine-2,5-diyl and pyridine-2,5-diyl, a rightward configuration (15-24 and 15-26) is preferred.

Formula 12

(15-19)

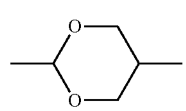

(15-20)

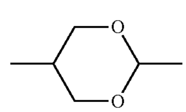

(15-21)

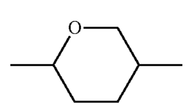

-continued (15-22)

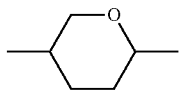

(15-23)

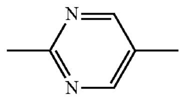

(15-24)

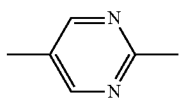

(15-25)

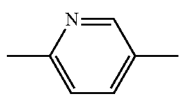

(15-26)

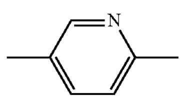

Further preferred examples of ring $A^1$, ring $A^2$ and ring $A^3$ include 1,4-cyclohexylene, 1,4-phenylene, 2-fluoro-1,4-phenylene, 2,6-difluoro-1,4-phenylene, tetrahydropyran-2,5-diyl and 1,3-dioxane-2,5-diyl. Most preferred examples of ring $A^1$, ring $A^2$ and ring $A^3$ include 1,4-cyclohexylene, 1,4-phenylene, 2-fluoro-1,4-phenylene and 2,6-difluoro-1,4-phenylene.

In formula (1), $Z^1$, $Z^2$, $Z^3$ and $Z^4$ are independently a single bond, —$(CH_2)_2$—, —CH═CH—, —CF═CF—, —COO—, —OCO—, —$CF_2O$—, —$OCF_2$—, —$CH_2O$—, —$OCH_2$—, —$(CH_2)_4$—, —$(CH_2)_2CF_2O$—, —$(CH_2)_2OCF_2$—, —$CF_2O(CH_2)_2$—, —$OCF_2(CH_2)_2$—, —CH═CH—$(CH_2)_2$— or —$(CH_2)_2$—CH═CH—.

Preferred examples of $Z^1$, $Z^2$, $Z^3$ and $Z^4$ include a single bond, —$(CH_2)_2$—, —CH═CH—, —COO—, —OCO—, —$CF_2O$—, —$OCF_2$— and —CF═CF—. Further preferred examples of $Z^1$, $Z^2$, $Z^3$ and $Z^4$ include a single bond, —$(CH_2)_2$—, —CH═CH—, —COO— and —$CF_2O$—. Most preferred examples of $Z^1$, $Z^2$, $Z^3$ and $Z^4$ include a single bond, —$(CH_2)_2$— and —$CF_2O$—.

In formula (1), $L^1$ and $L^2$ are independently hydrogen or halogen. Preferred examples of $L^1$ and $L^2$ include hydrogen or fluorine.

In formula (1), $X^1$ is halogen, —C≡N, —N═C═S, —$SF_5$ or alkyl having 1 to 10 carbons, and in the alkyl, at least one of —$CH_2$— may be replaced by —O— or —S—, at least one of —$(CH_2)_2$— may be replaced by —CH═CH—, and in the groups, at least one of hydrogen may be replaced by halogen. Examples of groups in which at least one of —$CH_2$— (or —$(CH_2)_2$—) of alkyl is replaced by —O— or —S— (or —CH═CH—) include alkoxy, alkoxyalkyl, alkoxyalkoxy, alkylthio, alkylthioalkoxy, alkenyl, alkenyloxy, alkenyloxyalkyl, alkoxyalkenyl and alkenylthio. In the alkyl and the groups, at least one of hydrogen may be replaced by halogen.

Examples of alkyl in which at least one of hydrogen is replaced by halogen include —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$CH_2Cl$, —$CHCl_2$, —$CCl_3$, $(CH_2)_2$—Cl, —$CCl_2CH_2Cl$, —$CCl_2CHCl_2$, —$CH_2Cl_3$, —$CCl_2CCl_3$, —$(CH_2)_3$—Cl, —$(CCl_2)_3$—Cl, —$CCl_2CHClCCl_3$, —$CHClCCl_2CCl_3$, —$(CH_2)_4$—Cl, —$(CCl_2)_4$—Cl, —$(CH_2)_5$—Cl and —$(CCl_2)_5$—Cl.

Examples of alkoxy in which at least one of hydrogen is replaced by halogen include —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —$O(CH_2)_4$—F, —O—$(CF_2)_4$—F, —O—$(CH_2)_5$—F, —O—$(CF_2)_5$—F, —$OCH_2Cl$, —$OCHCl_2$, —$OCCl_3$, —O—$(CH_2)_2$—Cl, —$OCCl_2CH_2Cl$, —$OCCl_2CHCl_2$, —$OCH_2CCl_3$, —O—$(CH_2)_3$—Cl, —O—$(CCl_2)_3$—Cl, —$OCCl_2CHClCCl_3$, —$OCHClCCl_2CCl_3$, —$O(CH_2)_4$—Cl, —O—$(CCl_2)_4$—Cl, —O—$(CH_2)_5$—Cl and —O—$(CCl_2)_5$—Cl.

Examples of alkenyl in which at least one of hydrogen is replaced by halogen include —CH═CHF, —CH═$CF_2$, —CF═CHF, —CH═$CHCH_2F$, —CH═$CHCF_3$, —$(CH_2)_2$—CH═$CF_2$, —$CH_2CH$═$CHCF_3$, —CH═$CHCF_2CF_3$, —CH═CHCl, —CH═$CCl_2$, —CCl═CHCl, —CH═$CHCH_2Cl$, —CH═$CHCCl_3$, —$(CH_2)_2$—CH═$CCl_2$, —$CH_2CH$═$CHCCl_3$ and —CH═$CHCCl_2CCl_3$.

Preferred examples of $X^1$ include fluorine, chlorine, —C≡N, N═C═S, —$SF_5$, —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$OCH_3$, —$OC_2H_5$, —$OC_3H_7$, —$OC_4H_9$, —$OC_5H_{11}$, —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —$O(CH_2)_4$—F, —O—$(CF_2)_4$—F, —O—$(CH_2)_5$—F, —O—$(CF_2)_5$—F, —CH═$CH_2$, —CH═$CHCH_3$, —$CH_2CH$═$CH_2$, —CH═$CHC_2H_5$, —$CH_2CH$═$CHCH_3$, —$(CH_2)_2$—CH═$CH_2$, —CH═$CHC_3H_7$, —$CH_2CH$═$CHC_2H_5$, —$(CH_2)_2$—CH═$CHCH_3$, —$(CH_2)_3$—CH═$CH_2$, —CH═CHF, —CH═$CF_2$, —CF═CHF, —CH═$CHCH_2F$, —CH═$CHCF_3$, —$(CH_2)_2$—CH═$CF_2$, —$CH_2CH$═$CHCF_3$ and —CH═$CHCF_2CF_3$.

Further preferred examples of $X^1$ include fluorine, chlorine, —C≡N, —$CF_3$, —$CHF_2$, —$CH_2F$, —$OCF_3$, —$OCHF_2$ and —$OCH_2F$. Most preferred examples of $X^1$ include fluorine, —$CF_3$ and —$OCF_3$. A compound in which $X^1$ is fluorine is preferred from a viewpoint of a small viscosity. A compound in which $X^1$ is —$CF_3$ is preferred from a viewpoint of a large dielectric anisotropy. A compound in which $X^1$ is —$OCF_3$ is preferred from a viewpoint of an excellent compatibility.

In formula (1), m and n are independently 0 or 1. Preferred examples of a sum of m and n include 0, 1 and 2.

1-2. Physical Properties of Compound (1)

When kinds of $R^1$, ring $A^1$, ring $A^2$, ring $A^3$, $Z^1$, $Z^2$, $Z^3$, $Z^4$, $X^1$, $L^1$ and $L^2$, and a sum of m and n are suitably combined in compound (1), physical properties such as a clearing point, optical anisotropy and dielectric anisotropy can be arbitrarily adjusted. Compound (1) may also contain isotopes such as $^2H$ (deuterium) and $^{13}C$ in an amount higher than an amount of natural abundance because compound (1) has no significant difference in physical properties. Main effects of kinds of $R^1$ or the like on the physical properties of compound (1) will be explained below.

When left-terminal group $R^1$ has a straight chain, the temperature range of the liquid crystal phase is wide, and viscosity is small. When $R^1$ has a branched chain, solubility in other liquid crystal compounds is good. A compound in which $R^1$ is optically active is useful as a chiral dopant. When the compound is added to the liquid crystal composition, a reverse twisted domain generated in the liquid crystal display device can be prevented. A compound in which $R^1$ is not optically active is useful as a component of the composition. When $R^1$ is alkenyl, a preferred configuration depends on a position of a double bond. An alkenyl compound having a preferred configuration has a high maximum temperature or a wide temperature range of the liquid crystal phase.

When all of ring $A^1$, ring $A^2$ and ring $A^3$ are 1,4-cyclohexylene, the clearing point is high and the viscosity is small. When at least one of ring $A^1$, ring $A^2$ and ring $A^3$ is 1,4-phenylene, or 1,4-phenylene in which at least one of hydrogen is replaced by halogen, the optical anisotropy is relatively large and an orientational order parameter is relatively large. When all of ring $A^1$, ring $A^2$ and ring $A^3$ are 1,4-phenylene, 1,4-phenylene in which at least one of hydrogen is replaced by halogen, or a combination thereof, the optical anisotropy is particularly large. When at least one of ring $A^1$, ring $A^2$ and ring $A^3$ is 1,3-dioxane-2,5-diyl, the dielectric anisotropy is large. When at least one of ring $A^1$, ring $A^2$ and ring $A^3$ is tetrahydropyran-2,5-diyl, the solubility in other liquid crystal compounds is favorable.

When bonding group $Z^1$, $Z^2$, $Z^3$ or $Z^4$ is a single bond, —$(CH_2)_2$—, —CH═CH—, —$CF_2O$—, —$OCF_2$—, —$CH_2O$—, —$OCH_2$—, —CF═CF—, —$(CH_2)_3$—O—, —O—$(CH_2)_3$, —$(CH_2)_2$—$CF_2O$—, —$OCF_2$—$(CH_2)_2$— or —$(CH_2)_4$—, the viscosity is small. When the bonding group is a single bond, —$(CH_2)_2$—, —$CF_2O$—, —$OCF_2$— or —CH═CH—, the viscosity is smaller. When the bonding group is —CH═CH—, the temperature range of the liquid crystal phase is wide, and an elastic constant (K) is large. When the bonding group is —$CF_2O$— or —COO—, the dielectric anisotropy is large. When $Z^1$, $Z^2$, $Z^3$ or $Z^4$ is a single bond, —$(CH_2)_2$— or —$(CH_2)_4$—, chemical stability is high.

When right-terminal group $X^2$ is fluorine, chlorine, —C≡N, —N═C═S, —$SF_5$, —$CF_3$, —$CHF_2$, —$CH_2F$, —$OCF_3$, —$OCHF_2$ or —$OCH_2F$, the dielectric anisotropy is large. When $X^1$ is —C≡N, —N═C═S or alkenyl, the optical anisotropy is large. When $X^1$ is fluorine, —$CF_3$ or alkyl, the chemical stability is high.

When a sum of m and n is 0, the viscosity is small and the solubility in other liquid crystal compounds is favorable. When the sum of m and n is 1, the viscosity is small and the clearing point is high. When the sum of m and n is 2, the viscosity is small and the clearing point is particularly high. According to the invention, the sum of m and n is preferably 0 or 1.

As described above, when kinds of a ring structure, a terminal group, a bonding group or the like is suitably selected, a compound having objective physical properties can be obtained. Accordingly, compound (1) is useful as a component of the liquid crystal composition to be used for a liquid crystal display device having a mode such as a PC, TN, STN, ECB, OCB, IPS and VA mode.

1-3. Preferred Compound

Preferred examples of compound (1) include compounds (1-1) and (1-3). Further preferred examples include compounds (1-1-1) to (1-2-7). Compounds (1-1-1) to (1-1-5) are preferred from a viewpoint of a small viscosity, a large dielectric anisotropy or an excellent solubility. Compounds (1-2-1) to (1-2-7) are preferred from a viewpoint of a high clearing point, a large optical anisotropy or a larger dielectric anisotropy.

1-4. Synthesis of Compound (1)

A process for synthesizing compound (1) will be explained. Compound (1) can be prepared by suitably combining methods in synthetic organic chemistry. A method for introducing an objective terminal group, ring and bonding group into a starting material is described in books such as "Organic Syntheses" (John Wiley & Sons, Inc.), "Organic Reactions" (John Wiley & Sons, Inc.), "Comprehensive Organic Synthesis" (Pergamon Press) and "New Experimental Chemistry Course (Shin Jikken Kagaku Koza in Japanese)" (Maruzen Co., Ltd.).

1-4-1. Formation of a Bonding Group

An example of a method for forming a bonding group in compound (1) is as described in a scheme below. In the scheme, $MSG^1$ ($MSG^2$) is a monovalent organic group having at least one ring. A plurality of monovalent organic groups represented by $MSG^1$ ($MSG^2$) may be identical or different. Compounds (1A) to (1G) correspond to compound (1).

Formula 13

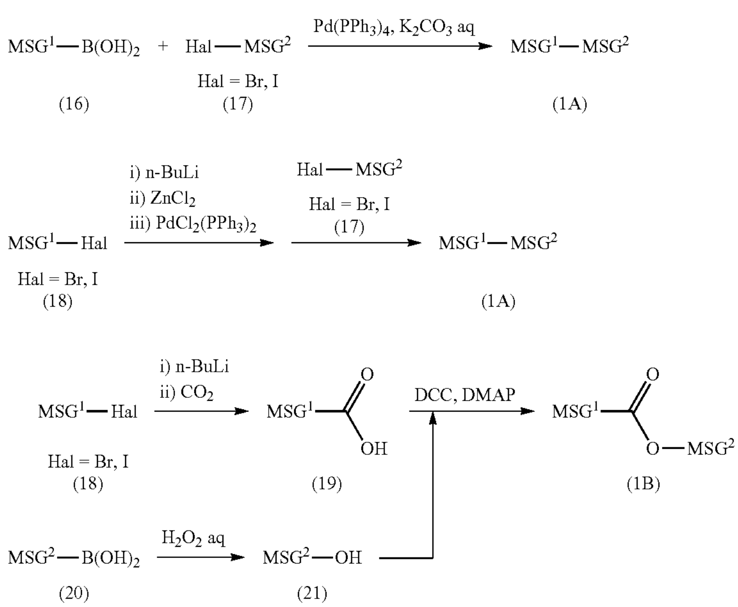

-continued

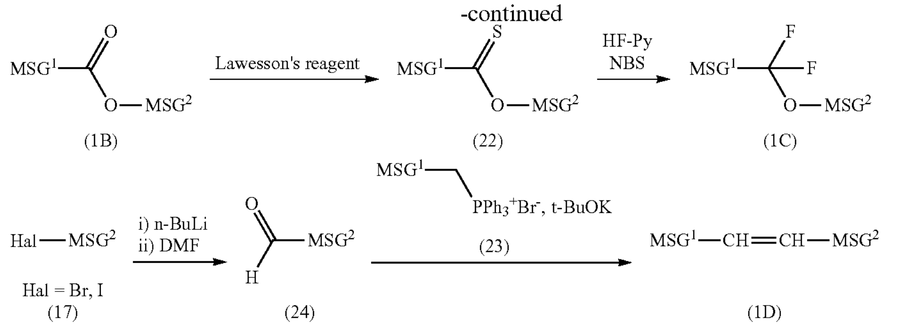

Formula 14

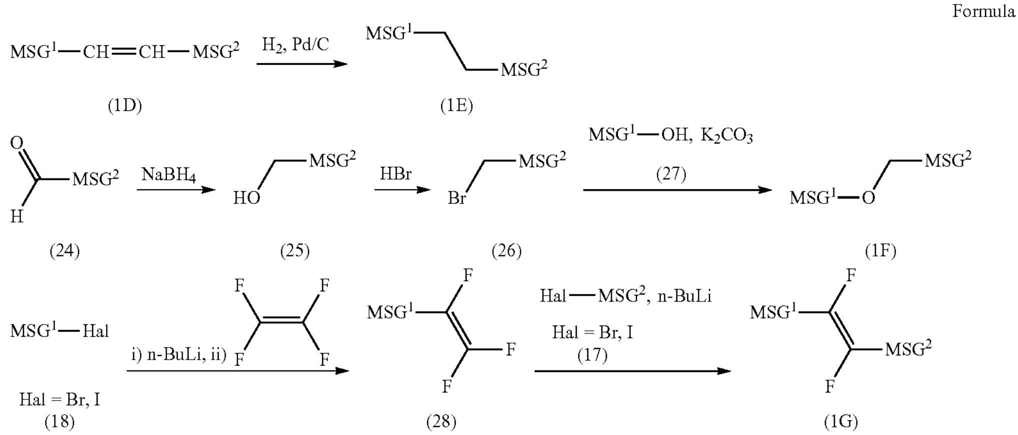

(I) Formation of a Single Bond

Compound (1A) is prepared by allowing arylboronic acid (16) to react, in the presence of a catalyst such as tetrakis (triphenylphosphine)palladium in an aqueous solution of carbonate, with compound (17) to be prepared according to a publicly known method. Compound (1A) is also prepared by allowing compound (18) to be prepared according to a publicly known method to react with n-butyllithium and subsequently with zinc chloride, and further with compound (17) in the presence of a catalyst such as dichlorobis(triphenylphosphine)palladium.

(II) Formation of —COO— and —OCO—

Carboxylic acid (19) is obtained by allowing compound (18) to react with n-butyllithium, and subsequently with carbon dioxide. Compound (1B) having —COO— is prepared by dehydrating, in the presence of N,N'-dicyclohexylcarbodiimide (DCC) and 4-dimethylaminopyridine (DMAP), compound (19) and phenol (21) to be prepared according to a publicly known method. A compound having —OCO— is also prepared according to the method.

(III) Formation of —$CF_2O$— and —$OCF_2$—

Compound (22) is obtained by treating compound (1B) with a thiation reagent such as Lawesson's reagent. Compound (1C) having —$CF_2O$— is prepared by fluorinating compound (22) with a hydrogen fluoride-pyridine complex and N-bromosuccinimide (NBS). See M. Kuroboshi et al., Chem. Lett., 1992, 827. Compound (1C) is also prepared by fluorinating compound (22) with (diethylamino) sulfurtrifluoride (DAST). See W. H. Bunnelle et al., J. Org. Chem. 1990, 55, 768. A compound having —$OCF_2$— is also prepared according to the method. The bonding groups can also be formed according to the method described in Peer. Kirsch et al., Angew. Chem. Int. Ed. 2001, 40, 1480.

(IV) Formation of —CH═CH—

Aldehyde (24) is obtained by treating compound (17) with n-butyllithium and then allowing the treated compound to react with formamide such as N,N-dimethylformamide (DMF). Compound (1D) is prepared by allowing aldehyde (24) to react with phosphorus ylide generated by treating phosphonium salt (23) to be prepared according to a known method with a base such as potassium tert-butoxide. Because a cis isomer is formed depending on reaction conditions, the cis isomer is isomerized into a trans isomer according to a known method, when necessary.

(V) Formation of —$(CH_2)_2$—

Compound (1E) is prepared by hydrogenating compound (1D) in the presence of a catalyst such as palladium on carbon.

(VI) Formation of —$CH_2O$— or —$OCH_2$—

Compound (25) is obtained by reducing compound (24) with a reducing agent such as sodium borohydride. Compound (26) is obtained by halogenating compound (25) with hydrobromic acid or the like. Compound (1F) is prepared by allowing compound (26) to react with compound (27) in the presence of potassium carbonate or the like.

(VII) Formation of —CF═CF—

Compound (28) is obtained by treating compound (18) with n-butyllithium and then allowing the treated compound to react with tetrafluoroethylene. Compound (1G) is prepared by treating compound (17) with n-butyllithium and then allowing the treated compound to react with compound (28).

1-4-2. Formation of Rings $A^1$, $A^2$ and $A^3$

With regard to a ring such as 1,4-cyclohexylene, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5,6-tetrafluoro-1,4-phenylene, tetrahydropyran-2,5-diyl, 1,3-dioxane-2,5-diyl, pyrimidine-2,5-diyl and pyridine-2,5-diyl, a starting material is commercially available or a synthetic process is well known.

1-4-3. Synthesis Example

An example of a method for preparing compound (1) is as described below. Arylboronic acid (30) is obtained by treating aryl bromide (29) to be prepared according to a publicly known method with n-butyllithium, and then allowing the treated material to react with a boric acid ester such as triisopropyl borate, and subsequently treating the reacted product with hydrochloric acid. Trifluorostyrene (31) is obtained by allowing dichloro[1,4-bis(diphenylphosphino)butane]palladium (II) and cesium fluoride to act on the arylboronic acid (30), and then allowing 1-chloro-1,2,2-trifluoroethylene to react with the resulting product. A mixture (33) of a cis isomer and a trans isomer is obtained by allowing a lithium reagent (32) such as ethyllithium to react with trifluorostyrene (31). Compound (1) is prepared by isomerizing the mixture (33) of the cis isomer and the trans isomer using diphenyl disulfide and azobisisobutyronitrile (AIBN).

In the compounds, $R^1$, ring $A^1$, ring $A^2$, ring $A^3$, $Z^1$, $Z^2$, $Z^3$, $Z^4$, $L^1$ and $L^2$, $X^1$, m and n are defined in a manner identical with the definitions described above.

2. Composition (1)

Liquid crystal composition (1) of the invention will be explained. The composition (1) contains at least one compound (1) as component A. The composition (1) may contain two or more compounds (1). A component of the liquid crystal compound may include only compound (1). In order to develop excellent physical properties, composition (1) preferably contains at least one of compound (1) in the range of approximately 1 to approximately 99% by weight. A further preferred ratio is in the range of approximately 5 to approximately 60% by weight. Composition (1) may also contain compound (1) and various kinds of liquid crystal compounds that are not described herein.

A preferred composition contains a compound selected from components B, C and D and E shown below. When Formula 15

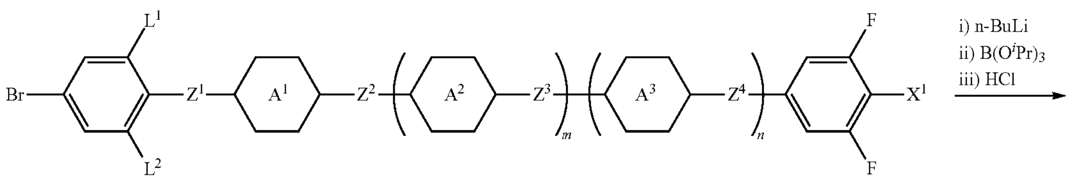

(29)

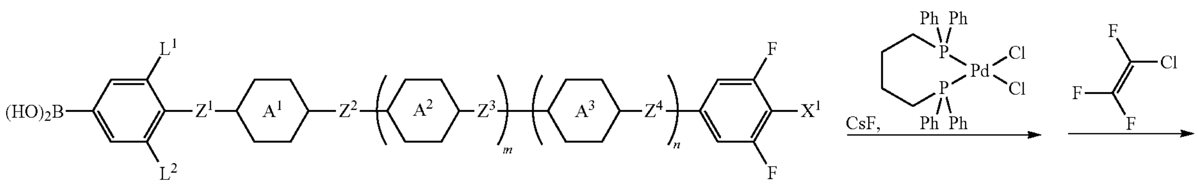

(30)

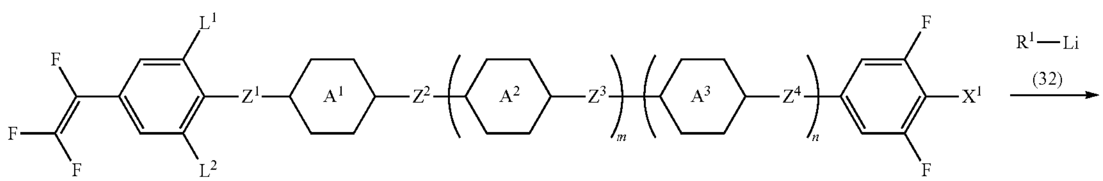

(31)

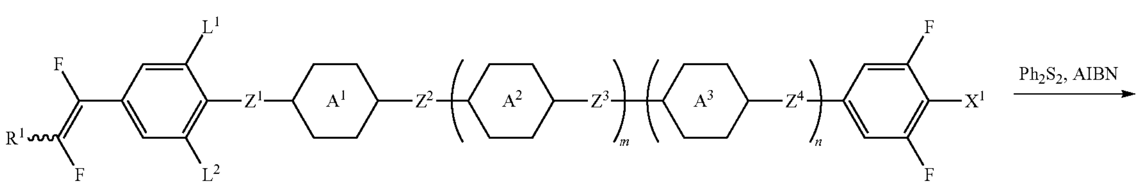

(33)

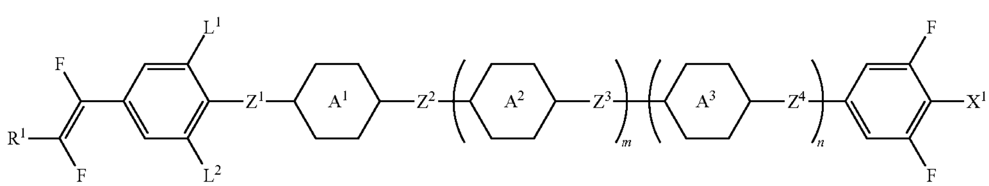

(1)

preparing composition (1), a component can also be selected, or example, in consideration of the dielectric anisotropy of compound (1). A composition prepared by suitably selecting components has a high maximum temperature of the nematic phase, a low minimum temperature of the nematic phase, a small viscosity, a suitable optical anisotropy, a large dielectric anisotropy and a suitable elastic constant.

Component B includes compounds (2) to (4). Component C includes compound (5). Component D includes compounds (6) to (11). Component E includes compounds (12) to (14). The components will be explained in the order.

Component B includes a compound having a halogen-containing group or a fluorine-containing group at aright terminal. Preferred examples of component B include compounds (2-1) to (2-16), compounds (3-1) to (3-112) and compounds (4-1) to (4-54). In addition, in formulas (3) and (4), a case where both $Z^5$ and $Z^6$ are —$CF_2O$— and/or —$OCF_2$— is excluded. The exclusion means that component B does not contain a compound in which both $Z^5$ and $Z^6$ are —$CF_2O$—, a compound in which both $Z^5$ and $Z^6$ are —$OCF_2$—, and a compound in which one of $Z^5$ and $Z^6$ is —$CF_2O$— and the other is —$OCF_2$—.

Formula 16

(2-1)

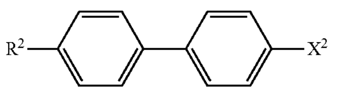

(2-2)

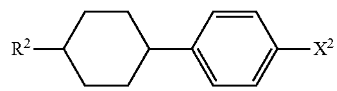

(2-3)

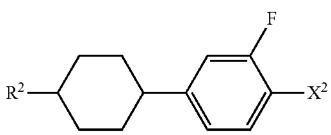

(2-4)

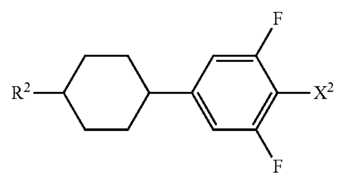

(2-5)

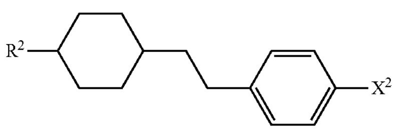

(2-6)

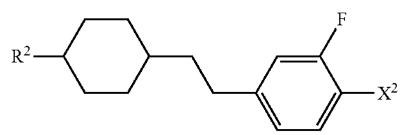

(2-7)

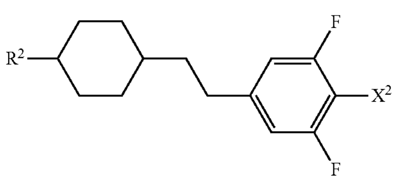

(2-8)

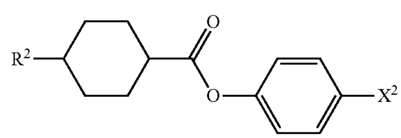

(2-9)

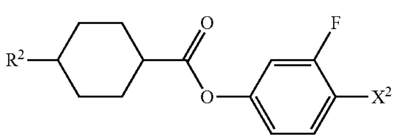

(2-10)

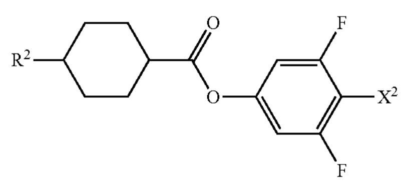

(2-11)

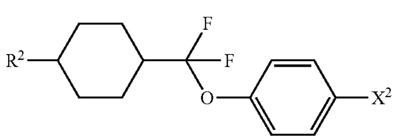

(2-12)

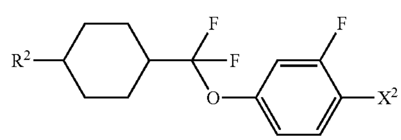

(2-13)

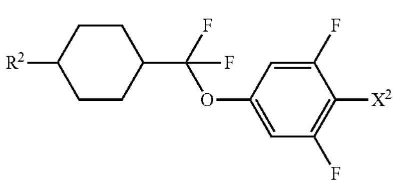

(2-14)

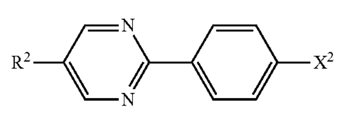

(2-15)

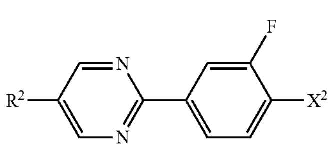

(2-16)

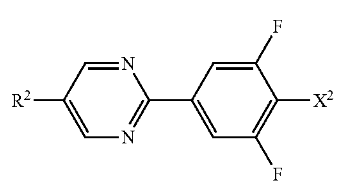

-continued
Formula 17
(3-1)
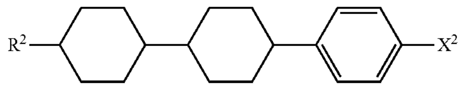
(3-2)
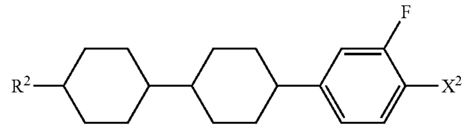
(3-3)
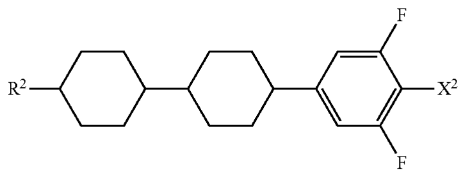
(3-4)
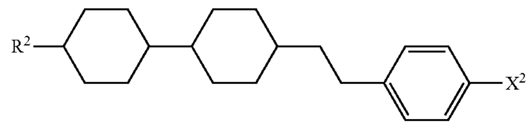
(3-5)
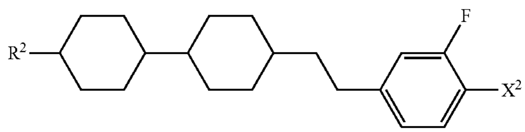
(3-6)
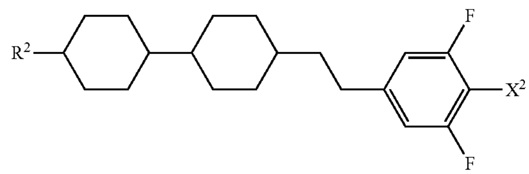
(3-7)
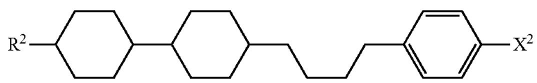
(3-8)
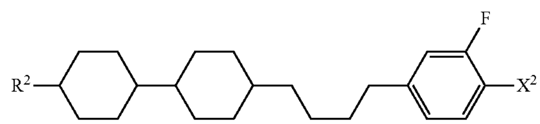
(3-9)
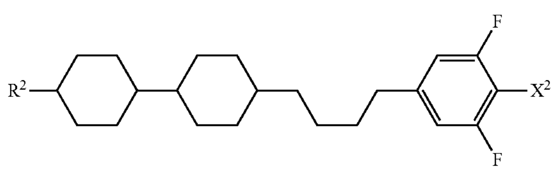
(3-10)
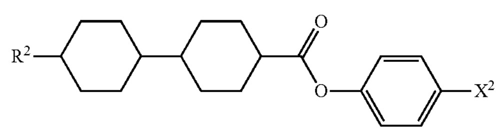
(3-11)
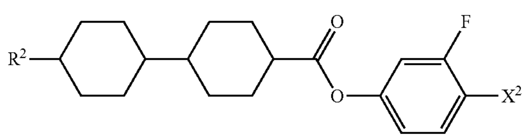
(3-12)
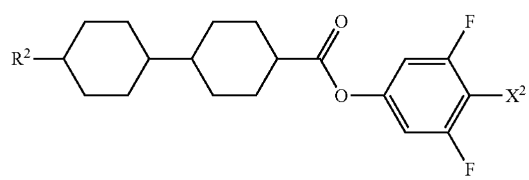
(3-13)
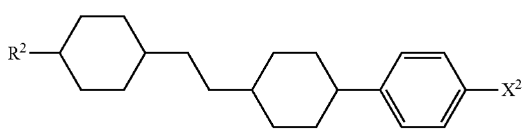
(3-14)
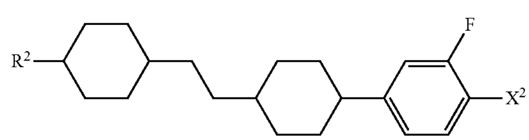
(3-15)
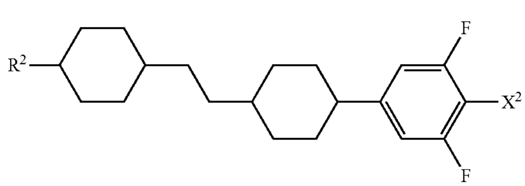
(3-16)
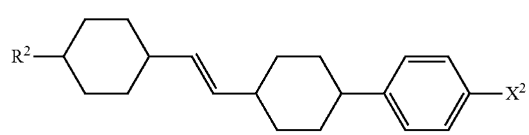

-continued
(3-17)
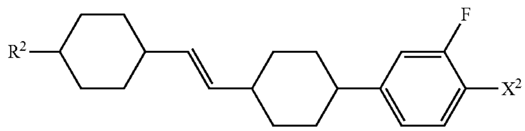
(3-18)
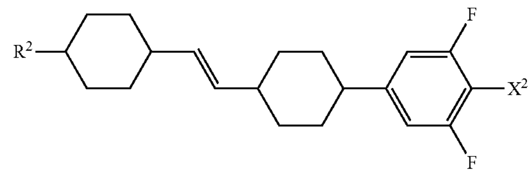
(3-19)
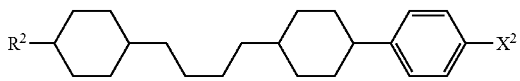
(3-20)
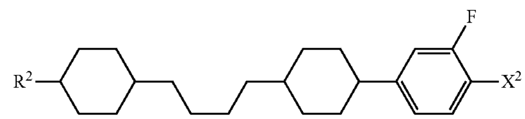
(3-21)
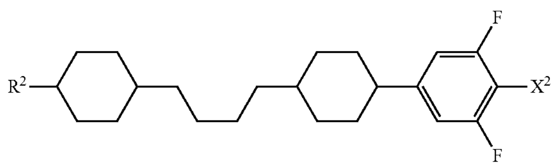
(3-22)
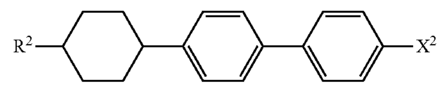
(3-23)
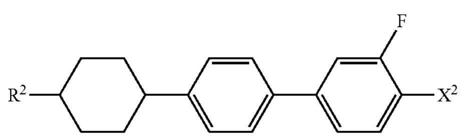
(3-24)
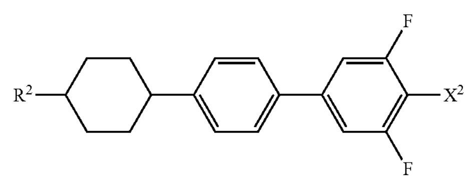
Formula 18
(3-25)
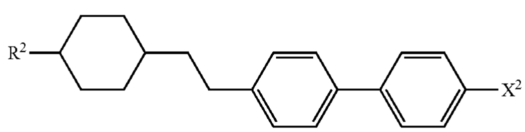
(3-26)
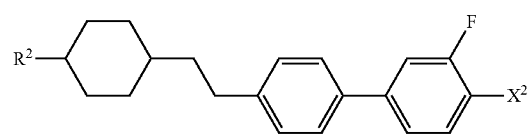
(3-27)
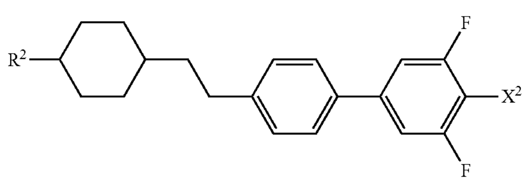
(3-28)
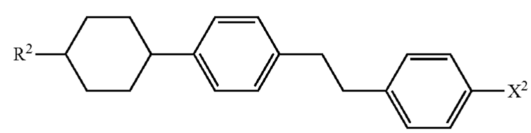
(3-29)
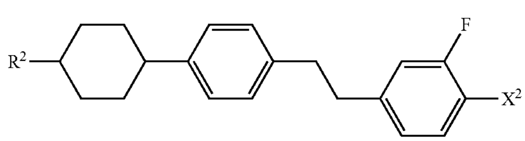
(3-30)
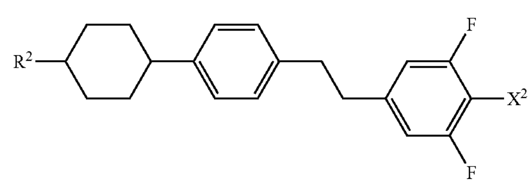
(3-31)
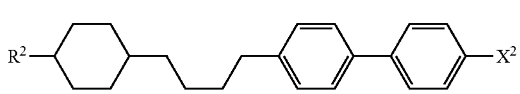
(3-32)
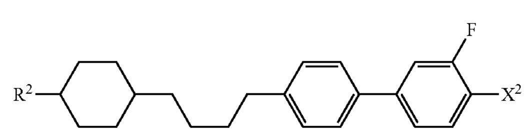

-continued
(3-33)
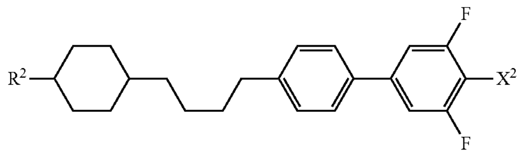
(3-34)
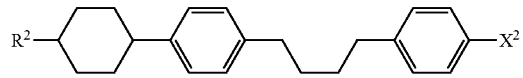
(3-35)
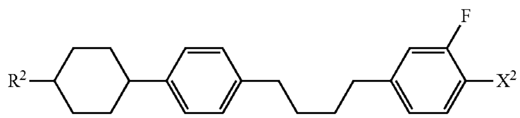
(3-36)
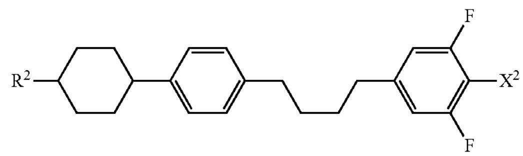
(3-37)
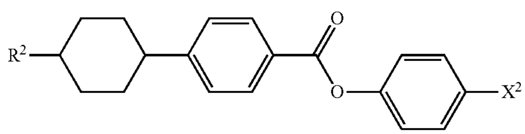
(3-38)
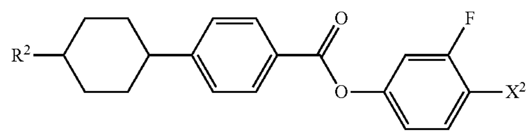
(3-39)
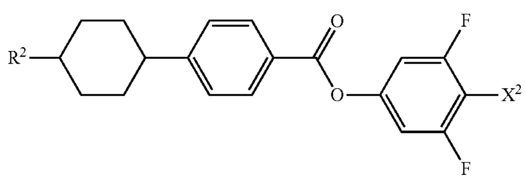
(3-40)
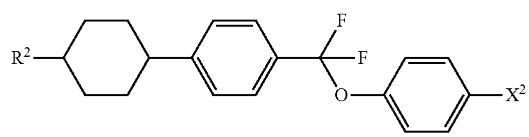
(3-41)
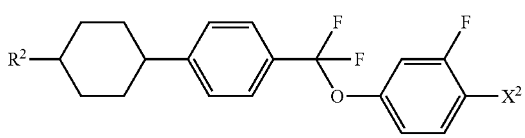
(3-42)
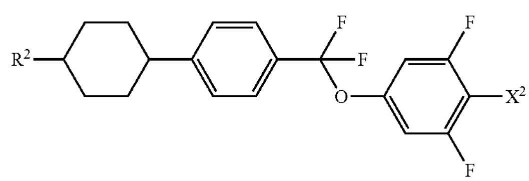
(3-43)
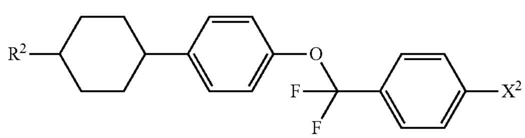
(3-44)
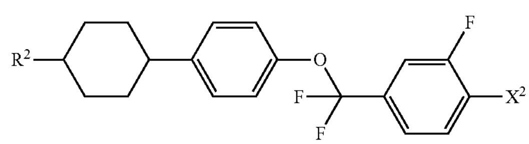
(3-45)
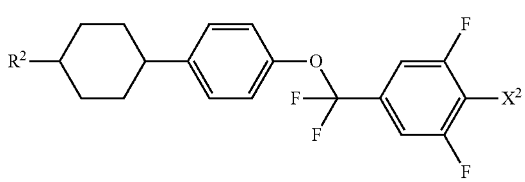
(3-46)
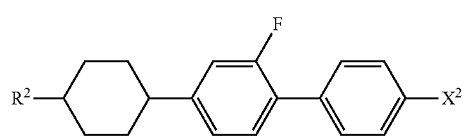
(3-47)
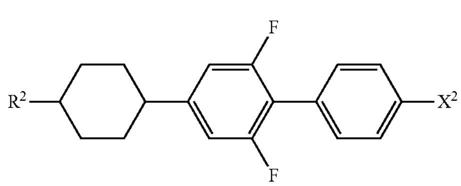
(3-48)
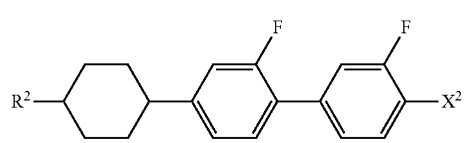

-continued
(3-49)
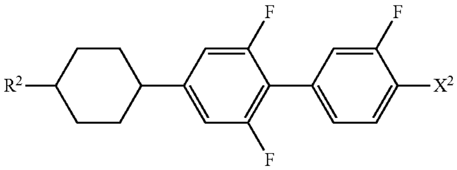
(3-50)
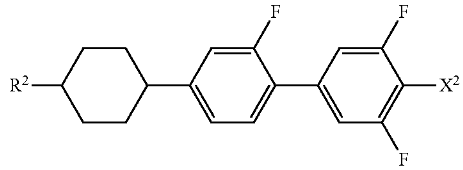
(3-51)
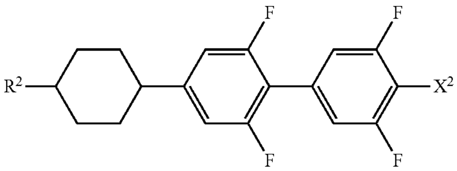
Formula 19
(3-52)
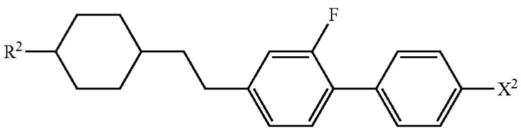
(3-53)
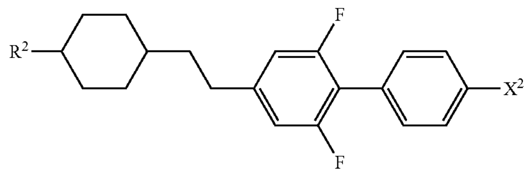
(3-54)
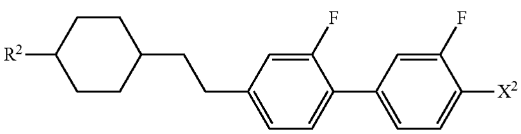
(3-55)
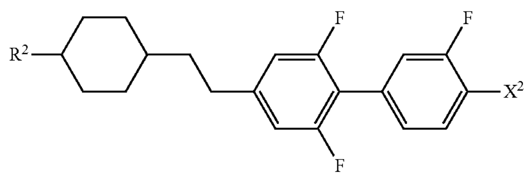
(3-56)
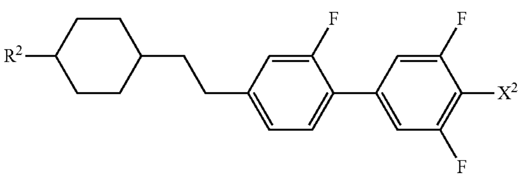
(3-57)
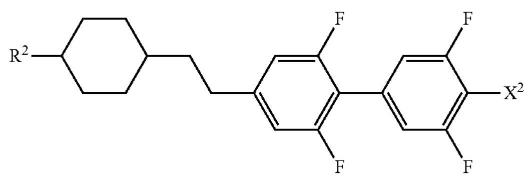
(3-58)
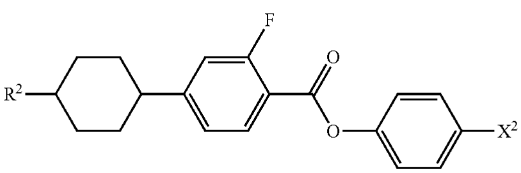
(3-59)
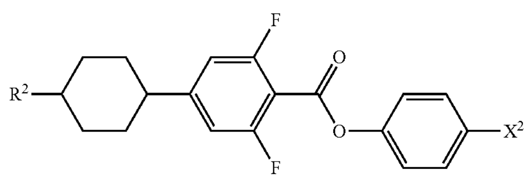
(3-60)
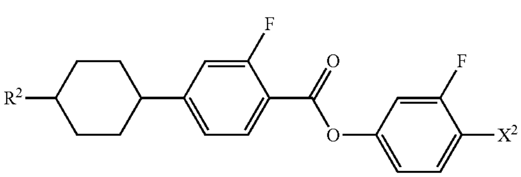
(3-61)
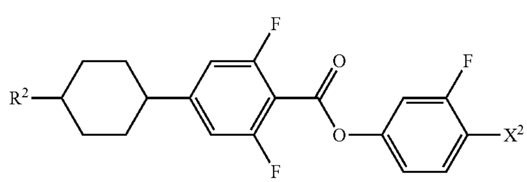
(3-62)
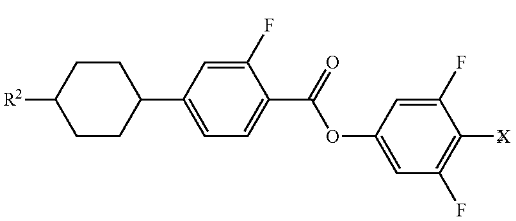
(3-63)
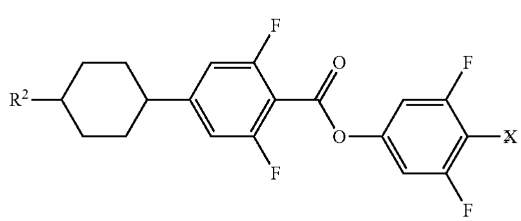

-continued
(3-64)
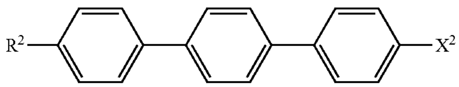
(3-65)
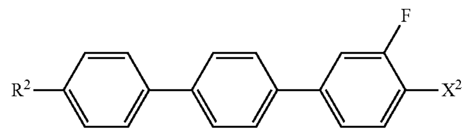
(3-66)
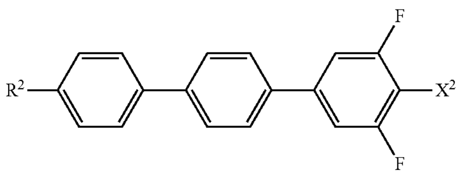
(3-67)
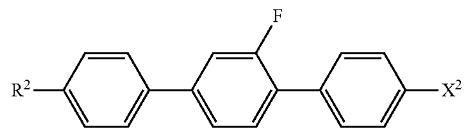
(3-68)
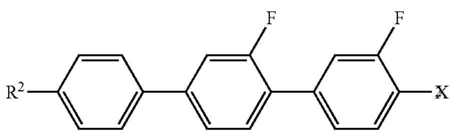
(3-69)
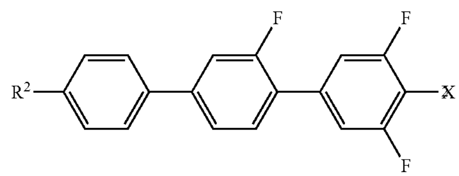
(3-70)
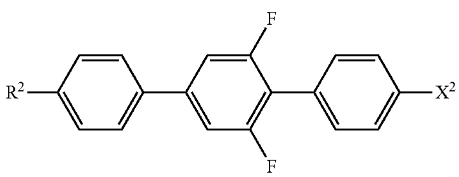
(3-71)
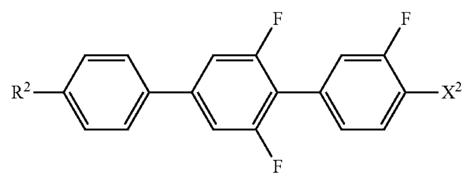
(3-72)
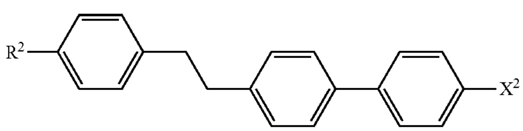
(3-73)
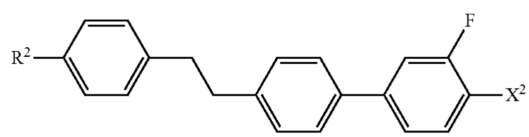
(3-74)
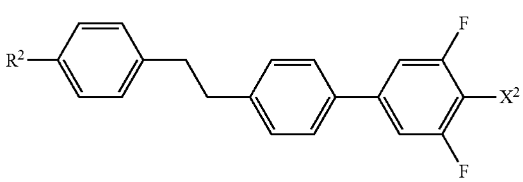
(3-75)
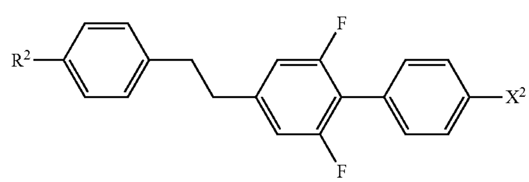
(3-76)
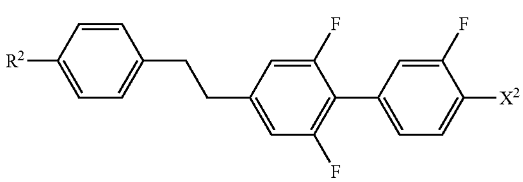
Formula 20
(3-77)
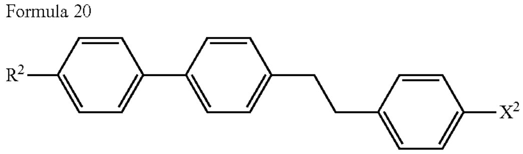
(3-78)
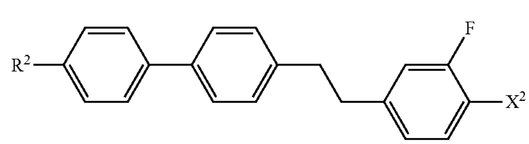

-continued
(3-79)
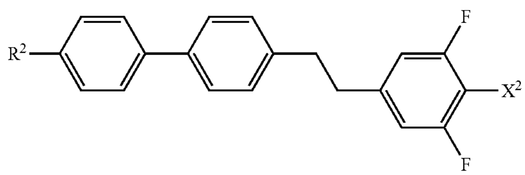
(3-80)
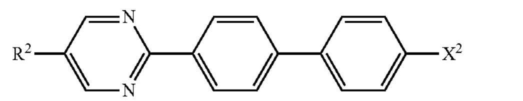
(3-81)
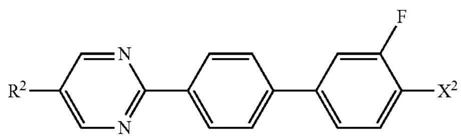
(3-82)
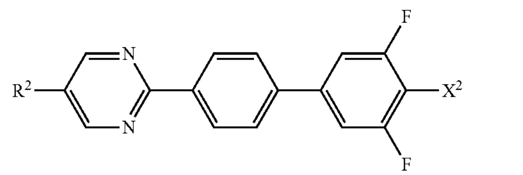
(3-83)
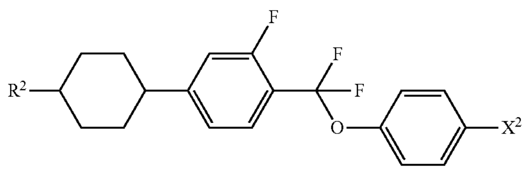
(3-84)
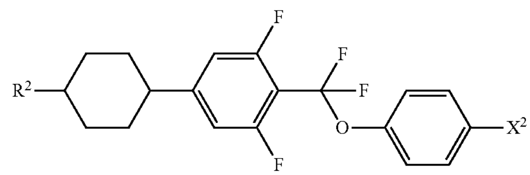
(3-85)
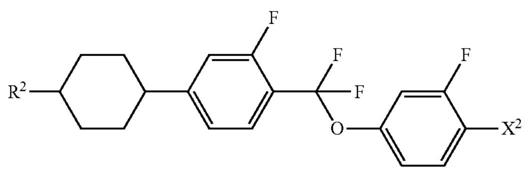
(3-86)
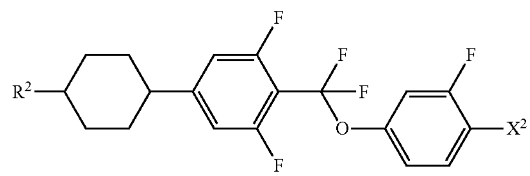
(3-87)
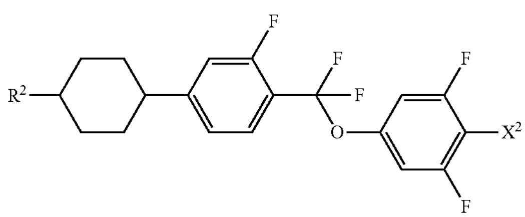
(3-88)
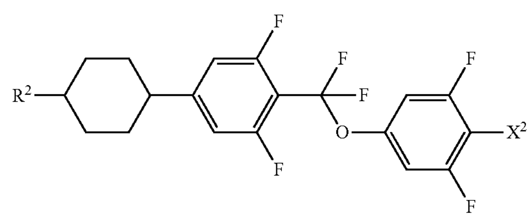
(3-89)
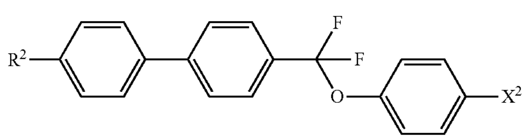
(3-90)
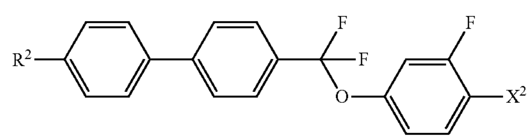
(3-91)
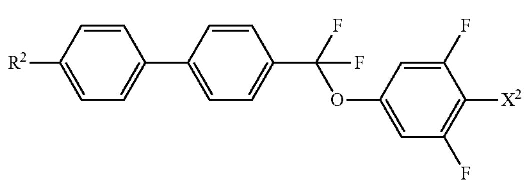
(3-92)
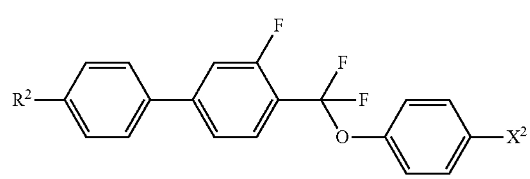
(3-93)
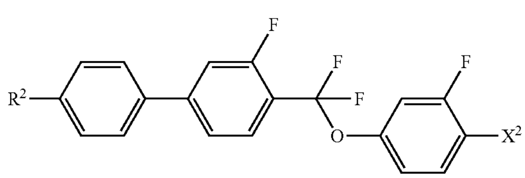
(3-94)
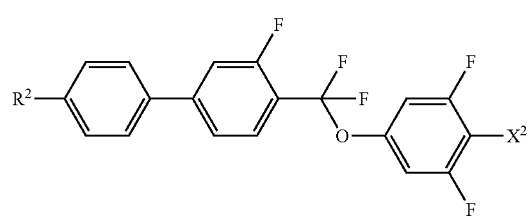

-continued
(3-95)
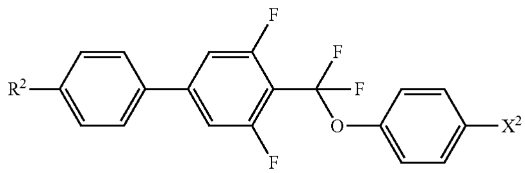
(3-96)
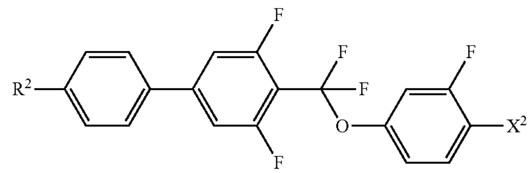
(3-97)
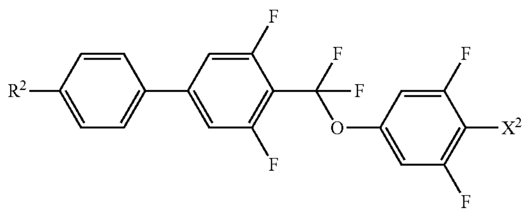
(3-98)
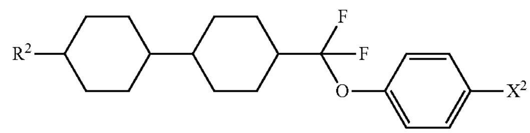
(3-99)
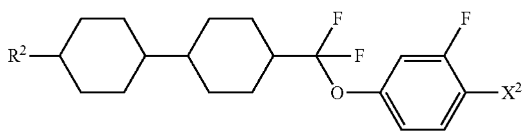
(3-100)
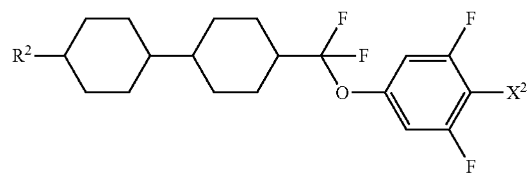
Formula 21
(3-101)
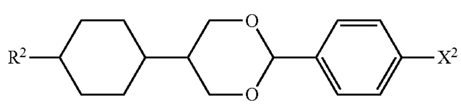
(3-102)
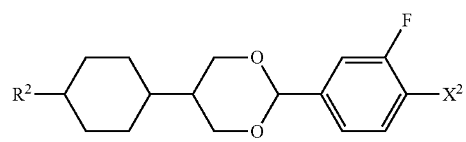
(3-103)
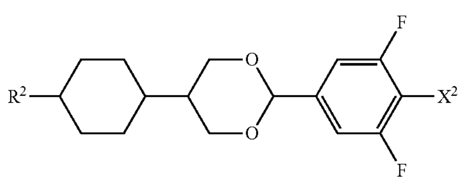
(3-104)
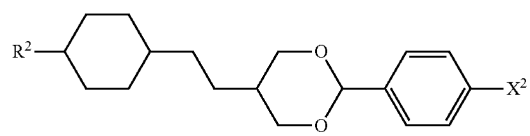
(3-105)
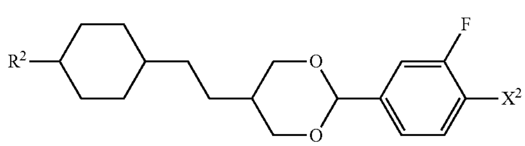
(3-106)
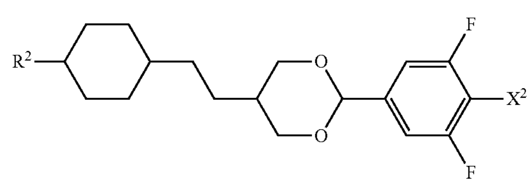
(3-107)
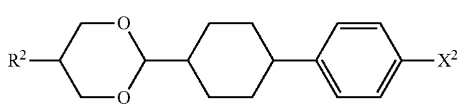
(3-108)
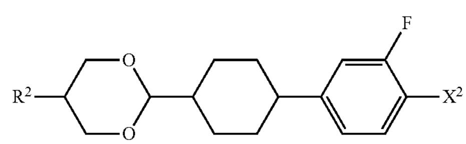
(3-109)
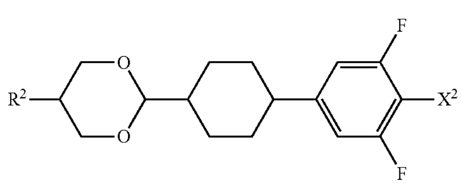
(3-110)
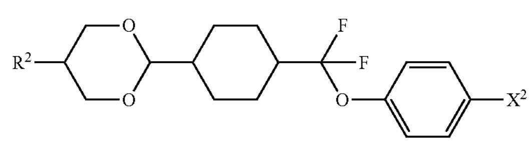

-continued
(3-111)
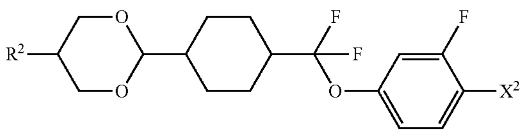
(3-112)
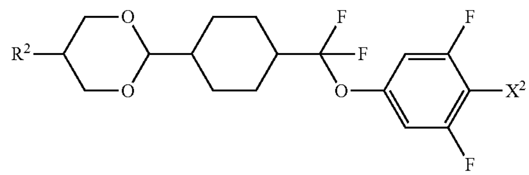
Formula 22
(4-1)
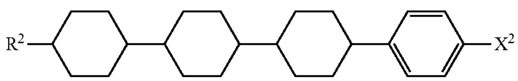
(4-2)
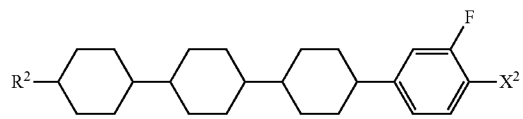
(4-3)
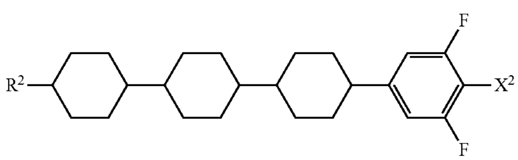
(4-4)
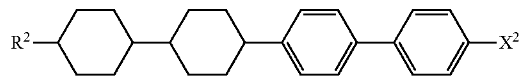
(4-5)
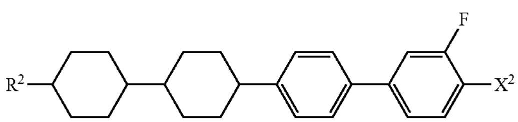
(4-6)
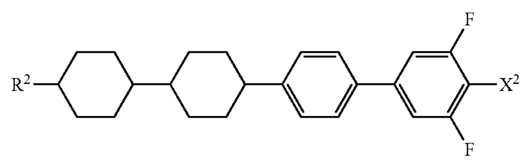
(4-7)
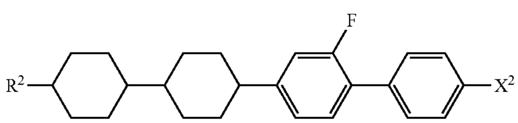
(4-8)
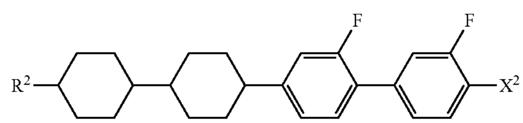
(4-9)
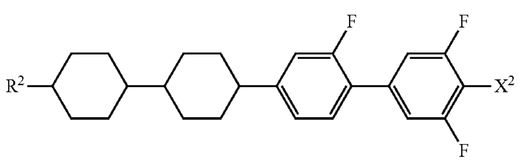
(4-10)
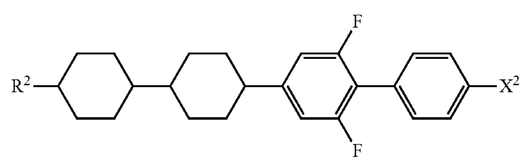
(4-11)
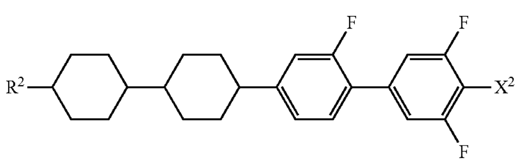
(4-12)
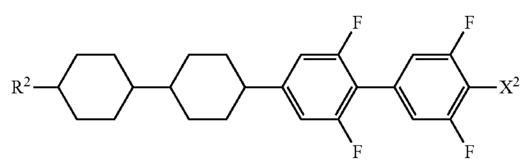
(4-13)
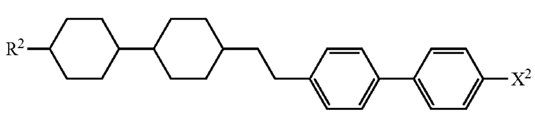
(4-14)
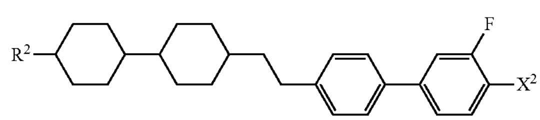
(4-15)
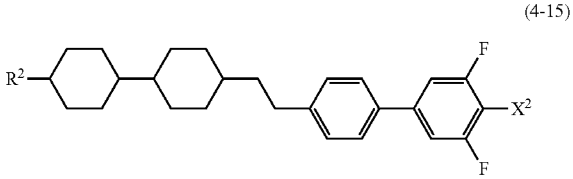
(4-16)
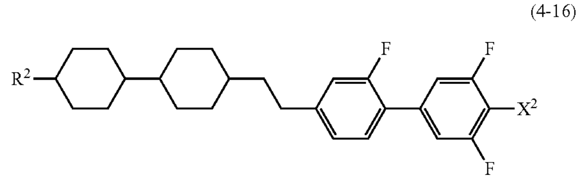

-continued
(4-17)
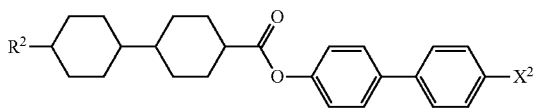
(4-18)
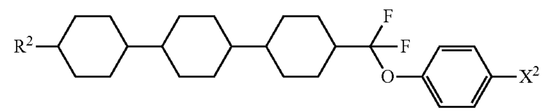
(4-19)
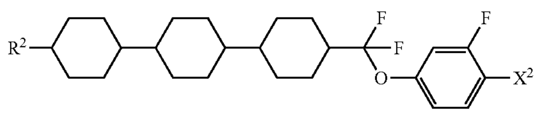
(4-20)
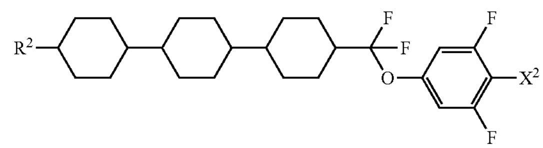
(4-21)
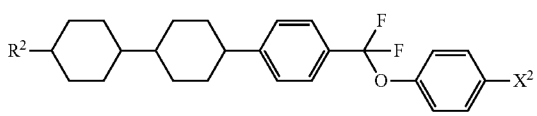
(4-22)
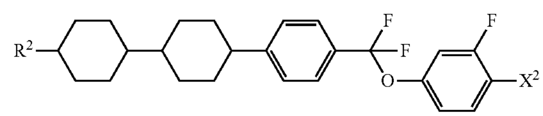
(4-23)
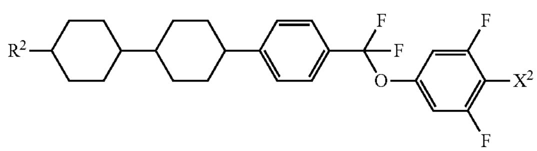
(4-24)
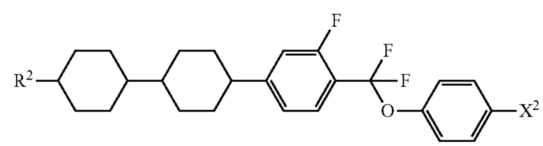
(4-25)
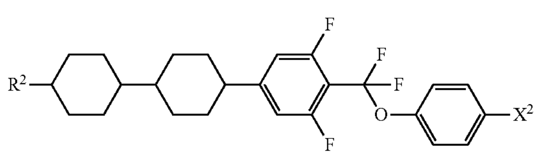
(4-26)
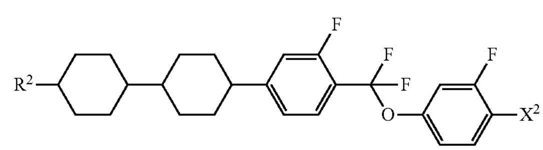
(4-27)
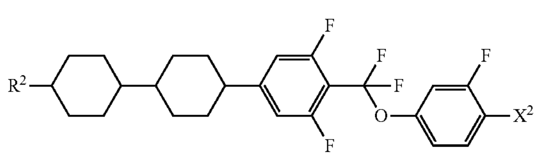
(4-28)
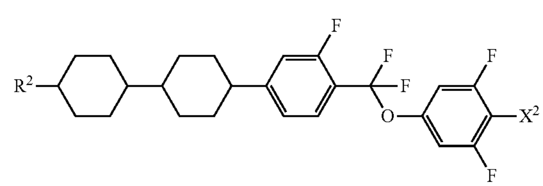
(4-29)
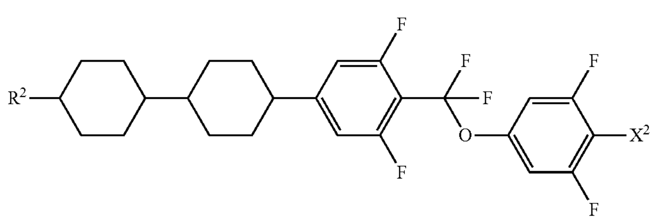
Formula 23
(4-30)
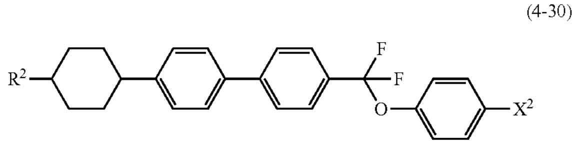
(4-31)
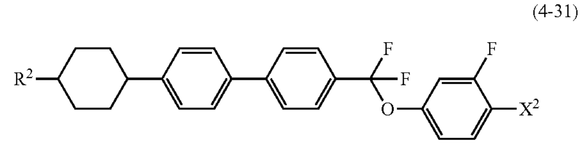
(4-32)
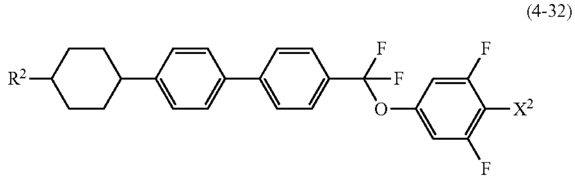
(4-33)
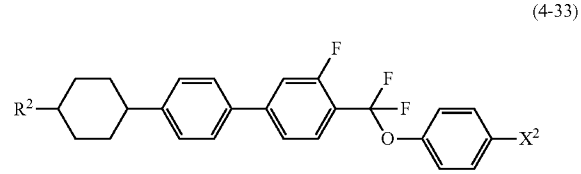

-continued
(4-34)
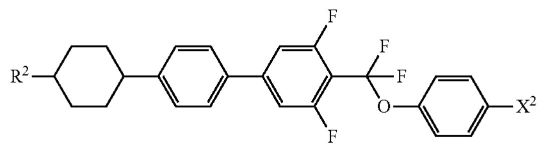
(4-35)
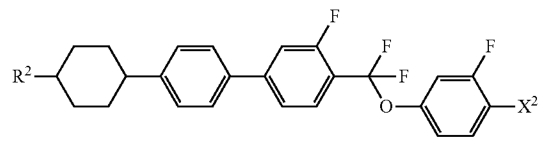
(4-36)
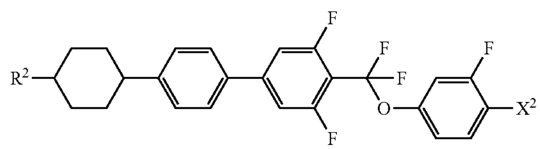
(4-37)
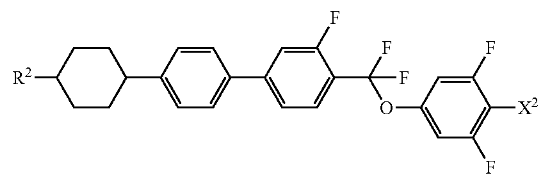
(4-38)
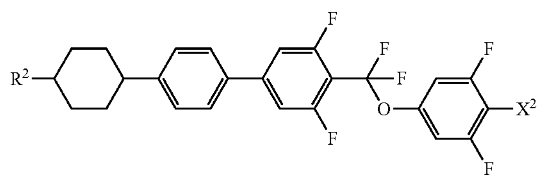
(4-39)
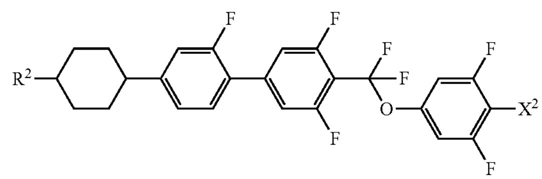
(4-40)
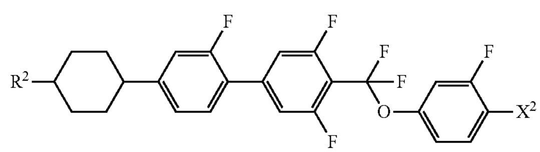
(4-41)
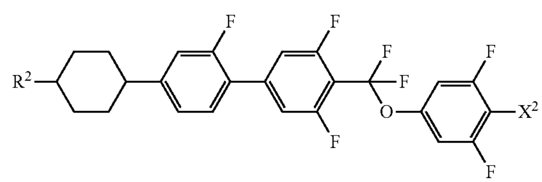
(4-42)
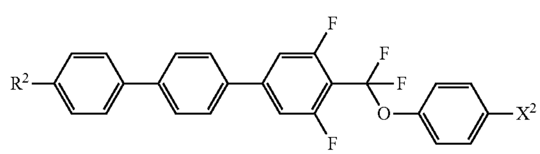
(4-43)
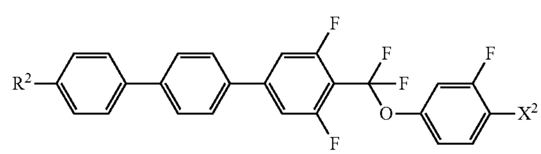
(4-44)
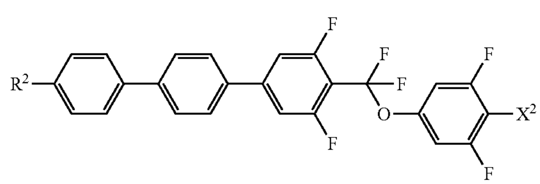
(4-45)
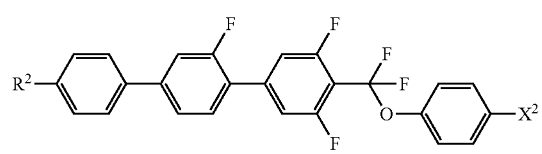
(4-46)
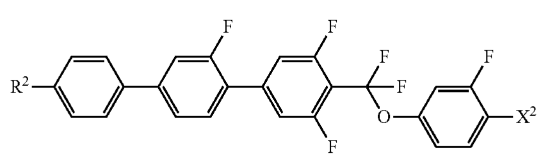
(4-47)
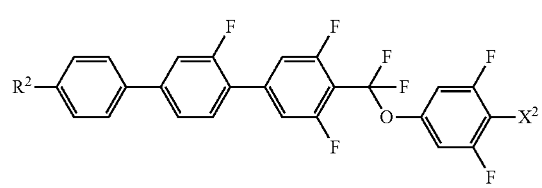
(4-48)
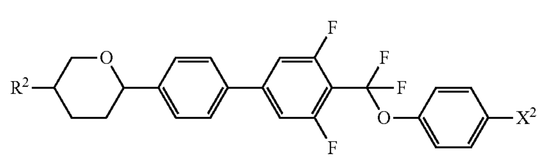
(4-49)
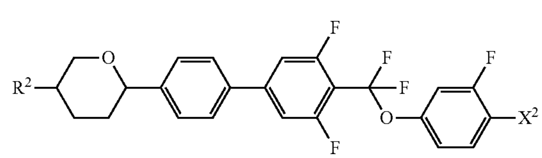

-continued (4-50)

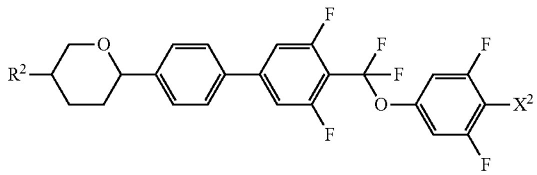

(4-51)

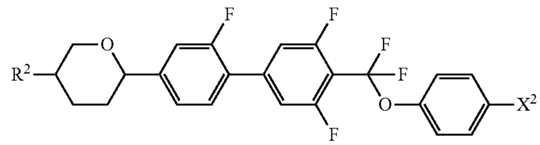

(4-52)

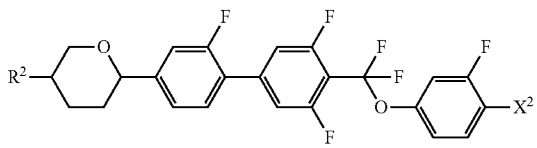

(4-53)

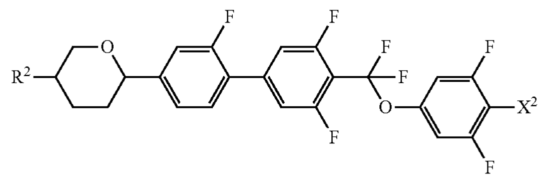

(4-54)

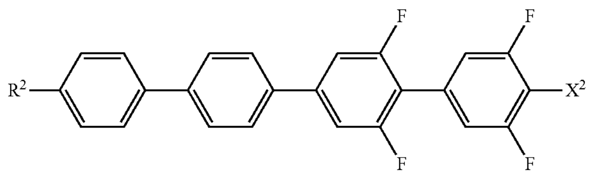

In the compounds (component B), $R^2$ and $X^2$ are defined in a manner identical with the definitions described above.

Component B has a positive dielectric anisotropy and has a superb stability to heat, light and so forth, and therefore is used when preparing a liquid crystal composition for the TFT mode or the PSA mode. Content of component B is suitably in the range of approximately 1 to approximately 99% by weight, preferably, in the range of approximately 10 to approximately 97% by weight, still further preferably, in the range of approximately 40 to approximately 95% by weight, based on the total weight of the liquid crystal composition. Moreover, when compounds (12) to (14) are further added to the composition, the viscosity can be adjusted.

Component C includes compound (5) in which a right-terminal group is —C≡N or —C≡C—C≡N. Preferred examples of component C include compounds (5-1) to (5-64).

Formula 24

(5-1)

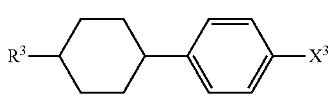

(5-2)

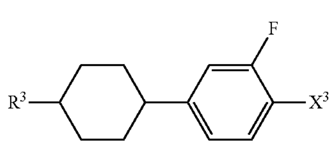

(5-3)

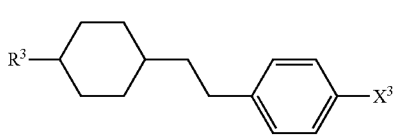

-continued (5-4)

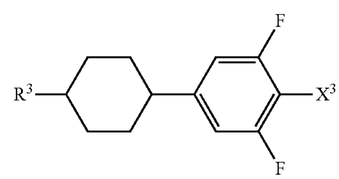

(5-5)

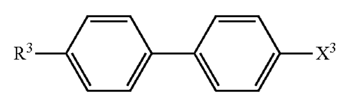

(5-6)

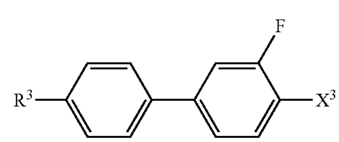

(5-7)

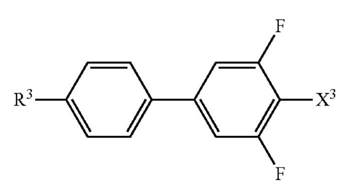

(5-8)

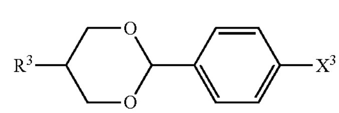

(5-9)

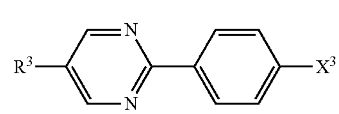

-continued
(5-10)
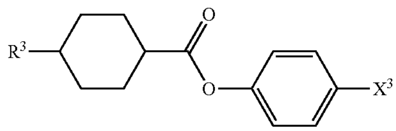
(5-11)
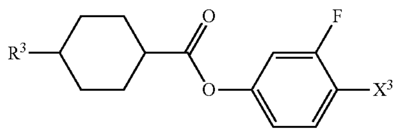
(5-12)
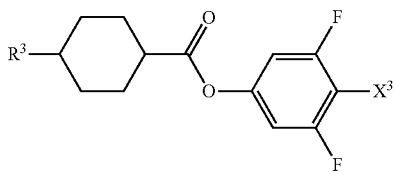
(5-13)
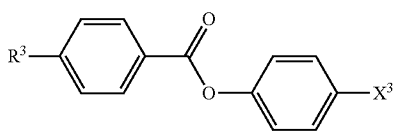
(5-14)
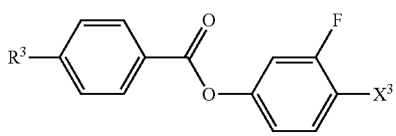
(5-15)
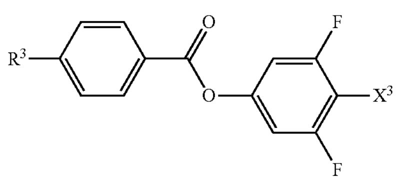
(5-16)
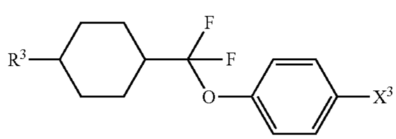
(5-17)
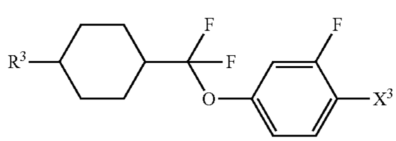
(5-18)
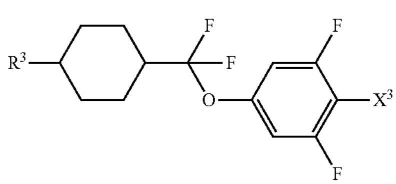
(5-19)
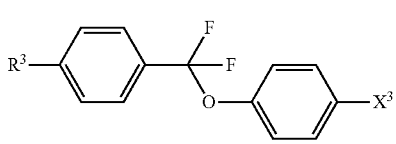
-continued
(5-20)
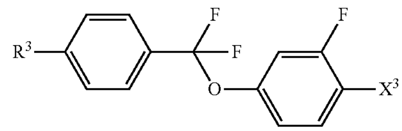
(5-21)
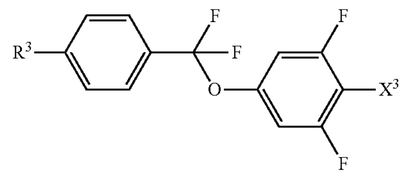
(5-22)
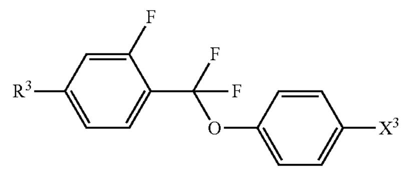
(5-23)
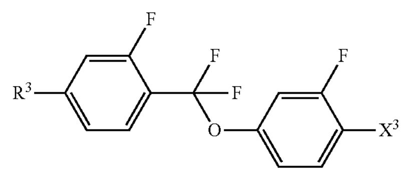
(5-24)
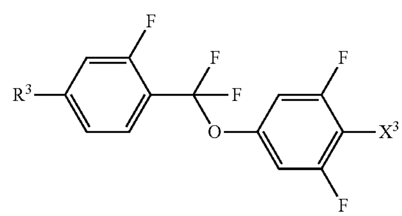
(5-25)
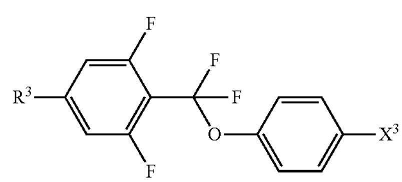
(5-26)
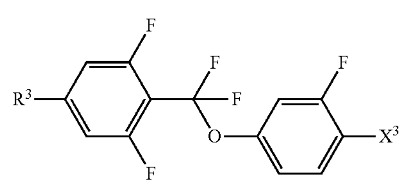
(5-27)
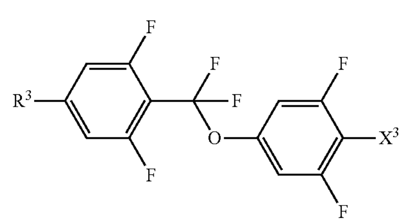
Formula 25
(5-28)
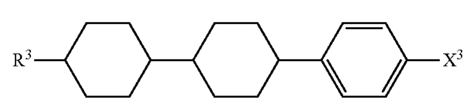

-continued
(5-29)
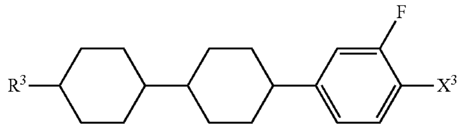
(5-30)
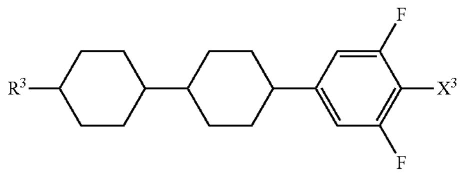
(5-31)
(5-32)
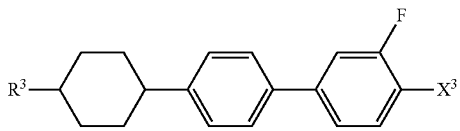
(5-33)
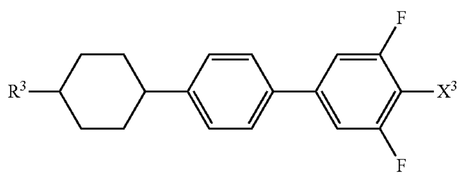
(5-34)
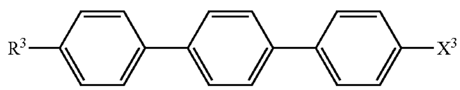
(5-35)
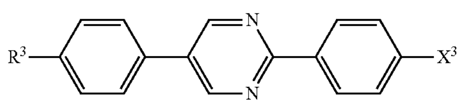
(5-36)
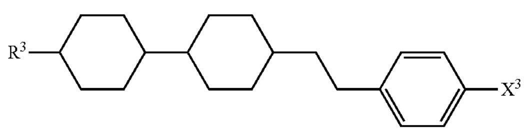
(5-37)
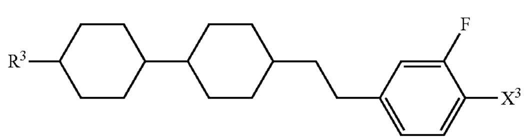
(5-38)
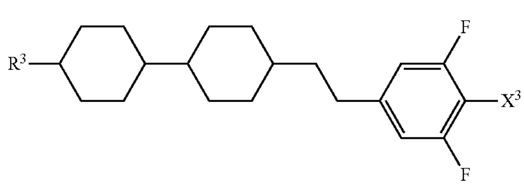
(5-39)
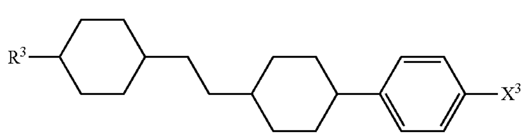
-continued
(5-40)
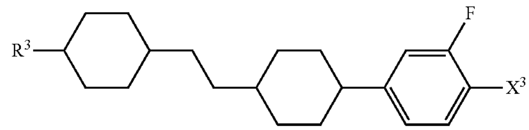
(5-41)
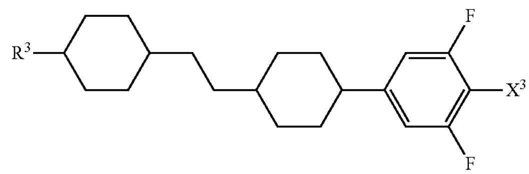
(5-42)
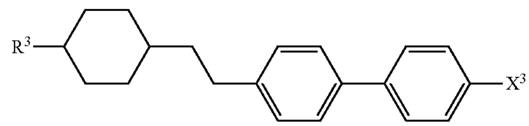
(5-43)
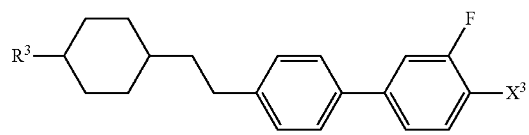
(5-44)
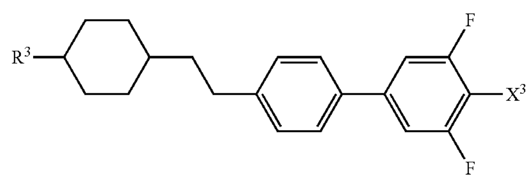
(5-45)
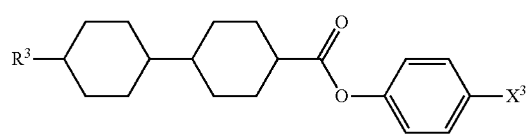
(5-46)
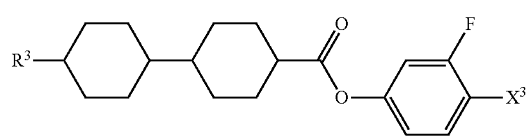
(5-47)
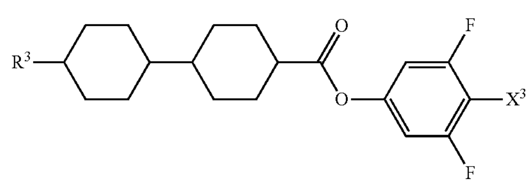
(5-48)
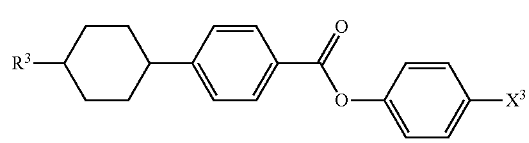

-continued (5-49)

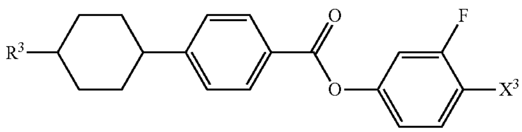

Formula 26

(5-50)

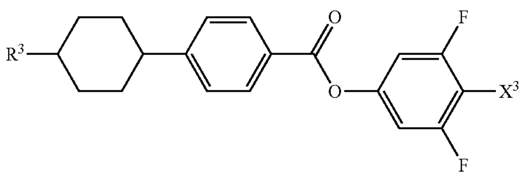

(5-51)

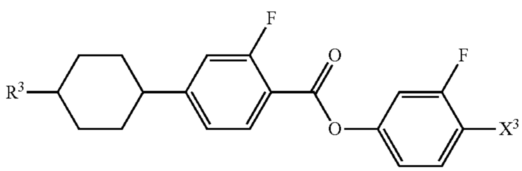

(5-52)

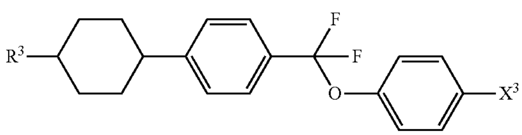

(5-53)

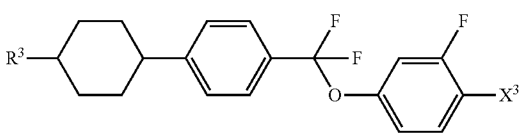

(5-54)

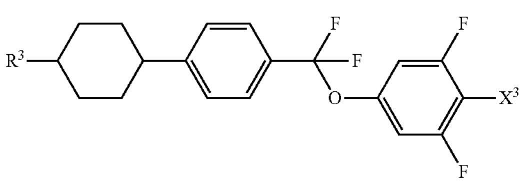

(5-55)

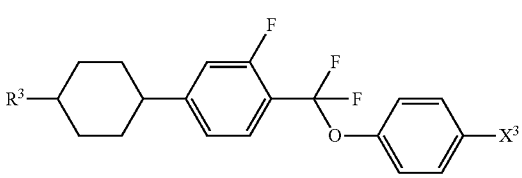

(5-56)

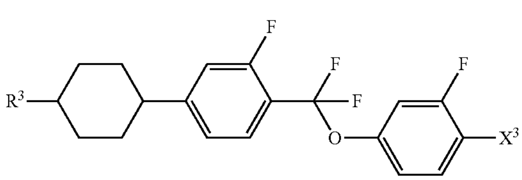

-continued (5-57)

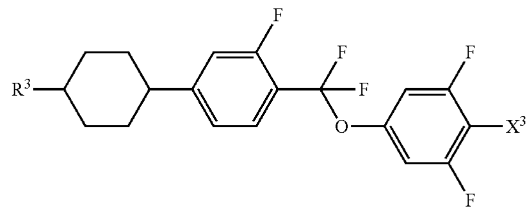

(5-58)

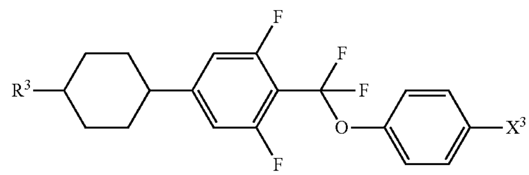

(5-59)

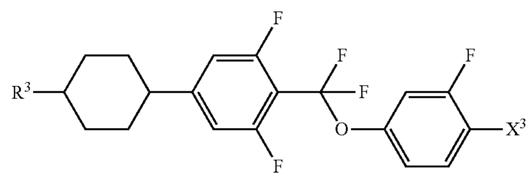

(5-60)

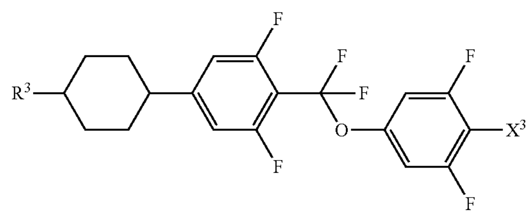

(5-61)

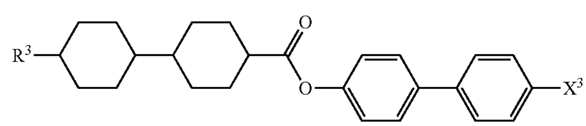

(5-62)

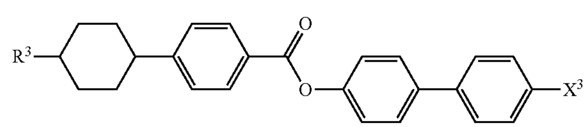

(5-63)

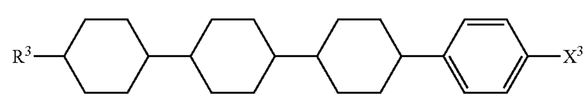

(5-64)

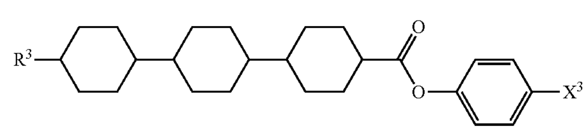

In the compounds (component C), $R^3$ and $X^3$ are defined in a manner identical with the definitions described above.

Component C has a very large positive value of dielectric anisotropy, and therefore is mainly used when preparing a liquid crystal composition for the STN mode, the TN mode or the PSA mode. When component C is added to the composition, the dielectric anisotropy of the composition can be increased. Component C is effective in extending the temperature range of the liquid crystal phase, adjusting the viscosity or adjusting the optical anisotropy. Component C is also useful for adjusting a voltage-transmittance curve of the device.

When preparing a liquid crystal composition for the STN mode or the TN mode, content of component C is suitably in the range of approximately 1 to approximately 99% by weight, preferably, in the range of approximately 10 to approximately 97% by weight, further preferably, in the range of approximately 40 to approximately 95% by weight, based on the total weight of the liquid crystal composition. When component E is added to the composition, the temperature range of the liquid crystal phase, the viscosity, the optical anisotropy, the dielectric anisotropy or the like can be adjusted.

Component D includes compounds (6) to (11). The compounds have a benzene ring in which lateral positions are replaced by two halogen atoms, such as 2,3-difluoro-1,4-phenylene. Preferred examples of component D include compounds (6-1) to (6-6), compounds (7-1) to (7-15), compound (8-1), compounds (9-1) to (9-3), compounds (10-1) to (10-11) and compounds (11-1) to (11-10).

Formula 27

(6-1)

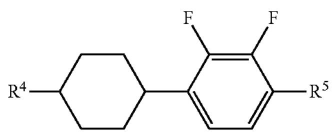

(6-2)

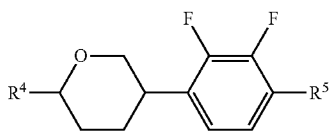

(6-3)

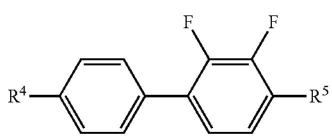

(6-4)

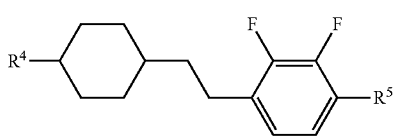

(6-5)

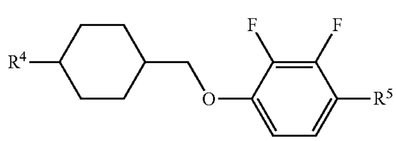

(6-6)

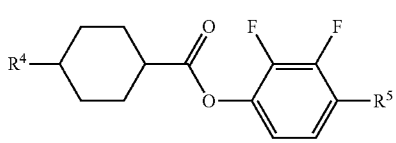

(7-1)

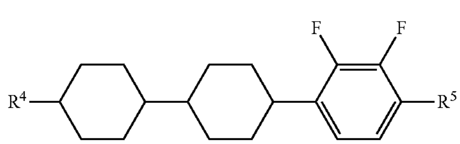

-continued (7-2)

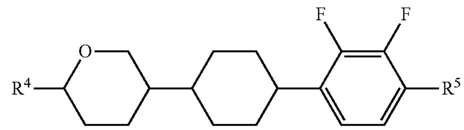

(7-3)

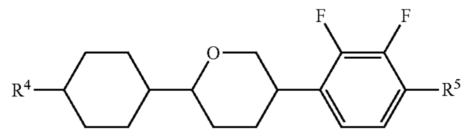

(7-4)

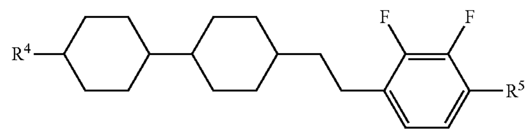

(7-5)

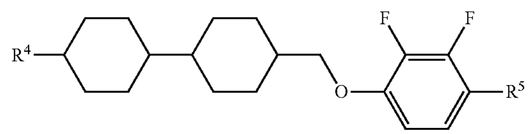

(7-6)

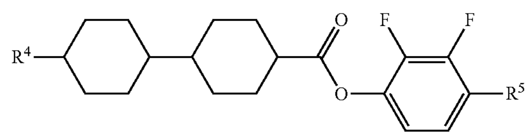

(7-7)

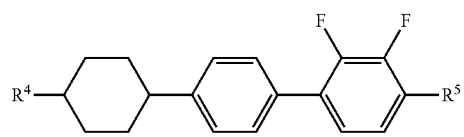

(7-8)

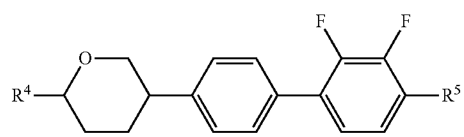

(7-9)

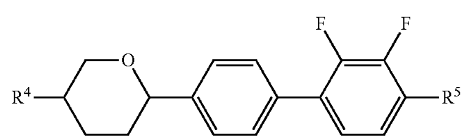

(7-10)

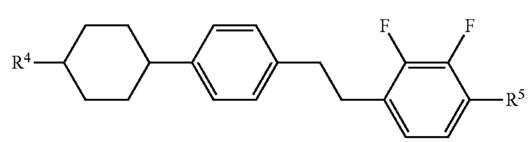

(7-11)

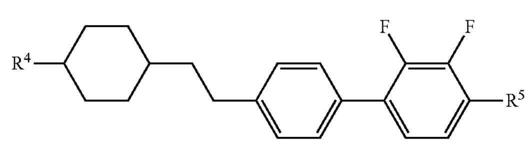

(7-12)

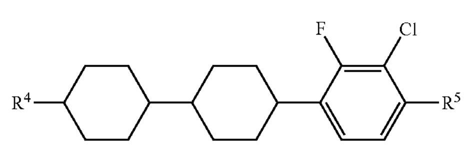

-continued
(7-13)
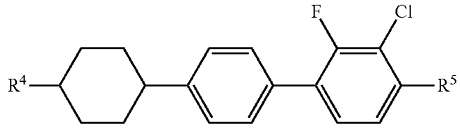
(7-14)
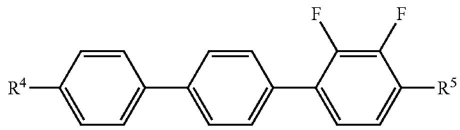
(7-15)
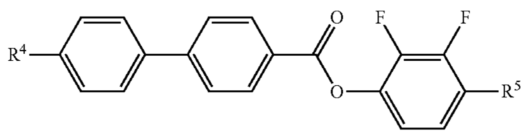
(8-1)
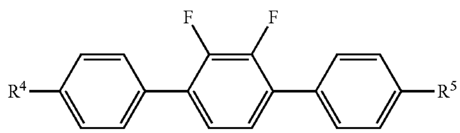
(9-1)
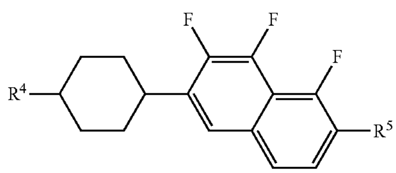
(9-2)
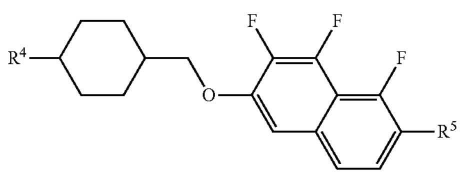
(9-3)
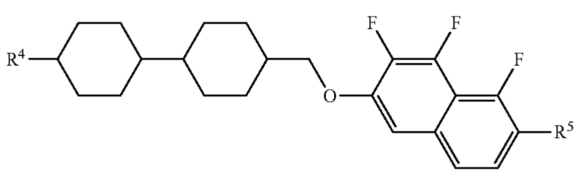
(10-1)
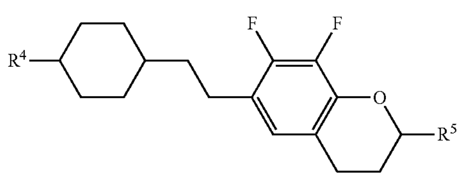
(10-2)
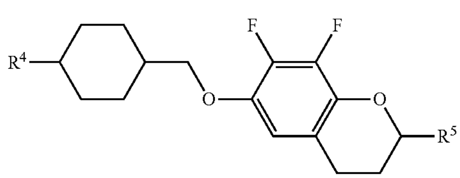
(10-3)
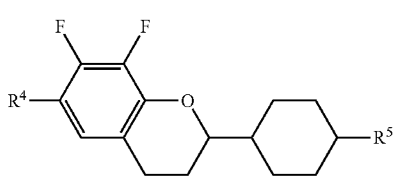
-continued
(10-4)
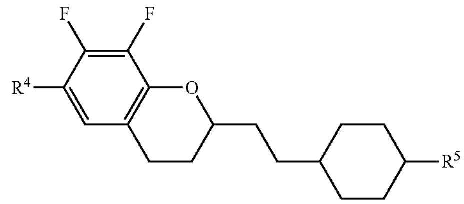
Formula 28
(10-5)
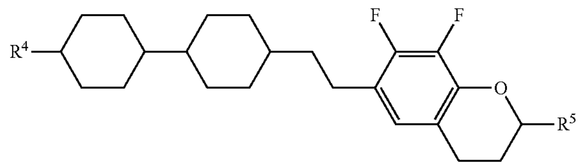
(10-6)
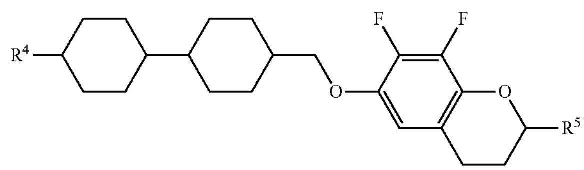
(10-7)
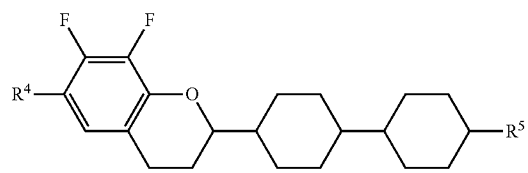
(10-8)
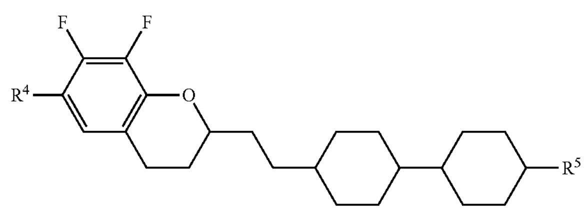
(10-9)
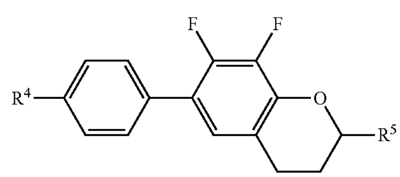
(10-10)
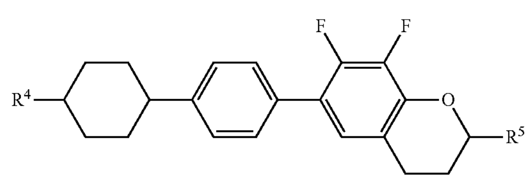
(10-11)
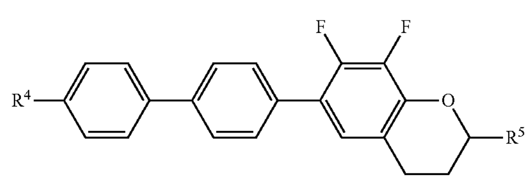

-continued (11-1)

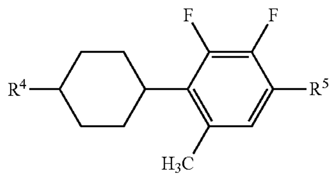

(11-2)

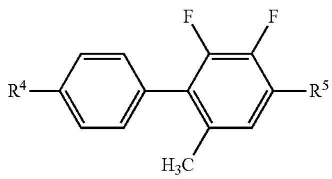

(11-3)

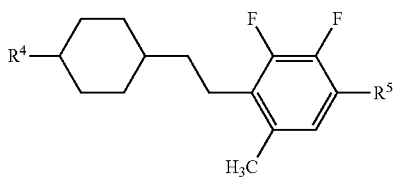

(11-4)

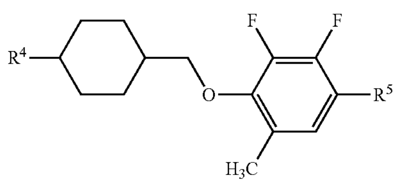

(11-5)

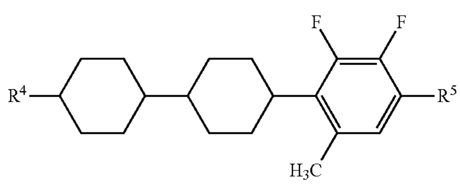

(11-6)

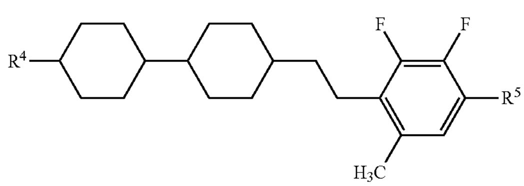

(11-7)

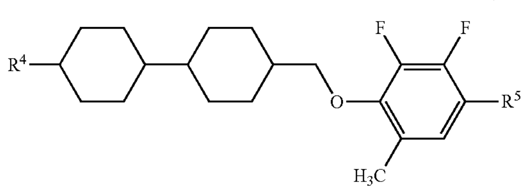

(11-8)

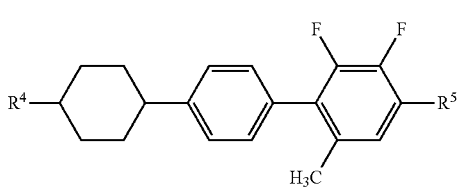

-continued (11-9)

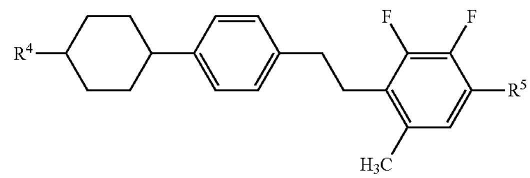

(11-10)

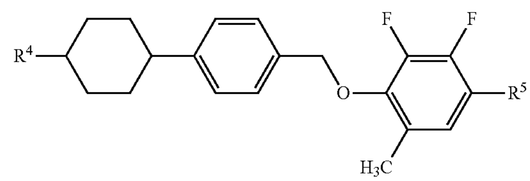

In the compounds (component D), $R^4$ and $R^5$ are defined in a manner identical with the definitions described above.

Component D includes a compound having a negative dielectric anisotropy. Component D is mainly used when preparing a composition for the VA mode or the PSA modes. If content of component D is increased, the dielectric anisotropy of the composition increases, but the viscosity also increases. Thus, the content is preferably decreased, as long as a required value of dielectric anisotropy is satisfied. Accordingly, in consideration of approximately 5 of an absolute value of dielectric anisotropy, the content is preferably in the range of approximately 40% by weight or more based on the total weight of the liquid crystal composition in order to perform sufficient voltage driving.

Among types of compound D, compound (6) is a bicyclic compound, and therefore effective mainly in adjusting the viscosity, the optical anisotropy or the dielectric anisotropy. Compound (7) and compound (8) each are a tricyclic compound, and therefore effective in increasing the maximum temperature, the optical anisotropy or the dielectric anisotropy. Compounds (9) to (11) each are effective in increasing the dielectric anisotropy.

When preparing a composition for the VA mode or the PSA mode, the content of component D is preferably in the range of approximately 40% by weight or more, further preferably, in the range of approximately 50 to approximately 95% by weight, based on the total weight of the liquid crystal composition. When component D is added to the composition, the elastic constant of the composition can be adjusted, and the voltage-transmittance curve of the device can be adjusted. When component D is added to a composition having a positive dielectric anisotropy, the content of component D is preferably in the range of approximately 30% by weight or less based on the total weight of the composition.

Component E includes a compound in which two terminal groups are alkyl or the like. Preferred examples of component E include compounds (12-1) to (12-11), compounds (13-1) to (13-19) and compounds (14-1) to (14-6).

Formula 29

(12-1)

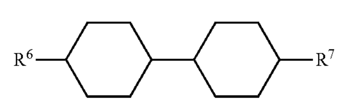

-continued
(12-2)
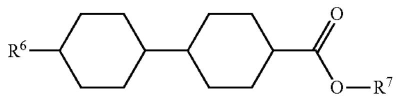
(12-3)
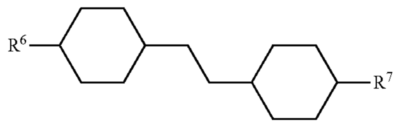
(12-4)
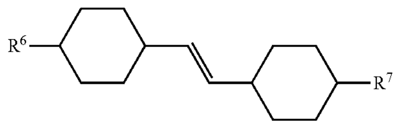
(12-5)
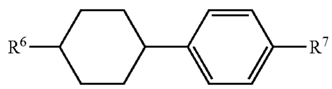
(12-6)
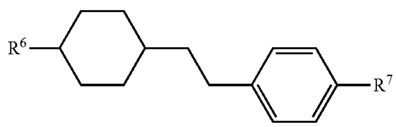
(12-7)
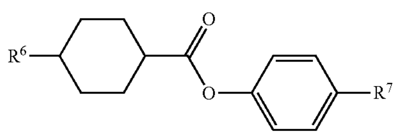
(12-8)
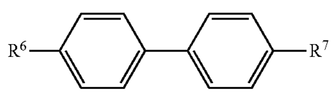
(12-9)
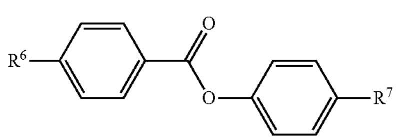
(12-10)
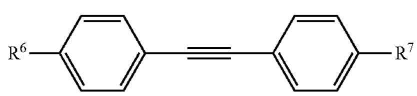
(12-11)
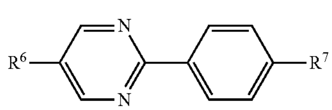
(13-1)
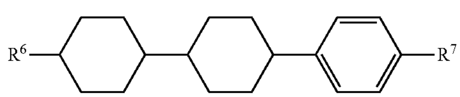
(13-2)
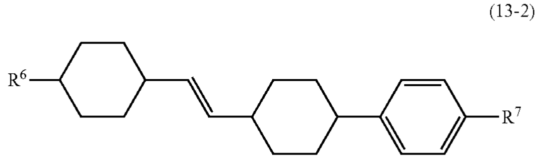
(13-3)
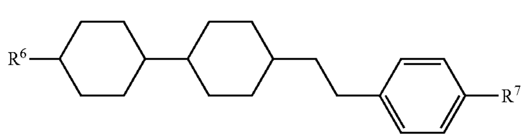
-continued
(13-4)
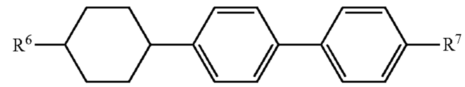
(13-5)
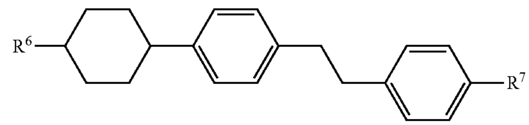
(13-6)
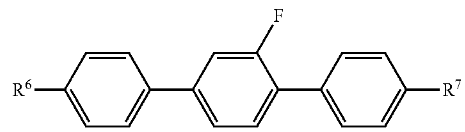
(13-7)
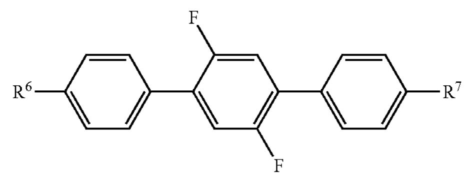
(13-8)
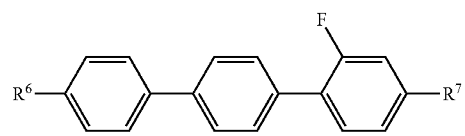
(13-9)
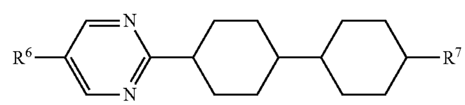
(13-10)
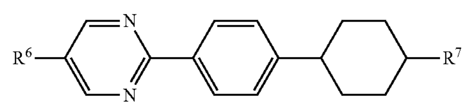
(13-11)
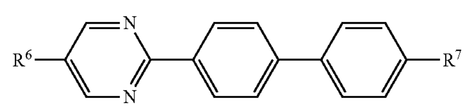
(13-12)
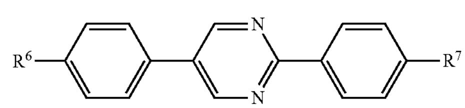
(13-13)
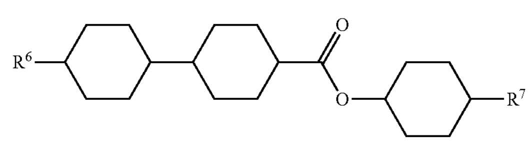
(13-14)
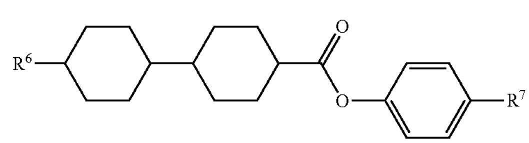
(13-15)
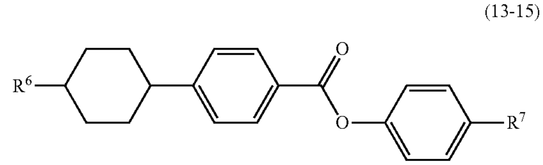

-continued (13-16)

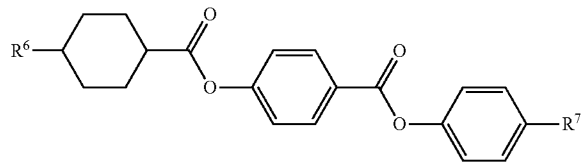

(13-17)

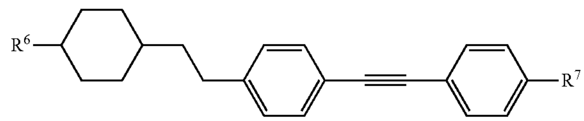

(13-18)

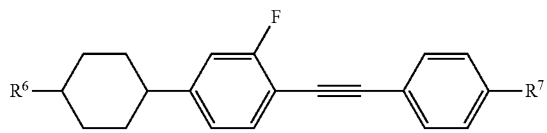

(13-19)

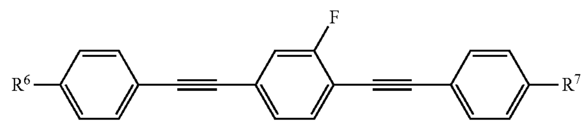

Formula 30

(14-1)

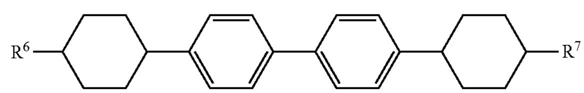

(14-2)

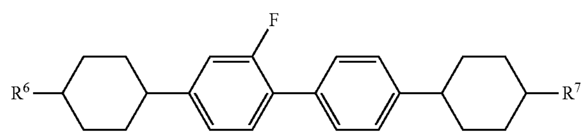

(14-3)

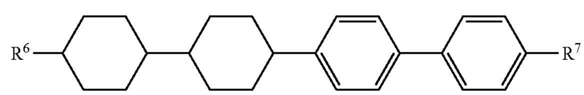

(14-4)

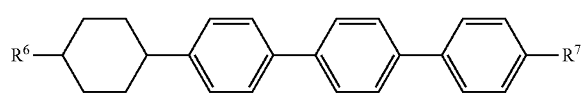

-continued (14-5)

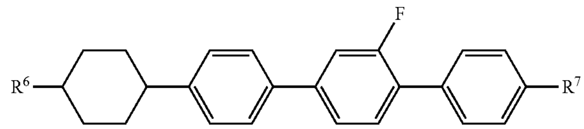

(14-6)

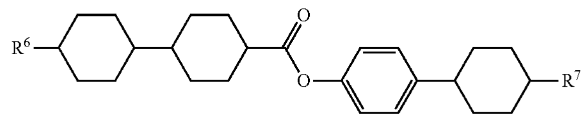

In the compounds (component E), $R^6$ and $R^7$ are defined in a manner identical with the definitions described above.

Component E has a small absolute value of dielectric anisotropy, and is close to neutrality. Compound (12) is effective mainly in adjusting the viscosity or the optical anisotropy. Compound (13) and compound (14) are effective in extending the temperature range of the nematic phase by increasing the maximum temperature, or effective in adjusting the optical anisotropy.

If the content of component E is increased, the viscosity of the composition decreases, but the dielectric anisotropy decreases. Thus, the content is preferably increased, as long as a required value for the dielectric anisotropy is satisfied. Accordingly, when preparing a liquid crystal composition for the VA mode or the PSA mode, the content of component E is preferably in the range of approximately 30% by weight or more, and further preferably, in the range of approximately 40% by weight or more, based on the total weight of the liquid crystal composition.

Composition (1) is prepared according to a method for dissolving required components at a high temperature, or the like. According to an application, an additive may be added to the composition. Examples of the additive include an optically active compound, a polymerizable compound, a polymerization initiator, an antioxidant and an ultraviolet absorber. Such additives are well known to those skilled in the art, and are described in literatures.

Composition (1) may further contain at least one optically active compound. As the optically active compound, a publicly known chiral dopant can be added. The chiral dopant is effective in inducing a helical structure of liquid crystals to give a required twist angle, and preventing an inverted twist. Preferred examples of the chiral dopants include optically active compounds (Op-1) to (Op-13) as described below.

Formula 31

(Op-1)

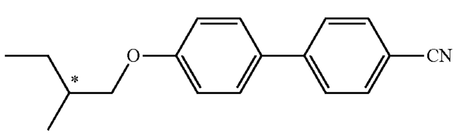

(Op-2)

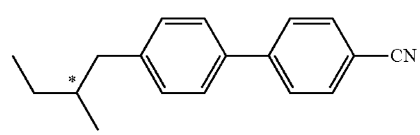

(Op-3)

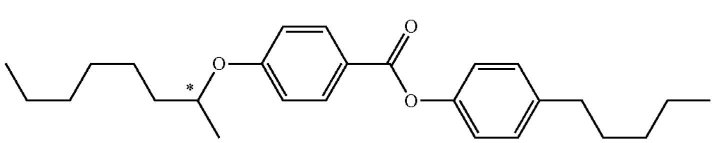

-continued
(Op-4)
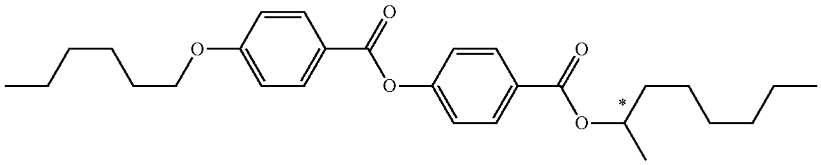
(Op-5)
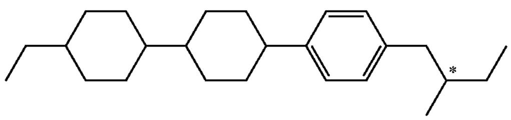
(Op-6)
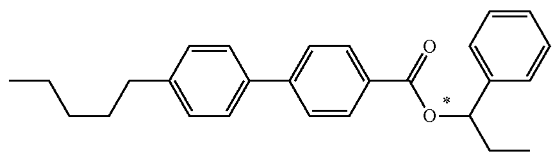
(Op-7)
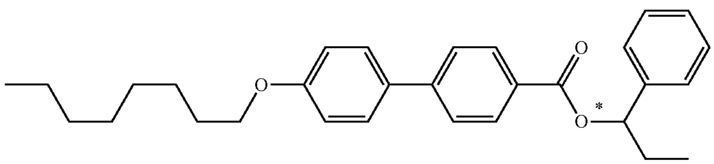
(Op-8)
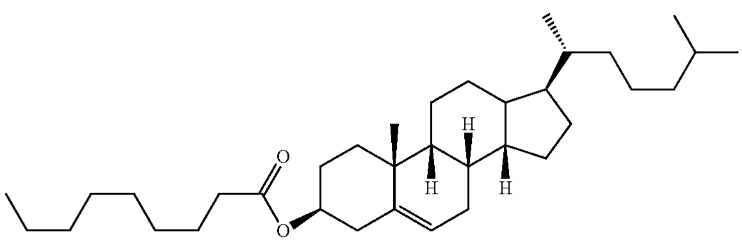
(Op-9)
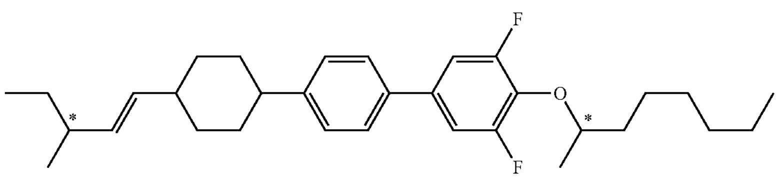
(Op-10)
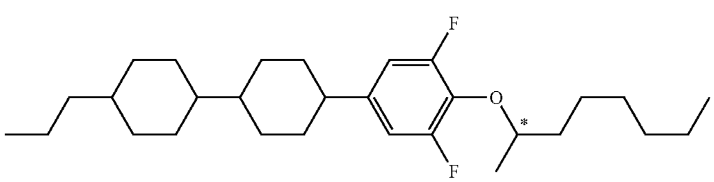
(Op-11)
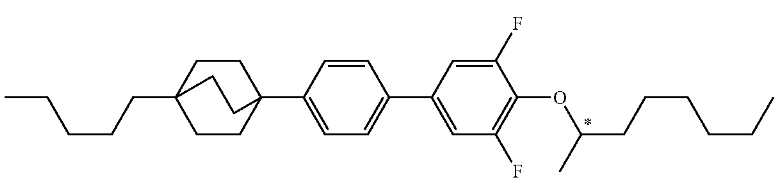
(Op-12)
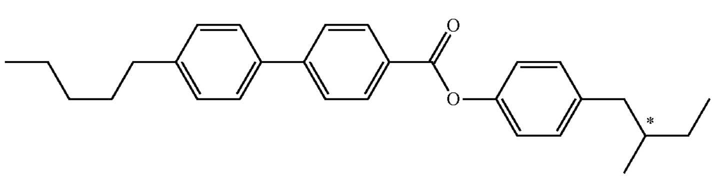

-continued (Op-13)

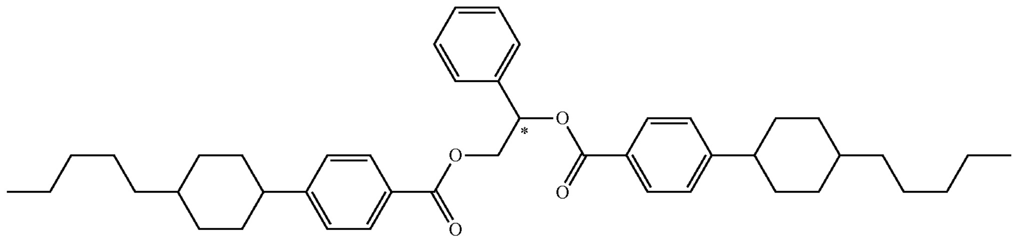

A helical pitch of composition (1) is adjusted by adding such an optically active compound. The helical pitch is preferably adjusted to the range of approximately 40 to approximately 200 micrometers for a liquid crystal composition for the TFT mode and the TN mode. The helical pitch is preferably adjusted to the range of approximately 6 to approximately 20 micrometers for a liquid crystal composition for the STN mode. The helical pitch is preferably adjusted to the range of approximately 1.5 to approximately 4 micrometers for a liquid crystal composition for the BTN mode. Two or more kinds of optically active compounds may be added for the purpose of adjusting temperature dependence of the helical pitch.

Composition (1) can also be used for the PSA mode by adding the polymerizable compound. Examples of the polymerizable compounds include an acrylate, a methacrylate, a vinyl compound, a vinyloxy compound, a propenyl ether, an epoxy compound (oxirane, oxetane) and a vinyl ketone. The polymerizable compound is preferably polymerized by irradiation with ultraviolet light in the presence of a suitable polymerization initiator such as a photopolymerization initiator. Suitable conditions for polymerization, suitable types and suitable amounts of the polymerization initiator are known to those skilled in the art and described in literatures.

The antioxidant is effective in maintaining a large voltage holding ratio. Preferred examples of the antioxidant include 2,6-di-tert-butyl-4-alkyl phenol. The ultraviolet absorber is effective in preventing a decrease in the maximum temperature. Preferred examples of the ultraviolet absorbent include a benzophenone derivative, a benzoate derivative and triazole derivative. A light stabilizer such as an amine having steric hindrance is also preferred.

If a dichroic dye of a merocyanine type, a styryl type, an azo type, an azomethine type, an azoxy type, a quinophthalone type, an anthraquinone type, a tetrazine type or the like is added to the composition, composition (1) can also be used for a guest-host (GH) mode.

3. Liquid Crystal Display Device

Composition (1) can be used for a liquid crystal display device that has the operating mode such as the PC mode, the TN mode, the STN mode, the OCB mode and the PSA mode, and is driven according to an active matrix (AM) mode. Composition (1) can also be used for a liquid crystal display device that has the operating mode such as the PC mode, the TN mode, the STN mode, the OCB mode, the VA mode and the IPS mode, and is driven according to a passive matrix (PM) mode. The devices according to the AM mode and the PM mode can also be applied to any type of a reflective type, a transmissive type and a transflective type.

Composition (1) can also be used for a nematic curvilinear aligned phase (NCAP) device prepared by microencapsulating nematic liquid crystals, a polymer dispersed liquid crystal display device (PDLCD) prepared by forming a three-dimensional network polymer in the liquid crystals, and a polymer network liquid crystal display device (PDLCD).

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Hereafter, the invention will be explained in more detail by way of Examples, but the invention is not limited by the Examples.

1-1. Examples of Compound (1)

Compound (1) was prepared according to procedures as described below. A compound prepared was identified by a method such as an NMR analysis. Physical properties of the compound were measured by methods as described below.

NMR Analysis

As a measuring apparatus, DRX-500 (made by Bruker BioSpin Corporation) was used. In measurement of $^1$H-NMR, a sample was dissolved into a deuterated solvent such as $CDCl_3$, and measurement was carried out under the conditions of room temperature, 500 MHz and 16 times of accumulation. Tetramethylsilane was used as a reference material. In measurement of $^{19}$F-NMR, $CFCl_3$ was used as a reference material, and measurement was carried out under the conditions of 24 times of accumulation. In the explanation of nuclear magnetic resonance spectra, s, d, t, q, quin, sex, m and br stand for a singlet, a doublet, a triplet, a quartet, a quintet, a sextet, a multiplet and broad, respectively.

Measurement Sample

When measuring a phase structure and a transition temperature, a liquid crystal compound per se was used as a sample. When measuring physical properties such as a maximum temperature of a nematic phase, viscosity, optical anisotropy and dielectric anisotropy, a composition prepared by mixing a compound with a base liquid crystal was used as a sample.

When using the sample in which the compound is mixed with the base liquid crystal, measurement was carried out according to the methods described below. A sample was prepared by mixing 15% by weight of compound with 85% by weight of base liquid crystal. Extrapolated values were calculated from measured values of the sample, according to an extrapolation method represented by an equation described below, and the values were described.

(Extrapolated value)={100×(measured value of a sample)−(% by weight of base liquid crystal)×(measured value of the base liquid crystal)}/(% by weight of compound).

When a crystal (or a smectic phase) precipitated at 25° C. even at the ratio of the compound to the base liquid crystal, a ratio of the compound to the base liquid crystal was changed in the order of (10% by weight:90% by weight), (5% by weight:95% by weight) and (1% by weight:99% by weight), and physical properties of a sample were measured at a ratio at which no crystal (or no smectic phase) precipitated at 25° C. In addition, unless otherwise noted, the ratio of the compound to the base liquid crystal is 15% by weight:85% by weight.

As the base liquid crystal, base liquid crystal (i) as described below was used. Ratios of components in base liquid crystal (i) are expressed in terms of weight percent.

Formula 32

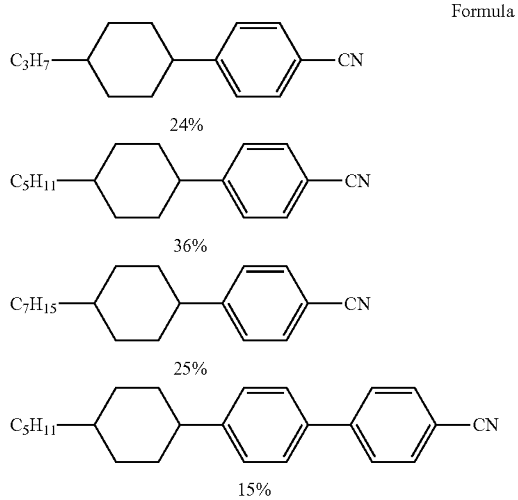

Measuring Method

Physical properties were measured according to the methods described below. Most of the methods are applied as described in an EIAJ standard (EIAJ ED-2521A) to be discussed and established in Japan Electronics and Information Technology Industries Association (hereinafter, abbreviated as JEITA), or as modified thereon. No TFT was attached to a TN device used for measurement.

(1) Phase Structure

A sample was placed on a hot plate of a melting point apparatus (FP-52 Hot Stage made by Mettler-Toledo International Inc.) equipped with a polarizing microscope, and a state of phase and a change thereof were observed with the polarizing microscope while heating the sample at a rate of 3° C. per minute, and a kind of the phase was specified.

(2) Phase Transition Temperature (° C.)

A sample was heated and then cooled at a rate of 3° C. per minute using a differential scanning calorimeter, DSC-7 System or Diamond DSC System, made by PerkinElmer, Inc. A starting point of an endothermic peak or an exothermic peak caused by a phase change of the sample was determined by extrapolation, and thus a phase transition temperature was determined. Temperature at which a compound transits from a solid to a liquid crystal phase such as a smectic phase and a nematic phase may be occasionally abbreviated as "minimum temperature of the liquid crystal phase." Temperature at which a compound transits from the liquid crystal phase to a liquid may be occasionally abbreviated as "clearing point."

The crystal was expressed as C. When kinds of the crystals were further distinguishable, each of the crystals was expressed as $C_1$ or $C_2$. The smectic phase was expressed as S and the nematic phase as N. When smectic A phase, smectic B phase, smectic C phase or smectic F phase was distinguishable among the smectic phases, the phases were expressed as $S_A$, $S_B$, $S_C$ or $S_F$, respectively. A liquid (isotropic) was expressed as I. The phase transition temperature was expressed, for example, as "C 50.0 N 100.0 I." The expression shows that a phase transition temperature from the crystal to the nematic phase is 50.0° C., and a phase transition temperature from the nematic phase to the liquid is 100.0° C.

(3) Compatibility at a Low Temperature

Samples were prepared in which a base liquid crystal and a liquid crystal compound were mixed for a ratio of the compound to be 20% by weight, 15% by weight, 10% by weight, 5% by weight, 3% by weight and 1% by weight, and the samples were put in glass vials. The glass vials were kept in freezers at −10° C. or −20° C. for a fixed period of time, and then whether or not a crystal or a smectic phase precipitated was observed.

(4) Maximum Temperature of a Nematic Phase ($T_{NI}$ or NI; ° C.)

A sample was placed on a hot plate of a melting point apparatus equipped with a polarizing microscope, and heated at a rate of 1° C. per minute. Temperature when part of the sample changed from the nematic phase to the isotropic liquid was measured. A maximum temperature of the nematic phase may be occasionally abbreviated as "maximum temperature." When the sample was a mixture of the compound and the base liquid crystal, the maximum temperature was expressed using a symbol of $T_{NI}$. When the sample was a mixture of the compound and component B or the like, the maximum temperature was expressed using a symbol of NI.

(5) Minimum Temperature of a Nematic Phase ($T_c$; ° C.)

Samples each having a nematic phase were kept in freezers at 0° C., −10° C., −20° C., −30° C. and −40° C. for 10 days, and then liquid crystal phases were observed. For example, when a sample maintained the nematic phase at −20° C. and changed to a crystal or a smectic phase at −30° C., $T_c$ was expressed as $T_c \leq -20$° C. A minimum temperature of the nematic phase may be occasionally abbreviated as "minimum temperature."

(6) Viscosity (Bulk Viscosity; η; Measured at 20° C.; mPa·s)

Viscosity was measured using a cone-plate (E type) rotational viscometer.

(7) Viscosity (Rotational Viscosity; β1; Measured at 25° C.; mPa·s)

Measurement was carried out according to a method described in M. Imai et al., Molecular Crystals and Liquid Crystals, Vol. 259, 37 (1995). A sample was put in a TN device in which a twist angle was 0 degrees and a distance (cell gap) between two glass substrates was 5 micrometers. Voltage was stepwise applied to the device in the range of 16 V to 19.5 V at an increment of 0.5 V. After a period of 0.2 second with no voltage application, application was repeated under conditions of only one of rectangular waves (rectangular pulse; 0.2 second) and no application (2 seconds). A peak current and a peak time of a transient current generated by the application were measured. A value of rotational viscosity was obtained from the measured values according to calculating equation (8) on page 40 of the paper by Imai et al. A value of dielectric anisotropy necessary for the calculation was determined by using the device used for measuring the rotational viscosity according to the method as described below.

(8) Optical Anisotropy (Refractive Index Anisotropy; Measured at 25° C.; Δn)

Measurement was carried out by means of Abbe refractometer with a polarizing plate mounted on an ocular by using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy (Δn) was calculated from an equation: Δn=n∥−n⊥.

(9) Dielectric Anisotropy (Δ∈; Measured at 25° C.)

A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant (∈∥) in the major axis direction of liquid crystal molecules was measured. Sine waves (0.5 V, 1 kHz) were applied to the device, and after 2 seconds, a dielectric constant (∈⊥) in the minor axis direction of the liquid crystal molecules was measured. A value of dielectric anisotropy was calculated from an equation: Δ∈=∈∥−∈⊥.

(10) Elastic Constant (K; Measured at 25° C.; pN)

HP4284A LCR Meter made by Yokogawa-Hewlett-Packard Co. was used for measurement. A sample was put in a horizontal alignment cell in which a distance (cell gap) between two glass substrates was 20 micrometers. An electric charge from 0 V to 20 V was applied to the cell, and electrostatic capacity and applied voltage were measured. Measured values of the electrostatic capacity (C) and the applied voltage (V) were fitted to equation (2.98) and equation (2.101) on page 75 of "Liquid Crystal Device Handbook" (Ekisho Debaisu Handobukku in Japanese) (The Nikkan Kogyo Shimbun, Ltd.), and values of $K_{11}$ and $K_{33}$ were obtained from equation (2.99). Next, $K_{22}$ was calculated using the previously determined values of $K_{11}$ and $K_{33}$ in equation (3.18) on page 171 of the same Handbook. An elastic constant is a mean value of the thus determined $K_{11}$, $K_{22}$ and $K_{33}$.

(11) Threshold Voltage (Vth; Measured at 25° C.; V)

An LCD-5100 luminance meter made by Otsuka Electronics Co., Ltd. was used for measurement. A light source was a halogen lamp. A sample was put in a normally white mode TN device in which a distance (cell gap) between two glass substrates was 0.45/Δn (μm) and a twist angle was 80 degrees. Voltage (32 Hz, rectangular waves) to be applied to the device was stepwise increased from 0 V to 10 V at an increment of 0.02 V. On the occasion, the device was irradiated with light from a direction perpendicular to the device, and the amount of light transmitted through the device was measured. A voltage-transmittance curve was prepared, in which the maximum amount of light corresponds to 100% transmittance and the minimum amount of light corresponds to 0% transmittance. A threshold voltage is a voltage at 90% transmittance.

(12) Voltage Holding Ratio (VHR-1; at 25° C.; %)

A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

(13) Voltage Holding Ratio (VHR-2; at 80° C.; %)

A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the TN device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Raw Materials

Solmix A-11 (registered tradename) is a mixture of ethanol (85.5%), methanol (13.4%) and isopropanol (1.1%), and obtained from Japan Alcohol Trading Co., Ltd. Tetrahydrofuran may be occasionally abbreviated as THF.

Example 1

Synthesis of Compound

No. 1-1-11

Formula 33

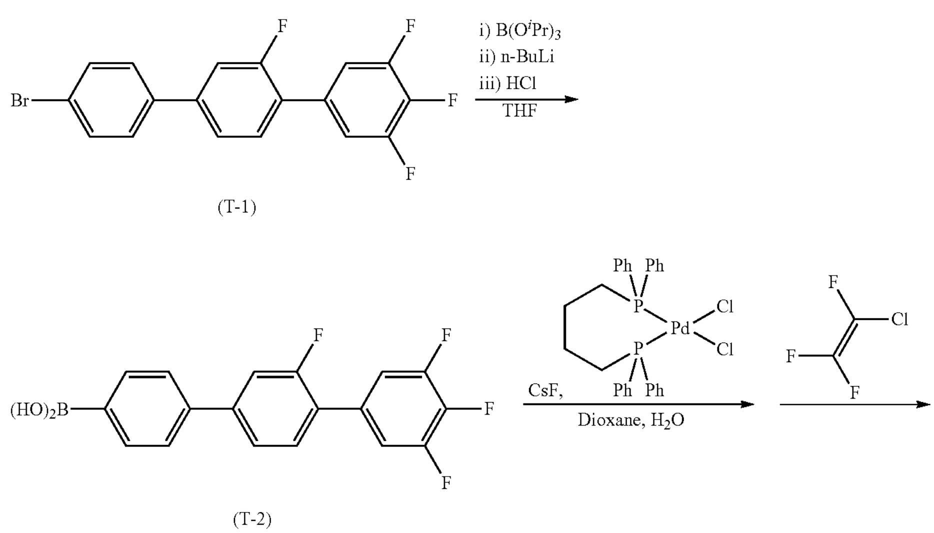

-continued

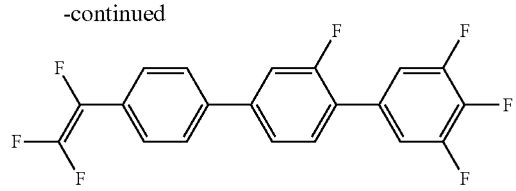

(1-1-11)

First Step

In a 500 mL recovery flask, 6.00 g (15.7 mmol) of aryl bromide (T-1) was weighed, subjected to heating drying at 70° C. under reduced pressure for 2 hours, allowed to be cooled to room temperature, subjected to substitution to be under an argon atmosphere, and then dissolved into anhydrous THF (120 mL), and cooled to −78° C. To the solution, 4.80 mL (20.8 mmol) of triisopropyl borate was added, 12.5 mL (20.6 mmol) of hexane solution of 1.65 M n-butyllithium was slowly added dropwise, and the resulting mixture was stirred at −78° C. for 2 hours. To the reaction mixture, 1 M hydrochloric acid aqueous solution (90 mL) and ethyl acetate (120 mL) were added, and the resulting mixture was stirred at room temperature for 10 minutes. After liquids were separated, an aqueous layer was extracted with ethyl acetate (90 mL, twice), combined organic layers were sequentially washed with a saturated aqueous solution of sodium hydrogencarbonate (50 mL) and pure water (50 mL), dried, and concentrated under reduced pressure. The resulting solid was suspended into anhydrous THF (40 mL) and chloroform (10 mL), subjected to ultrasonic treatment for 10 minutes, and then filtered, and washed with chloroform, and thus arylboronic acid (T-2) (4.70 g, 13.6 mmol) was obtained.

Second Step

To a 100 mL Pyrex tube, 5.54 g (16.0 mmol) of arylboronic acid (T-2), 96.6 mg (0.160 mmol) of dichloro[1,4-bis(diphenylphosphinobutane]palladium (II), 4.86 g (32.0 mmol) of cesium fluoride were weighed, and subjected to substitution to be under an argon atmosphere, and then anhydrous dioxane (32 mL) and pure water (1.6 mL) were added thereto. The suspension was degassed, and then cooled to −78° C. Then, 4.66 g (40.0 mmol) of 1-chloro-1,2,2-trifluoroethylene was added, the tube was sealed, and then the resulting mixture was stirred at 100° C. for 1 hour. The reaction mixture was filtered with a glass filter lined with a silica gel, the filter residue was washed with ethyl acetate, and the filtrate was concentrated under reduced pressure. The resulting solid was purified with automated medium pressure column chromatography made by Yamazen Corporation (column size M+L (silica gel 330 g), hexane). The resulting product was further purified by recrystallization from hexane-ethyl acetate, and thus compound (No. 1-1-11) (2.57 g, 6.72 mmol) was obtained.

$^1$H-NMR (δ ppm; $CDCl_3$): 7.68 (brd, J=8.3 Hz, 2H), 7.58 (brd, J=8.3 Hz, 2H), 7.53-7.39 (m, 3H), 7.26-7.21 (m, 2H). $^{19}$F-NMR (δ ppm; $CDCl_3$): −98.6 (dd, J=68.2 Hz, J=32.7 Hz, 1F), −113.5 (dd, J=109.0 Hz, J=68.2 Hz, 1F), −117.1 (s, 1F), −134.2 (d, J=20.4 Hz, 2F), −161.2 (t, J=20.4 Hz, 1F), −177.1 (dd, J=109.0 Hz, J=32.7 Hz, 1F).

Physical properties of compound (No. 1-1-11) were as described below.

Transition temperature: C 105.5 I. $T_{NI}$=81.7° C.; η=76.8 mPa·s; Δn=0.287.

In addition, a measurement sample was prepared using 2% by weight of compound (No. 1-1-11) and 98% by weight of base liquid crystal (i). The reason is that a crystal precipitated at an ordinary ratio (15% by weight:85% by weight).

Example 2

Synthesis of Compound No. 1-1-12

Formula 34

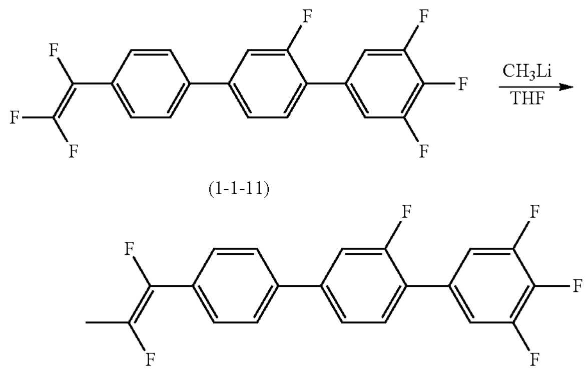

(1-1-11)

(1-1-12)

In a 50 mL recovery flask, 5.25 g (13.7 mmol) of compound (No. 1-1-11) was weighed, subjected to substitution to be under an argon atmosphere, and then dissolved into anhydrous THF (140 mL), and cooled to −78° C. To the solution, 15.5 mL (16.9 mmol) of diethyl ether solution of 1.09 M methyllithium was added, and the resulting mixture was stirred at −78° C. for 3o minutes. To the reaction mixture, 30% ammonium chloride aqueous solution (100 mL) was added, liquids were separated, a sodium chloride aqueous solution (20 mL) was added to an aqueous layer, and the aqueous layer was extracted with ethyl acetate (120 mL, twice). Combined organic layers were sequentially washed with a 18% sodium chloride aqueous solution (100 mL) and a saturated sodium chloride aqueous solution (100 mL), dried, and then concentrated under reduced pressure. The resulting solid was purified with automated medium pressure column chromatography made by Yamazen Corporation (column size 200 g+4 L (silica gel 365 g), hexane). The resulting product was further purified by recrystallization from hexane-ethyl acetate, and thus compound (No. 1-1-12) (1.17 g, 3.09 mmol) was obtained.

$^1$H-NMR (δ ppm; $CDCl_3$): 7.71 (brd, J=8.5 Hz, 2H), 7.64 (brd, J=8.5 Hz, 2H), 7.50-7.40 (m, 3H), 7.26-7.21 (m, 2H), 2.24 (dd, J=17.9 Hz, J=5.6 Hz, 3H).

$^{19}$F-NMR (δ ppm; $CDCl_3$): −117.1 (s, 1F), −123.1 (d, J=10.8 Hz, 1F), −134.3 (d, J=20.4 Hz, 2F), −136.3 (d, J=10.8 Hz, 1F), −161.2 (t, J=20.4 Hz, 1F).

Physical properties of compound (No. 1-1-12) were as described below.

Transition temperature: C (N 158.8) 156.2 I. $T_{NI}$=125.0° C.; η=73.7 mPa·s; Δn=0.270; Δ∈=22.1.

In addition, a measurement sample was prepared using 3% by weight of compound (No. 1-1-12) and 97% by weight of base liquid crystal (i). The reason is that a crystal precipitated at an ordinary ratio (15% by weight:85% by weight).

Example 3

Synthesis of Compound No. 1-1-13

Formula 35

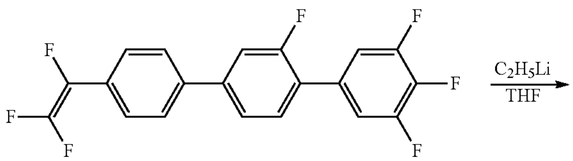

(1-1-11)

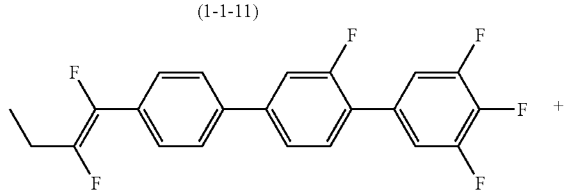

(1-1-13)

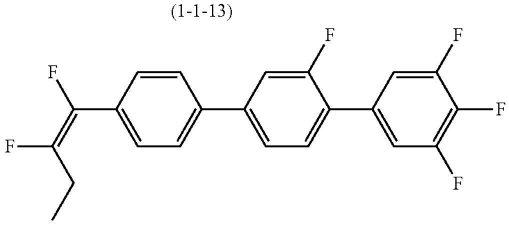

(T-3)

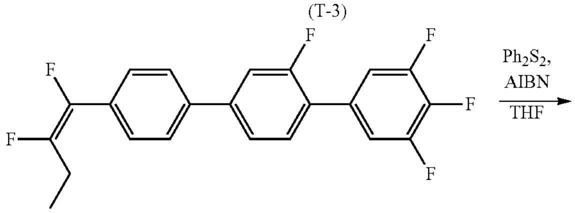

(T-3)

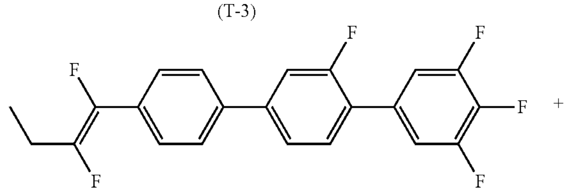

(1-1-13)

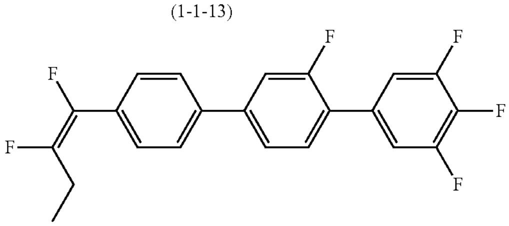

(T-3)

First Step

In a 50 mL recovery flask, 319 mg (0.835 mmol) of compound (No. 1-1-11) was weighed, subjected to substitution to be under an argon atmosphere, and then dissolved into anhydrous THF (4.0 mL), and cooled to −78° C. To the solution, 2.0 mL (1.0 mmol) of benzene/cyclohexane (volume ratio=9/1) mixed solution of 0.50 M ethyllithium was added, and the resulting mixture was stirred at −78° C. for 1 hour, and further at 0° C. for 1 hour. To the reaction mixture, a saturated ammonium chloride aqueous solution (3.0 mL) was added, and an aqueous layer was extracted with ethyl acetate (5.0 mL, once, 3.0 mL, twice). Combined organic layers were sequentially washed with pure water (3.0 mL) and a saturated sodium chloride aqueous solution (3.0 mL), dried, and then concentrated under reduced pressure. The resulting solid was purified with automated medium pressure column chromatography made by Yamazen Corporation (column size L+L (silica gel 60 g), hexane), and thus compound (No. 1-1-13) (128 mg, 0.326 mmol) and a cis isomer (T-3) (78.6 mg, 0.200 mmol) were obtained.

Second Step

In a 10 mL Pyrex tube, 117 mg (0.299 mmol) of cis isomer (T-3) was weighed, subjected to substitution to be under an argon atmosphere, and then dissolved into anhydrous THF (1.0 mL). To the solution, 6.5 mg (0.0299 mmol) of diphenyl sulfide and 4.9 mg (0.0299 mmol) azobisisobutyronitrile (AIBN) were added, the tube was sealed, and then the resulting mixture was subjected to heating agitation at 70° C. for 5 hours. To the reaction mixture, 6.0 mg (0.159 mmol) of sodium borohydride and ethanol (0.50 mL) were added, respectively, and the resulting mixture was stirred at room temperature for 30 minutes. To the reaction mixture, pure water (2.0 mL) was added, an aqueous layer was extracted with ethyl acetate (3.0 mL, twice), and combined organic layers were sequentially washed with a saturated sodium hydrogencarbonate aqueous solution (3.0 mL) and a saturated sodium chloride aqueous solution (3.0 mL), dried, and then concentrated under reduced pressure. The resulting solid was purified with automated medium pressure column chromatography made by Yamazen Corporation (column size inj. L+L (silica gel 45 g), hexane), and thus compound (No. 1-1-13) (81.0 mg, 0.206 mmol) and cis isomer (T-3) (36 mg, 0.0918 mmol) were obtained.

Ethylation in the first step and isomerization in the second step were performed several times, the resulting compound (No. 1-1-13) (2.50 g, 6.37 mmol) was purified by recrystallization from hexane-ethyl acetate, and thus compound (No. 1-1-13) (1.08 g, 2.75 mmol) was obtained.

$^1$H-NMR (δ ppm; $CDCl_3$): 7.71 (brd, J=8.4 Hz, 2H), 7.64 (brd, J=8.4 Hz, 2H), 7.50-7.38 (m, 3H), 7.26-7.21 (m, 2H), 2.61 (ddq, J=23.1 Hz, J=7.5 Hz, J=5.5 Hz, 2H), 1.24 (t, J=7.5 Hz, 3H).

$^{19}$F-NMR (δ ppm; $CDCl_3$): −117.3 (s, 1F), −134.3 (d, J=20.5 Hz, 2F), −145.8 (d, J=121 Hz, 1F), −160.2 (d, J=121 Hz, 1F), −161.4 (t, J=20.5 Hz, 1F).

Physical properties of compound (No. 1-1-13) were as described below.

Transition temperature: C 104.8 N 130.3 I. $T_{NI}$=102.7° C.; η=66.2 mPa·s; Δn=0.267; Δ∈=21.1.

In addition, a measurement sample was prepared using 10% by weight of compound (No. 1-1-13) and 90% by weight of base liquid crystal (i). The reason is that a crystal precipitated at an ordinary ratio (15% by weight:85% by weight).

Compounds (No. 1-1-1) to (No. 1-3-75) shown below can be prepared in a manner similar to the synthesis methods described in Examples 1 to 3. Attached data were determined according to the methods described above. When measuring a transition temperature, a compound per se was used as a sample. When measuring a maximum temperature ($T_{NI}$), viscosity (η), optical anisotropy (Δn) and dielectric anisotropy (Δ∈), a mixture of a compound (15% by weight) and base liquid crystal (i) (85% by weight) was used as a sample. From the measured values, extrapolated values were calculated according to the extrapolation method described above and described. In addition, in compound (No. 1-1-11), the measurement sample was prepared using 2% by weight of compound (No. 1-1-11) and 98% by weight of base liquid crystal (i). In compound (No. 1-1-12), the measurement sample was prepared using 3% by weight of compound (No. 1-1-12) and 97% by weight of base liquid crystal (i). In compound (No. 1-1-13), the measurement sample was prepared using 10% by weight of compound (No. 1-1-13) and 90% by weight of base liquid crystal (i). The reason is that a crystal precipitated at the ordinary ratio (15% by weight:85% by weight).

Formula 36

| No. | |
|---|---|
| 1-1-1 | 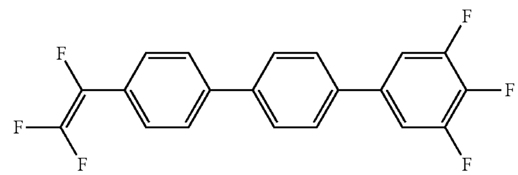 [SMILES: FC(F)=C(F)c1ccc(-c2ccc(-c3cc(F)c(F)c(F)c3)cc2)cc1] |
| 1-1-2 | 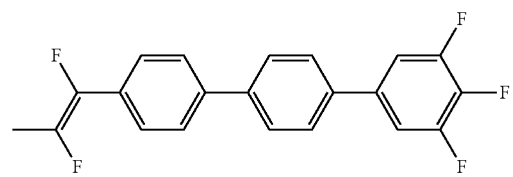 [SMILES: C/C(F)=C(\F)c1ccc(-c2ccc(-c3cc(F)c(F)c(F)c3)cc2)cc1] |
| 1-1-3 | 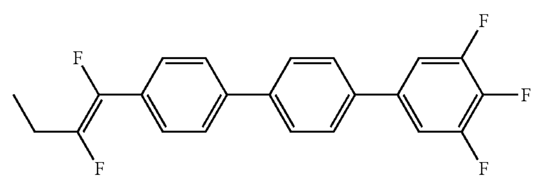 |
| 1-1-4 | 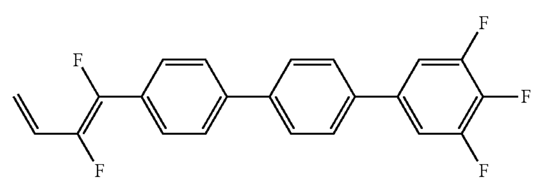 [SMILES: C=C/C(F)=C(\F)c1ccc(-c2ccc(-c3cc(F)c(F)c(F)c3)cc2)cc1] |
| 1-1-5 | 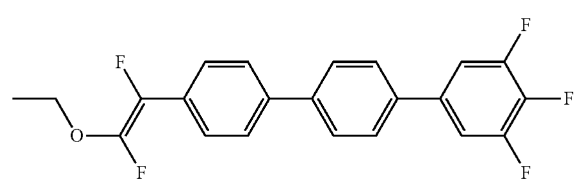 [SMILES: CCO/C(F)=C(\F)c1ccc(-c2ccc(-c3cc(F)c(F)c(F)c3)cc2)cc1] |
| 1-1-6 | 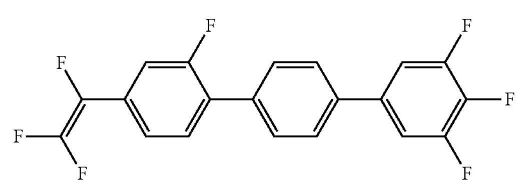 [SMILES: FC(F)=C(F)c1ccc(-c2ccc(-c3cc(F)c(F)c(F)c3)cc2)c(F)c1] |
| 1-1-7 | 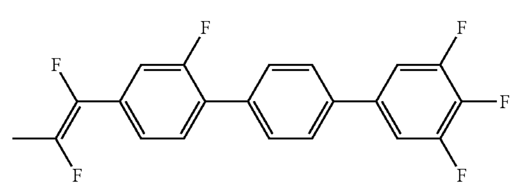 [SMILES: C/C(F)=C(\F)c1ccc(-c2ccc(-c3cc(F)c(F)c(F)c3)cc2)c(F)c1] |

-continued
Formula 36
No.
1-1-8
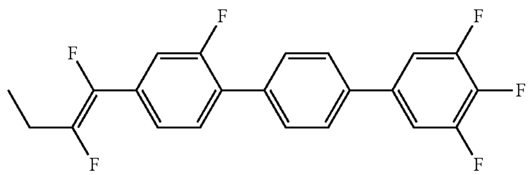 [SMILES: CC/C(F)=C(\F)c1ccc(-c2ccc(-c3cc(F)c(F)c(F)c3)cc2)c(F)c1]
1-1-9
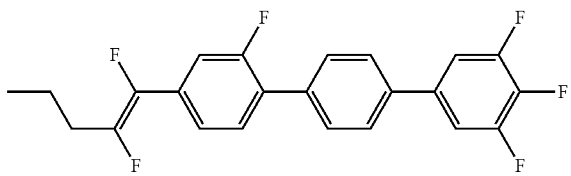
1-1-10
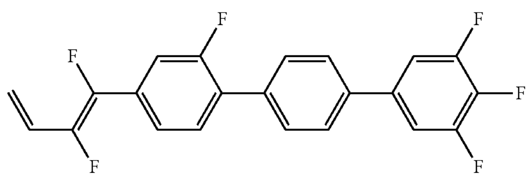
1-1-11
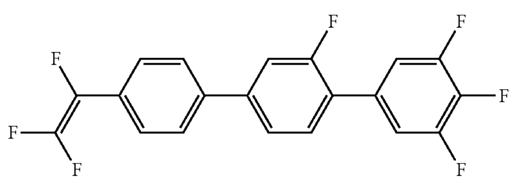
C 105.51
$T_{NI}$ = 81.7° C., η = 76.8 mPa·s, Δn = 0.287
1-1-12
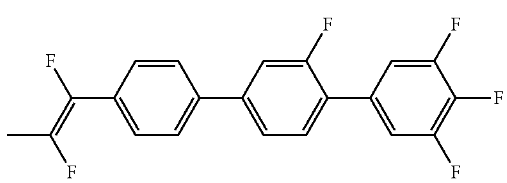
C (N 158.8) 156.21
$T_{NI}$ = 125.0° C., η = 73.7 mPa·s, Δn = 0.270, Δε = 22.1
1-1-13
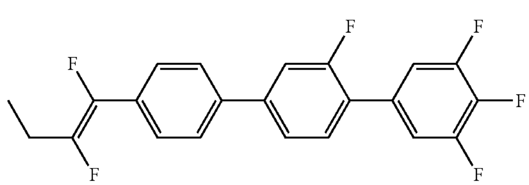
C 104.8 N 131.31
$T_{NI}$ = 102.7° C., η = 66.2 mPa·s, Δn = 0.267, Δε = 21.1
1-1-14
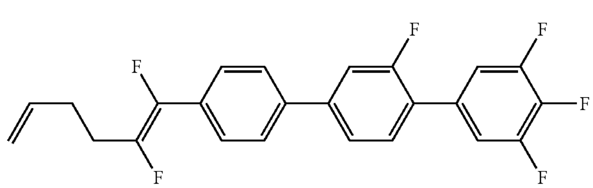 [SMILES: C=CCC/C(F)=C(\F)c1ccc(-c2ccc(-c3cc(F)c(F)c(F)c3)c(F)c2)cc1]

-continued
| Formula 36 | |
|---|---|
| No. | |
| 1-1-15 | 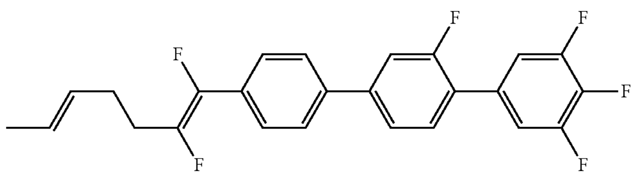 [SMILES: C/C=C/CC/C(F)=C(\F)c1ccc(-c2ccc(-c3cc(F)c(F)c(F)c3)c(F)c2)cc1] |
| 1-1-16 | 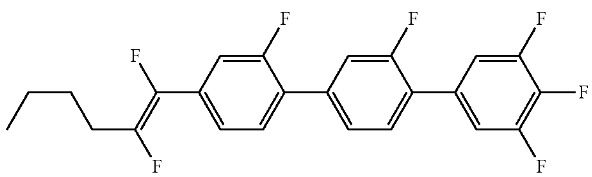 |
| 1-1-17 | 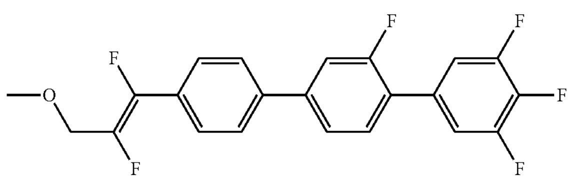 [SMILES: COC/C(F)=C(\F)c1ccc(-c2ccc(-c3cc(F)c(F)c(F)c3)c(F)c2)cc1] |
| 1-1-18 | 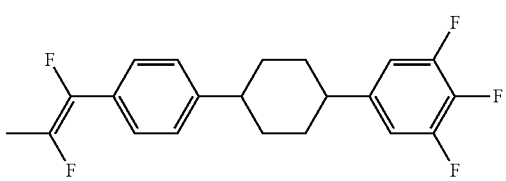 |
| 1-1-19 | 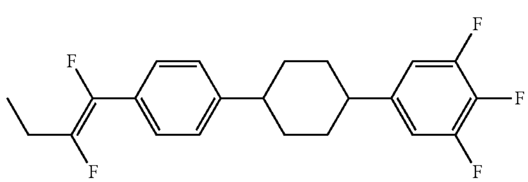 [SMILES: CC/C(F)=C(\F)c1ccc(C2CCC(c3cc(F)c(F)c(F)c3)CC2)cc1] |
| 1-1-20 | 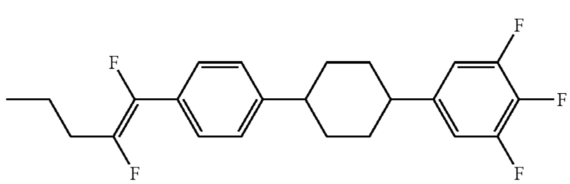 [SMILES: CCC/C(F)=C(\F)c1ccc(C2CCC(c3cc(F)c(F)c(F)c3)CC2)cc1] |
| Formula 37 | |
|---|---|
| No. | |
| 1-1-21 | 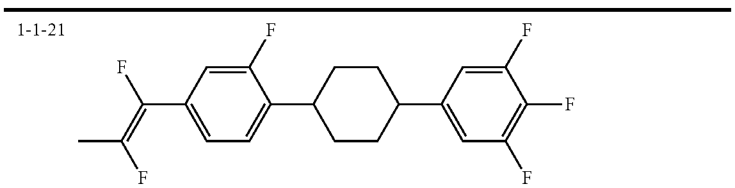 |

-continued
| Formula 37 | |
|---|---|
| No. | |
| 1-1-22 | 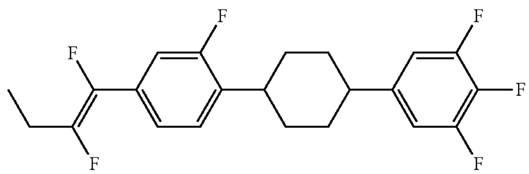 [SMILES: CC/C(F)=C(\F)c1ccc(C2CCC(c3cc(F)c(F)c(F)c3)CC2)c(F)c1] |
| 1-1-23 | 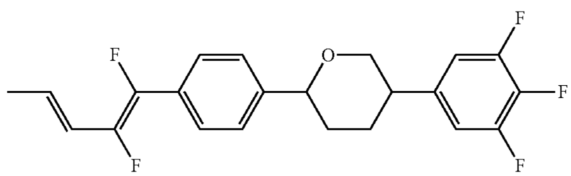 |
| 1-1-24 | 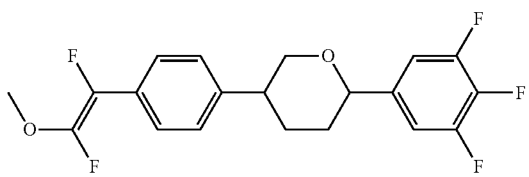 [SMILES: CO/C(F)=C(\F)c1ccc(C2CCC(c3cc(F)c(F)c(F)c3)OC2)cc1] |
| 1-1-25 | 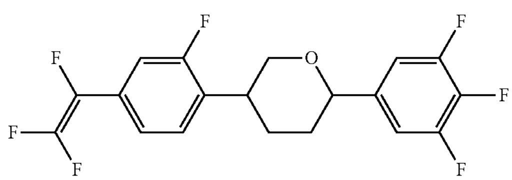 [SMILES: FC(F)=C(F)c1ccc(C2CCC(c3cc(F)c(F)c(F)c3)OC2)c(F)c1] |
| 1-1-26 | 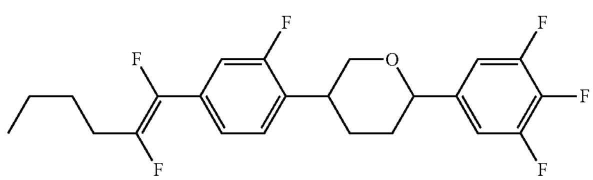 [SMILES: CCCC/C(F)=C(\F)c1ccc(C2CCC(c3cc(F)c(F)c(F)c3)OC2)c(F)c1] |
| 1-1-27 | 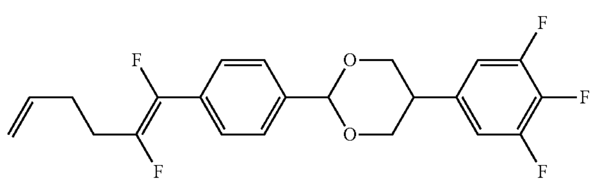 [SMILES: C=CCC/C(F)=C(\F)c1ccc(C2OCC(c3cc(F)c(F)c(F)c3)CO2)cc1] |
| 1-1-28 | 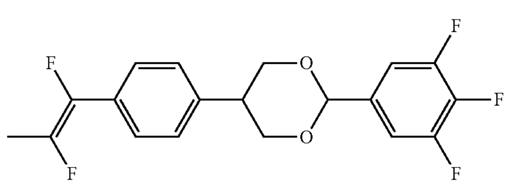 [SMILES: C/C(F)=C(\F)c1ccc(C2COC(c3cc(F)c(F)c(F)c3)OC2)cc1] |
| 1-1-29 | 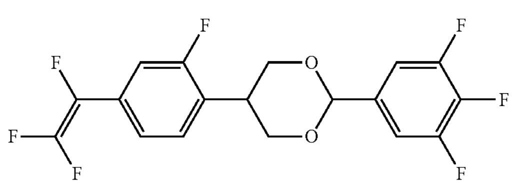 [SMILES: FC(F)=C(F)c1ccc(C2COC(c3cc(F)c(F)c(F)c3)OC2)c(F)c1] |

-continued
| Formula 37 | |
|---|---|
| No. | |
| 1-1-30 | 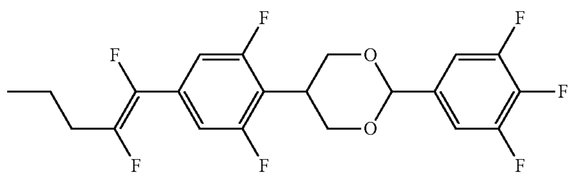 [SMILES: CCC/C(F)=C(\F)c1cc(F)c(C2COC(c3cc(F)c(F)c(F)c3)OC2)c(F)c1] |
| 1-1-31 | 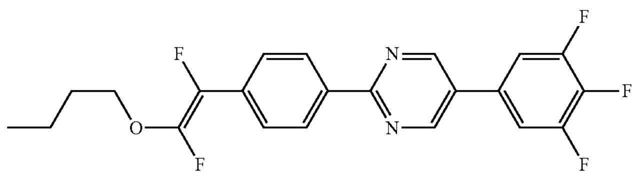 [SMILES: CCCCO/C(F)=C(\F)c1ccc(-c2ncc(-c3cc(F)c(F)c(F)c3)cn2)cc1] |
| 1-1-32 | 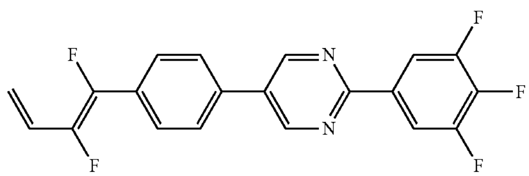 [SMILES: C=C/C(F)=C(\F)c1ccc(-c2cnc(-c3cc(F)c(F)c(F)c3)nc2)cc1] |
| 1-1-33 | 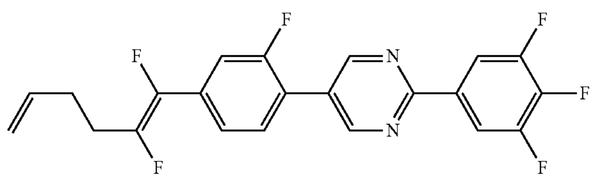 [SMILES: C=CCC/C(F)=C(\F)c1ccc(-c2cnc(-c3cc(F)c(F)c(F)c3)nc2)c(F)c1] |
| 1-1-34 | 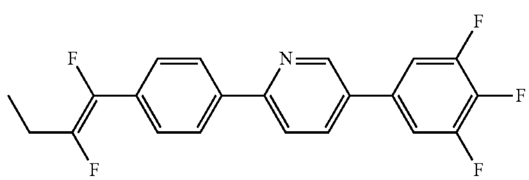 |
| 1-1-35 | 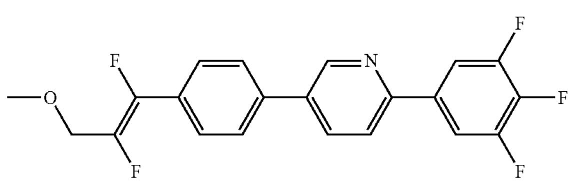 |
| 1-1-36 | 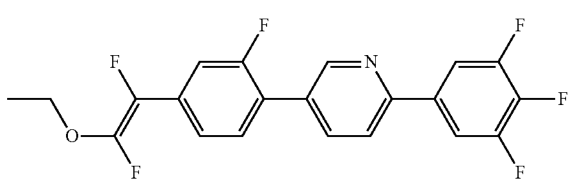 |
| 1-1-37 | 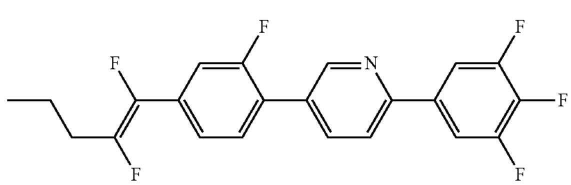 [SMILES: CCO/C(F)=C(\F)c1ccc(-c2ccc(-c3cc(F)c(F)c(F)c3)nc2)c(F)c1] |

-continued
| Formula 37 | |
|---|---|
| No. | |
| 1-1-38 | 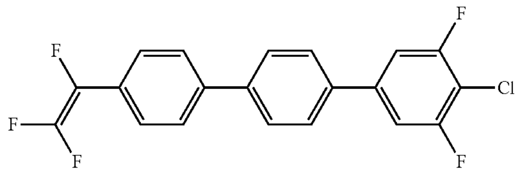 [SMILES: FC(F)=C(F)c1ccc(-c2ccc(-c3cc(F)c(Cl)c(F)c3)cc2)cc1] |
| 1-1-39 | 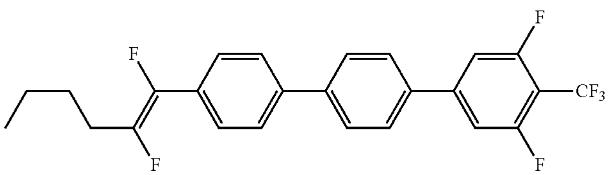 [SMILES: CCCC/C(F)=C(\F)c1ccc(-c2ccc(-c3cc(F)c(C(F)(F)F)c(F)c3)cc2)cc1] |
| 1-1-40 | 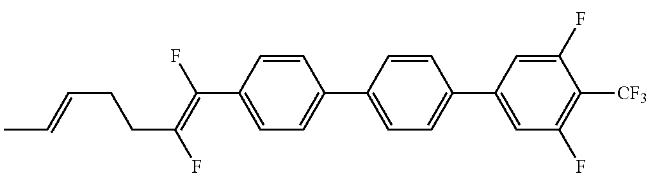 [SMILES: C/C=C/CC/C(F)=C(\F)c1ccc(-c2ccc(-c3cc(F)c(C(F)(F)F)c(F)c3)cc2)cc1] |
| Formula 38 | |
|---|---|
| No. | |
| 1-1-41 | 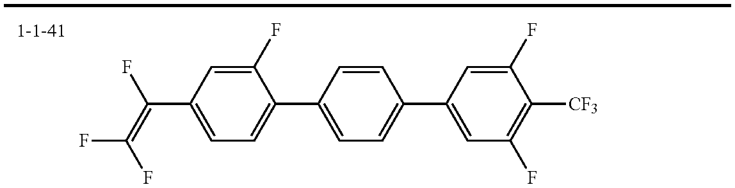 |
| 1-1-42 | 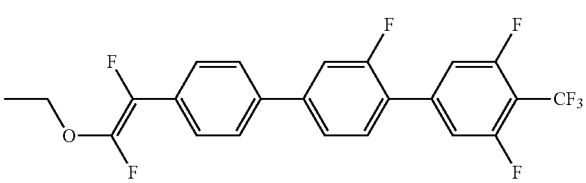 [SMILES: CCO/C(F)=C(\F)c1ccc(-c2ccc(-c3cc(F)c(C(F)(F)F)c(F)c3)c(F)c2)cc1] |
| 1-1-43 | 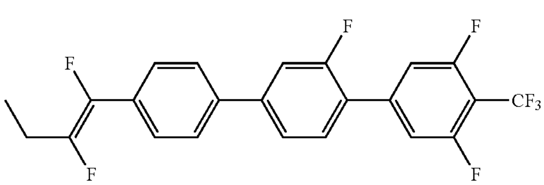 [SMILES: CC/C(F)=C(\F)c1ccc(-c2ccc(-c3cc(F)c(C(F)(F)F)c(F)c3)c(F)c2)cc1] |
| 1-1-44 | 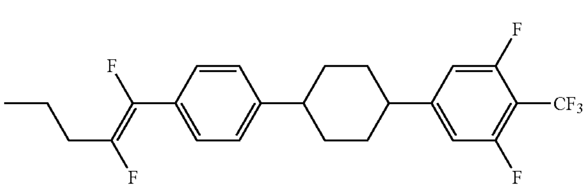 [SMILES: CCC/C(F)=C(\F)c1ccc(C2CCC(c3cc(F)c(C(F)(F)F)c(F)c3)CC2)cc1] |

-continued
| Formula 38 | |
|---|---|
| No. | |
| 1-1-45 | 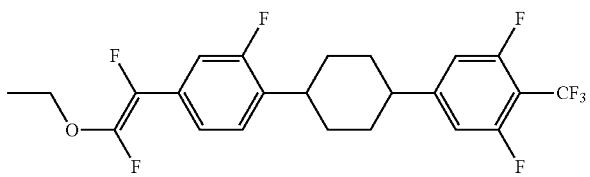 [SMILES: CCO/C(F)=C(\F)c1ccc(C2CCC(c3cc(F)c(C(F)(F)F)c(F)c3)CC2)c(F)c1] |
| 1-1-46 | 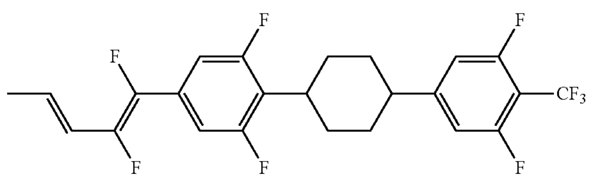 [SMILES: C/C=C/C(F)=C(\F)c1cc(F)c(C2CCC(c3cc(F)c(C(F)(F)F)c(F)c3)CC2)c(F)c1] |
| 1-1-47 | 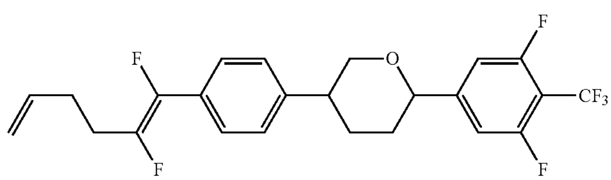 [SMILES: C=CCC/C(F)=C(\F)c1ccc(C2CCC(c3cc(F)c(C(F)(F)F)c(F)c3)OC2)cc1] |
| 1-1-48 | 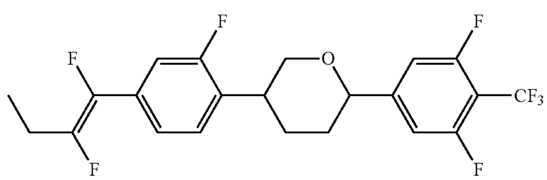 [SMILES: CC/C(F)=C(\F)c1ccc(C2CCC(c3cc(F)c(C(F)(F)F)c(F)c3)OC2)c(F)c1] |
| 1-1-49 | 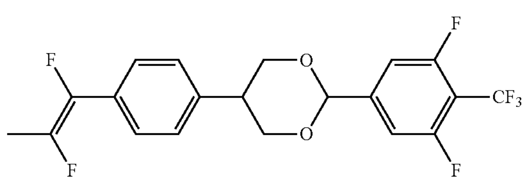 [SMILES: C/C(F)=C(\F)c1ccc(C2COC(c3cc(F)c(C(F)(F)F)c(F)c3)OC2)cc1] |
| 1-1-50 | 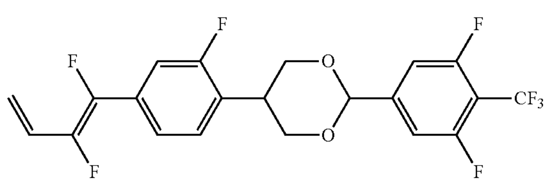 [SMILES: C=C/C(F)=C(\F)c1ccc(C2COC(c3cc(F)c(C(F)(F)F)c(F)c3)OC2)c(F)c1] |
| 1-1-51 | 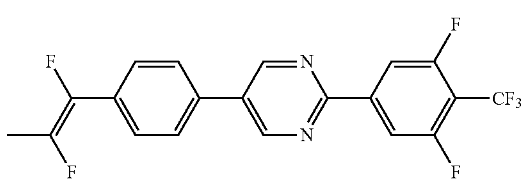 [SMILES: C/C(F)=C(\F)c1ccc(-c2cnc(-c3cc(F)c(C(F)(F)F)c(F)c3)nc2)cc1] |
| 1-1-52 | 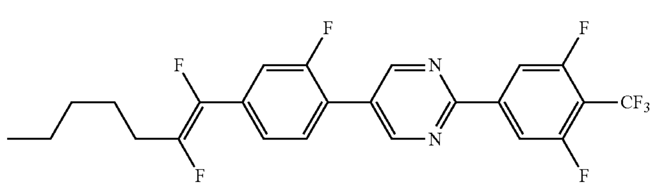 [SMILES: CCCCC/C(F)=C(\F)c1ccc(-c2cnc(-c3cc(F)c(C(F)(F)F)c(F)c3)nc2)c(F)c1] |

-continued
| Formula 38 | |
|---|---|
| No. | |
| 1-1-53 | 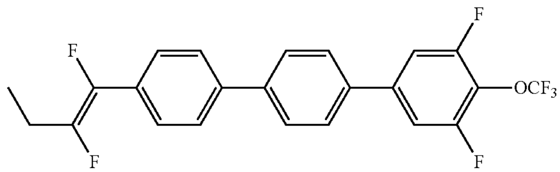 [SMILES: CC/C(F)=C(\F)c1ccc(-c2ccc(-c3cc(F)c(OC(F)(F)F)c(F)c3)cc2)cc1] |
| 1-1-54 | 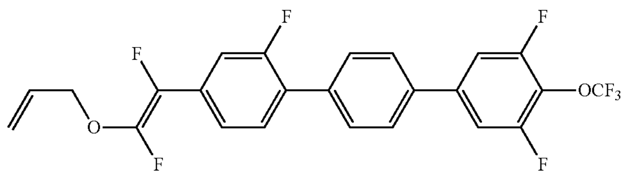 [SMILES: C=CCO/C(F)=C(\F)c1ccc(-c2ccc(-c3cc(F)c(OC(F)(F)F)c(F)c3)cc2)c(F)c1] |
| 1-1-55 | 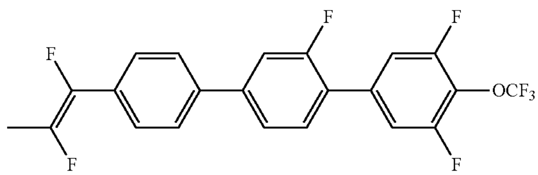 |
| 1-1-56 | 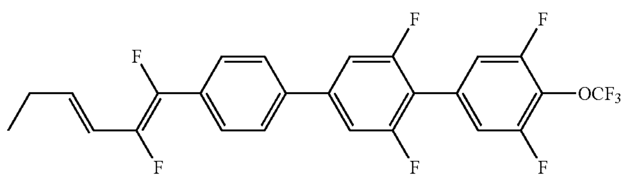 [SMILES: CC/C=C/C(F)=C(\F)c1ccc(-c2cc(F)c(-c3cc(F)c(OC(F)(F)F)c(F)c3)c(F)c2)cc1] |
| 1-1-57 | 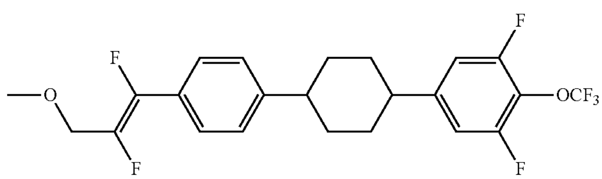 [SMILES: COC/C(F)=C(\F)c1ccc(C2CCC(c3cc(F)c(OC(F)(F)F)c(F)c3)CC2)cc1] |
| 1-1-58 | 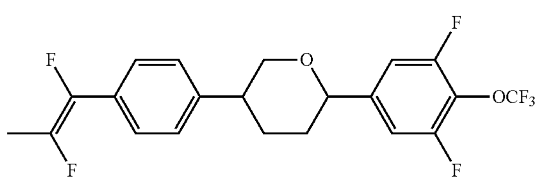 |
| 1-1-59 | 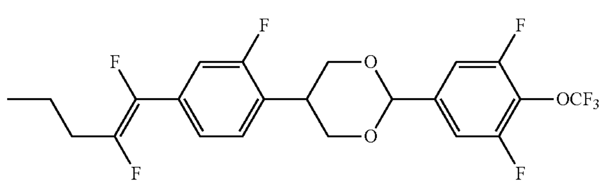 [SMILES: CCC/C(F)=C(\F)c1ccc(C2COC(c3cc(F)c(OC(F)(F)F)c(F)c3)OC2)c(F)c1] |
| 1-1-60 | 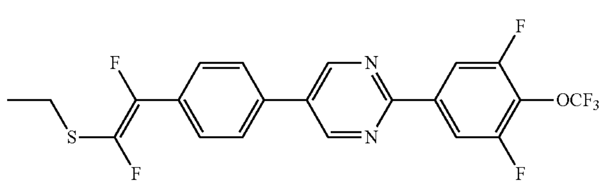 [SMILES: CCS/C(F)=C(\F)c1ccc(-c2cnc(-c3cc(F)c(OC(F)(F)F)c(F)c3)nc2)cc1] |

| Formula 39 | |
|---|---|
| No. | |
| 1-1-61 | 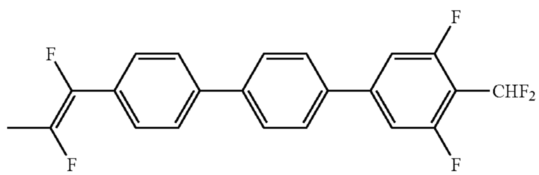 [SMILES: C/C(F)=C(\F)c1ccc(-c2ccc(-c3cc(F)c(C(F)F)c(F)c3)cc2)cc1] |
| 1-1-62 | 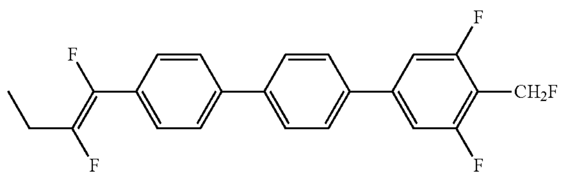 |
| 1-1-63 | 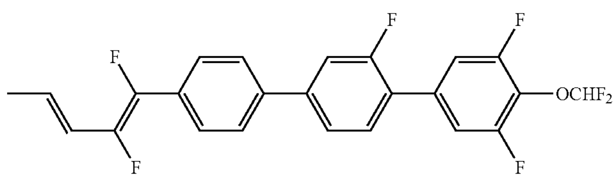 [SMILES: C/C=C/C(F)=C(\F)c1ccc(-c2ccc(-c3cc(F)c(OC(F)F)c(F)c3)c(F)c2)cc1] |
| 1-1-64 | 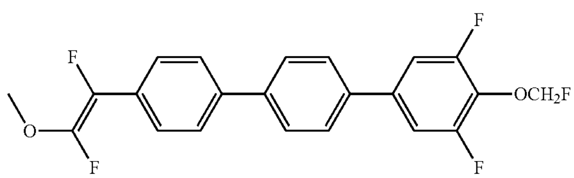 |
| 1-1-65 | 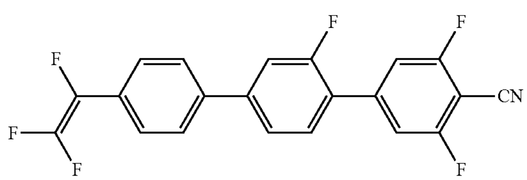 [SMILES: N#Cc1c(F)cc(-c2ccc(-c3ccc(C(F)=C(F)F)cc3)cc2F)cc1F] |
| 1-1-66 | 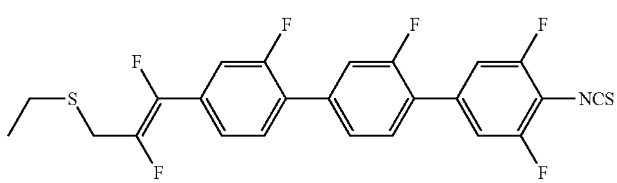 |
| 1-1-67 | 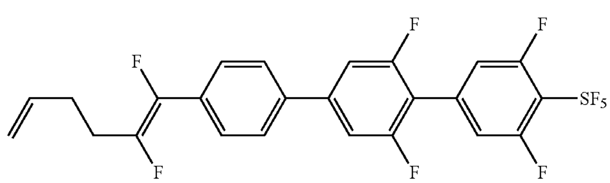 |
| 1-1-68 | 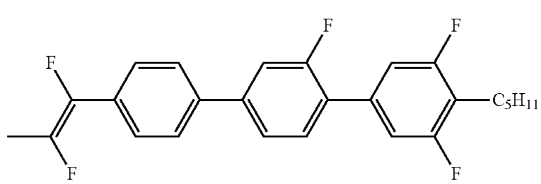 |

-continued
| Formula 39 | |
|---|---|
| No. | |
| 1-1-69 | 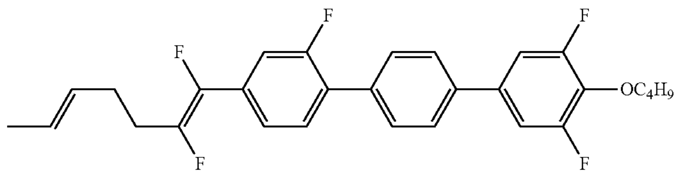 |
| 1-1-70 | 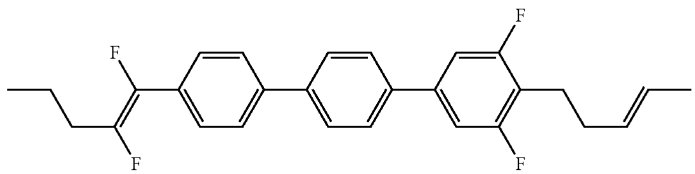 [SMILES: C/C=C/CCc1c(F)cc(-c2ccc(-c3ccc(/C(F)=C(\F)CCC)cc3)cc2)cc1F] |
| 1-1-71 | 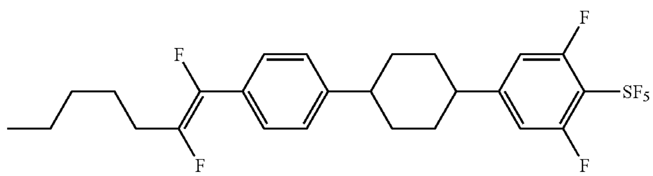 |
| 1-1-72 | 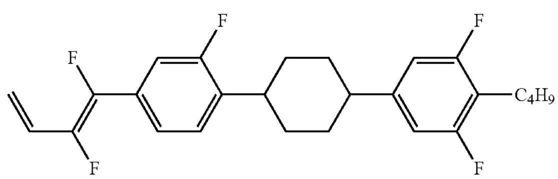 |
| 1-1-73 | 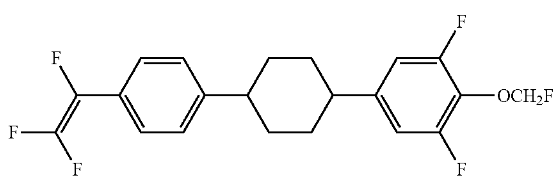 |
| 1-1-74 | 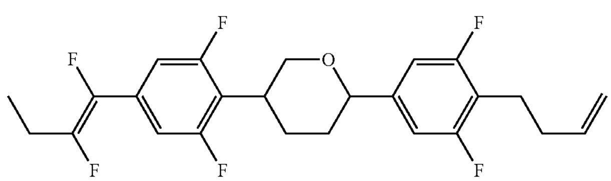 [SMILES: C=CCCc1c(F)cc(C2CCC(c3c(F)cc(/C(F)=C(\F)CC)cc3F)CO2)cc1F] |
| 1-1-75 | 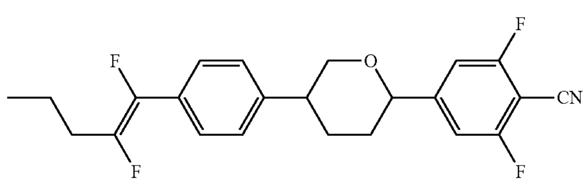 |
| 1-1-76 | 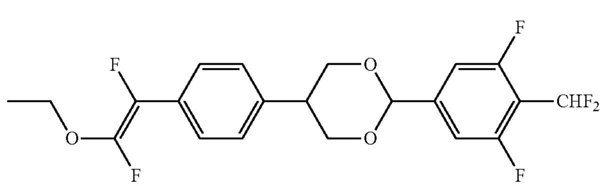 [SMILES: CCO/C(F)=C(\F)c1ccc(C2COC(c3cc(F)c(C(F)F)c(F)c3)OC2)cc1] |

-continued
Formula 39
| No. | |
|---|---|
| 1-1-77 | 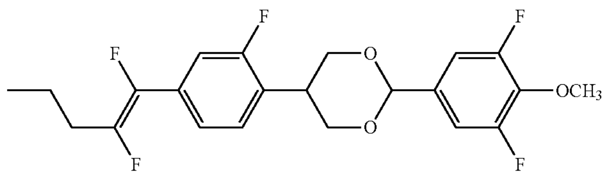 [SMILES: CCC/C(F)=C(\F)c1ccc(C2COC(c3cc(F)c(OC)c(F)c3)OC2)c(F)c1] |
| 1-1-78 | 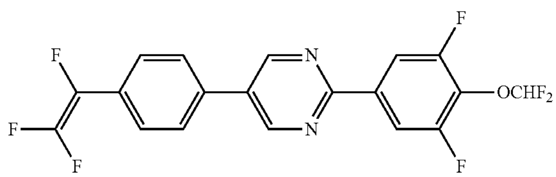 [SMILES: FC(F)=C(F)c1ccc(-c2cnc(-c3cc(F)c(OC(F)F)c(F)c3)nc2)cc1] |
| 1-1-79 | 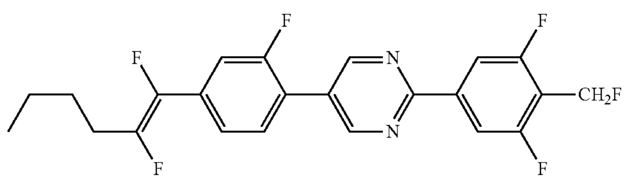 |
| 1-1-80 | 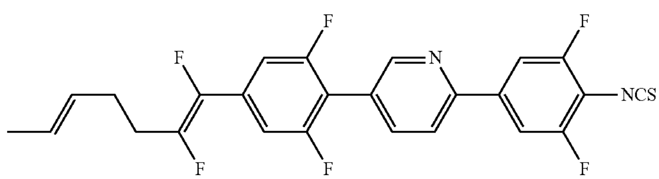 |
Formula 40
| No. | |
|---|---|
| 1-1-81 | 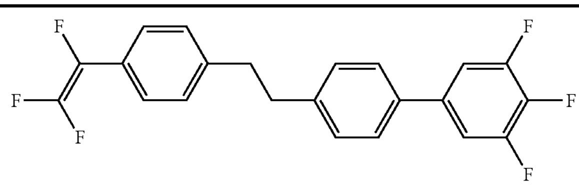 |
| 1-1-82 | 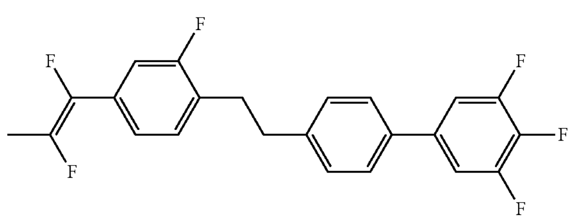 [SMILES: C/C(F)=C(\F)c1ccc(CCc2ccc(-c3cc(F)c(F)c(F)c3)cc2)c(F)c1] |
| 1-1-83 | 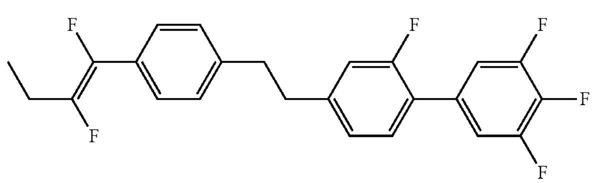 [SMILES: CC/C(F)=C(\F)c1ccc(CCc2ccc(-c3cc(F)c(F)c(F)c3)c(F)c2)cc1] |

-continued
| No. | Formula 40 |
| --- | --- |
| 1-1-84 | 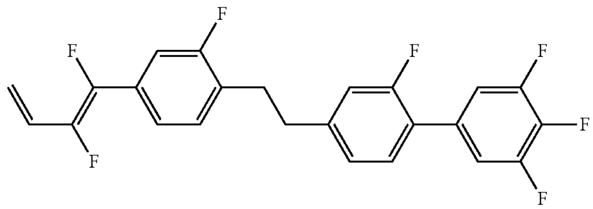 [SMILES: C=C/C(F)=C(\F)c1ccc(CCc2ccc(-c3cc(F)c(F)c(F)c3)c(F)c2)c(F)c1] |
| 1-1-85 | 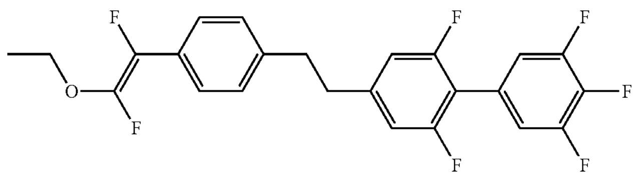 [SMILES: CCO/C(F)=C(\F)c1ccc(CCc2cc(F)c(-c3cc(F)c(F)c(F)c3)c(F)c2)cc1] |
| 1-1-86 | 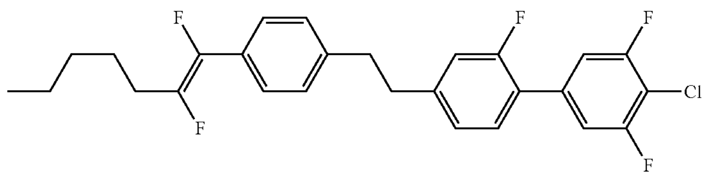 [SMILES: CCCCC/C(F)=C(\F)c1ccc(CCc2ccc(-c3cc(F)c(Cl)c(F)c3)c(F)c2)cc1] |
| 1-1-87 | 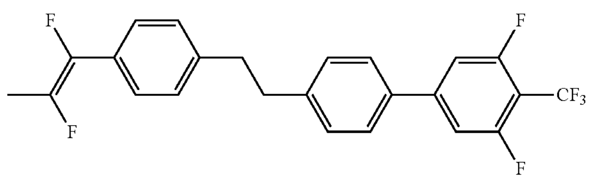 |
| 1-1-88 | 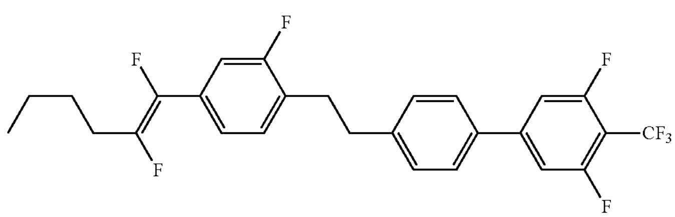 [SMILES: CCCC/C(F)=C(\F)c1ccc(CCc2ccc(-c3cc(F)c(C(F)(F)F)c(F)c3)cc2)c(F)c1] |
| 1-1-89 | 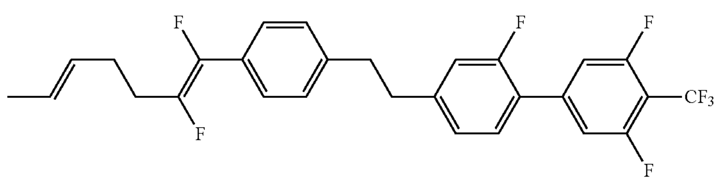 [SMILES: C/C=C/CC/C(F)=C(\F)c1ccc(CCc2ccc(-c3cc(F)c(C(F)(F)F)c(F)c3)c(F)c2)cc1] |
| 1-1-90 | 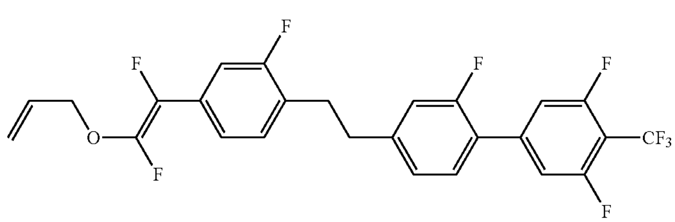 [SMILES: C=CCO/C(F)=C(\F)c1ccc(CCc2ccc(-c3cc(F)c(C(F)(F)F)c(F)c3)c(F)c2)c(F)c1] |
| 1-1-91 | 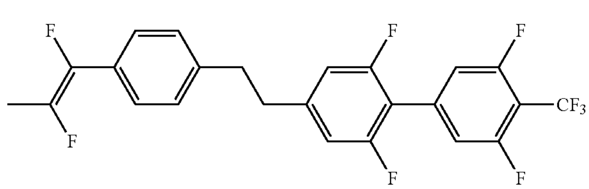 [SMILES: C/C(F)=C(\F)c1ccc(CCc2cc(F)c(-c3cc(F)c(C(F)(F)F)c(F)c3)c(F)c2)cc1] |

-continued
| Formula 40 | |
|---|---|
| No. | |
| 1-1-92 | 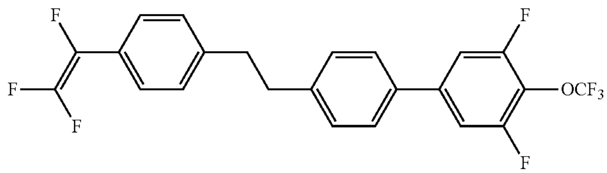 [SMILES: FC(F)=C(F)c1ccc(CCc2ccc(-c3cc(F)c(OC(F)(F)F)c(F)c3)cc2)cc1] |
| 1-1-93 | 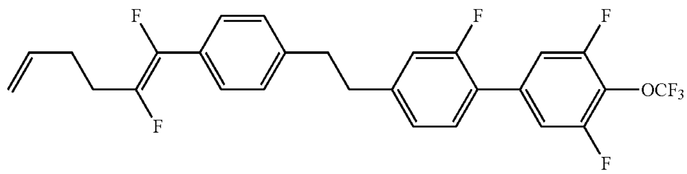 [SMILES: C=CCC/C(F)=C(\F)c1ccc(CCc2ccc(-c3cc(F)c(OC(F)(F)F)c(F)c3)c(F)c2)cc1] |
| 1-1-94 | 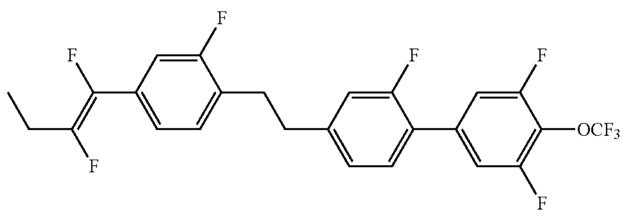 [SMILES: CC/C(F)=C(\F)c1ccc(CCc2ccc(-c3cc(F)c(OC(F)(F)F)c(F)c3)c(F)c2)c(F)c1] |
| 1-1-95 | 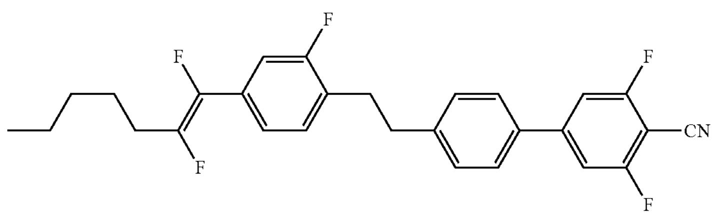 [SMILES: CCCCC/C(F)=C(\F)c1ccc(CCc2ccc(-c3cc(F)c(C#N)c(F)c3)cc2)c(F)c1] |
| 1-1-96 | 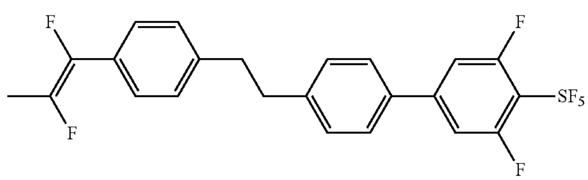 |
| 1-1-97 | 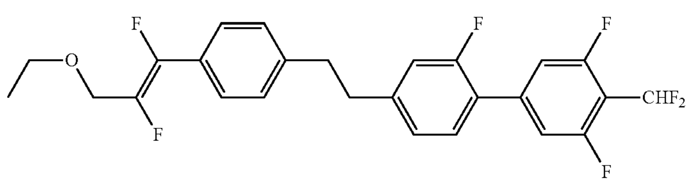 [SMILES: CCOC/C(F)=C(\F)c1ccc(CCc2ccc(-c3cc(F)c(C(F)F)c(F)c3)c(F)c2)cc1] |
| 1-1-98 | 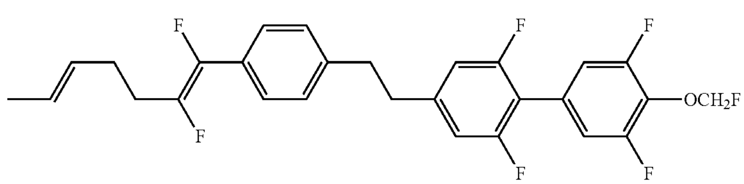 |
| 1-1-99 | 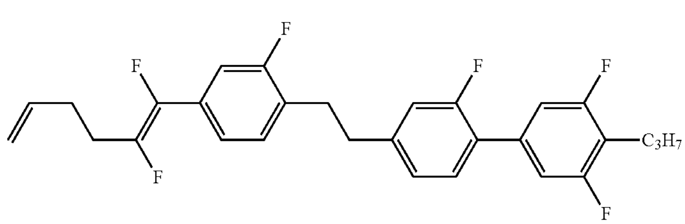 |

-continued
| Formula 40 | |
|---|---|
| No. | |
| 1-1-100 | 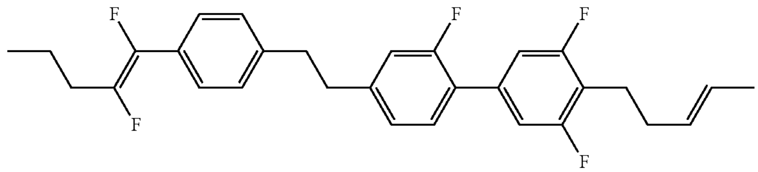 [SMILES: C/C=C/CCc1c(F)cc(-c2ccc(CCc3ccc(/C(F)=C(\F)CCC)cc3)cc2F)cc1F] |
| Formula 41 | |
|---|---|
| No. | |
| 1-1-101 | 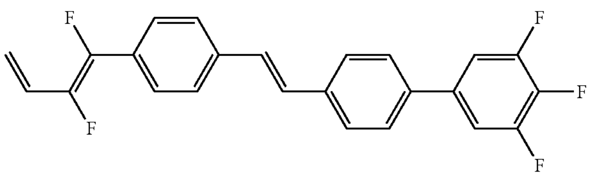 |
| 1-1-102 | 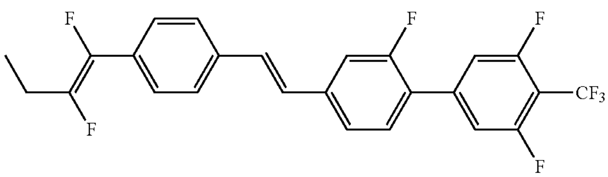 [SMILES: CC/C(F)=C(\F)c1ccc(/C=C/c2ccc(-c3cc(F)c(C(F)(F)F)c(F)c3)c(F)c2)cc1] |
| 1-1-103 | 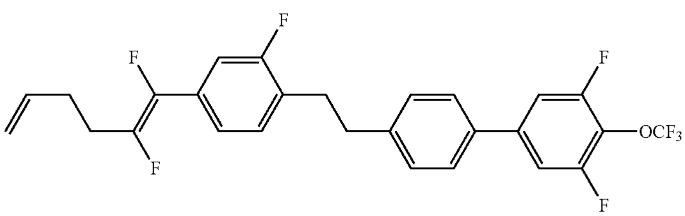 [SMILES: C=CCC/C(F)=C(\F)c1ccc(CCc2ccc(-c3cc(F)c(OC(F)(F)F)c(F)c3)cc2)c(F)c1] |
| 1-1-104 | 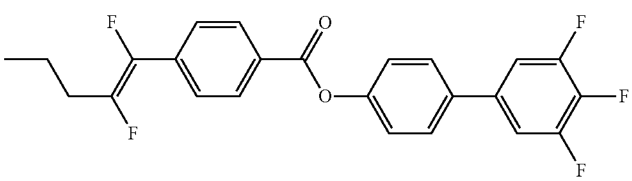 [SMILES: CCC/C(F)=C(\F)c1ccc(C(=O)Oc2ccc(-c3cc(F)c(F)c(F)c3)cc2)cc1] |
| 1-1-105 | 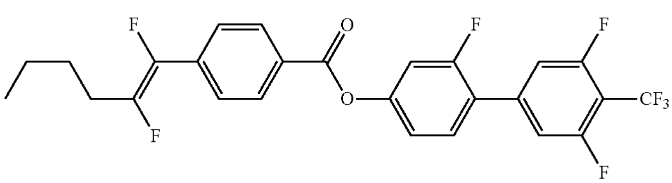 [SMILES: CCCC/C(F)=C(\F)c1ccc(C(=O)Oc2ccc(-c3cc(F)c(C(F)(F)F)c(F)c3)c(F)c2)cc1] |
| 1-1-106 | 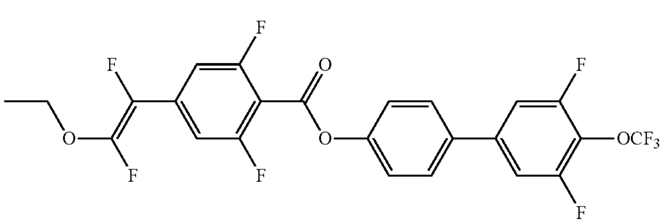 [SMILES: CCO/C(F)=C(\F)c1cc(F)c(C(=O)Oc2ccc(-c3cc(F)c(OC(F)(F)F)c(F)c3)cc2)c(F)c1] |

-continued
| Formula 41 | |
|---|---|
| No. | |
| 1-1-107 | 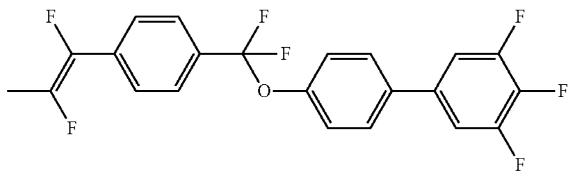 |
| 1-1-108 | 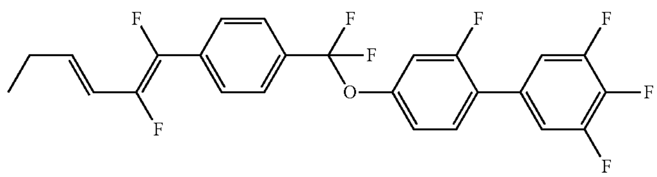 [SMILES: CC/C=C/C(F)=C(\F)c1ccc(C(F)(F)Oc2ccc(-c3cc(F)c(F)c(F)c3)c(F)c2)cc1] |
| 1-1-109 | 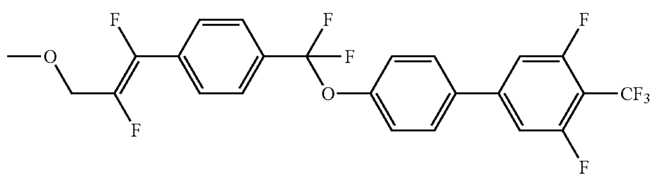 [SMILES: COC/C(F)=C(\F)c1ccc(C(F)(F)Oc2ccc(-c3cc(F)c(C(F)(F)F)c(F)c3)cc2)cc1] |
| 1-1-110 | 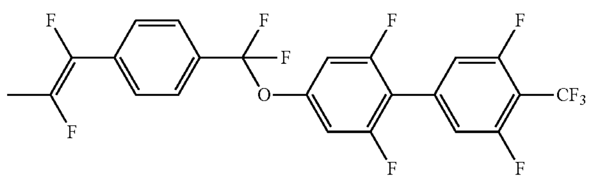 [SMILES: C/C(F)=C(\F)c1ccc(C(F)(F)Oc2cc(F)c(-c3cc(F)c(C(F)(F)F)c(F)c3)c(F)c2)cc1] |
| 1-1-111 | 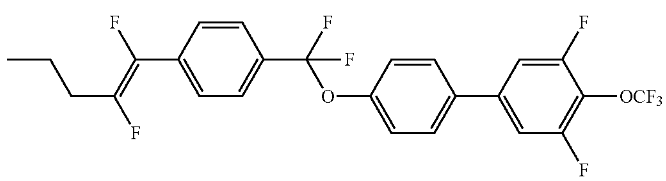 [SMILES: CCC/C(F)=C(\F)c1ccc(C(F)(F)Oc2ccc(-c3cc(F)c(OC(F)(F)F)c(F)c3)cc2)cc1] |
| 1-1-112 | 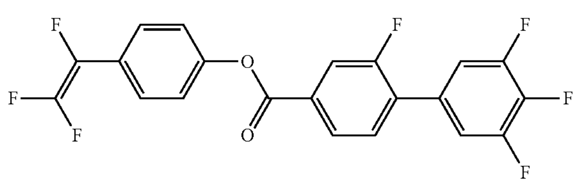 [SMILES: O=C(Oc1ccc(C(F)=C(F)F)cc1)c1ccc(-c2cc(F)c(F)c(F)c2)c(F)c1] |
| 1-1-113 | 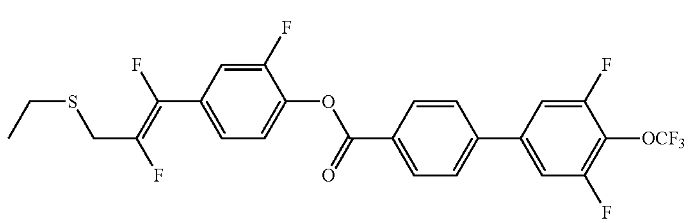 [SMILES: CCSC/C(F)=C(\F)c1ccc(OC(=O)c2ccc(-c3cc(F)c(OC(F)(F)F)c(F)c3)cc2)c(F)c1] |
| 1-1-114 | 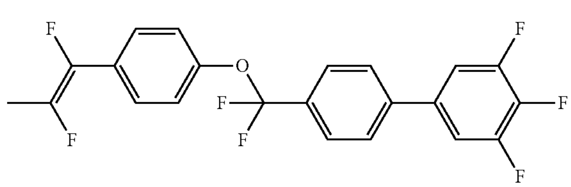 [SMILES: C/C(F)=C(\F)c1ccc(OC(F)(F)c2ccc(-c3cc(F)c(F)c(F)c3)cc2)cc1] |

-continued
| Formula 41 | |
|---|---|
| No. | |
| 1-1-115 | 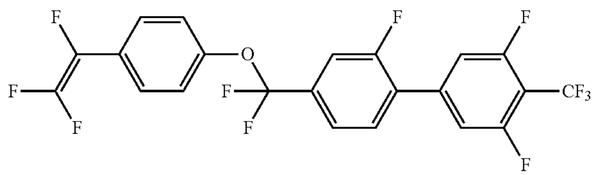 [SMILES: FC(F)=C(F)c1ccc(OC(F)(F)c2ccc(-c3cc(F)c(C(F)(F)F)c(F)c3)c(F)c2)cc1] |
| 1-1-116 | 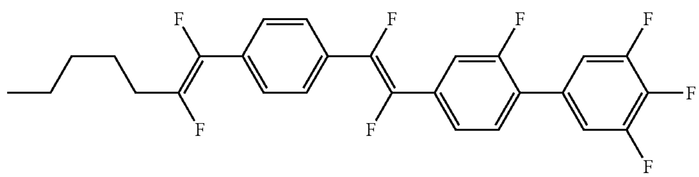 [SMILES: CCCCC/C(F)=C(\F)c1ccc(/C(F)=C(\F)c2ccc(-c3cc(F)c(F)c(F)c3)c(F)c2)cc1] |
| 1-1-117 | 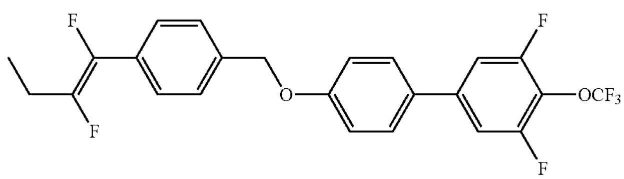 [SMILES: CC/C(F)=C(\F)c1ccc(COc2ccc(-c3cc(F)c(OC(F)(F)F)c(F)c3)cc2)cc1] |
| 1-1-118 | 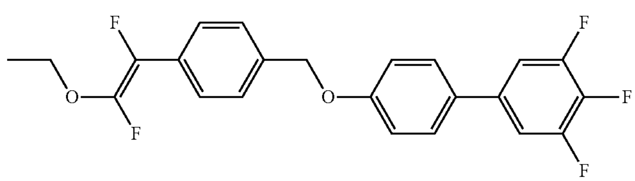 [SMILES: CCO/C(F)=C(\F)c1ccc(COc2ccc(-c3cc(F)c(F)c(F)c3)cc2)cc1] |
| 1-1-119 | 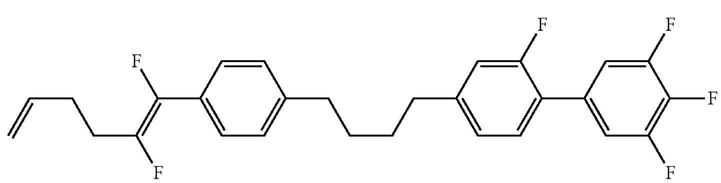 [SMILES: C=CCC/C(F)=C(\F)c1ccc(CCCCc2ccc(-c3cc(F)c(F)c(F)c3)c(F)c2)cc1] |
| 1-1-120 | 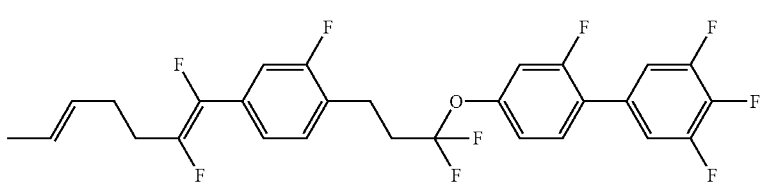 [SMILES: C/C=C/CC/C(F)=C(\F)c1ccc(CCC(F)(F)Oc2ccc(-c3cc(F)c(F)c(F)c3)c(F)c2)c(F)c1] |
| Formula 42 | |
|---|---|
| No. | |
| 1-1-121 | 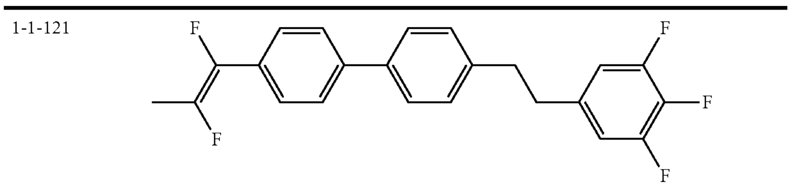 |

-continued
| Formula 42 | |
| --- | --- |
| No. | |
| 1-1-122 | 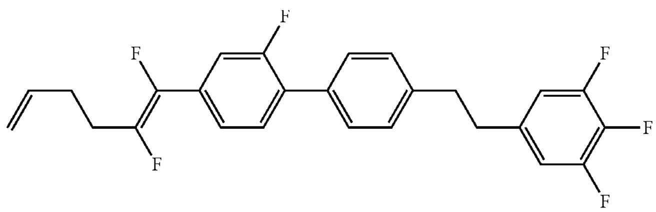 [SMILES: C=CCC/C(F)=C(\F)c1ccc(-c2ccc(CCc3cc(F)c(F)c(F)c3)cc2)c(F)c1] |
| 1-1-123 | 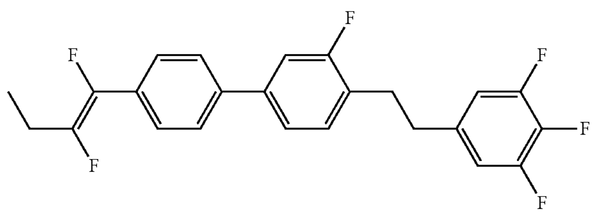 |
| 1-1-124 | 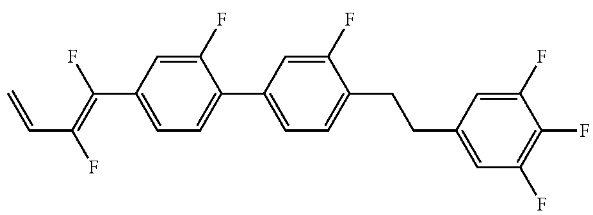 [SMILES: C=C/C(F)=C(\F)c1ccc(-c2ccc(CCc3cc(F)c(F)c(F)c3)c(F)c2)c(F)c1] |
| 1-1-125 | 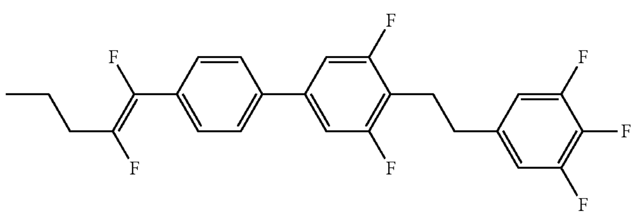 [SMILES: CCC/C(F)=C(\F)c1ccc(-c2cc(F)c(CCc3cc(F)c(F)c(F)c3)c(F)c2)cc1] |
| 1-1-126 | 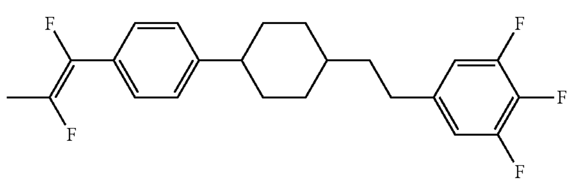 [SMILES: C/C(F)=C(\F)c1ccc(C2CCC(CCc3cc(F)c(F)c(F)c3)CC2)cc1] |
| 1-1-127 | 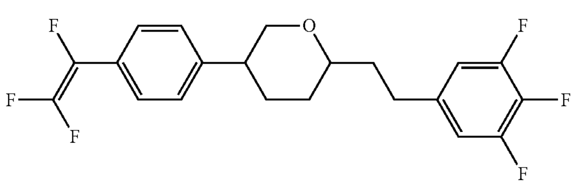 [SMILES: FC(F)=C(F)c1ccc(C2CCC(CCc3cc(F)c(F)c(F)c3)OC2)cc1] |
| 1-1-128 | 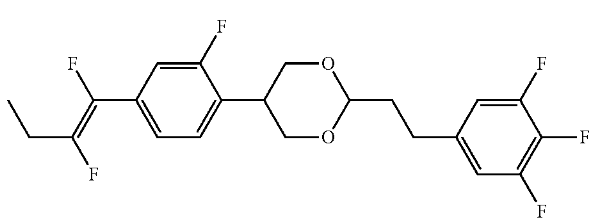 [SMILES: CC/C(F)=C(\F)c1ccc(C2COC(CCc3cc(F)c(F)c(F)c3)OC2)c(F)c1] |

-continued
Formula 42
| No. | |
|---|---|
| 1-1-129 | 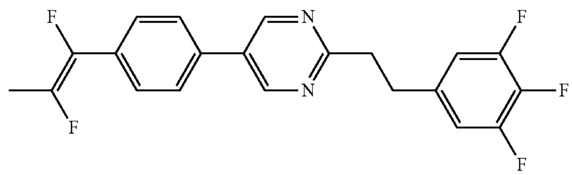 [SMILES: C/C(F)=C(\F)c1ccc(-c2cnc(CCc3cc(F)c(F)c(F)c3)nc2)cc1] |
| 1-1-130 | 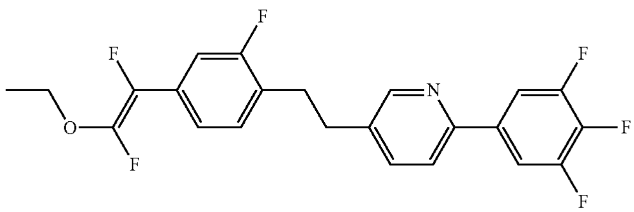 [SMILES: CCO/C(F)=C(\F)c1ccc(CCc2ccc(-c3cc(F)c(F)c(F)c3)nc2)c(F)c1] |
| 1-1-131 | 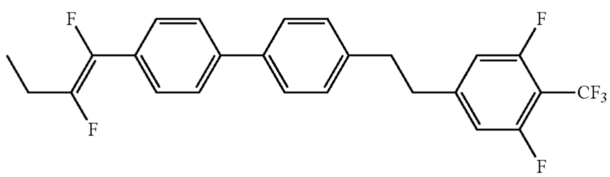 |
| 1-1-132 | 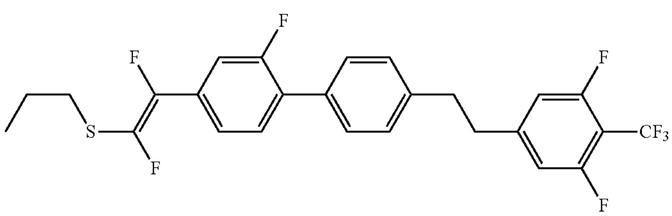 [SMILES: CCCS/C(F)=C(\F)c1ccc(-c2ccc(CCc3cc(F)c(C(F)(F)F)c(F)c3)cc2)c(F)c1] |
| 1-1-133 | 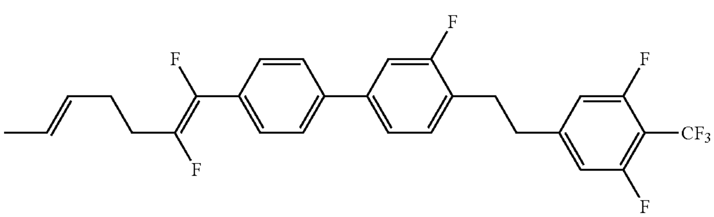 [SMILES: C/C=C/CC/C(F)=C(\F)c1ccc(-c2ccc(CCc3cc(F)c(C(F)(F)F)c(F)c3)c(F)c2)cc1] |
| 1-1-134 | 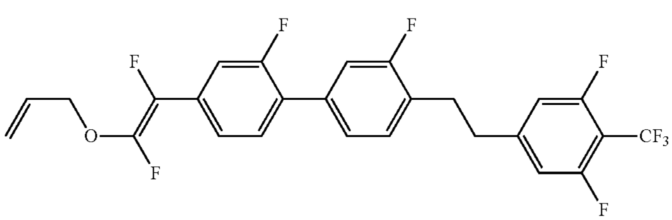 |
| 1-1-135 | 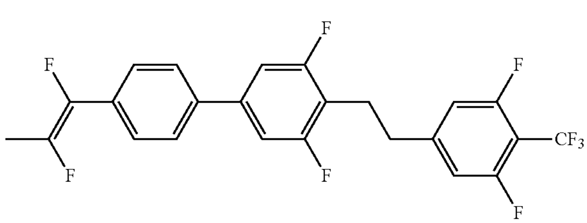 [SMILES: C/C(F)=C(\F)c1ccc(-c2cc(F)c(CCc3cc(F)c(C(F)(F)F)c(F)c3)c(F)c2)cc1] |

-continued
| Formula 42 | |
|---|---|
| No. | |
| 1-1-136 | 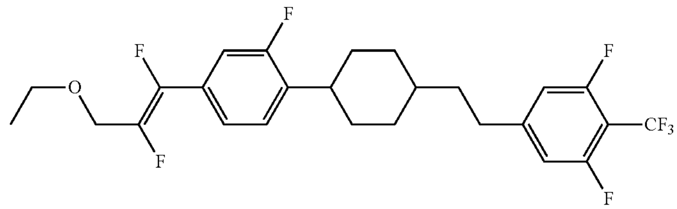 [SMILES: CCOC/C(F)=C(\F)c1ccc(C2CCC(CCc3cc(F)c(C(F)(F)F)c(F)c3)CC2)c(F)c1] |
| 1-1-137 | 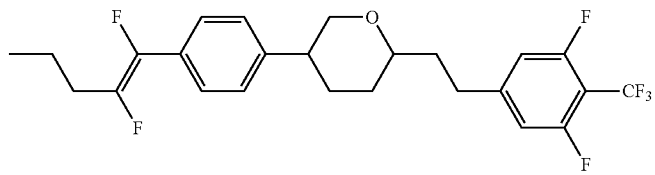 [SMILES: CCC/C(F)=C(\F)c1ccc(C2CCC(CCc3cc(F)c(C(F)(F)F)c(F)c3)OC2)cc1] |
| 1-1-138 | 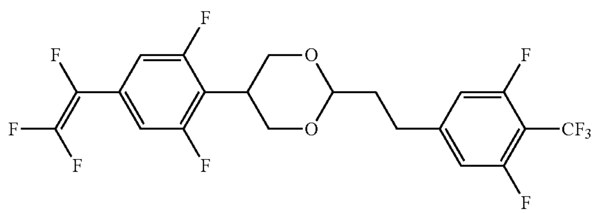 [SMILES: FC(F)=C(F)c1cc(F)c(C2COC(CCc3cc(F)c(C(F)(F)F)c(F)c3)OC2)c(F)c1] |
| 1-1-139 | 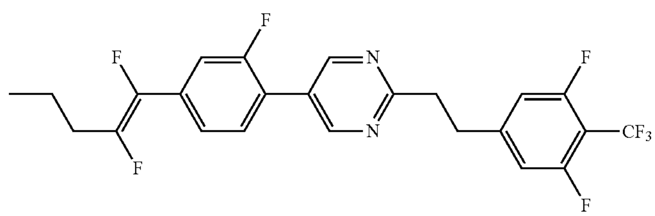 [SMILES: CCC/C(F)=C(\F)c1ccc(-c2cnc(CCc3cc(F)c(C(F)(F)F)c(F)c3)nc2)c(F)c1] |
| 1-1-140 | 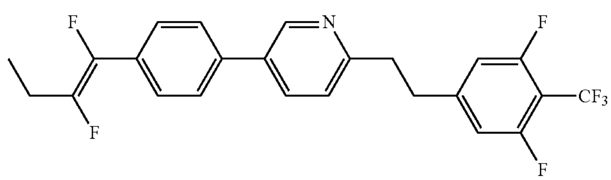 [SMILES: CC/C(F)=C(\F)c1ccc(-c2ccc(CCc3cc(F)c(C(F)(F)F)c(F)c3)nc2)cc1] |
| Formula 43 | |
|---|---|
| No. | |
| 1-1-141 | 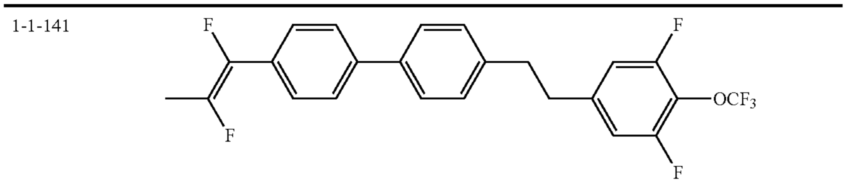 |
| 1-1-142 | 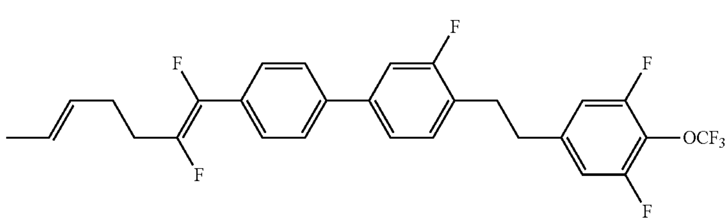 [SMILES: C/C=C/CC/C(F)=C(\F)c1ccc(-c2ccc(CCc3cc(F)c(OC(F)(F)F)c(F)c3)c(F)c2)cc1] |

-continued
| Formula 43 | |
|---|---|
| No. | |
| 1-1-143 | 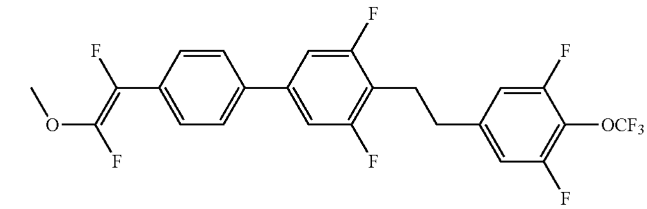 [SMILES: CO/C(F)=C(\F)c1ccc(-c2cc(F)c(CCc3cc(F)c(OC(F)(F)F)c(F)c3)c(F)c2)cc1] |
| 1-1-144 | 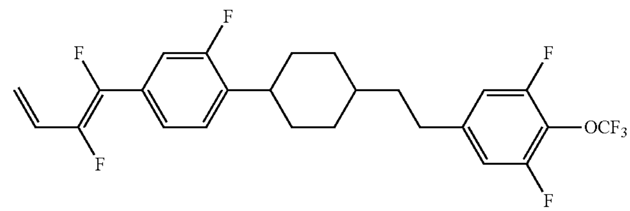 [SMILES: C=C/C(F)=C(\F)c1ccc(C2CCC(CCc3cc(F)c(OC(F)(F)F)c(F)c3)CC2)c(F)c1] |
| 1-1-145 | 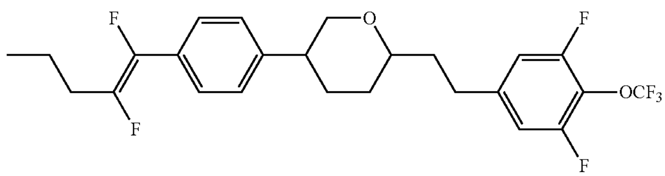 [SMILES: C/C=C/C(F)=C(\F)c1ccc(C2COC(CCc3cc(F)c(OC(F)(F)F)c(F)c3)OC2)cc1] |
| 1-1-146 | 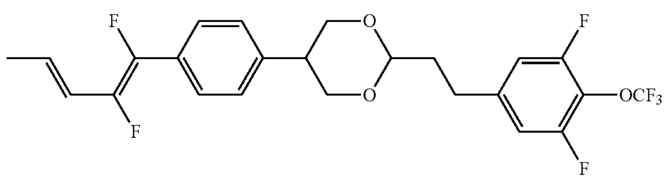 |
| 1-1-147 | 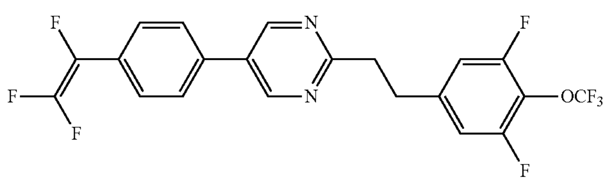 [SMILES: FC(F)=C(F)c1ccc(-c2cnc(CCc3cc(F)c(OC(F)(F)F)c(F)c3)nc2)cc1] |
| 1-1-148 | 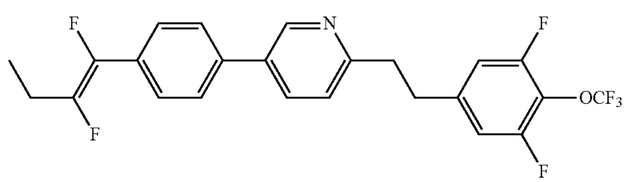 [SMILES: CC/C(F)=C(\F)c1ccc(-c2ccc(CCc3cc(F)c(OC(F)(F)F)c(F)c3)nc2)cc1] |
| 1-1-149 | 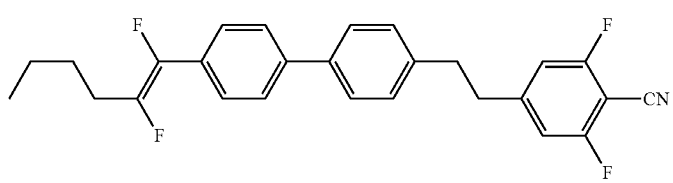 [SMILES: CCCC/C(F)=C(\F)c1ccc(-c2ccc(CCc3cc(F)c(C#N)c(F)c3)cc2)cc1] |
| 1-1-150 | 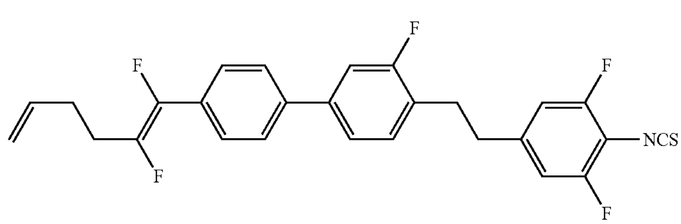 |

-continued
Formula 43
| No. | |
|---|---|
| 1-1-151 | 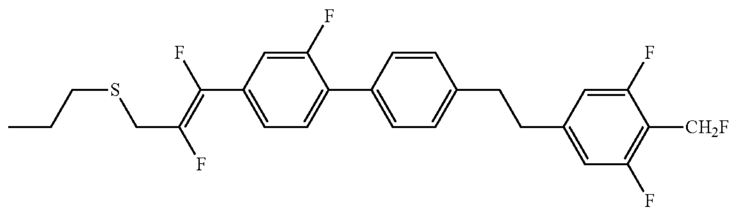 |
| 1-1-152 | 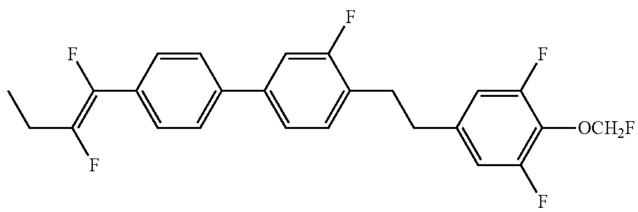 |
| 1-1-153 | 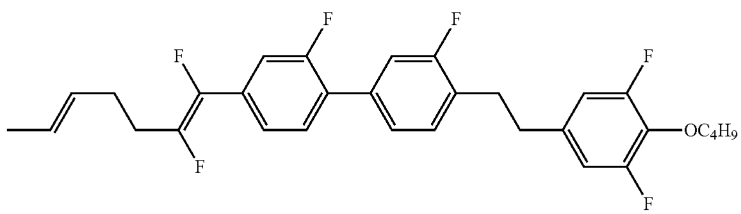 |
| 1-1-154 | 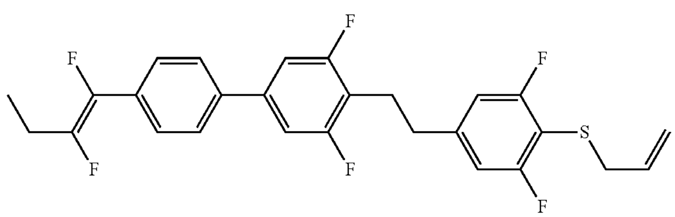 [SMILES: C=CCSc1c(F)cc(CCc2c(F)cc(-c3ccc(/C(F)=C(\F)CC)cc3)cc2F)cc1F] |
| 1-1-155 | 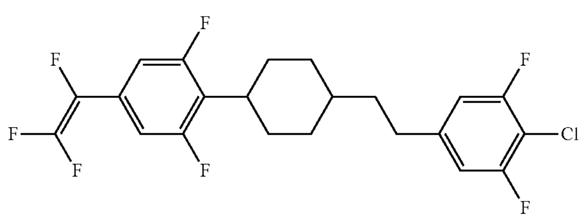 [SMILES: FC(F)=C(F)c1cc(F)c(C2CCC(CCc3cc(F)c(Cl)c(F)c3)CC2)c(F)c1] |
| 1-1-156 | 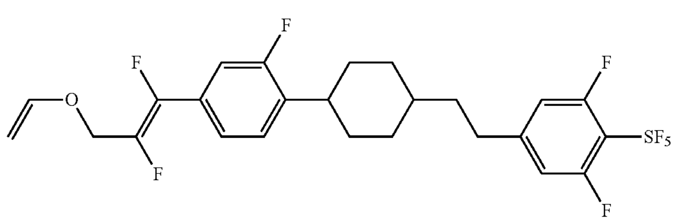 |
| 1-1-157 | 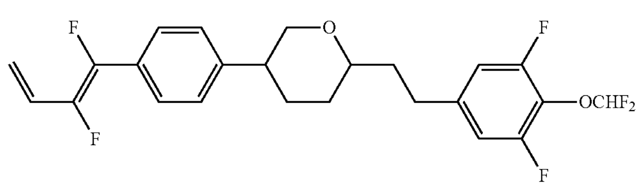 [SMILES: C=C/C(F)=C(\F)c1ccc(C2CCC(CCc3cc(F)c(OC(F)F)c(F)c3)OC2)cc1] |

-continued
| Formula 43 | |
|---|---|
| No. | |
| 1-1-158 | 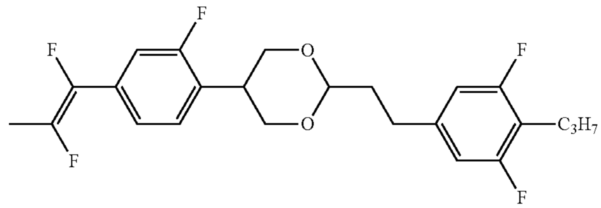 |
| 1-1-159 | 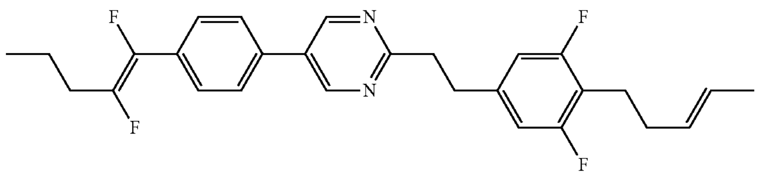 [SMILES: C/C=C/CCc1c(F)cc(CCc2ncc(-c3ccc(/C(F)=C(\F)CCC)cc3)cn2)cc1F] |
| 1-1-160 | 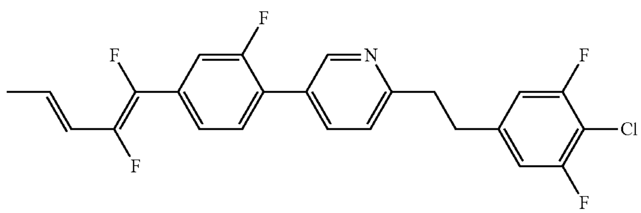 [SMILES: C/C=C/C(F)=C(\F)c1ccc(-c2ccc(CCc3cc(F)c(Cl)c(F)c3)nc2)c(F)c1] |
| Formula 44 | |
|---|---|
| No. | |
| 1-1-161 | 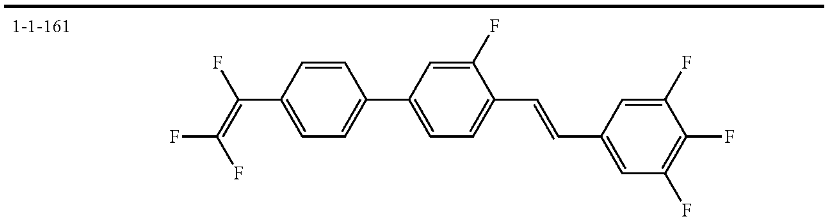 |
| 1-1-162 | 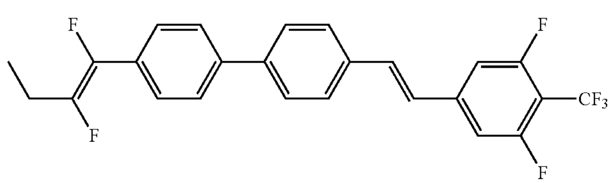 [SMILES: CC/C(F)=C(\F)c1ccc(-c2ccc(/C=C/c3cc(F)c(C(F)(F)F)c(F)c3)cc2)cc1] |
| 1-1-163 | 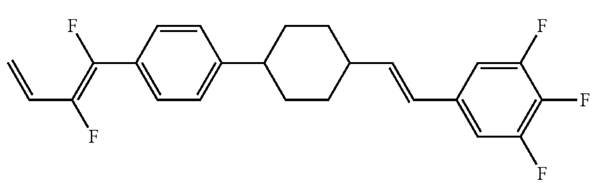 [SMILES: C=C/C(F)=C(\F)c1ccc(C2CCC(/C=C/c3cc(F)c(F)c(F)c3)CC2)cc1] |
| 1-1-164 | 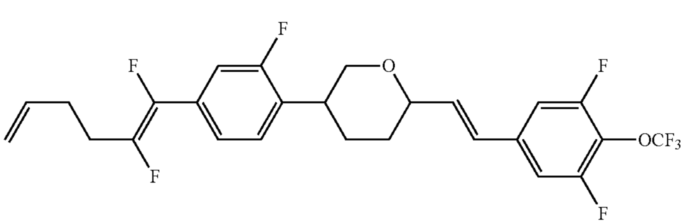 [SMILES: C=CCC/C(F)=C(\F)c1ccc(C2CCC(/C=C/c3cc(F)c(OC(F)(F)F)c(F)c3)OC2)c(F)c1] |

-continued
| Formula 44 | |
|---|---|
| No. | |
| 1-1-165 | 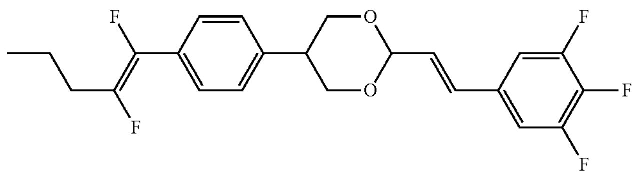 [SMILES: CCC/C(F)=C(\F)c1ccc(C2COC(/C=C/c3cc(F)c(F)c(F)c3)OC2)cc1] |
| 1-1-166 | 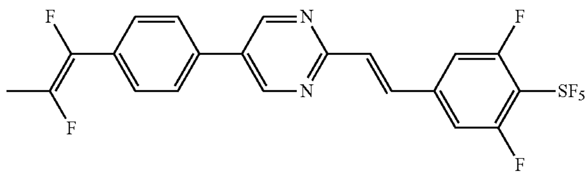 |
| 1-1-167 | 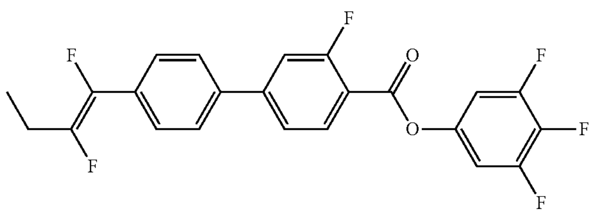 [SMILES: CC/C(F)=C(\F)c1ccc(-c2ccc(C(=O)Oc3cc(F)c(F)c(F)c3)c(F)c2)cc1] |
| 1-1-168 | 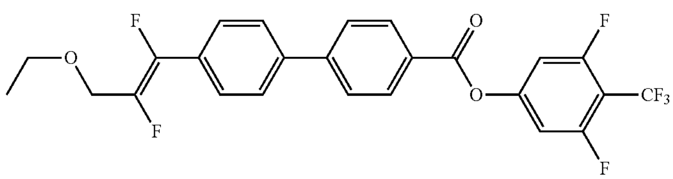 [SMILES: CCOC/C(F)=C(\F)c1ccc(-c2ccc(C(=O)Oc3cc(F)c(C(F)(F)F)c(F)c3)cc2)cc1] |
| 1-1-169 | 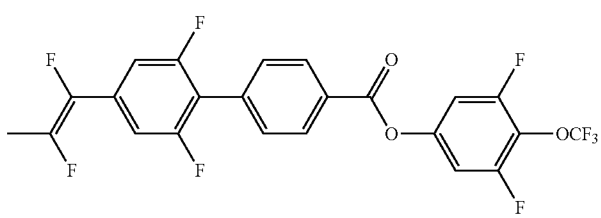 [SMILES: C/C(F)=C(\F)c1cc(F)c(-c2ccc(C(=O)Oc3cc(F)c(OC(F)(F)F)c(F)c3)cc2)c(F)c1] |
| 1-1-170 | 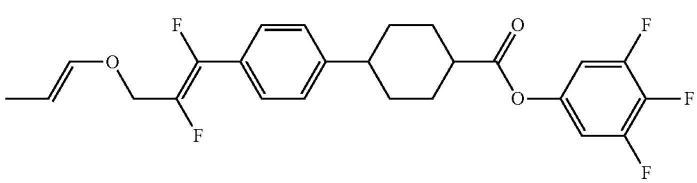 [SMILES: C/C=C/OC/C(F)=C(\F)c1ccc(C2CCC(C(=O)Oc3cc(F)c(F)c(F)c3)CC2)cc1] |
| 1-1-171 | 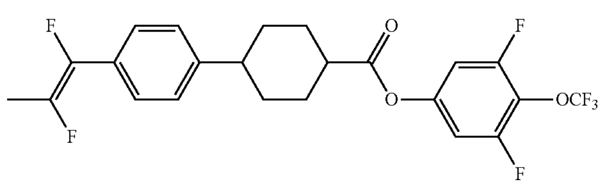 [SMILES: C/C(F)=C(\F)c1ccc(C2CCC(C(=O)Oc3cc(F)c(OC(F)(F)F)c(F)c3)CC2)cc1] |
| 1-1-172 | 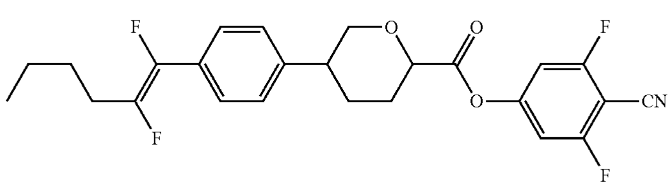 [SMILES: CCCC/C(F)=C(\F)c1ccc(C2CCC(C(=O)Oc3cc(F)c(C#N)c(F)c3)OC2)cc1] |

-continued
Formula 44
| No. | |
|---|---|
| 1-1-173 | 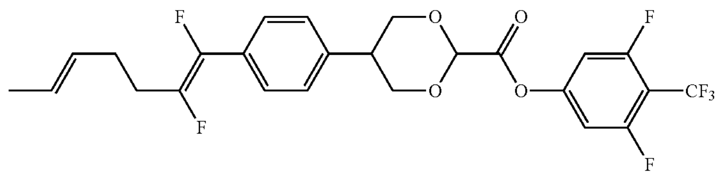 [SMILES: C/C=C/CC/C(F)=C(\F)c1ccc(C2COC(C(=O)Oc3cc(F)c(C(F)(F)F)c(F)c3)OC2)cc1] |
| 1-1-174 | 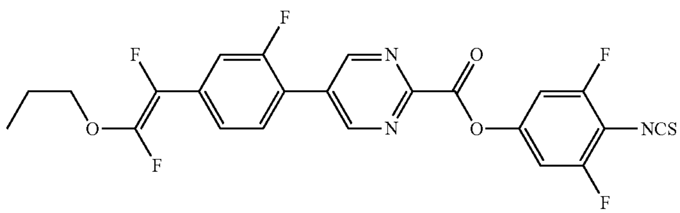 |
| 1-1-175 | 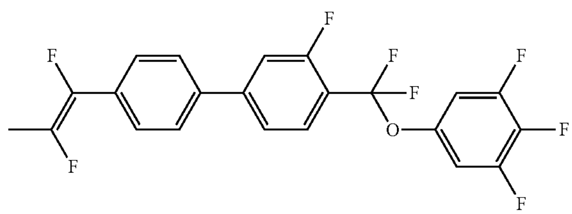 [SMILES: C/C(F)=C(\F)c1ccc(-c2ccc(C(F)(F)Oc3cc(F)c(F)c(F)c3)c(F)c2)cc1] |
| 1-1-176 | 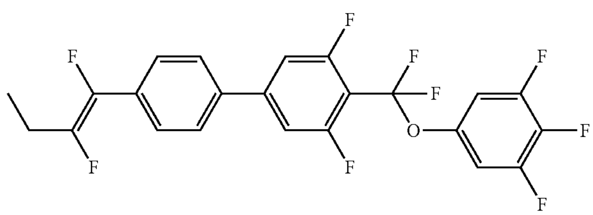 [SMILES: CC/C(F)=C(\F)c1ccc(-c2cc(F)c(C(F)(F)Oc3cc(F)c(F)c(F)c3)c(F)c2)cc1] |
| 1-1-177 | 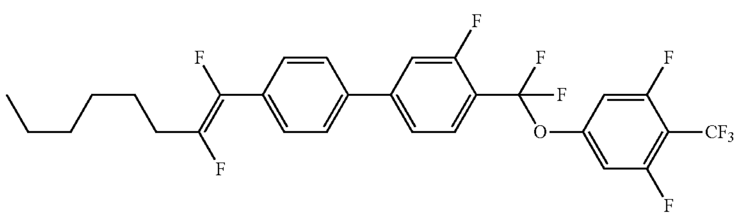 [SMILES: CCCCCC/C(F)=C(\F)c1ccc(-c2ccc(C(F)(F)Oc3cc(F)c(C(F)(F)F)c(F)c3)c(F)c2)cc1] |
| 1-1-178 | 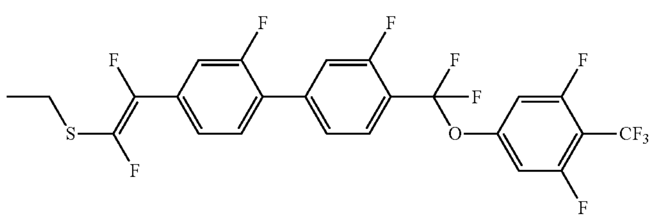 [SMILES: CCS/C(F)=C(\F)c1ccc(-c2ccc(C(F)(F)Oc3cc(F)c(C(F)(F)F)c(F)c3)c(F)c2)c(F)c1] |
| 1-1-179 | 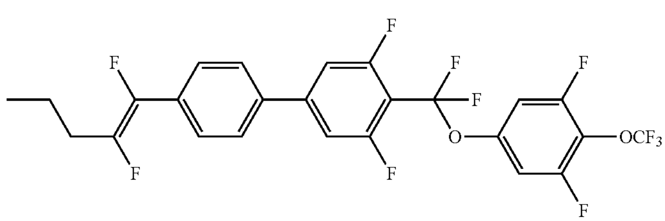 [SMILES: CCC/C(F)=C(\F)c1ccc(-c2cc(F)c(C(F)(F)Oc3cc(F)c(OC(F)(F)F)c(F)c3)c(F)c2)cc1] |

-continued
| Formula 44 |
| --- |
| No. |
| 1-1-180 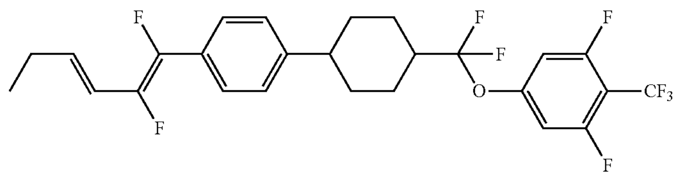 [SMILES: CC/C=C/C(F)=C(\F)c1ccc(C2CCC(C(F)(F)Oc3cc(F)c(C(F)(F)F)c(F)c3)CC2)cc1] |
| Formula 45 |
| --- |
| No. |
| 1-1-181 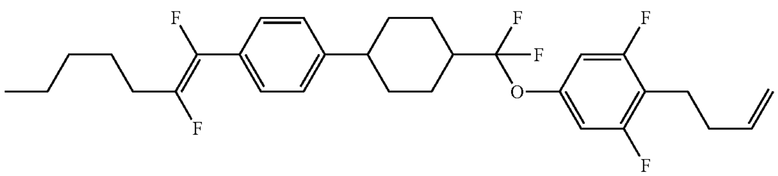 [SMILES: C=CCCc1c(F)cc(OC(F)(F)C2CCC(c3ccc(/C(F)=C(\F)CCCCC)cc3)CC2)cc1F] |
| 1-1-182 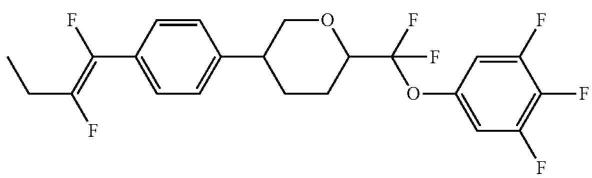 [SMILES: CC/C(F)=C(\F)c1ccc(C2CCC(C(F)(F)Oc3cc(F)c(F)c(F)c3)OC2)cc1] |
| 1-1-183 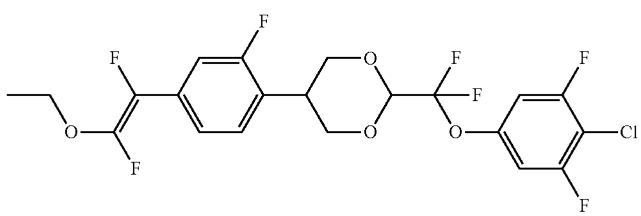 [SMILES: CCO/C(F)=C(\F)c1ccc(C2COC(C(F)(F)Oc3cc(F)c(Cl)c(F)c3)OC2)c(F)c1] |
| 1-1-184 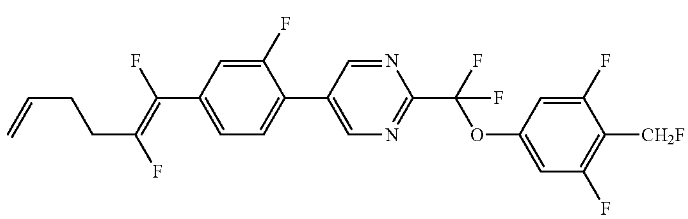 |
| 1-1-185 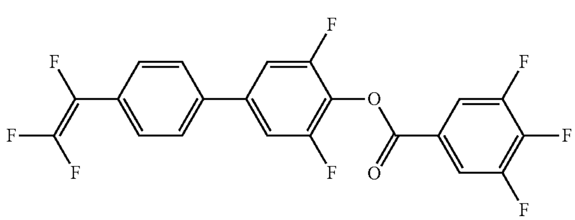 [SMILES: O=C(Oc1c(F)cc(-c2ccc(C(F)=C(F)F)cc2)cc1F)c1cc(F)c(F)c(F)c1] |
| 1-1-186 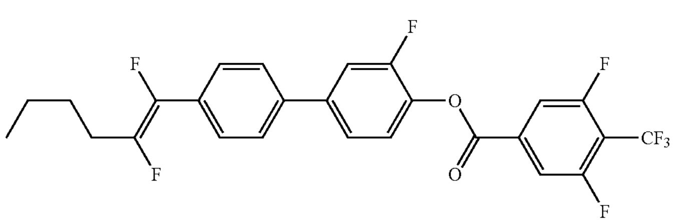 [SMILES: CCCC/C(F)=C(\F)c1ccc(-c2ccc(OC(=O)c3cc(F)c(C(F)(F)F)c(F)c3)c(F)c2)cc1] |

-continued
| Formula 45 | |
| --- | --- |
| No. | |
| 1-1-187 | 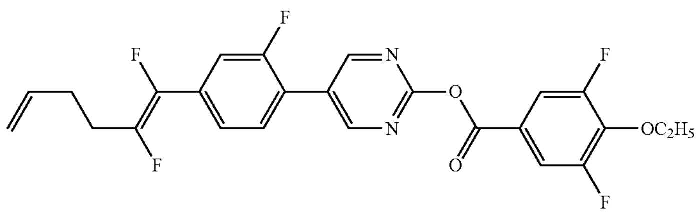 [SMILES: C=CCC/C(F)=C(\F)c1ccc(-c2cnc(OC(=O)c3cc(F)c(OCC)c(F)c3)nc2)c(F)c1] |
| 1-1-188 | 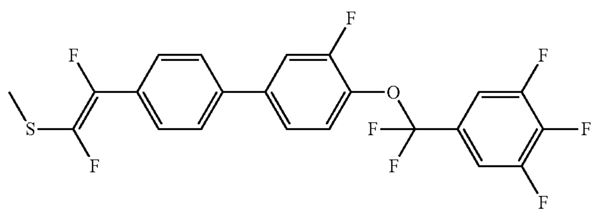 [SMILES: CS/C(F)=C(\F)c1ccc(-c2ccc(OC(F)(F)c3cc(F)c(F)c(F)c3)c(F)c2)cc1] |
| 1-1-189 | 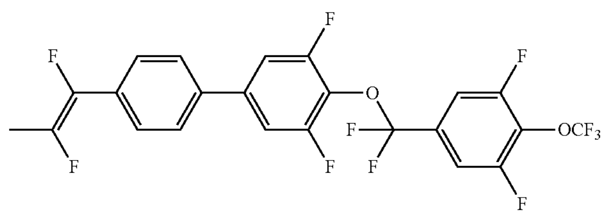 [SMILES: C/C(F)=C(\F)c1ccc(-c2cc(F)c(OC(F)(F)c3cc(F)c(OC(F)(F)F)c(F)c3)c(F)c2)cc1] |
| 1-1-190 | 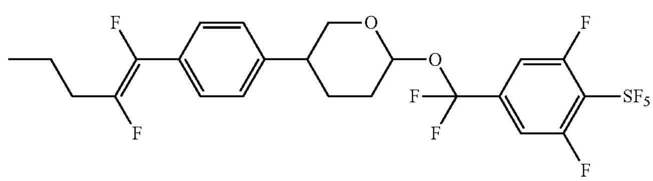 |
| 1-1-191 | 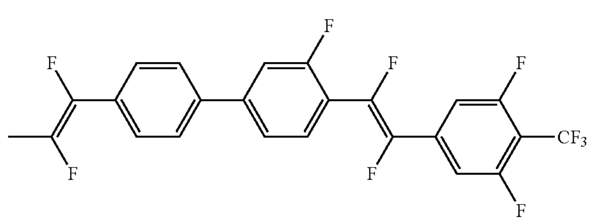 [SMILES: C/C(F)=C(\F)c1ccc(-c2ccc(/C(F)=C(\F)c3cc(F)c(C(F)(F)F)c(F)c3)c(F)c2)cc1] |
| 1-1-192 | 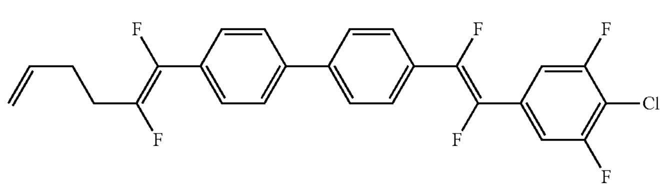 [SMILES: C=CCC/C(F)=C(\F)c1ccc(-c2ccc(/C(F)=C(\F)c3cc(F)c(Cl)c(F)c3)cc2)cc1] |
| 1-1-193 | 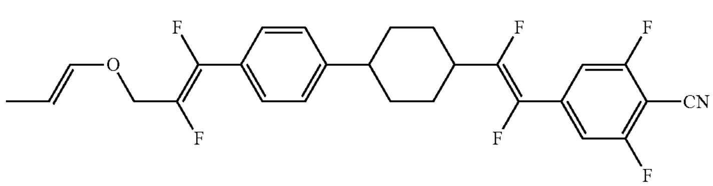 [SMILES: C/C=C/OC/C(F)=C(\F)c1ccc(C2CCC(/C(F)=C(\F)c3cc(F)c(C#N)c(F)c3)CC2)cc1] |

-continued
| Formula 45 | |
|---|---|
| No. | |
| 1-1-194 | 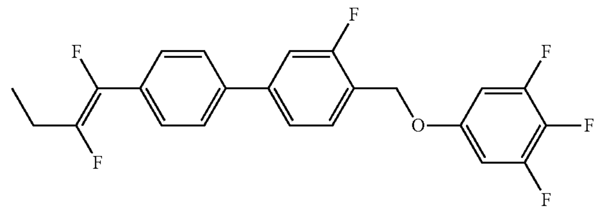 [SMILES: CC/C(F)=C(\F)c1ccc(-c2ccc(COc3cc(F)c(F)c(F)c3)c(F)c2)cc1] |
| 1-1-195 | 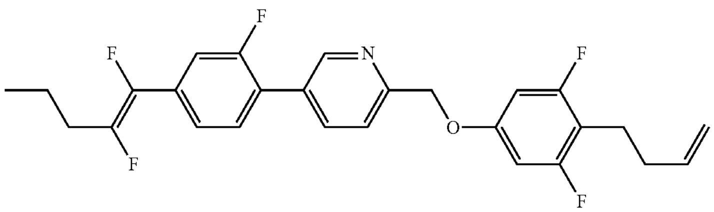 [SMILES: C=CCCc1c(F)cc(OCc2ccc(-c3ccc(/C(F)=C(\F)CCC)cc3F)cn2)cc1F] |
| 1-1-196 | 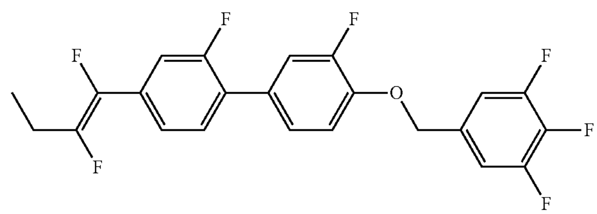 |
| 1-1-197 | 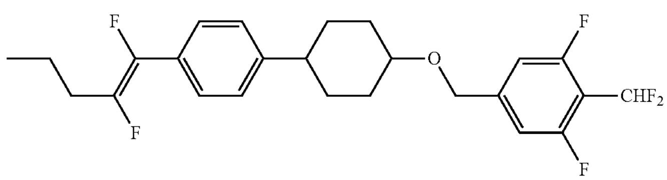 |
| 1-1-198 | 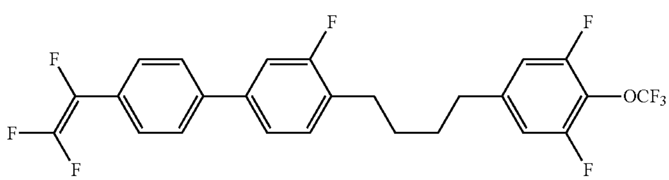 [SMILES: FC(F)=C(F)c1ccc(-c2ccc(CCCCc3cc(F)c(OC(F)(F)F)c(F)c3)c(F)c2)cc1] |
| 1-1-199 | 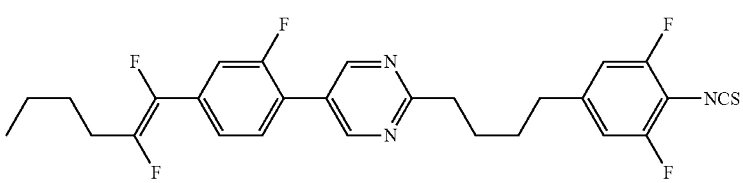 |
| 1-1-200 | 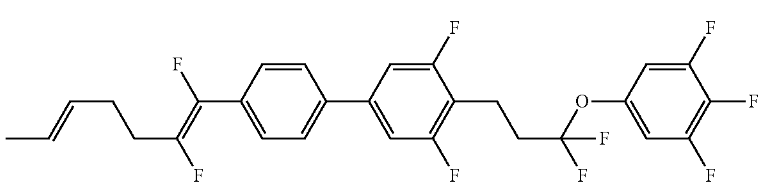 [SMILES: C/C=C/CC/C(F)=C(\F)c1ccc(-c2cc(F)c(CCC(F)(F)Oc3cc(F)c(F)c(F)c3)c(F)c2)cc1] |

Formula 46
| No. | |
|---|---|
| 1-2-1 | 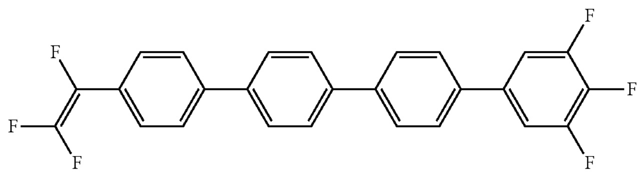 [SMILES: FC(F)=C(F)c1ccc(-c2ccc(-c3ccc(-c4cc(F)c(F)c(F)c4)cc3)cc2)cc1] |
| 1-2-2 | 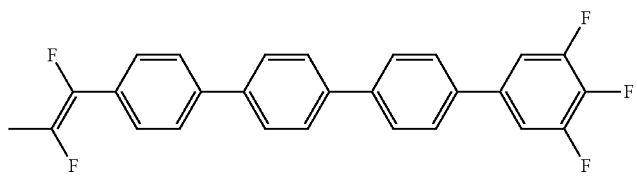 [SMILES: C/C(F)=C(\F)c1ccc(-c2ccc(-c3ccc(-c4cc(F)c(F)c(F)c4)cc3)cc2)cc1] |
| 1-2-3 | 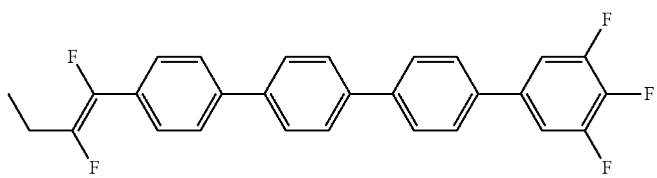 |
| 1-2-4 | 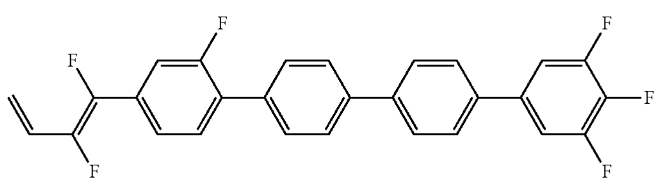 |
| 1-2-5 | 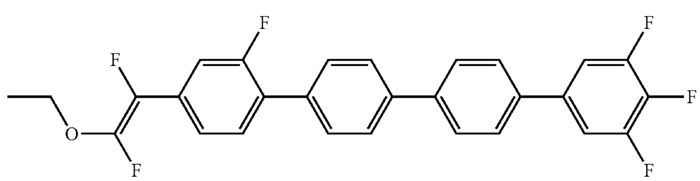 |
| 1-2-6 | 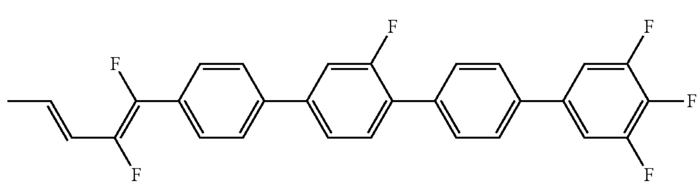 [SMILES: C/C=C/C(F)=C(\F)c1ccc(-c2ccc(-c3ccc(-c4cc(F)c(F)c(F)c4)cc3)c(F)c2)cc1] |
| 1-2-7 | 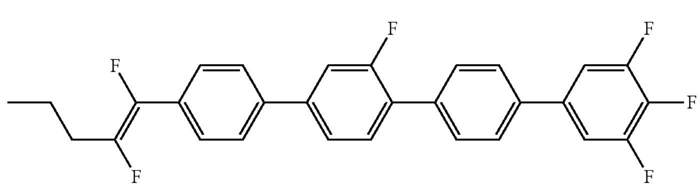 [SMILES: CCC/C(F)=C(\F)c1ccc(-c2ccc(-c3ccc(-c4cc(F)c(F)c(F)c4)cc3)c(F)c2)cc1] |
| 1-2-8 | 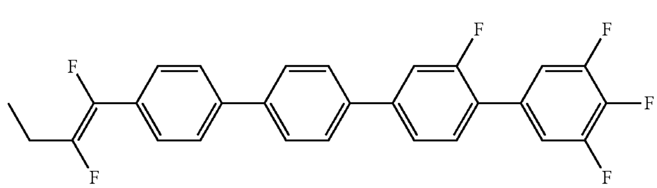 [SMILES: CC/C(F)=C(\F)c1ccc(-c2ccc(-c3ccc(-c4cc(F)c(F)c(F)c4)c(F)c3)cc2)cc1] |

-continued
| Formula 46 | |
|---|---|
| No. | |
| 1-2-9 | 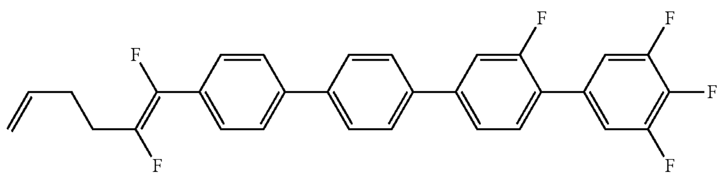 [SMILES: C=CCC/C(F)=C(\F)c1ccc(-c2ccc(-c3ccc(-c4cc(F)c(F)c(F)c4)c(F)c3)cc2)cc1] |
| 1-2-10 | 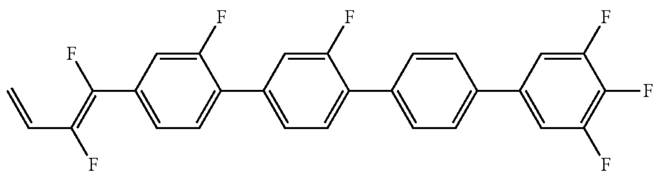 |
| 1-2-11 | 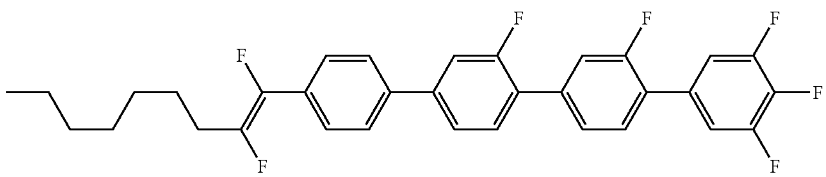 [SMILES: CCCCCCC/C(F)=C(\F)c1ccc(-c2ccc(-c3ccc(-c4cc(F)c(F)c(F)c4)c(F)c3)c(F)c2)cc1] |
| 1-2-12 | 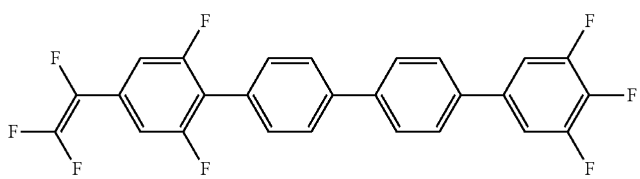 |
| 1-2-13 | 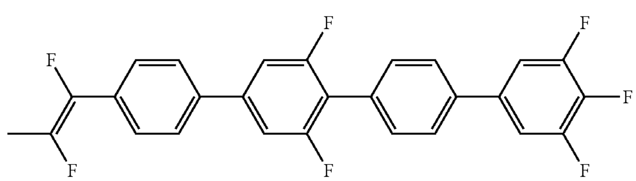 |
| 1-2-14 | 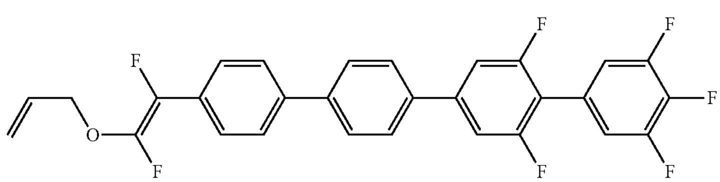 |
| 1-2-15 | 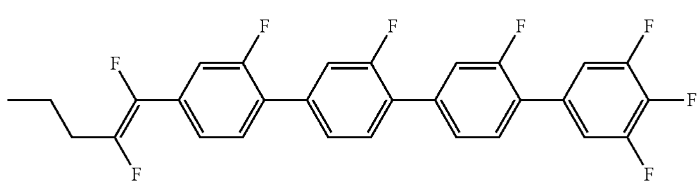 |
| 1-2-16 | 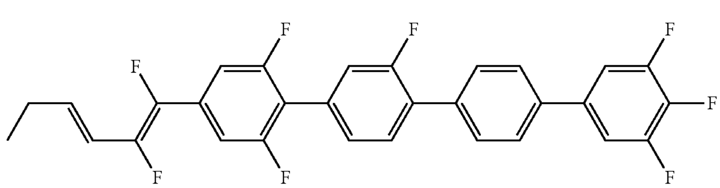 [SMILES: CC/C=C/C(F)=C(\F)c1cc(F)c(-c2ccc(-c3ccc(-c4cc(F)c(F)c(F)c4)cc3)c(F)c2)c(F)c1] |

-continued
| Formula 46 | |
|---|---|
| No. | |
| 1-2-17 | 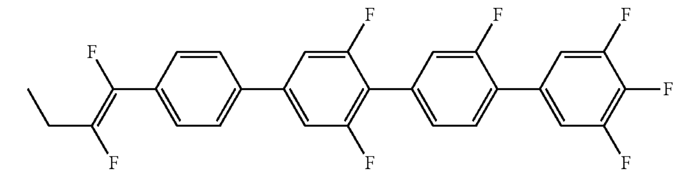 [SMILES: CC/C(F)=C(\F)c1ccc(-c2cc(F)c(-c3ccc(-c4cc(F)c(F)c(F)c4)c(F)c3)c(F)c2)cc1] |
| 1-2-18 | 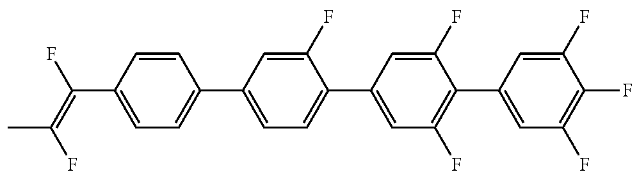 [SMILES: C/C(F)=C(\F)c1ccc(-c2ccc(-c3cc(F)c(-c4cc(F)c(F)c(F)c4)c(F)c3)c(F)c2)cc1] |
| 1-2-19 | 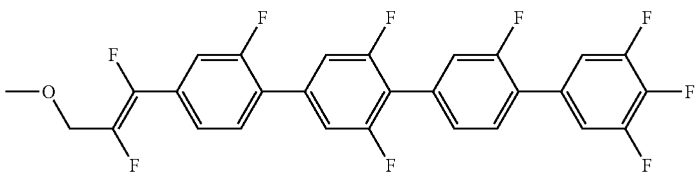 [SMILES: COC/C(F)=C(\F)c1ccc(-c2cc(F)c(-c3ccc(-c4cc(F)c(F)c(F)c4)c(F)c3)c(F)c2)c(F)c1] |
| 1-2-20 | 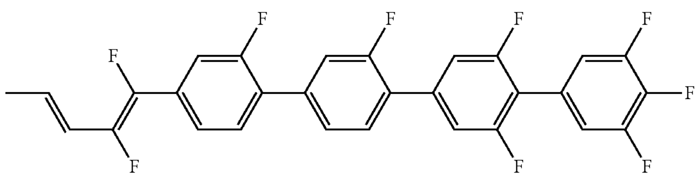 [SMILES: C/C=C/C(F)=C(\F)c1ccc(-c2ccc(-c3cc(F)c(-c4cc(F)c(F)c(F)c4)c(F)c3)c(F)c2)c(F)c1] |
| Formula 47 | |
|---|---|
| No. | |
| 1-2-21 | 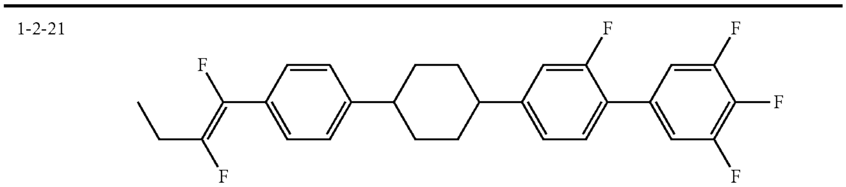 |
| 1-2-22 | 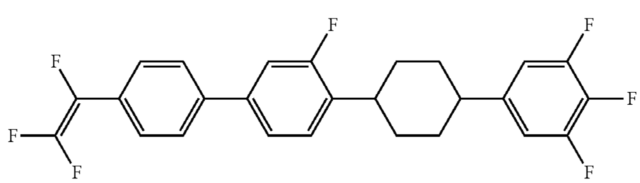 [SMILES: FC(F)=C(F)c1ccc(-c2ccc(C3CCC(c4cc(F)c(F)c(F)c4)CC3)c(F)c2)cc1] |
| 1-2-23 | 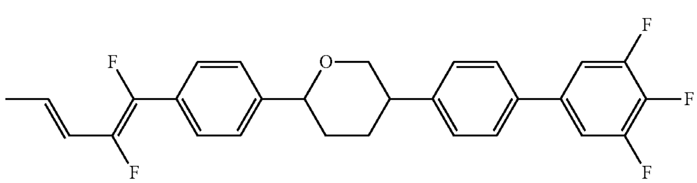 [SMILES: C/C=C/C(F)=C(\F)c1ccc(C2CCC(c3ccc(-c4cc(F)c(F)c(F)c4)cc3)CO2)cc1] |

-continued
Formula 47
| No. | |
|---|---|
| 1-2-24 | 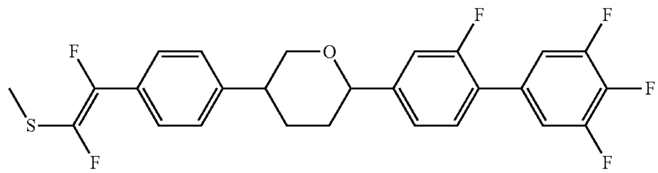 |
| 1-2-25 | 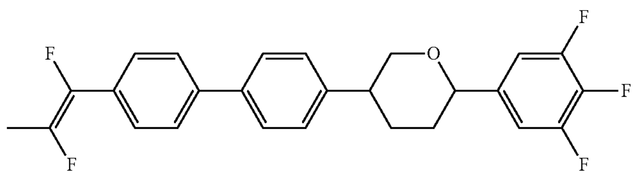 [SMILES: C/C(F)=C(\F)c1ccc(-c2ccc(C3CCC(c4cc(F)c(F)c(F)c4)OC3)cc2)cc1] |
| 1-2-26 | 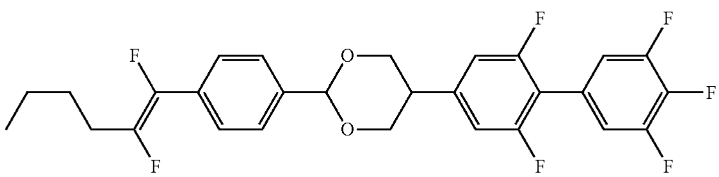 [SMILES: CCCC/C(F)=C(\F)c1ccc(C2OCC(c3cc(F)c(-c4cc(F)c(F)c(F)c4)c(F)c3)CO2)cc1] |
| 1-2-27 | 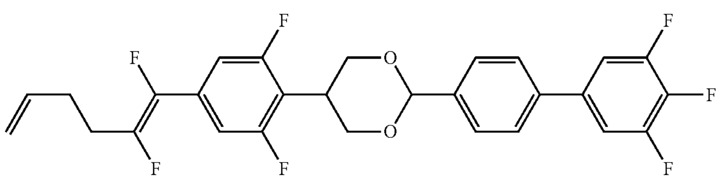 [SMILES: C=CCC/C(F)=C(\F)c1cc(F)c(C2COC(c3ccc(-c4cc(F)c(F)c(F)c4)cc3)OC2)c(F)c1] |
| 1-2-28 | 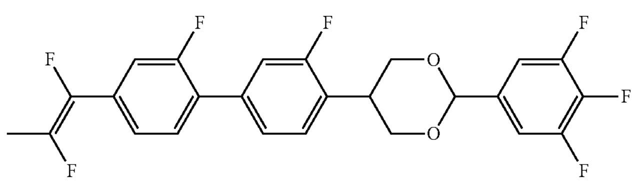 |
| 1-2-29 | 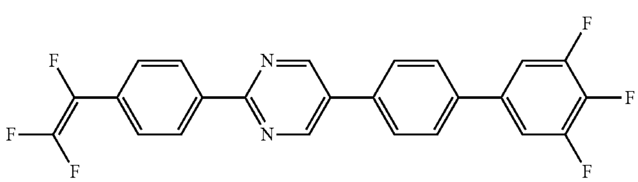 |
| 1-2-30 | 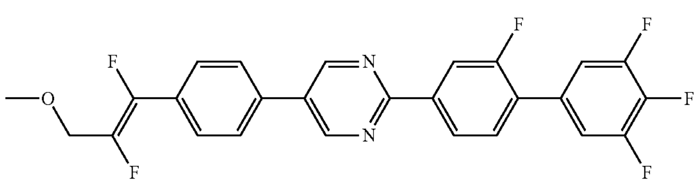 [SMILES: COC/C(F)=C(\F)c1ccc(-c2cnc(-c3ccc(-c4cc(F)c(F)c(F)c4)c(F)c3)nc2)cc1] |
| 1-2-31 | 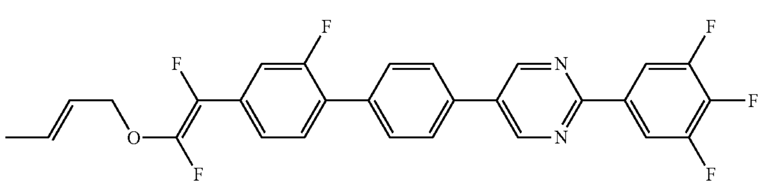 [SMILES: C/C=C/CO/C(F)=C(\F)c1ccc(-c2ccc(-c3cnc(-c4cc(F)c(F)c(F)c4)nc3)cc2)c(F)c1] |

-continued
| Formula 47 | |
|---|---|
| No. | |
| 1-2-32 | 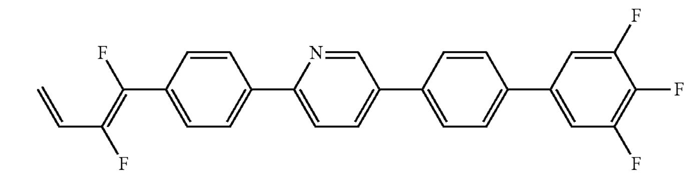 [SMILES: C=C/C(F)=C(\F)c1ccc(-c2ccc(-c3ccc(-c4cc(F)c(F)c(F)c4)cc3)cn2)cc1] |
| 1-2-33 | 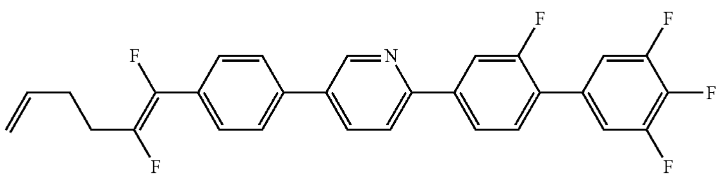 [SMILES: C=CCC/C(F)=C(\F)c1ccc(-c2ccc(-c3ccc(-c4cc(F)c(F)c(F)c4)c(F)c3)nc2)cc1] |
| 1-2-34 | 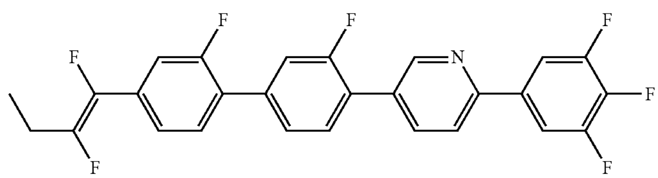 |
| 1-2-35 | 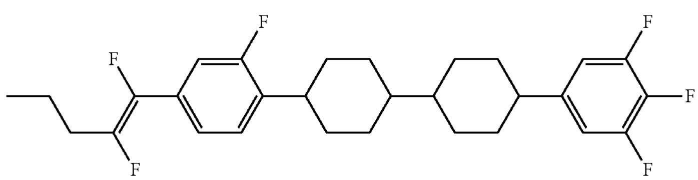 [SMILES: CCC/C(F)=C(\F)c1ccc(C2CCC(C3CCC(c4cc(F)c(F)c(F)c4)CC3)CC2)c(F)c1] |
| 1-2-36 | 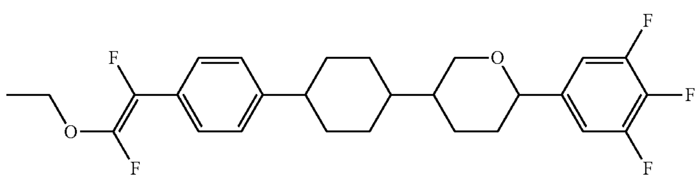 [SMILES: CCO/C(F)=C(\F)c1ccc(C2CCC(C3CCC(c4cc(F)c(F)c(F)c4)OC3)CC2)cc1] |
| 1-2-37 | 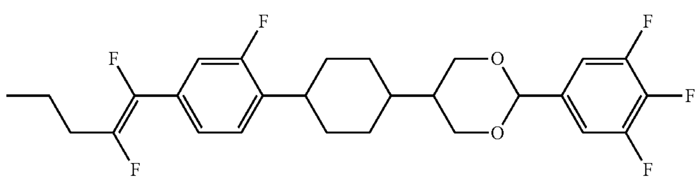 [SMILES: CCC/C(F)=C(\F)c1ccc(C2CCC(C3COC(c4cc(F)c(F)c(F)c4)OC3)CC2)c(F)c1] |
| 1-2-38 | 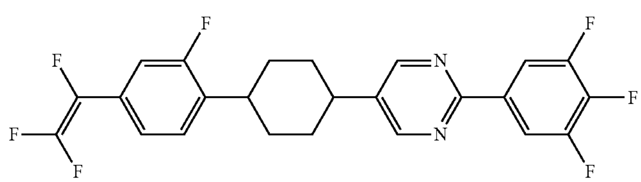 [SMILES: FC(F)=C(F)c1ccc(C2CCC(c3cnc(-c4cc(F)c(F)c(F)c4)nc3)CC2)c(F)c1] |
| 1-2-39 | 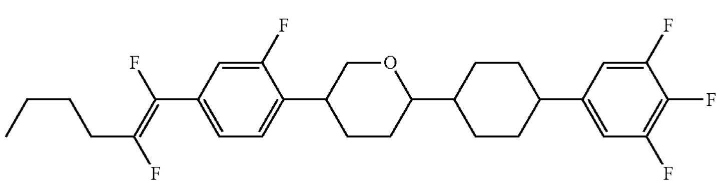 [SMILES: CCCC/C(F)=C(\F)c1ccc(C2CCC(C3CCC(c4cc(F)c(F)c(F)c4)CC3)OC2)c(F)c1] |

-continued
| Formula 47 | |
|---|---|
| No. | |
| 1-2-40 | 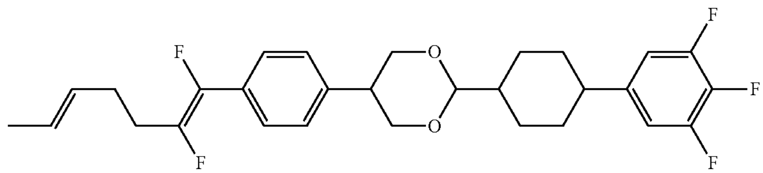 [SMILES: C/C=C/CC/C(F)=C(\F)c1ccc(C2COC(C3CCC(c4cc(F)c(F)c(F)c4)CC3)OC2)cc1] |
-continued
| Formula 48 | |
|---|---|
| No. | |
| 1-2-41 | 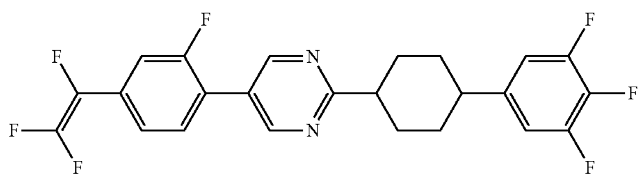 [SMILES: FC(F)=C(F)c1ccc(-c2cnc(C3CCC(c4cc(F)c(F)c(F)c4)CC3)nc2)c(F)c1] |
| 1-2-42 | 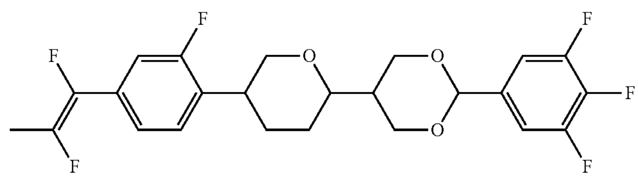 [SMILES: C/C(F)=C(\F)c1ccc(C2CCC(C3COC(c4cc(F)c(F)c(F)c4)OC3)OC2)c(F)c1] |
| 1-2-43 | 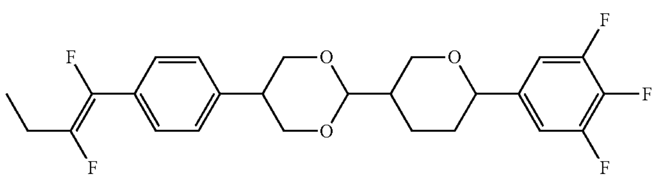 [SMILES: CC/C(F)=C(\F)c1ccc(C2COC(C3CCC(c4cc(F)c(F)c(F)c4)OC3)OC2)cc1] |
| 1-2-44 | 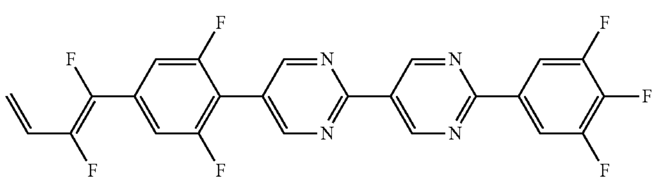 [SMILES: C=C/C(F)=C(\F)c1cc(F)c(-c2cnc(-c3cnc(-c4cc(F)c(F)c(F)c4)nc3)nc2)c(F)c1] |
| 1-2-45 | 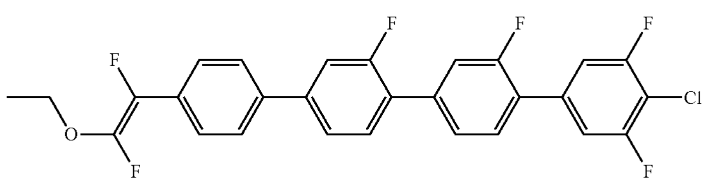 [SMILES: CCO/C(F)=C(\F)c1ccc(-c2ccc(-c3ccc(-c4cc(F)c(Cl)c(F)c4)c(F)c3)c(F)c2)cc1] |
| 1-2-46 | 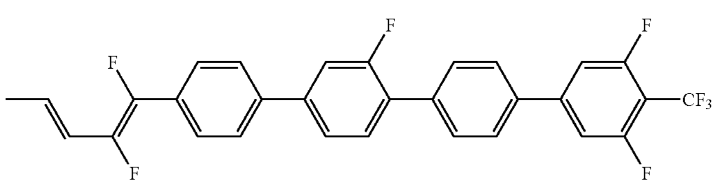 |

-continued
| Formula 48 | |
|---|---|
| No. | |
| 1-2-47 | 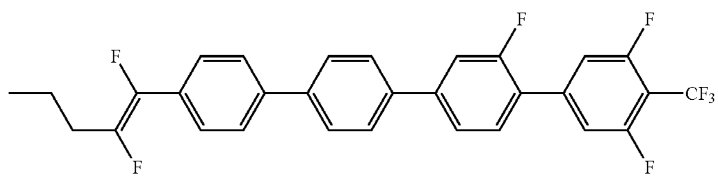 [SMILES: CCC/C(F)=C(\F)c1ccc(-c2ccc(-c3ccc(-c4cc(F)c(C(F)(F)F)c(F)c4)c(F)c3)cc2)cc1] |
| 1-2-48 | 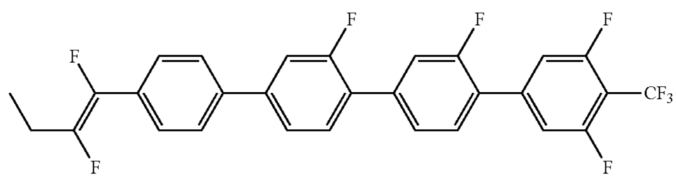 [SMILES: CC/C(F)=C(\F)c1ccc(-c2ccc(-c3ccc(-c4cc(F)c(C(F)(F)F)c(F)c4)c(F)c3)c(F)c2)cc1] |
| 1-2-49 | 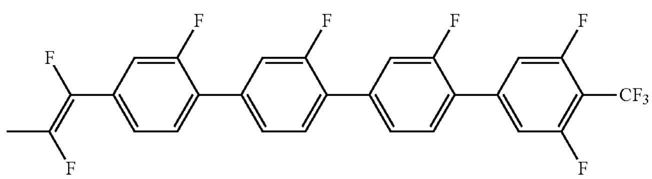 |
| 1-2-50 | 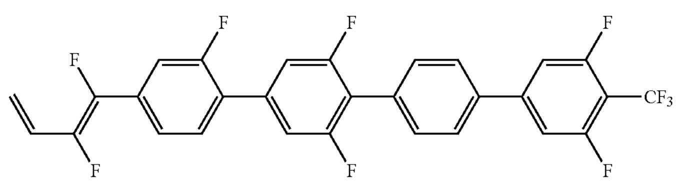 |
| 1-2-51 | 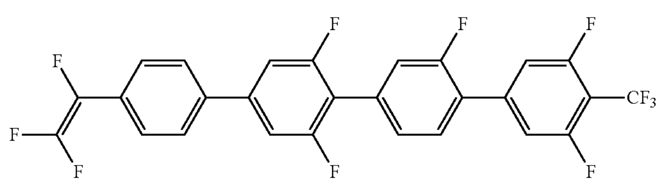 [SMILES: FC(F)=C(F)c1ccc(-c2cc(F)c(-c3ccc(-c4cc(F)c(C(F)(F)F)c(F)c4)c(F)c3)c(F)c2)cc1] |
| 1-2-52 | 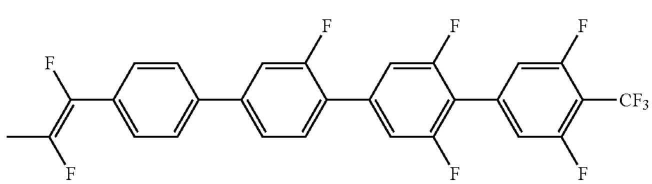 |
| 1-2-53 | 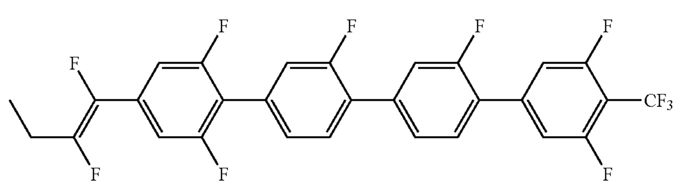 [SMILES: CC/C(F)=C(\F)c1cc(F)c(-c2ccc(-c3ccc(-c4cc(F)c(C(F)(F)F)c(F)c4)c(F)c3)c(F)c2)c(F)c1] |
| 1-2-54 | 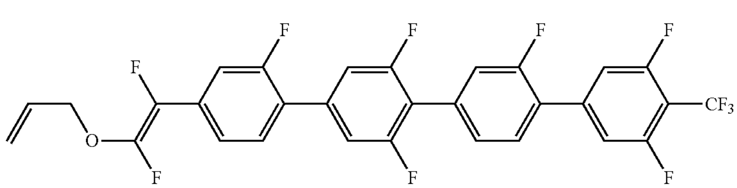 [SMILES: C=CCO/C(F)=C(\F)c1ccc(-c2cc(F)c(-c3ccc(-c4cc(F)c(C(F)(F)F)c(F)c4)c(F)c3)c(F)c2)c(F)c1] |

-continued
Formula 48
| No. | |
|---|---|
| 1-2-55 | 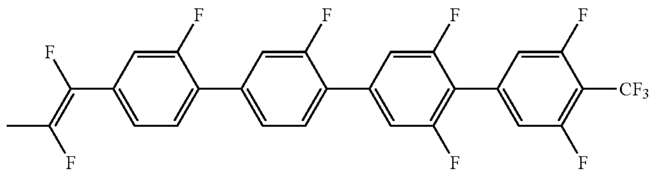 [SMILES: C/C(F)=C(\F)c1ccc(-c2ccc(-c3cc(F)c(-c4cc(F)c(C(F)(F)F)c(F)c4)c(F)c3)c(F)c2)c(F)c1] |
| 1-2-56 | 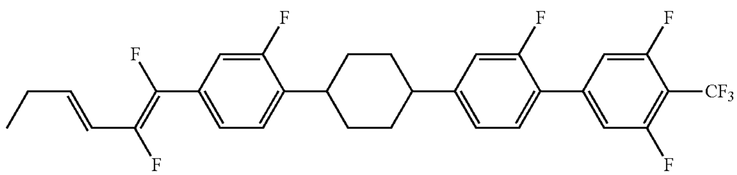 [SMILES: CC/C=C/C(F)=C(\F)c1ccc(C2CCC(c3ccc(-c4cc(F)c(C(F)(F)F)c(F)c4)c(F)c3)CC2)c(F)c1] |
| 1-2-57 | 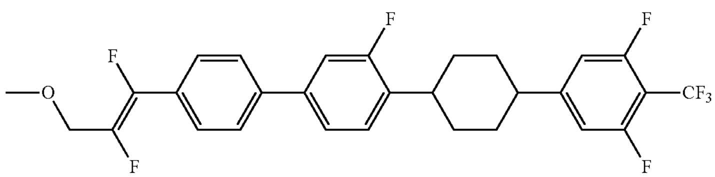 [SMILES: COC/C(F)=C(\F)c1ccc(-c2ccc(C3CCC(c4cc(F)c(C(F)(F)F)c(F)c4)CC3)c(F)c2)cc1] |
| 1-2-58 | 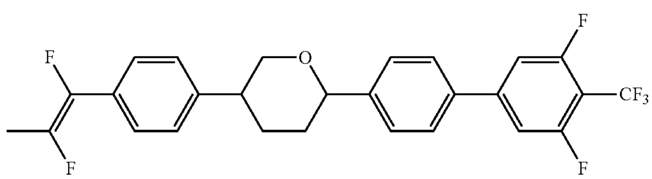 [SMILES: C/C(F)=C(\F)c1ccc(C2CCC(c3ccc(-c4cc(F)c(C(F)(F)F)c(F)c4)cc3)OC2)cc1] |
| 1-2-59 | 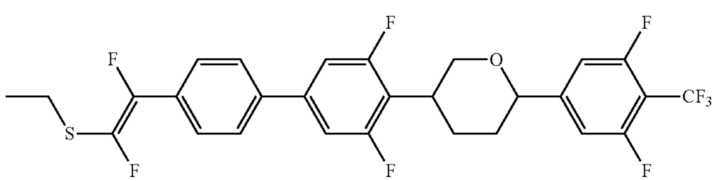 [SMILES: CCS/C(F)=C(\F)c1ccc(-c2cc(F)c(C3CCC(c4cc(F)c(C(F)(F)F)c(F)c4)OC3)c(F)c2)cc1] |
| 1-2-60 | 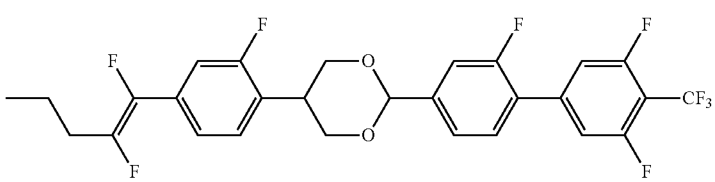 [SMILES: CCC/C(F)=C(\F)c1ccc(C2COC(c3ccc(-c4cc(F)c(C(F)(F)F)c(F)c4)c(F)c3)OC2)c(F)c1] |
Formula 49
| No. | |
|---|---|
| 1-2-61 | 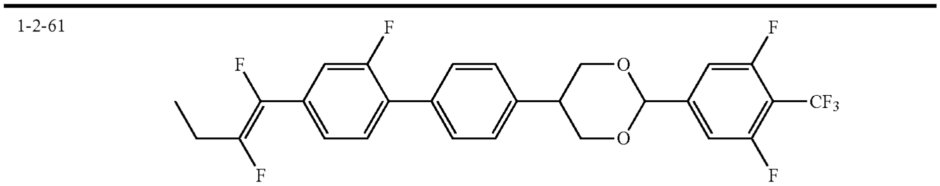 |

-continued
Formula 49
No.
1-2-62
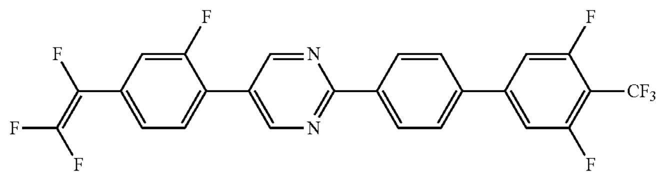 [SMILES: FC(F)=C(F)c1ccc(-c2cnc(-c3ccc(-c4cc(F)c(C(F)(F)F)c(F)c4)cc3)nc2)c(F)c1]
1-2-63
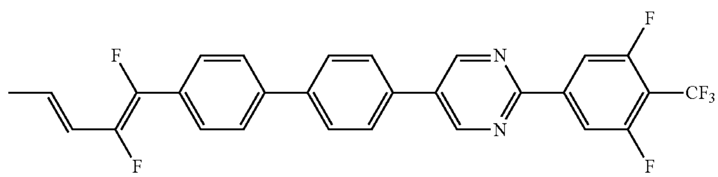
1-2-64
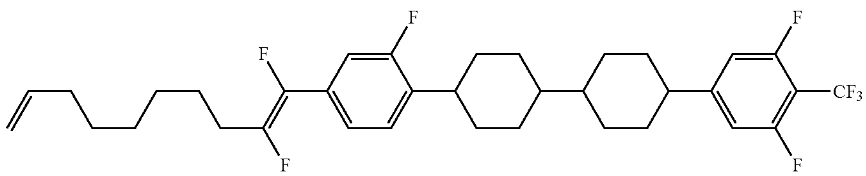 [SMILES: C=CCCCCCC/C(F)=C(\F)c1ccc(C2CCC(C3CCC(c4cc(F)c(C(F)(F)F)c(F)c4)CC3)CC2)c(F)c1]
1-2-65
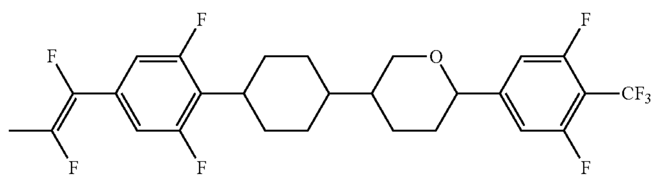 [SMILES: C/C(F)=C(\F)c1cc(F)c(C2CCC(C3CCC(c4cc(F)c(C(F)(F)F)c(F)c4)OC3)CC2)c(F)c1]
1-2-66
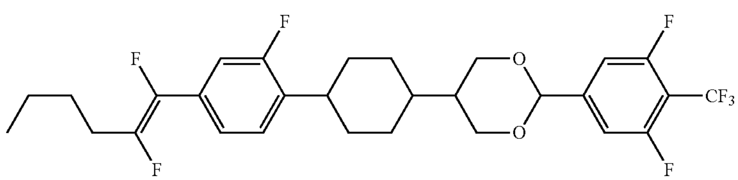 [SMILES: CCCC/C(F)=C(\F)c1ccc(C2CCC(C3COC(c4cc(F)c(C(F)(F)F)c(F)c4)OC3)CC2)c(F)c1]
1-2-67
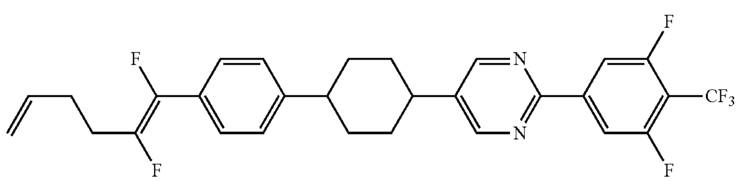 [SMILES: C=CCC/C(F)=C(\F)c1ccc(C2CCC(c3cnc(-c4cc(F)c(C(F)(F)F)c(F)c4)nc3)CC2)cc1]
1-2-68
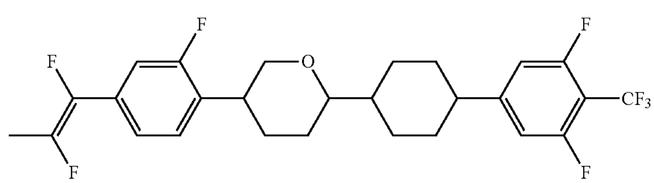
1-2-69
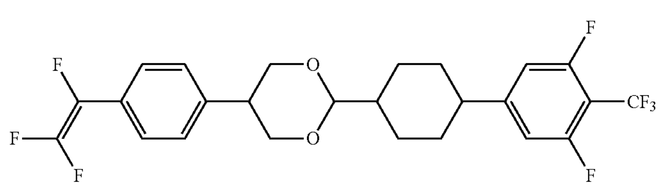 [SMILES: FC(F)=C(F)c1ccc(C2COC(C3CCC(c4cc(F)c(C(F)(F)F)c(F)c4)CC3)OC2)cc1]

-continued
Formula 49
| No. | |
|---|---|
| 1-2-70 | 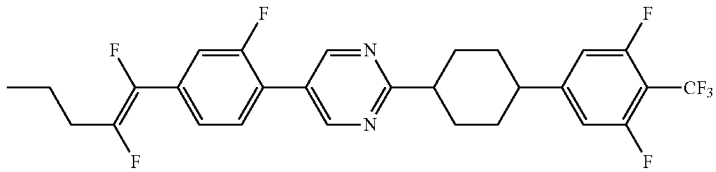 [SMILES: CCC/C(F)=C(\F)c1ccc(-c2cnc(C3CCC(c4cc(F)c(C(F)(F)F)c(F)c4)CC3)nc2)c(F)c1] |
| 1-2-71 | 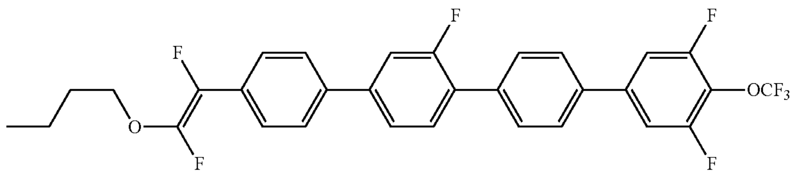 [SMILES: CCCCO/C(F)=C(\F)c1ccc(-c2ccc(-c3ccc(-c4cc(F)c(OC(F)(F)F)c(F)c4)cc3)c(F)c2)cc1] |
| 1-2-72 | 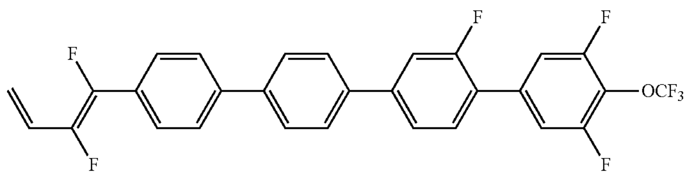 [SMILES: C=C/C(F)=C(\F)c1ccc(-c2ccc(-c3ccc(-c4cc(F)c(OC(F)(F)F)c(F)c4)c(F)c3)cc2)cc1] |
| 1-2-73 | 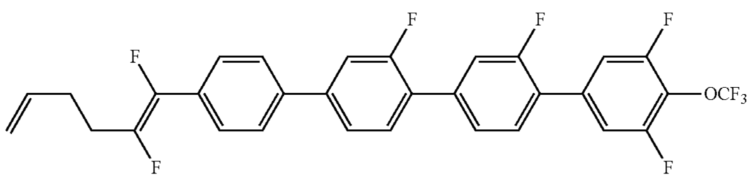 [SMILES: C=CCC/C(F)=C(\F)c1ccc(-c2ccc(-c3ccc(-c4cc(F)c(OC(F)(F)F)c(F)c4)c(F)c3)c(F)c2)cc1] |
| 1-2-74 | 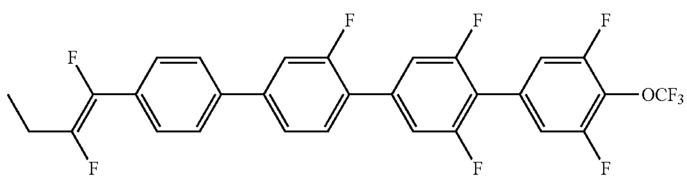 |
| 1-2-75 | 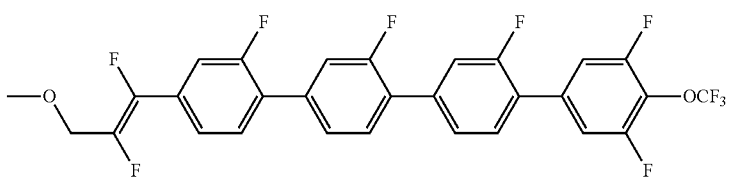 [SMILES: COC/C(F)=C(\F)c1ccc(-c2ccc(-c3ccc(-c4cc(F)c(OC(F)(F)F)c(F)c4)c(F)c3)c(F)c2)c(F)c1] |
| 1-2-76 | 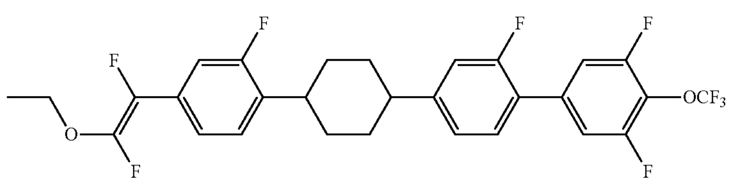 [SMILES: CCO/C(F)=C(\F)c1ccc(C2CCC(c3ccc(-c4cc(F)c(OC(F)(F)F)c(F)c4)c(F)c3)CC2)c(F)c1] |
| 1-2-77 | 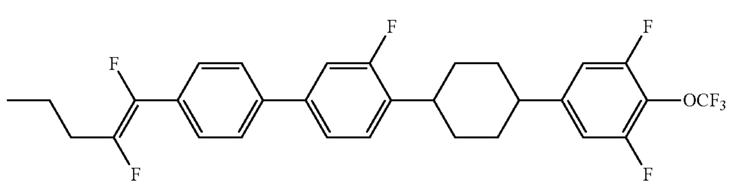 [SMILES: CCC/C(F)=C(\F)c1ccc(-c2ccc(C3CCC(c4cc(F)c(OC(F)(F)F)c(F)c4)CC3)c(F)c2)cc1] |

-continued
| Formula 49 | |
|---|---|
| No. | |
| 1-2-78 | 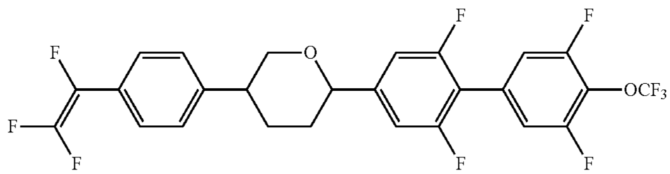 [SMILES: FC(F)=C(F)c1ccc(C2CCC(c3cc(F)c(-c4cc(F)c(OC(F)(F)F)c(F)c4)c(F)c3)OC2)cc1] |
| 1-2-79 | 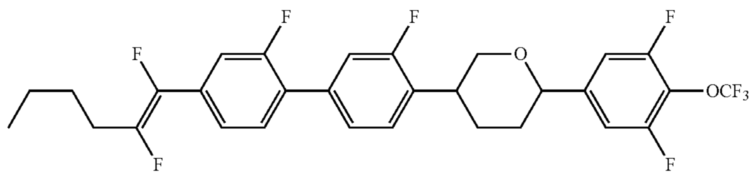 [SMILES: CCCC/C(F)=C(\F)c1ccc(-c2ccc(C3CCC(c4cc(F)c(OC(F)(F)F)c(F)c4)OC3)c(F)c2)c(F)c1] |
| 1-2-80 | 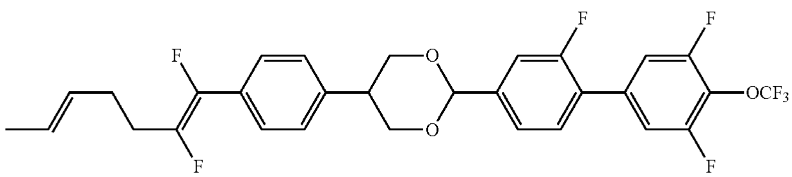 [SMILES: C/C=C/CC/C(F)=C(\F)c1ccc(C2COC(c3ccc(-c4cc(F)c(OC(F)(F)F)c(F)c4)c(F)c3)OC2)cc1] |
| Formula 50 | |
|---|---|
| No. | |
| 1-2-81 | 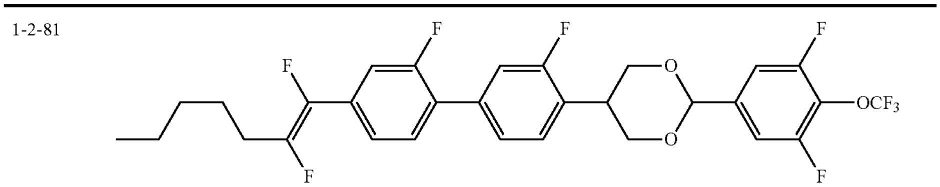 |
| 1-2-82 | 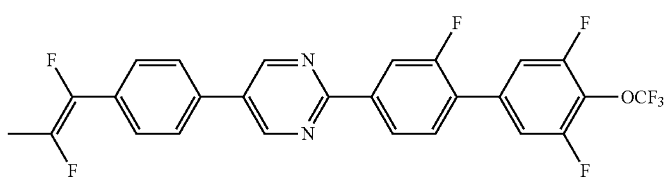 [SMILES: C/C(F)=C(\F)c1ccc(-c2cnc(-c3ccc(-c4cc(F)c(OC(F)(F)F)c(F)c4)c(F)c3)nc2)cc1] |
| 1-2-83 | 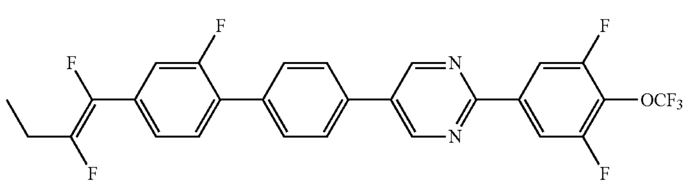 [SMILES: CC/C(F)=C(\F)c1ccc(-c2ccc(-c3cnc(-c4cc(F)c(OC(F)(F)F)c(F)c4)nc3)cc2)c(F)c1] |
| 1-2-84 | 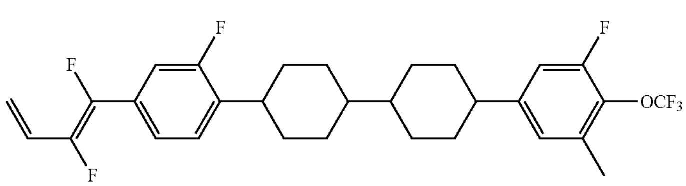 [SMILES: C=C/C(F)=C(\F)c1ccc(C2CCC(C3CCC(c4cc(C)c(OC(F)(F)F)c(F)c4)CC3)CC2)c(F)c1] |

-continued
Formula 50
| No. | |
|---|---|
| 1-2-85 | 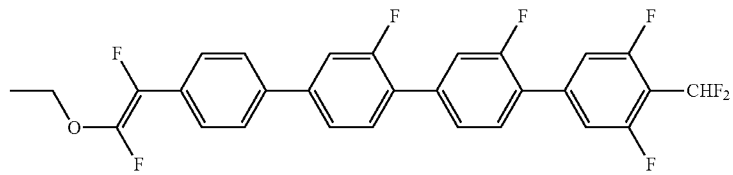 |
| 1-2-86 | 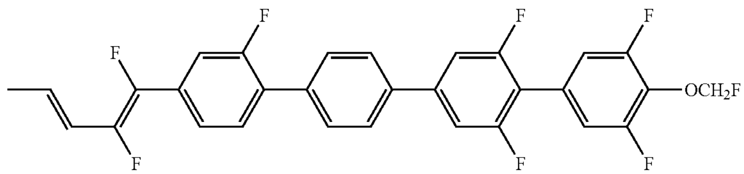 |
| 1-2-87 | 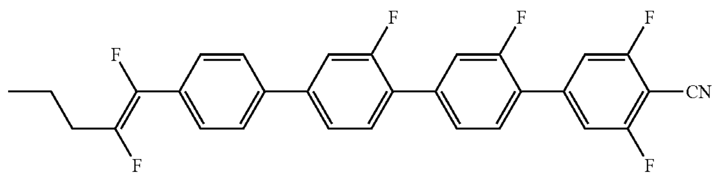 [SMILES: CCC/C(F)=C(\F)c1ccc(-c2ccc(-c3ccc(-c4cc(F)c(C#N)c(F)c4)c(F)c3)c(F)c2)cc1] |
| 1-2-88 | 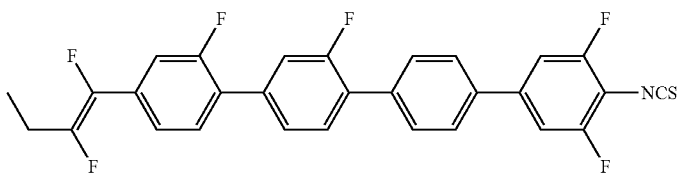 |
| 1-2-89 | 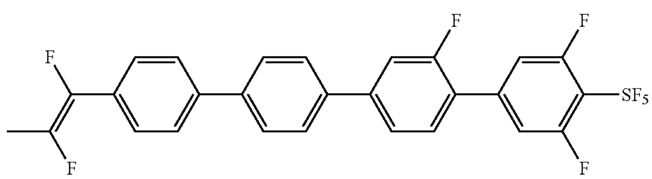 |
| 1-2-90 | 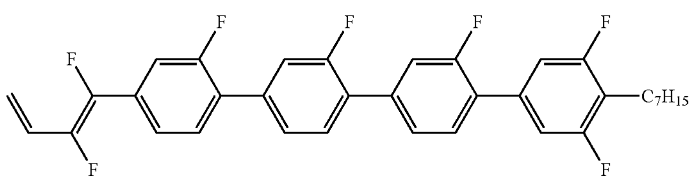 |
| 1-2-91 | 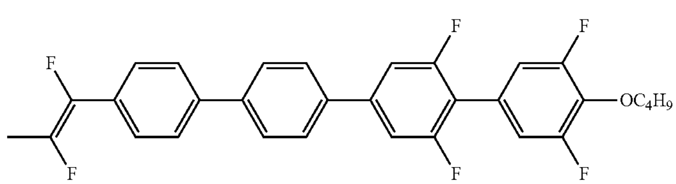 |
| 1-2-92 | 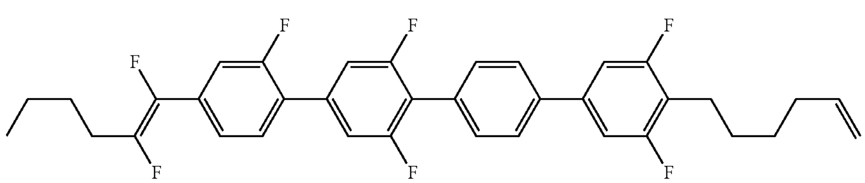 [SMILES: C=CCCCCc1c(F)cc(-c2ccc(-c3c(F)cc(-c4ccc(/C(F)=C(\F)CCCC)cc4F)cc3F)cc2)cc1F] |

-continued
| Formula 50 | |
| --- | --- |
| No. | |
| 1-2-93 | 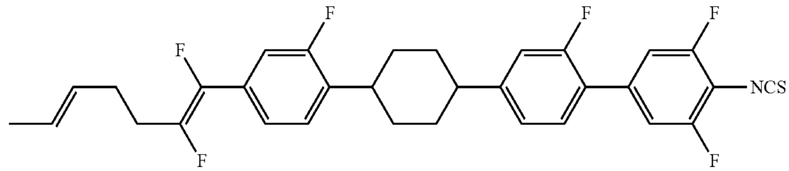 |
| 1-2-94 | 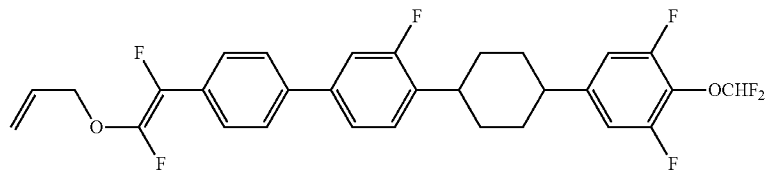 [SMILES: C=CCO/C(F)=C(\F)c1ccc(-c2ccc(C3CCC(c4cc(F)c(OC(F)F)c(F)c4)CC3)c(F)c2)cc1] |
| 1-2-95 | 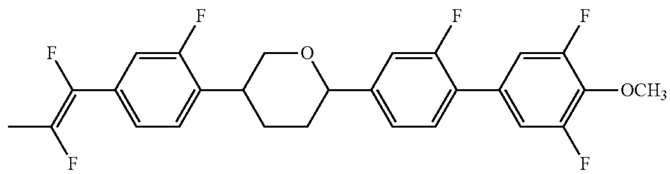 [SMILES: COc1c(F)cc(-c2ccc(C3CCC(c4ccc(/C(F)=C(/C)F)cc4F)CO3)cc2F)cc1F] |
| 1-2-96 | 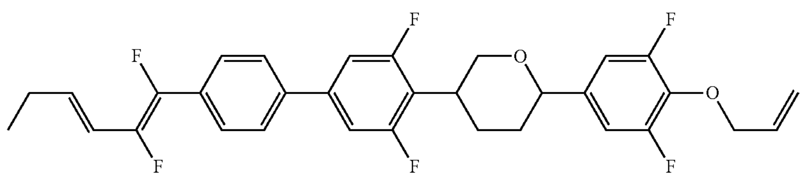 [SMILES: C=CCOc1c(F)cc(C2CCC(c3c(F)cc(-c4ccc(/C(F)=C(F)/C=C/CC)cc4)cc3F)CO2)cc1F] |
| 1-2-97 | 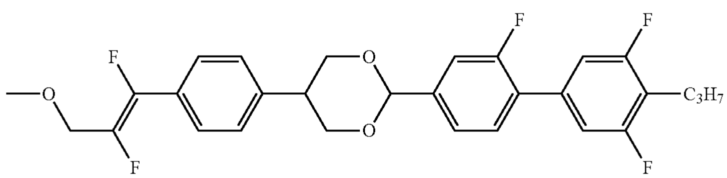 |
| 1-2-98 | 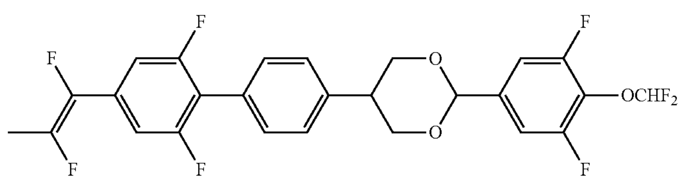 [SMILES: C/C(F)=C(\F)c1cc(F)c(-c2ccc(C3COC(c4cc(F)c(OC(F)F)c(F)c4)OC3)cc2)c(F)c1] |
| 1-2-99 | 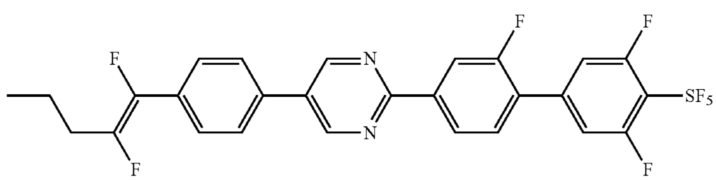 |
| 1-2-100 | 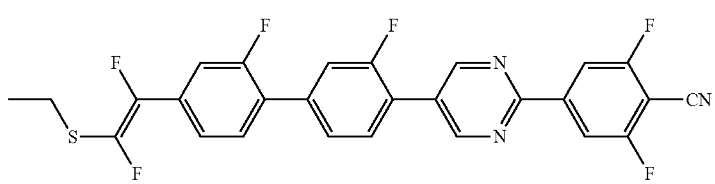 [SMILES: CCS/C(F)=C(\F)c1ccc(-c2ccc(-c3cnc(-c4cc(F)c(C#N)c(F)c4)nc3)c(F)c2)c(F)c1] |

Formula 51
| No. | |
|---|---|
| 1-2-101 | 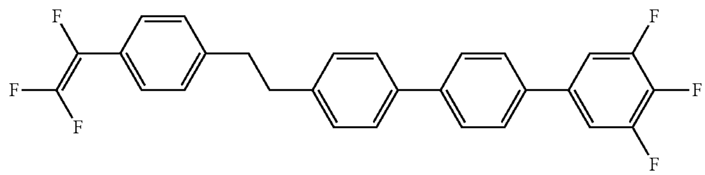 [SMILES: C/C(F)=C(\F)c1ccc(CCc2ccc(-c3ccc(-c4cc(F)c(F)c(F)c4)c(F)c3)cc2)cc1] |
| 1-2-102 | 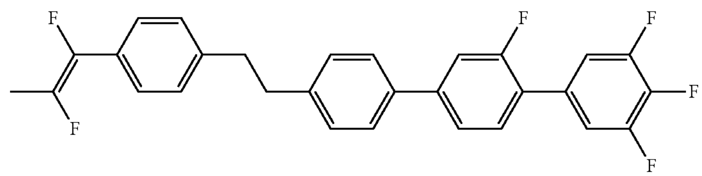 |
| 1-2-103 | 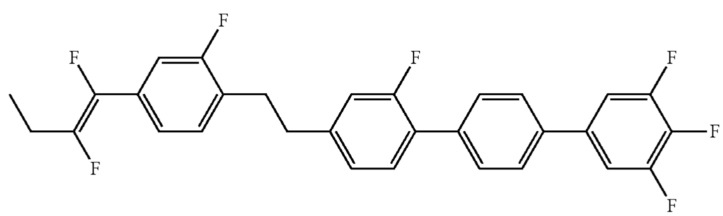 |
| 1-2-104 | 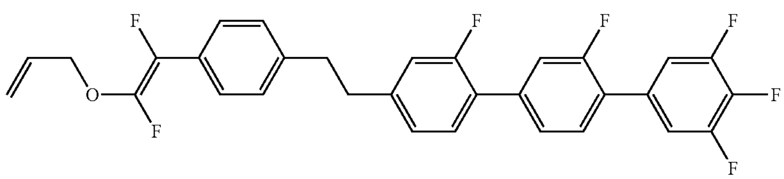 [SMILES: C=CCO/C(F)=C(\F)c1ccc(CCc2ccc(-c3ccc(-c4cc(F)c(F)c(F)c4)c(F)c3)c(F)c2)cc1] |
| 1-2-105 | 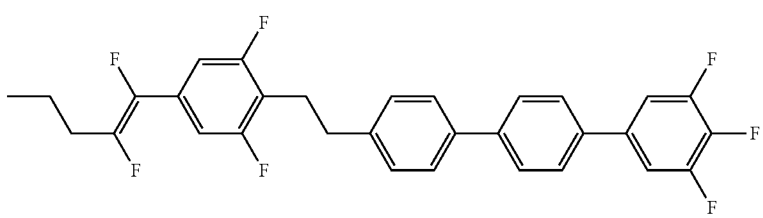 [SMILES: CCC/C(F)=C(\F)c1cc(F)c(CCc2ccc(-c3ccc(-c4cc(F)c(F)c(F)c4)cc3)cc2)c(F)c1] |
| 1-2-106 | 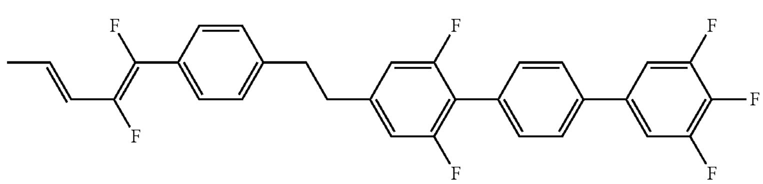 [SMILES: C/C=C/C(F)=C(\F)c1ccc(CCc2cc(F)c(-c3ccc(-c4cc(F)c(F)c(F)c4)cc3)c(F)c2)cc1] |
| 1-2-107 | 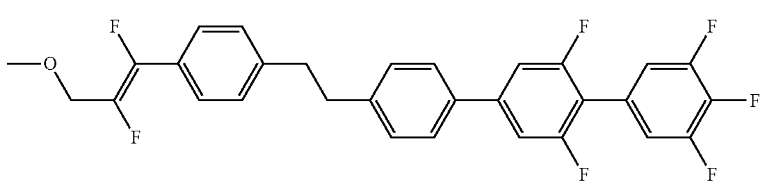 |
| 1-2-108 | 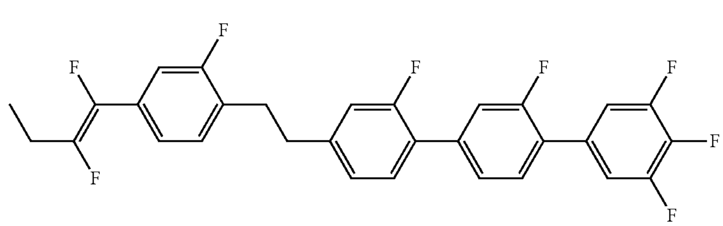 [SMILES: CC/C(F)=C(\F)c1ccc(CCc2ccc(-c3ccc(-c4cc(F)c(F)c(F)c4)c(F)c3)c(F)c2)c(F)c1] |

-continued
| Formula 51 | |
|---|---|
| No. | |
| 1-2-109 | 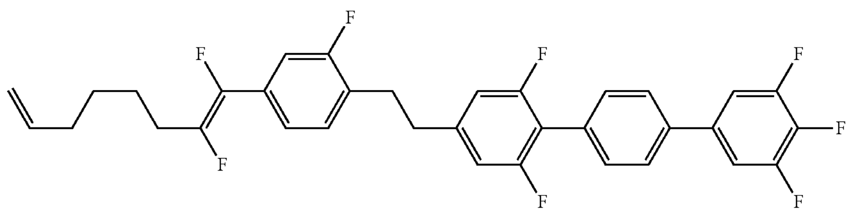 [SMILES: C=CCCCC/C(F)=C(\F)c1ccc(CCc2cc(F)c(-c3ccc(-c4cc(F)c(F)c(F)c4)cc3)c(F)c2)c(F)c1] |
| 1-2-110 | 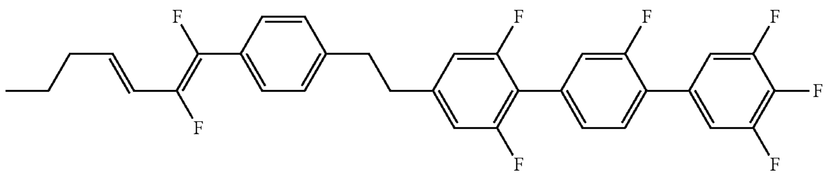 [SMILES: CCC/C=C/C(F)=C(\F)c1ccc(CCc2cc(F)c(-c3ccc(-c4cc(F)c(F)c(F)c4)c(F)c3)c(F)c2)cc1] |
| 1-2-111 | 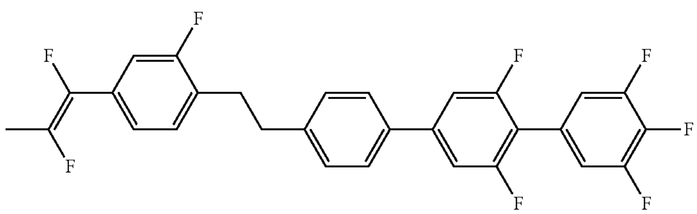 |
| 1-2-112 | 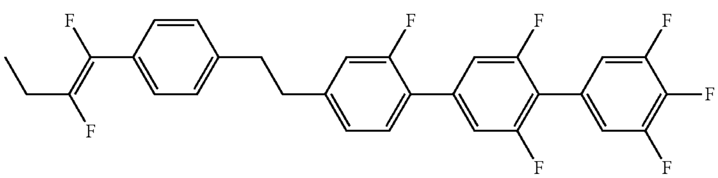 [SMILES: CC/C(F)=C(\F)c1ccc(CCc2ccc(-c3cc(F)c(-c4cc(F)c(F)c(F)c4)c(F)c3)c(F)c2)cc1] |
| 1-2-113 | 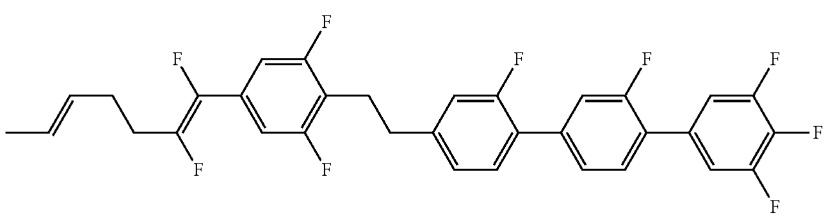 [SMILES: C/C=C/CC/C(F)=C(\F)c1cc(F)c(CCc2ccc(-c3ccc(-c4cc(F)c(F)c(F)c4)c(F)c3)c(F)c2)c(F)c1] |
| 1-2-114 | 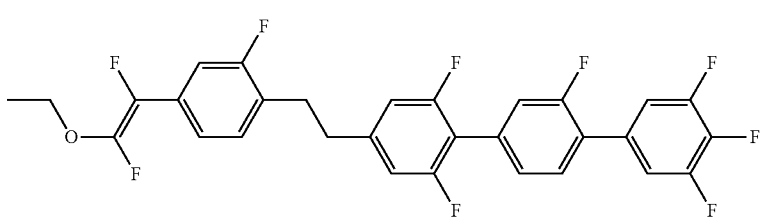 [SMILES: CCO/C(F)=C(\F)c1ccc(CCc2cc(F)c(-c3ccc(-c4cc(F)c(F)c(F)c4)c(F)c3)c(F)c2)c(F)c1] |
| 1-2-115 | 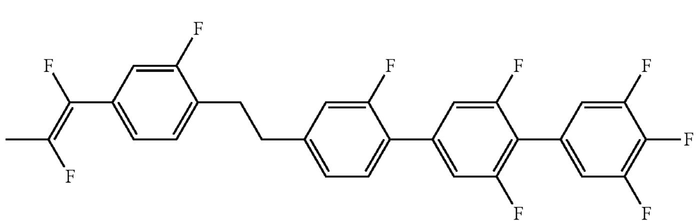 |

-continued
| Formula 51 | |
|---|---|
| No. | |
| 1-2-116 | 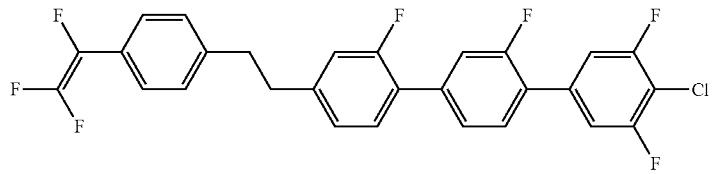 [SMILES: FC(F)=C(F)c1ccc(CCc2ccc(-c3ccc(-c4cc(F)c(Cl)c(F)c4)c(F)c3)c(F)c2)cc1] |
| 1-2-117 | 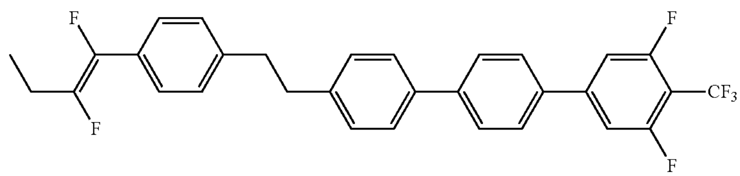 [SMILES: CC/C(F)=C(\F)c1ccc(CCc2ccc(-c3ccc(-c4cc(F)c(C(F)(F)F)c(F)c4)cc3)cc2)cc1] |
| 1-2-118 | 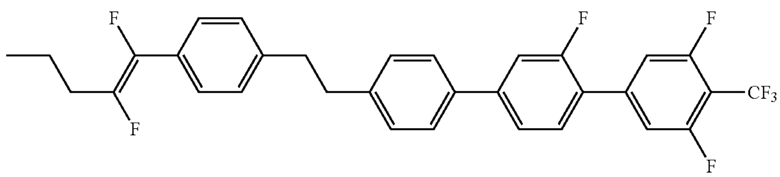 |
| 1-2-119 | 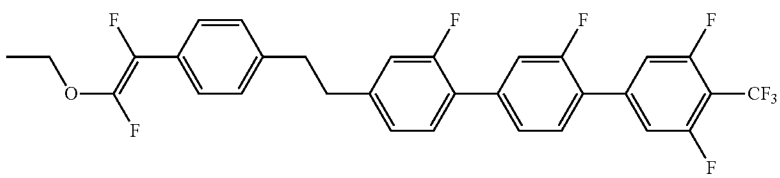 [SMILES: CCO/C(F)=C(\F)c1ccc(CCc2ccc(-c3ccc(-c4cc(F)c(C(F)(F)F)c(F)c4)c(F)c3)c(F)c2)cc1] |
| 1-2-120 | 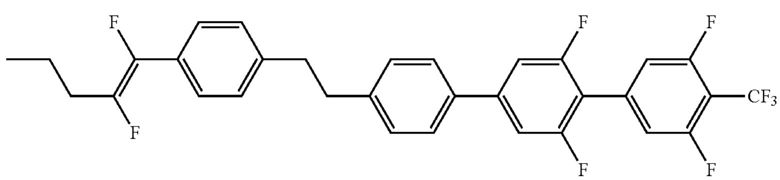 [SMILES: CCC/C(F)=C(\F)c1ccc(CCc2ccc(-c3cc(F)c(-c4cc(F)c(C(F)(F)F)c(F)c4)c(F)c3)cc2)cc1] |
| Formula 52 | |
|---|---|
| No. | |
| 1-2-121 | 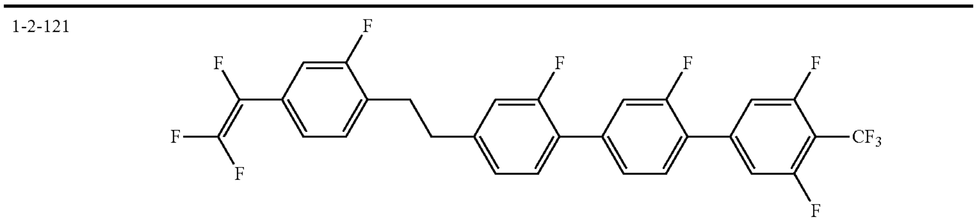 |
| 1-2-122 | 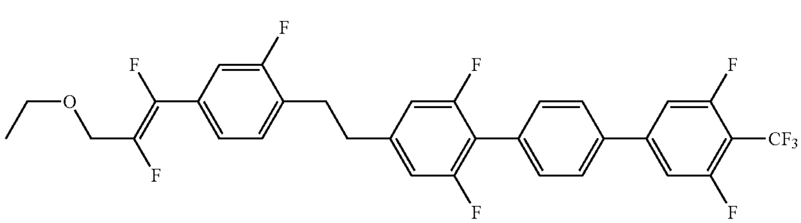 [SMILES: CCOC/C(F)=C(\F)c1ccc(CCc2cc(F)c(-c3ccc(-c4cc(F)c(C(F)(F)F)c(F)c4)cc3)c(F)c2)c(F)c1] |

-continued
| Formula 52 | |
|---|---|
| No. | |
| 1-2-123 | 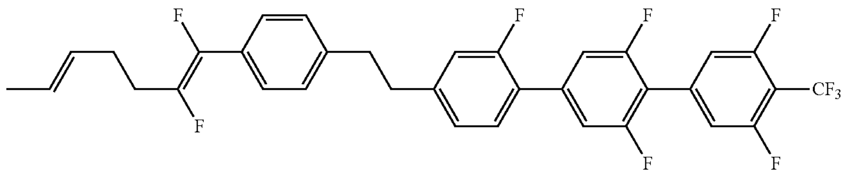 [SMILES: C/C=C/CC/C(F)=C(\F)c1ccc(CCc2ccc(-c3cc(F)c(-c4cc(F)c(C(F)(F)F)c(F)c4)c(F)c3)c(F)c2)cc1] |
| 1-2-124 | 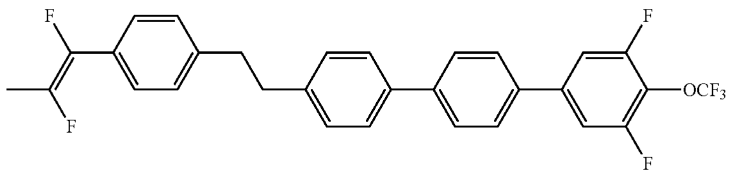 [SMILES: C/C(F)=C(\F)c1ccc(CCc2ccc(-c3ccc(-c4cc(F)c(OC(F)(F)F)c(F)c4)cc3)cc2)cc1] |
| 1-2-125 | 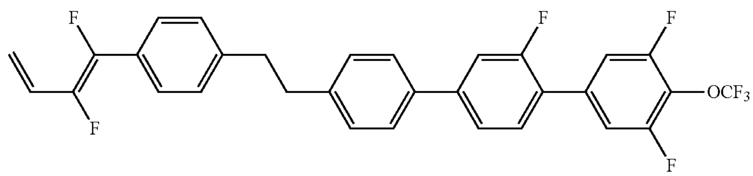 [SMILES: C=C/C(F)=C(\F)c1ccc(CCc2ccc(-c3ccc(-c4cc(F)c(OC(F)(F)F)c(F)c4)c(F)c3)cc2)cc1] |
| 1-2-126 | 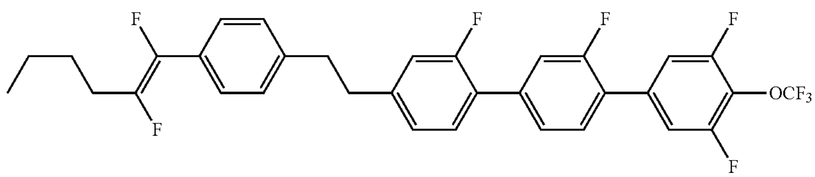 |
| 1-2-127 | 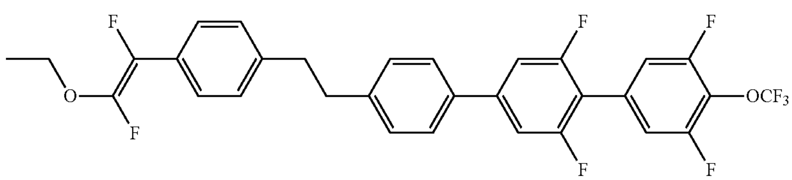 |
| 1-2-128 | 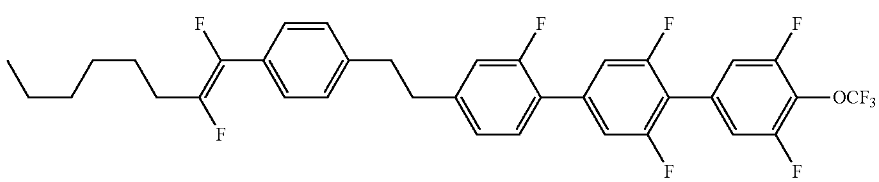 [SMILES: CCCCCC/C(F)=C(\F)c1ccc(CCc2ccc(-c3cc(F)c(-c4cc(F)c(OC(F)(F)F)c(F)c4)c(F)c3)c(F)c2)cc1] |
| 1-2-129 | 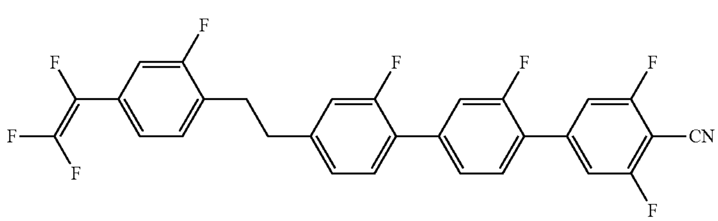 [SMILES: N#Cc1c(F)cc(-c2ccc(-c3ccc(CCc4ccc(C(F)=C(F)F)cc4F)cc3F)cc2F)cc1F] |
| 1-2-130 | 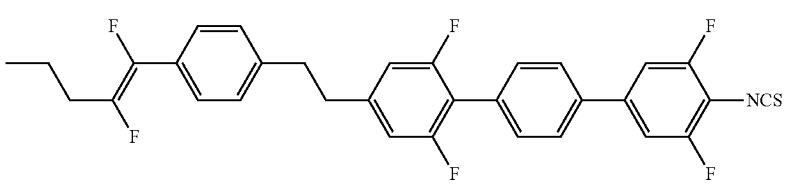 |

-continued
| Formula 52 | |
|---|---|
| No. | |
| 1-2-131 | 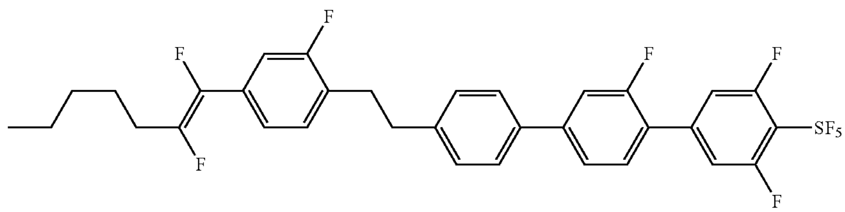 |
| 1-2-132 | 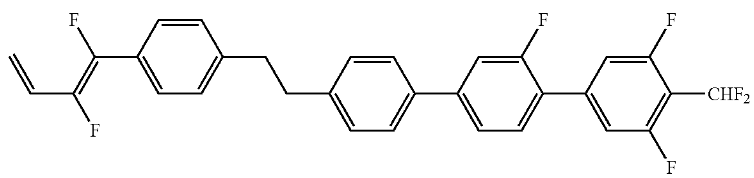 |
| 1-2-133 | 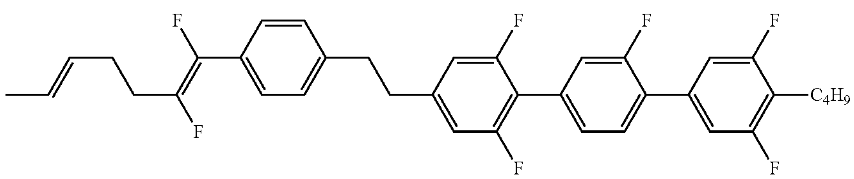 |
| 1-2-134 | 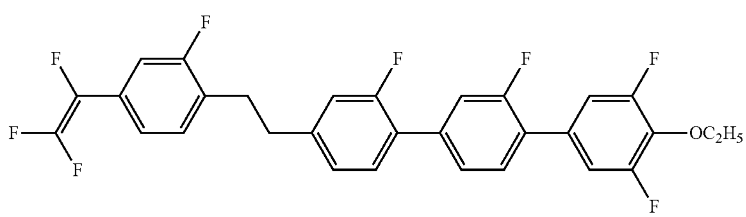 [SMILES: CCOc1c(F)cc(-c2ccc(-c3ccc(CCc4ccc(C(F)=C(F)F)cc4F)cc3F)cc2F)cc1F] |
| 1-2-135 | 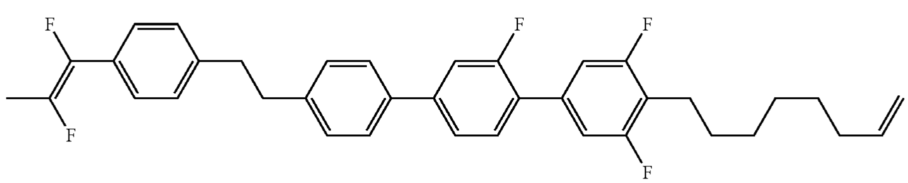 [SMILES: C=CCCCCCCc1c(F)cc(-c2ccc(-c3ccc(CCc4ccc(/C(F)=C(/C)F)cc4)cc3)cc2F)cc1F] |
| 1-2-136 | 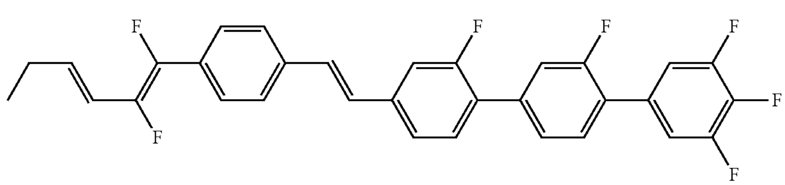 [SMILES: CC/C=C/C(F)=C(\F)c1ccc(/C=C/c2ccc(-c3ccc(-c4cc(F)c(F)c(F)c4)c(F)c3)c(F)c2)cc1] |
| 1-2-137 | 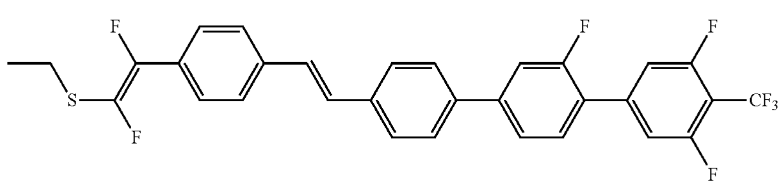 [SMILES: CCS/C(F)=C(\F)c1ccc(/C=C/c2ccc(-c3ccc(-c4cc(F)c(C(F)(F)F)c(F)c4)c(F)c3)cc2)cc1] |
| 1-2-138 | 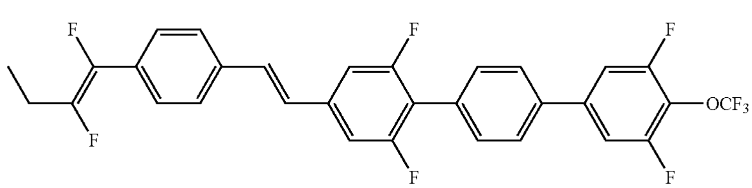 |

-continued
| Formula 52 | |
|---|---|
| No. | |
| 1-2-139 | 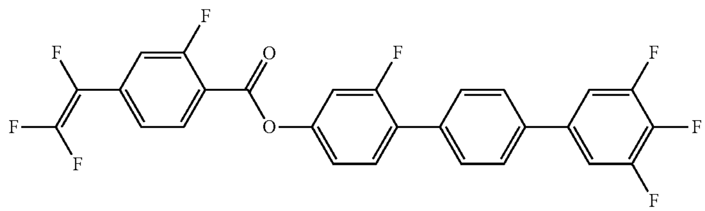 [SMILES: O=C(Oc1ccc(-c2ccc(-c3cc(F)c(F)c(F)c3)cc2)c(F)c1)c1ccc(C(F)=C(F)F)cc1F] |
| 1-2-140 | 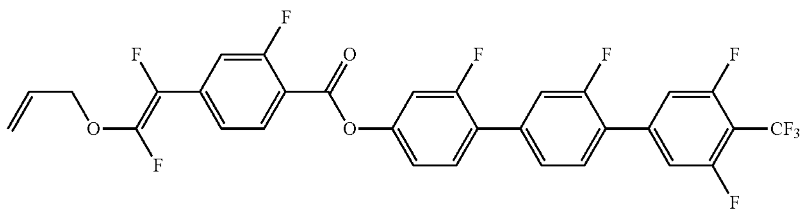 [SMILES: C=CCO/C(F)=C(\F)c1ccc(C(=O)Oc2ccc(-c3ccc(-c4cc(F)c(C(F)(F)F)c(F)c4)c(F)c3)c(F)c2)c(F)c1] |
| Formula 53 | |
|---|---|
| No. | |
| 1-2-141 | 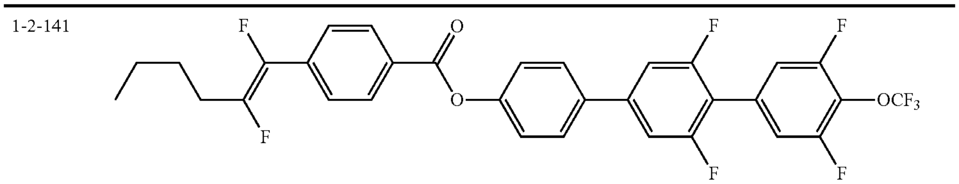 |
| 1-2-142 | 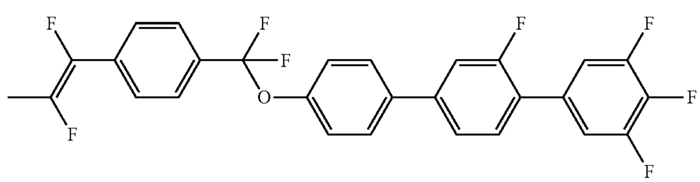 [SMILES: C/C(F)=C(\F)c1ccc(C(F)(F)Oc2ccc(-c3ccc(-c4cc(F)c(F)c(F)c4)c(F)c3)cc2)cc1] |
| 1-2-143 | 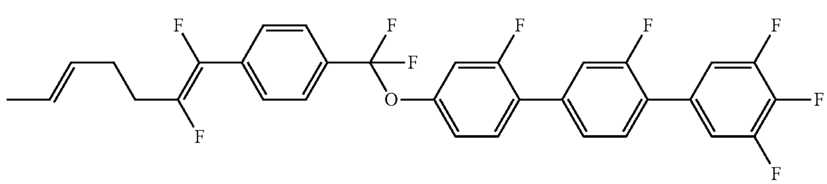 [SMILES: C/C=C/CC/C(F)=C(\F)c1ccc(C(F)(F)Oc2ccc(-c3ccc(-c4cc(F)c(F)c(F)c4)c(F)c3)c(F)c2)cc1] |
| 1-2-144 | 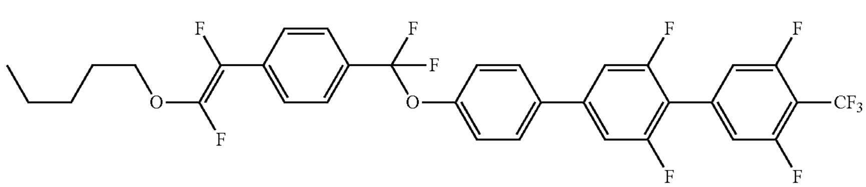 [SMILES: CCCCCO/C(F)=C(\F)c1ccc(C(F)(F)Oc2ccc(-c3cc(F)c(-c4cc(F)c(C(F)(F)F)c(F)c4)c(F)c3)cc2)cc1] |
| 1-2-145 | 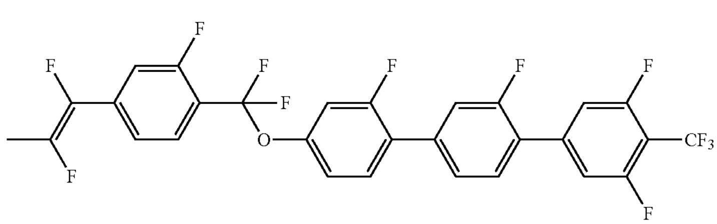 [SMILES: C/C(F)=C(\F)c1ccc(C(F)(F)Oc2ccc(-c3ccc(-c4cc(F)c(C(F)(F)F)c(F)c4)c(F)c3)c(F)c2)c(F)c1] |

-continued
| Formula 53 | |
| --- | --- |
| No. | |
| 1-2-146 | 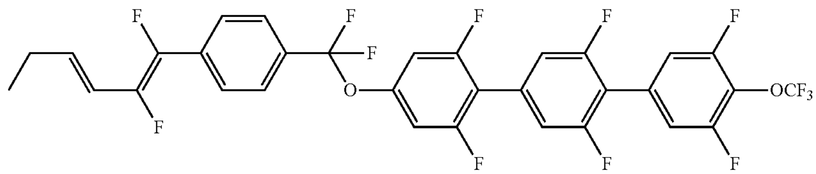 [SMILES: CC/C=C/C(F)=C(\F)c1ccc(C(F)(F)Oc2cc(F)c(-c3cc(F)c(-c4cc(F)c(OC(F)(F)F)c(F)c4)c(F)c3)c(F)c2)cc1] |
| 1-2-147 | 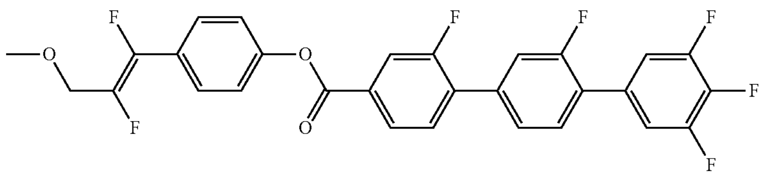 [SMILES: COC/C(F)=C(\F)c1ccc(OC(=O)c2ccc(-c3ccc(-c4cc(F)c(F)c(F)c4)c(F)c3)c(F)c2)cc1] |
| 1-2-148 | 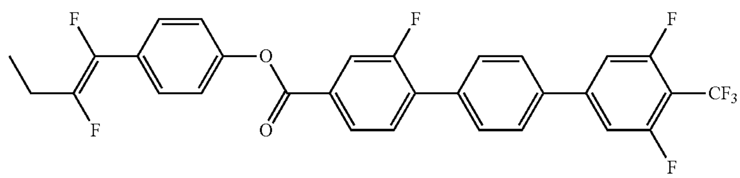 [SMILES: CC/C(F)=C(\F)c1ccc(OC(=O)c2ccc(-c3ccc(-c4cc(F)c(C(F)(F)F)c(F)c4)cc3)c(F)c2)cc1] |
| 1-2-149 | 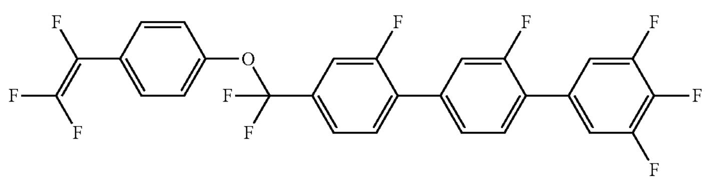 [SMILES: FC(F)=C(F)c1ccc(OC(F)(F)c2ccc(-c3ccc(-c4cc(F)c(F)c(F)c4)c(F)c3)c(F)c2)cc1] |
| 1-2-150 | 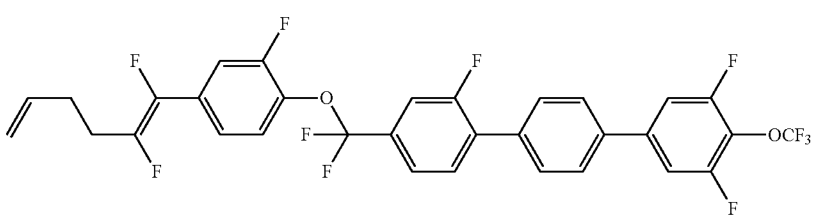 [SMILES: C=CCC/C(F)=C(\F)c1ccc(OC(F)(F)c2ccc(-c3ccc(-c4cc(F)c(OC(F)(F)F)c(F)c4)cc3)c(F)c2)c(F)c1] |
| 1-2-151 | 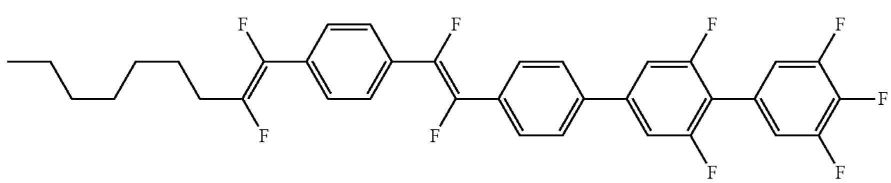 [SMILES: CCCCCCC/C(F)=C(\F)c1ccc(/C(F)=C(\F)c2ccc(-c3cc(F)c(-c4cc(F)c(F)c(F)c4)c(F)c3)cc2)cc1] |
| 1-2-152 | 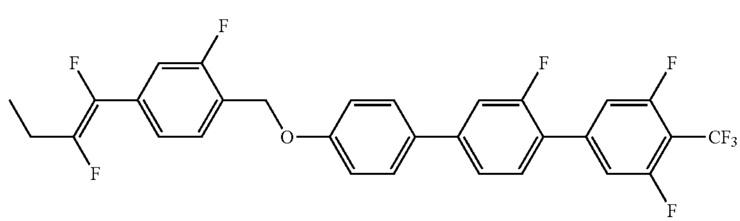 [SMILES: CC/C(F)=C(\F)c1ccc(COc2ccc(-c3ccc(-c4cc(F)c(C(F)(F)F)c(F)c4)c(F)c3)cc2)c(F)c1] |
| 1-2-153 | 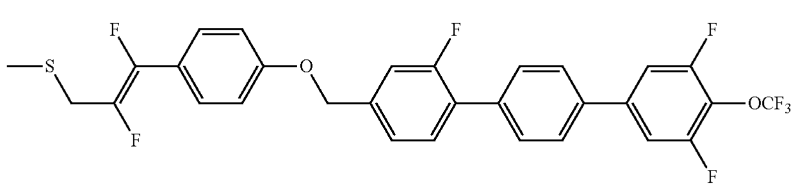 [SMILES: CSC/C(F)=C(\F)c1ccc(OCc2ccc(-c3ccc(-c4cc(F)c(OC(F)(F)F)c(F)c4)cc3)c(F)c2)cc1] |

-continued
| Formula 53 | |
|---|---|
| No. | |
| 1-2-154 | 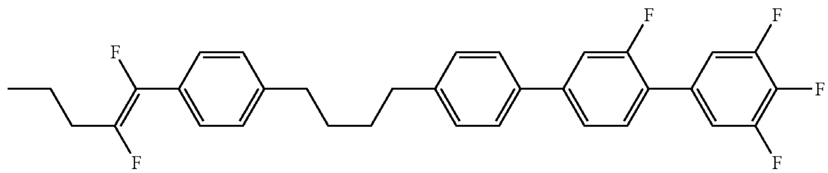 [SMILES: CCC/C(F)=C(\F)c1ccc(CCCCc2ccc(-c3ccc(-c4cc(F)c(F)c(F)c4)c(F)c3)cc2)cc1] |
| 1-2-155 | 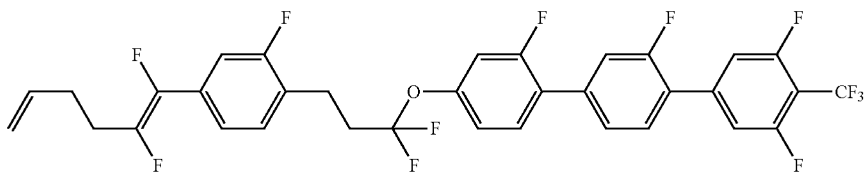 [SMILES: C=CCC/C(F)=C(\F)c1ccc(CCC(F)(F)Oc2ccc(-c3ccc(-c4cc(F)c(C(F)(F)F)c(F)c4)c(F)c3)c(F)c2)c(F)c1] |
| 1-2-156 | 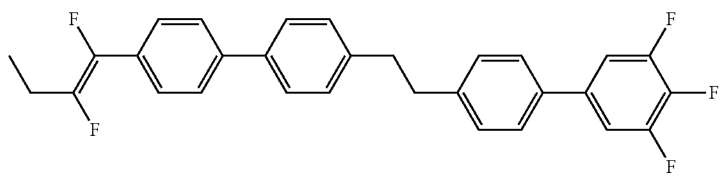 |
| 1-2-157 | 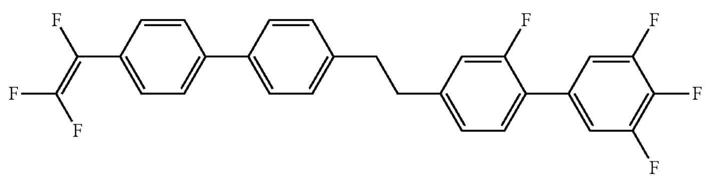 [SMILES: FC(F)=C(F)c1ccc(-c2ccc(CCc3ccc(-c4cc(F)c(F)c(F)c4)c(F)c3)cc2)cc1] |
| 1-2-158 | 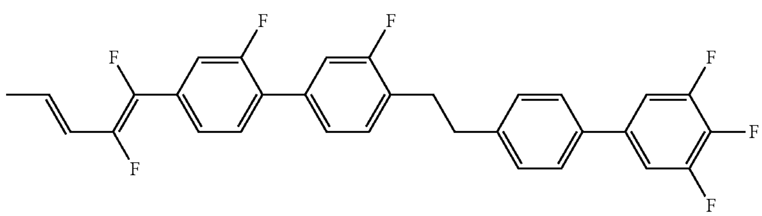 |
| 1-2-159 | 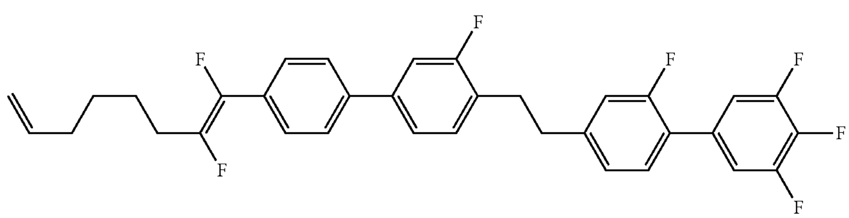 [SMILES: C=CCCCC/C(F)=C(\F)c1ccc(-c2ccc(CCc3ccc(-c4cc(F)c(F)c(F)c4)c(F)c3)c(F)c2)cc1] |
| 1-2-160 | 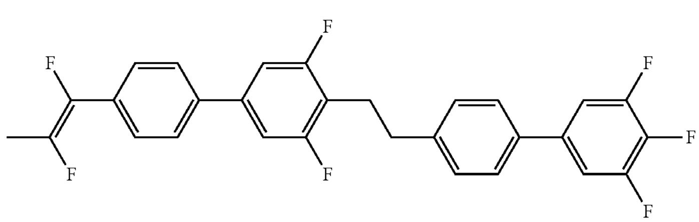 [SMILES: C/C(F)=C(\F)c1ccc(-c2cc(F)c(CCc3ccc(-c4cc(F)c(F)c(F)c4)cc3)c(F)c2)cc1] |

| Formula 54 | |
|---|---|
| No. | |
| 1-2-161 | 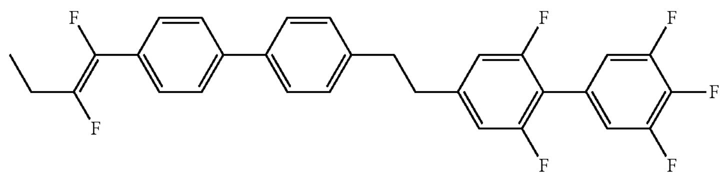 [SMILES: CC/C(F)=C(\F)c1ccc(-c2ccc(CCc3cc(F)c(-c4cc(F)c(F)c(F)c4)c(F)c3)cc2)cc1] |
| 1-2-162 | 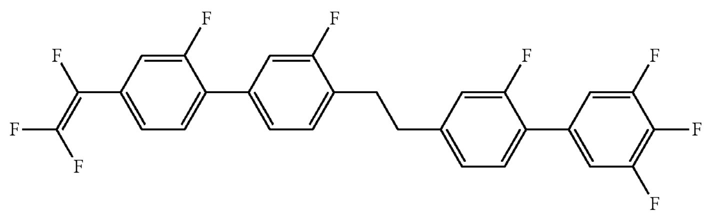 [SMILES: FC(F)=C(F)c1ccc(-c2ccc(CCc3ccc(-c4cc(F)c(F)c(F)c4)c(F)c3)c(F)c2)c(F)c1] |
| 1-2-163 | 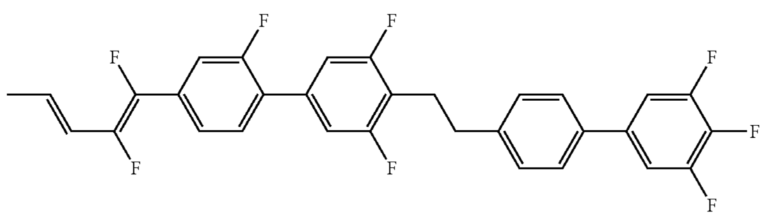 [SMILES: C/C=C/C(F)=C(\F)c1ccc(-c2cc(F)c(CCc3ccc(-c4cc(F)c(F)c(F)c4)cc3)c(F)c2)c(F)c1] |
| 1-2-164 | 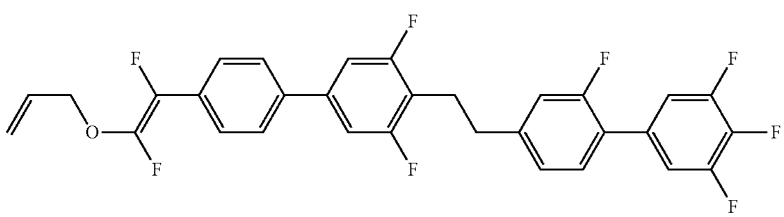 [SMILES: C=CCO/C(F)=C(\F)c1ccc(-c2cc(F)c(CCc3ccc(-c4cc(F)c(F)c(F)c4)c(F)c3)c(F)c2)cc1] |
| 1-2-165 | 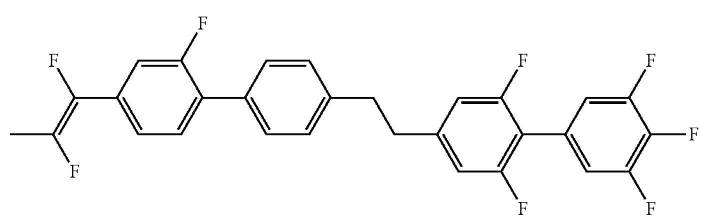 [SMILES: C/C(F)=C(\F)c1ccc(-c2ccc(CCc3cc(F)c(-c4cc(F)c(F)c(F)c4)c(F)c3)cc2)c(F)c1] |
| 1-2-166 | 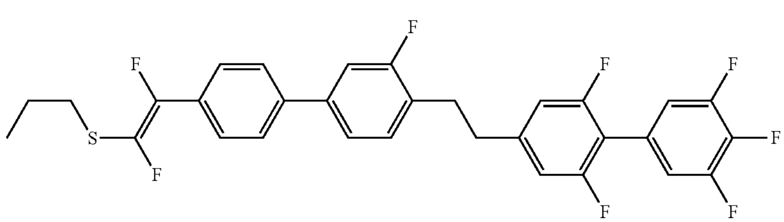 [SMILES: CCCS/C(F)=C(\F)c1ccc(-c2ccc(CCc3cc(F)c(-c4cc(F)c(F)c(F)c4)c(F)c3)c(F)c2)cc1] |
| 1-2-167 | 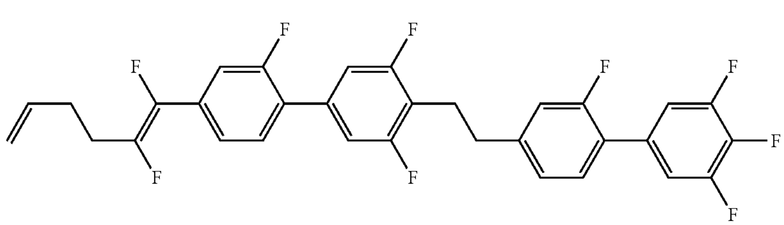 [SMILES: C=CCC/C(F)=C(\F)c1ccc(-c2cc(F)c(CCc3ccc(-c4cc(F)c(F)c(F)c4)c(F)c3)c(F)c2)c(F)c1] |

-continued
Formula 54
| No. | |
|---|---|
| 1-2-168 | 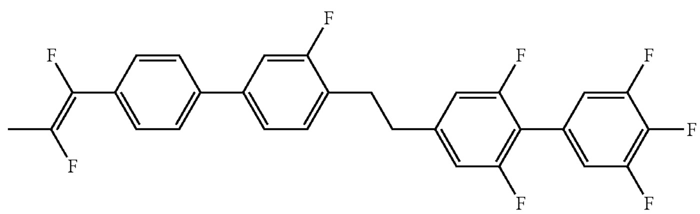 |
| 1-2-169 | 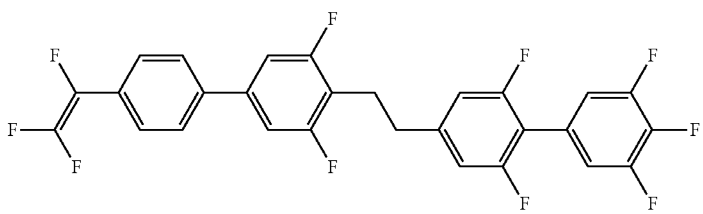 [SMILES: FC(F)=C(F)c1ccc(-c2cc(F)c(CCc3cc(F)c(-c4cc(F)c(F)c(F)c4)c(F)c3)c(F)c2)cc1] |
| 1-2-170 | 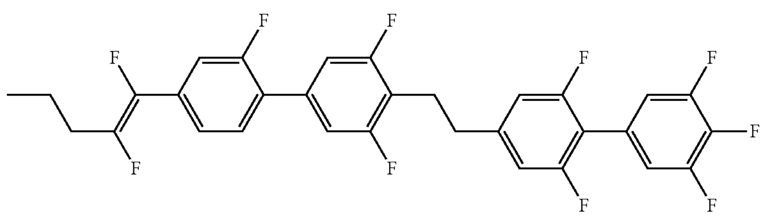 [SMILES: CCC/C(F)=C(\F)c1ccc(-c2cc(F)c(CCc3cc(F)c(-c4cc(F)c(F)c(F)c4)c(F)c3)c(F)c2)c(F)c1] |
| 1-2-171 | 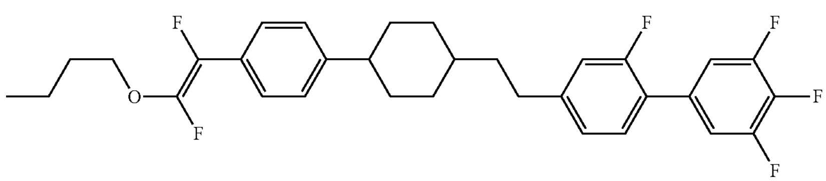 [SMILES: CCCCO/C(F)=C(\F)c1ccc(C2CCC(CCc3ccc(-c4cc(F)c(F)c(F)c4)c(F)c3)CC2)cc1] |
| 1-2-172 | 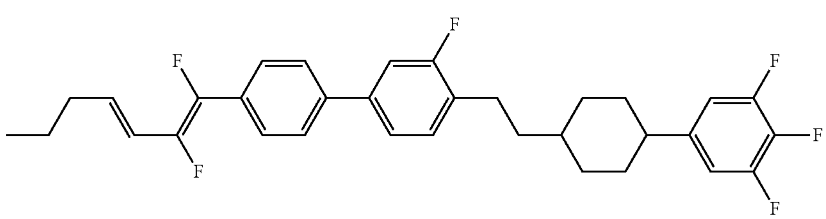 [SMILES: CCC/C=C/C(F)=C(\F)c1ccc(-c2ccc(CCC3CCC(c4cc(F)c(F)c(F)c4)CC3)c(F)c2)cc1] |
| 1-2-173 | 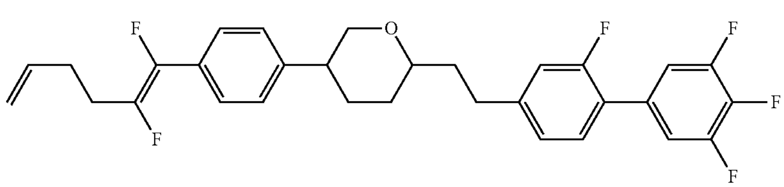 [SMILES: C=CCC/C(F)=C(\F)c1ccc(C2CCC(CCc3ccc(-c4cc(F)c(F)c(F)c4)c(F)c3)OC2)cc1] |
| 1-2-174 | 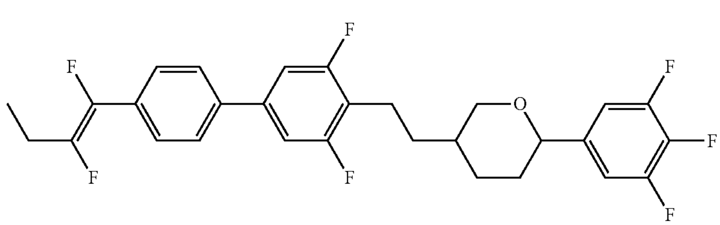 [SMILES: CC/C(F)=C(\F)c1ccc(-c2cc(F)c(CCC3CCC(c4cc(F)c(F)c(F)c4)OC3)c(F)c2)cc1] |

-continued
Formula 54
No.
1-2-175
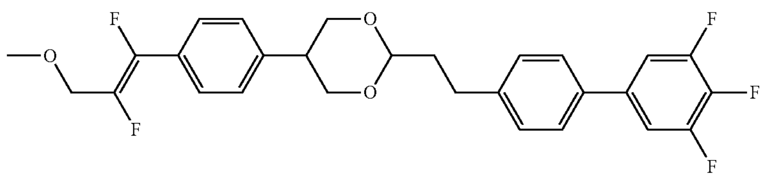 [SMILES: COC/C(F)=C(\F)c1ccc(C2COC(CCc3ccc(-c4cc(F)c(F)c(F)c4)cc3)OC2)cc1]
1-2-176
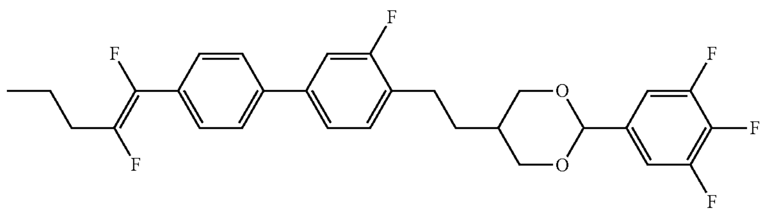 [SMILES: CCC/C(F)=C(\F)c1ccc(-c2ccc(CCC3COC(c4cc(F)c(F)c(F)c4)OC3)c(F)c2)cc1]
1-2-177
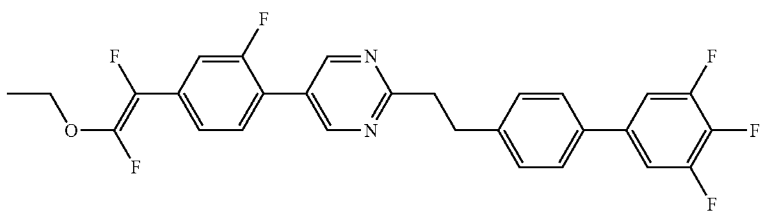 [SMILES: CCO/C(F)=C(\F)c1ccc(-c2cnc(CCc3ccc(-c4cc(F)c(F)c(F)c4)cc3)nc2)c(F)c1]
1-2-178
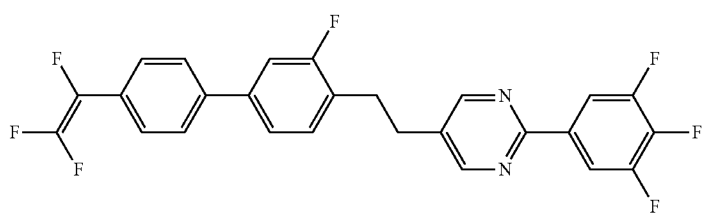 [SMILES: FC(F)=C(F)c1ccc(-c2ccc(CCc3cnc(-c4cc(F)c(F)c(F)c4)nc3)c(F)c2)cc1]
1-2-179
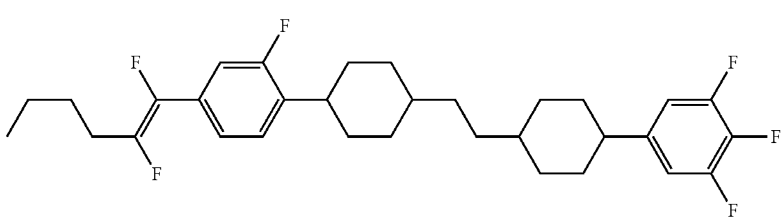 [SMILES: CCCC/C(F)=C(\F)c1ccc(C2CCC(CCC3CCC(c4cc(F)c(F)c(F)c4)CC3)CC2)c(F)c1]
1-2-180
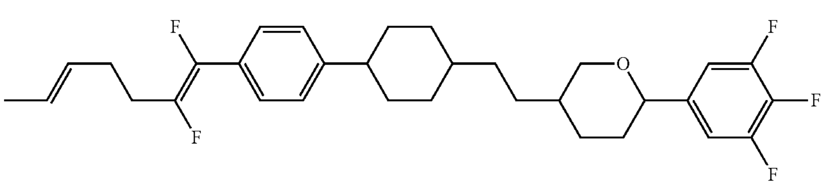 [SMILES: C/C=C/CC/C(F)=C(\F)c1ccc(C2CCC(CCC3CCC(c4cc(F)c(F)c(F)c4)OC3)CC2)cc1]

Formula 55
| No. | |
|---|---|
| 1-2-181 | 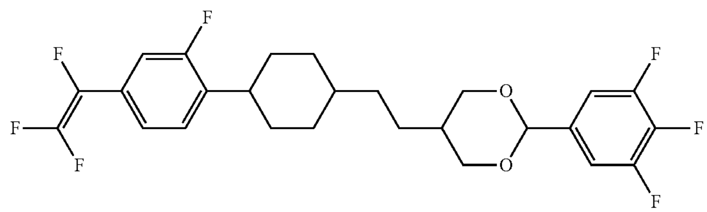 [SMILES: FC(F)=C(F)c1ccc(C2CCC(CCC3COC(c4cc(F)c(F)c(F)c4)OC3)CC2)c(F)c1] |
| 1-2-182 | 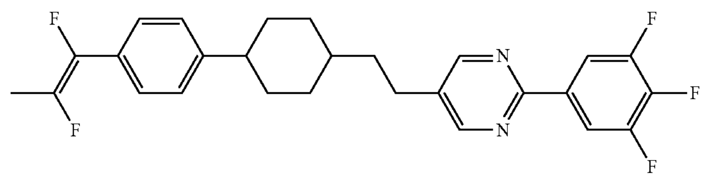 [SMILES: C/C(F)=C(\F)c1ccc(C2CCC(CCc3cnc(-c4cc(F)c(F)c(F)c4)nc3)CC2)cc1] |
| 1-2-183 | 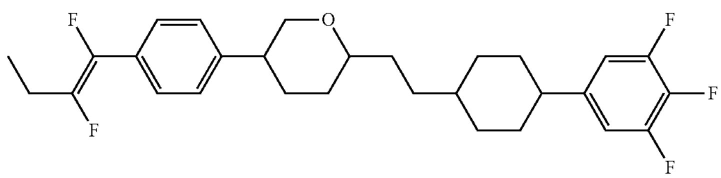 [SMILES: CC/C(F)=C(\F)c1ccc(C2CCC(CCC3CCC(c4cc(F)c(F)c(F)c4)CC3)OC2)cc1] |
| 1-2-184 | 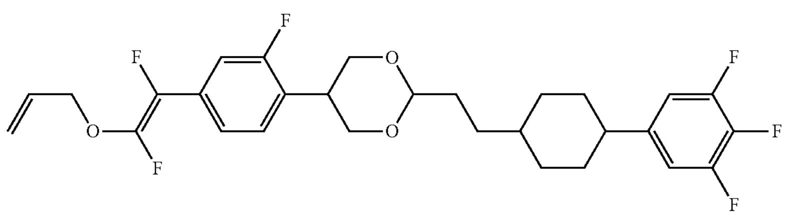 |
| 1-2-185 | 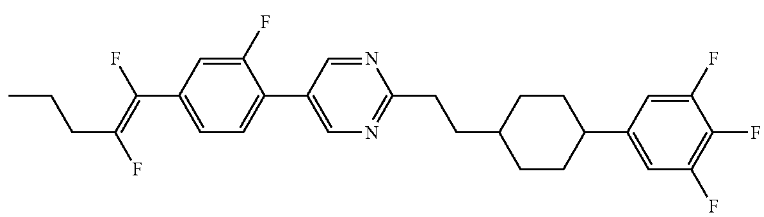 [SMILES: CCC/C(F)=C(\F)c1ccc(-c2cnc(CCC3CCC(c4cc(F)c(F)c(F)c4)CC3)nc2)c(F)c1] |
| 1-2-186 | 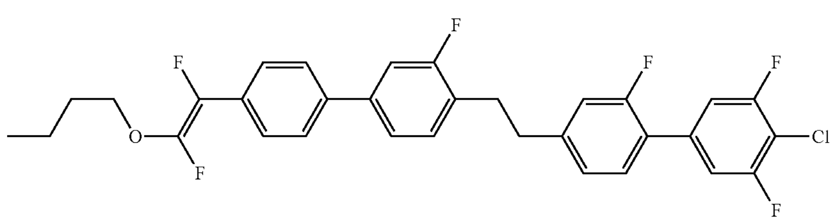 [SMILES: CCCCO/C(F)=C(\F)c1ccc(-c2ccc(CCc3ccc(-c4cc(F)c(Cl)c(F)c4)c(F)c3)c(F)c2)cc1] |
| 1-2-187 | 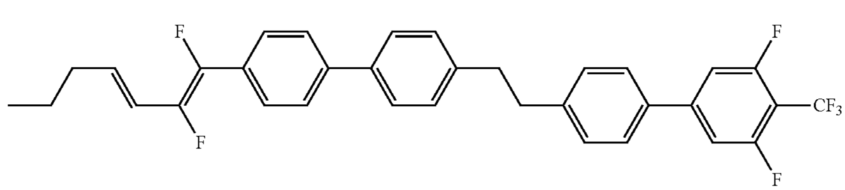 [SMILES: CCC/C=C/C(F)=C(\F)c1ccc(-c2ccc(CCc3ccc(-c4cc(F)c(C(F)(F)F)c(F)c4)cc3)cc2)cc1] |
| 1-2-188 | 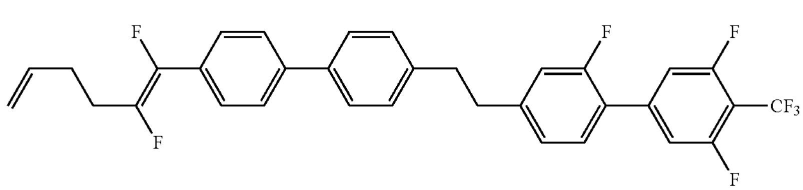 [SMILES: C=CCC/C(F)=C(\F)c1ccc(-c2ccc(CCc3ccc(-c4cc(F)c(C(F)(F)F)c(F)c4)c(F)c3)cc2)cc1] |

-continued
| Formula 55 | |
|---|---|
| No. | |
| 1-2-189 | 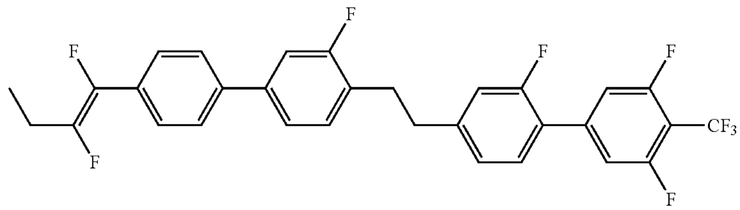 [SMILES: CC/C(F)=C(\F)c1ccc(-c2ccc(CCc3ccc(-c4cc(F)c(C(F)(F)F)c(F)c4)c(F)c3)c(F)c2)cc1] |
| 1-2-190 | 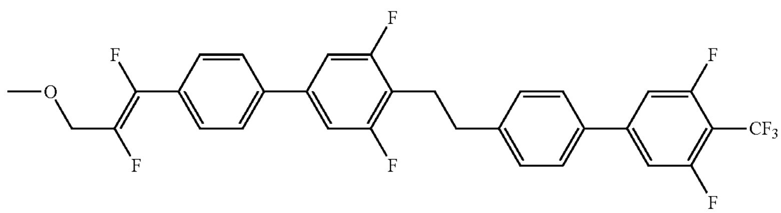 [SMILES: COC/C(F)=C(\F)c1ccc(-c2cc(F)c(CCc3ccc(-c4cc(F)c(C(F)(F)F)c(F)c4)cc3)c(F)c2)cc1] |
| 1-2-191 | 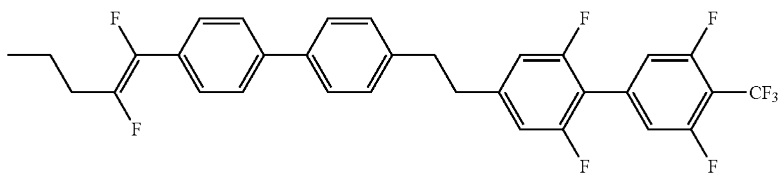 [SMILES: CCC/C(F)=C(\F)c1ccc(-c2ccc(CCc3cc(F)c(-c4cc(F)c(C(F)(F)F)c(F)c4)c(F)c3)cc2)cc1] |
| 1-2-192 | 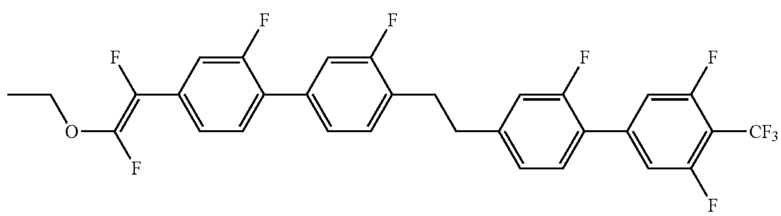 [SMILES: CCO/C(F)=C(\F)c1ccc(-c2ccc(CCc3ccc(-c4cc(F)c(C(F)(F)F)c(F)c4)c(F)c3)c(F)c2)c(F)c1] |
| 1-2-193 | 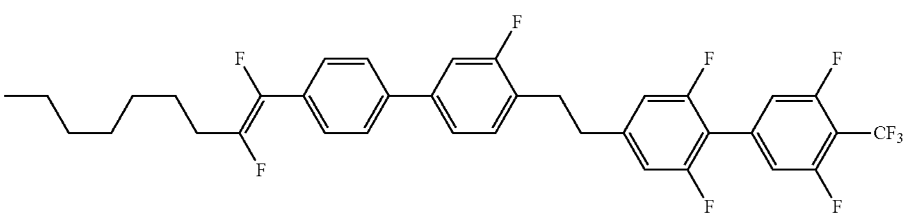 [SMILES: CCCCCCC/C(F)=C(\F)c1ccc(-c2ccc(CCc3cc(F)c(-c4cc(F)c(C(F)(F)F)c(F)c4)c(F)c3)c(F)c2)cc1] |
| 1-2-194 | 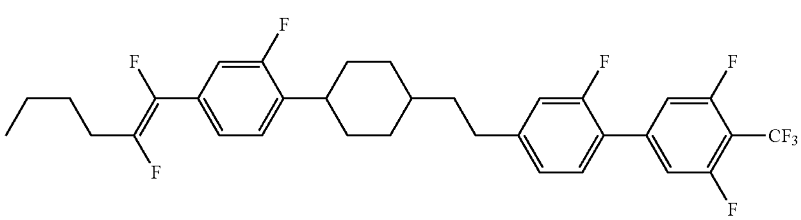 [SMILES: CCCC/C(F)=C(\F)c1ccc(C2CCC(CCc3ccc(-c4cc(F)c(C(F)(F)F)c(F)c4)c(F)c3)CC2)c(F)c1] |
| 1-2-195 | 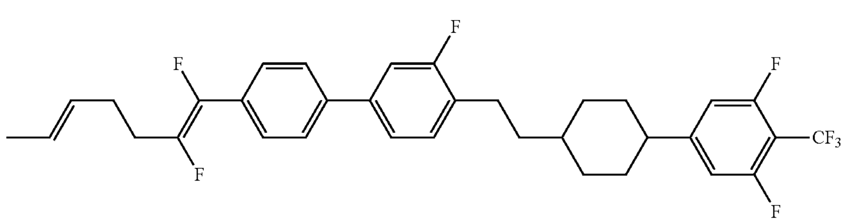 [SMILES: C/C=C/CC/C(F)=C(\F)c1ccc(-c2ccc(CCC3CCC(c4cc(F)c(C(F)(F)F)c(F)c4)CC3)c(F)c2)cc1] |

-continued
| Formula 55 | |
|---|---|
| No. | |
| 1-2-196 | 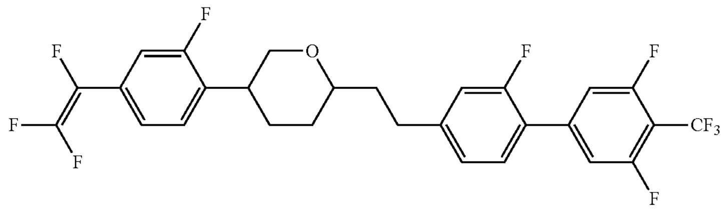 [SMILES: FC(F)=C(F)c1ccc(C2CCC(CCc3ccc(-c4cc(F)c(C(F)(F)F)c(F)c4)c(F)c3)OC2)c(F)c1] |
| 1-2-197 | 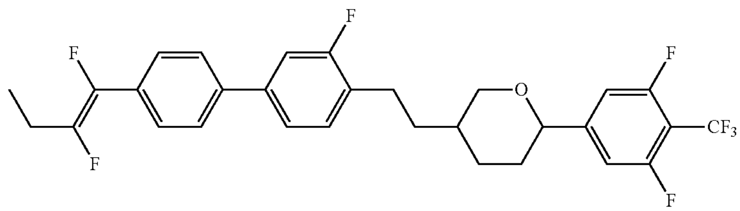 [SMILES: CC/C(F)=C(\F)c1ccc(-c2ccc(CCC3CCC(c4cc(F)c(C(F)(F)F)c(F)c4)OC3)c(F)c2)cc1] |
| 1-2-198 | 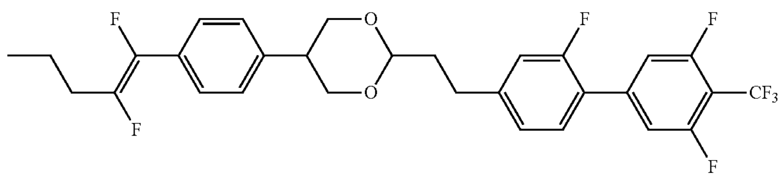 [SMILES: CCC/C(F)=C(\F)c1ccc(C2COC(CCc3ccc(-c4cc(F)c(C(F)(F)F)c(F)c4)c(F)c3)OC2)cc1] |
| 1-2-199 | 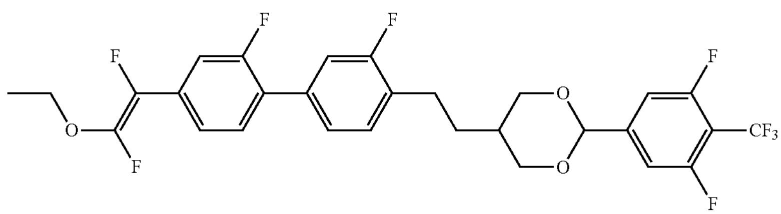 [SMILES: CCO/C(F)=C(\F)c1ccc(-c2ccc(CCC3COC(c4cc(F)c(C(F)(F)F)c(F)c4)OC3)c(F)c2)c(F)c1] |
| 1-2-200 | 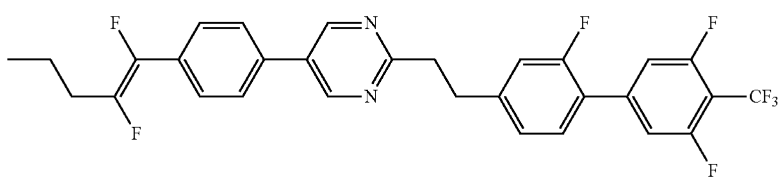 |
| Formula 56 | |
|---|---|
| No. | |
| 1-2-201 | 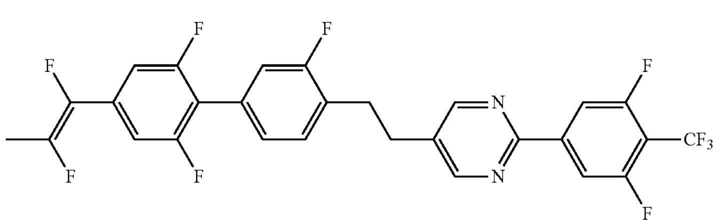 [SMILES: C/C(F)=C(\F)c1cc(F)c(-c2ccc(CCc3cnc(-c4cc(F)c(C(F)(F)F)c(F)c4)nc3)c(F)c2)c(F)c1] |

-continued
| Formula 56 | |
|---|---|
| No. | |
| 1-2-202 | 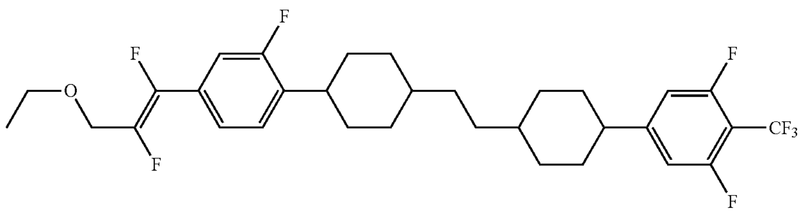 [SMILES: CCOC/C(F)=C(\F)c1ccc(C2CCC(CCC3CCC(c4cc(F)c(C(F)(F)F)c(F)c4)CC3)CC2)c(F)c1] |
| 1-2-203 | 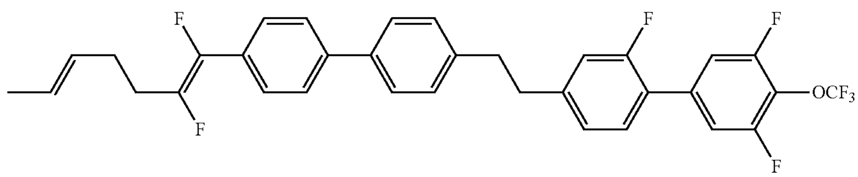 [SMILES: C/C=C/CC/C(F)=C(\F)c1ccc(-c2ccc(CCc3ccc(-c4cc(F)c(OC(F)(F)F)c(F)c4)c(F)c3)cc2)cc1] |
| 1-2-204 | 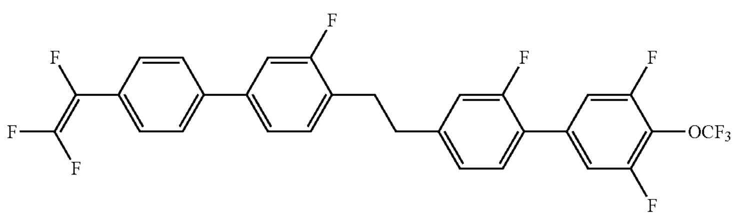 [SMILES: FC(F)=C(F)c1ccc(-c2ccc(CCc3ccc(-c4cc(F)c(OC(F)(F)F)c(F)c4)c(F)c3)c(F)c2)cc1] |
| 1-2-205 | 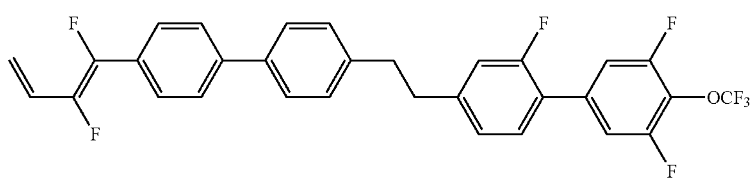 [SMILES: C=C/C(F)=C(\F)c1ccc(-c2ccc(CCc3ccc(-c4cc(F)c(OC(F)(F)F)c(F)c4)c(F)c3)cc2)cc1] |
| 1-2-206 | 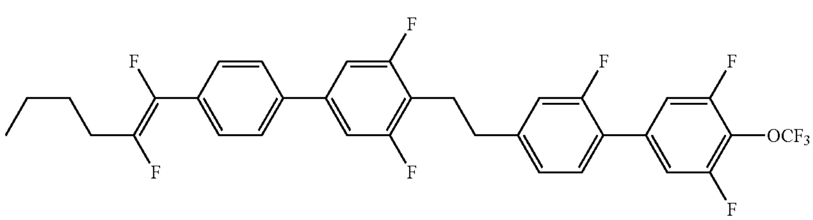 [SMILES: CCCC/C(F)=C(\F)c1ccc(-c2cc(F)c(CCc3ccc(-c4cc(F)c(OC(F)(F)F)c(F)c4)c(F)c3)c(F)c2)cc1] |
| 1-2-207 | 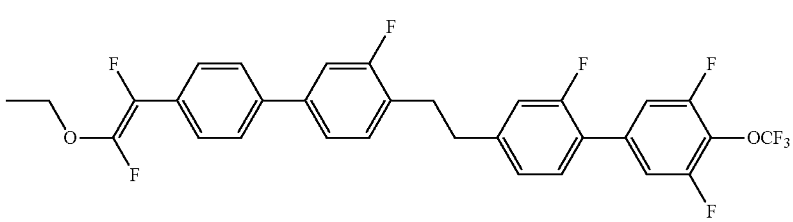 |
| 1-2-208 | 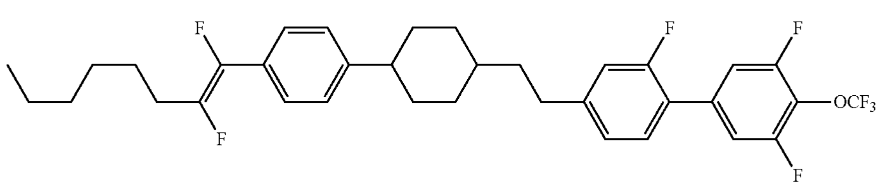 [SMILES: CCCCCC/C(F)=C(\F)c1ccc(C2CCC(CCc3ccc(-c4cc(F)c(OC(F)(F)F)c(F)c4)c(F)c3)CC2)cc1] |

-continued
| Formula 56 | |
|---|---|
| No. | |
| 1-2-209 | 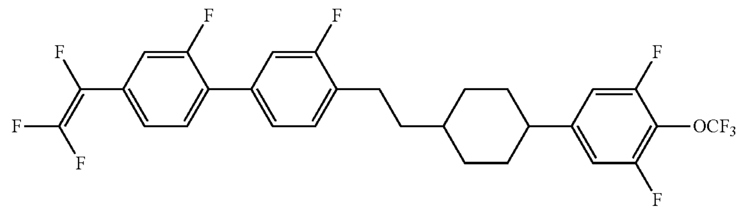 [SMILES: FC(F)=C(F)c1ccc(-c2ccc(CCC3CCC(c4cc(F)c(OC(F)(F)F)c(F)c4)CC3)c(F)c2)c(F)c1] |
| 1-2-210 | 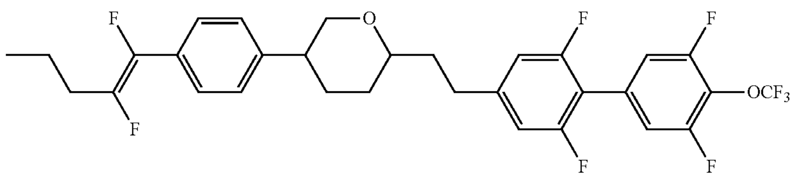 [SMILES: CCC/C(F)=C(\F)c1ccc(C2CCC(CCc3cc(F)c(-c4cc(F)c(OC(F)(F)F)c(F)c4)c(F)c3)OC2)cc1] |
| 1-2-211 | 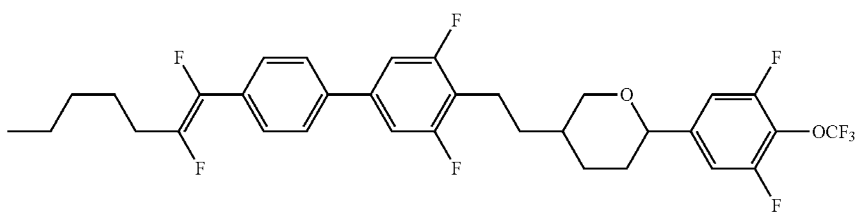 [SMILES: CCCCC/C(F)=C(\F)c1ccc(-c2cc(F)c(CCC3CCC(c4cc(F)c(OC(F)(F)F)c(F)c4)OC3)c(F)c2)cc1] |
| 1-2-212 | 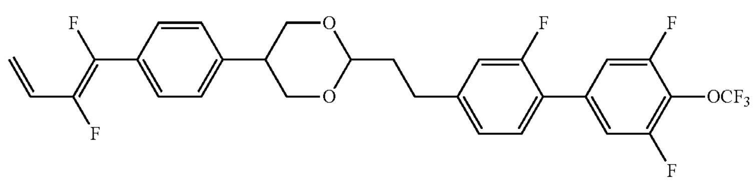 [SMILES: C=C/C(F)=C(\F)c1ccc(C2COC(CCc3ccc(-c4cc(F)c(OC(F)(F)F)c(F)c4)c(F)c3)OC2)cc1] |
| 1-2-213 | 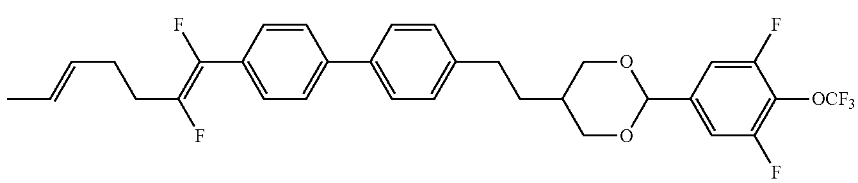 [SMILES: C/C=C/CC/C(F)=C(\F)c1ccc(-c2ccc(CCC3COC(c4cc(F)c(OC(F)(F)F)c(F)c4)OC3)cc2)cc1] |
| 1-2-214 | 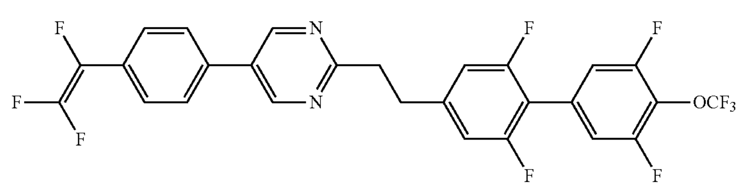 [SMILES: FC(F)=C(F)c1ccc(-c2cnc(CCc3cc(F)c(-c4cc(F)c(OC(F)(F)F)c(F)c4)c(F)c3)nc2)cc1] |
| 1-2-215 | 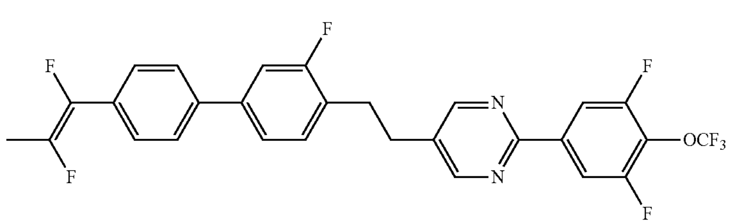 [SMILES: C/C(F)=C(\F)c1ccc(-c2ccc(CCc3cnc(-c4cc(F)c(OC(F)(F)F)c(F)c4)nc3)c(F)c2)cc1] |

-continued
| Formula 56 | |
|---|---|
| No. | |
| 1-2-216 | 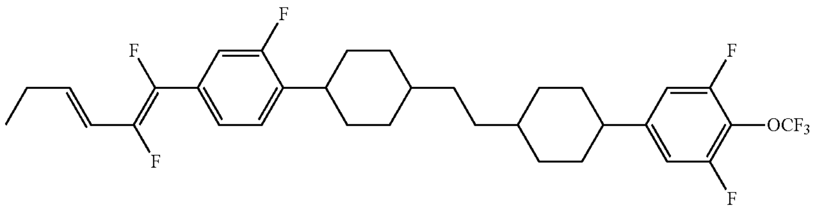 [SMILES: CC/C=C/C(F)=C(\F)c1ccc(C2CCC(CCC3CCC(c4cc(F)c(OC(F)(F)F)c(F)c4)CC3)CC2)c(F)c1] |
| 1-2-217 | 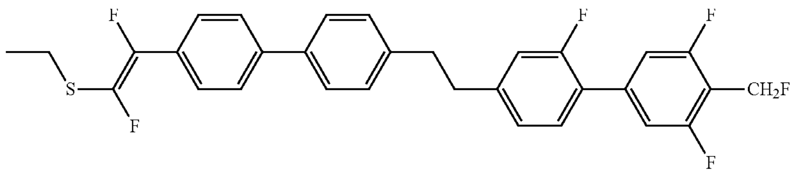 |
| 1-2-218 | 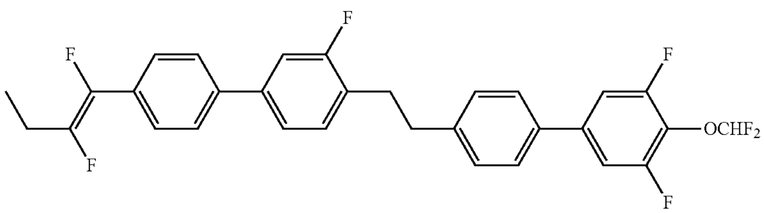 [SMILES: CC/C(F)=C(\F)c1ccc(-c2ccc(CCc3ccc(-c4cc(F)c(OC(F)F)c(F)c4)cc3)c(F)c2)cc1] |
| 1-2-219 | 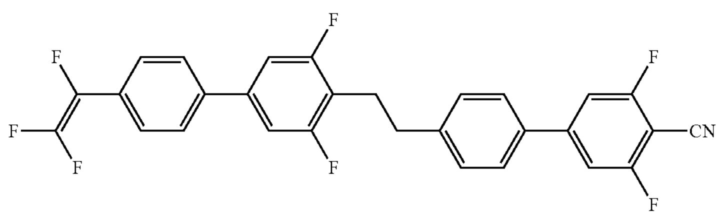 [SMILES: N#Cc1c(F)cc(-c2ccc(CCc3c(F)cc(-c4ccc(C(F)=C(F)F)cc4)cc3F)cc2)cc1F] |
| 1-2-220 | 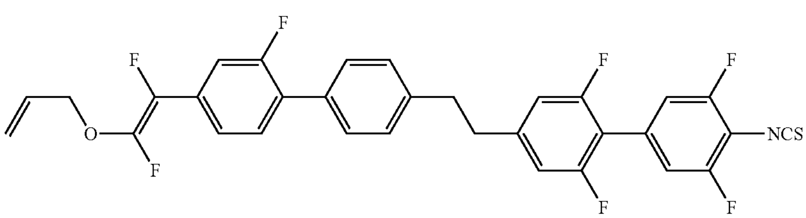 |
| Formula 57 | |
|---|---|
| No. | |
| 1-2-221 | 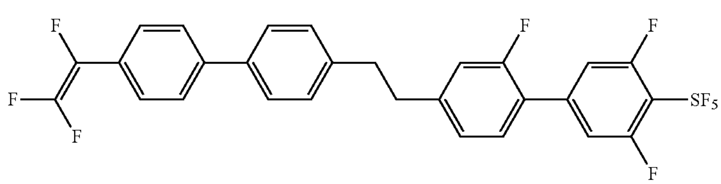 |

-continued
| Formula 57 | |
|---|---|
| No. | |
| 1-2-222 | 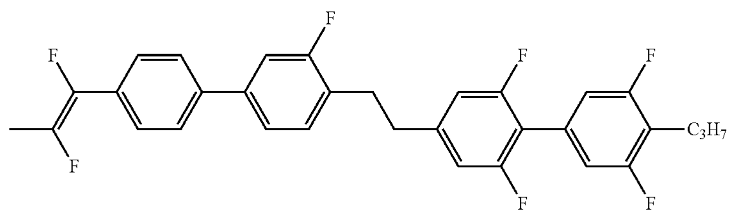 |
| 1-2-223 | 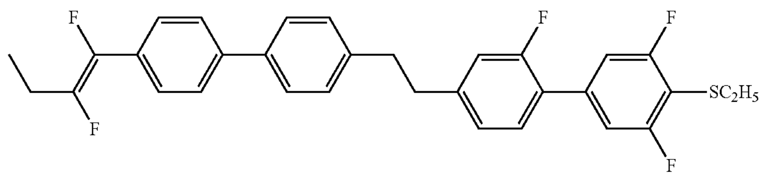 |
| 1-2-224 | 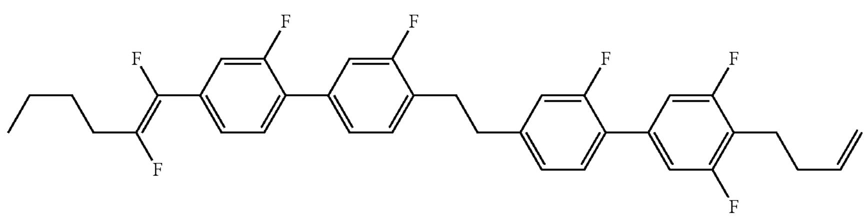 [SMILES: C=CCCc1c(F)cc(-c2ccc(CCc3ccc(-c4ccc(/C(F)=C(\F)CCCC)cc4F)cc3F)cc2F)cc1F] |
| 1-2-225 | 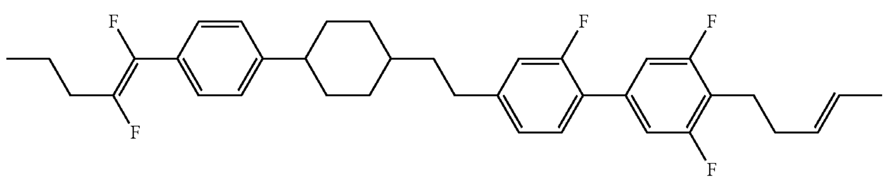 [SMILES: C/C=C/CCc1c(F)cc(-c2ccc(CCC3CCC(c4ccc(/C(F)=C(\F)CCC)cc4)CC3)cc2F)cc1F] |
| 1-2-226 | 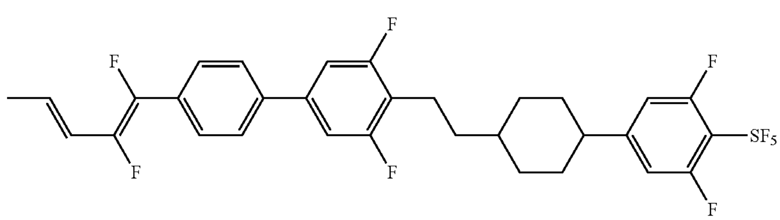 |
| 1-2-227 | 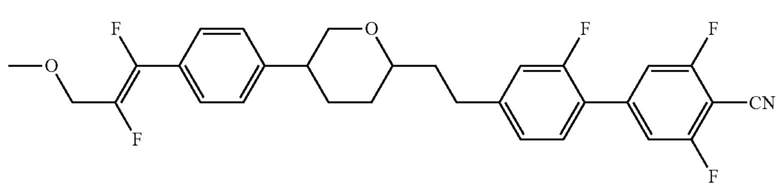 |
| 1-2-228 | 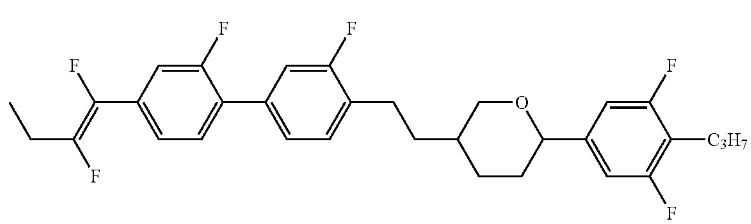 |

-continued
| Formula 57 | |
|---|---|
| No. | |
| 1-2-229 | 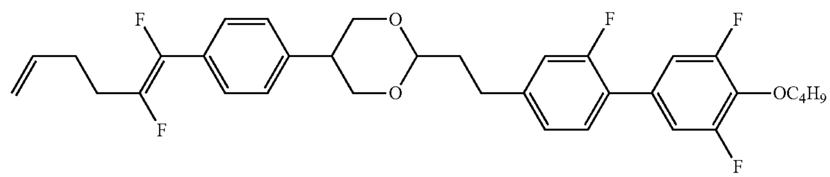 |
| 1-2-230 | 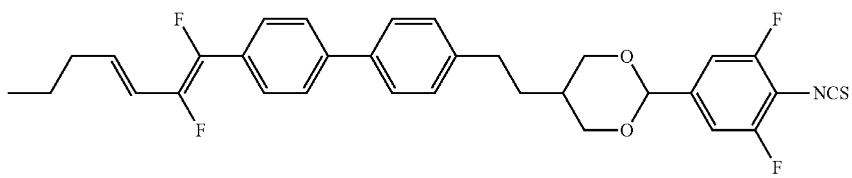 |
| 1-2-231 | 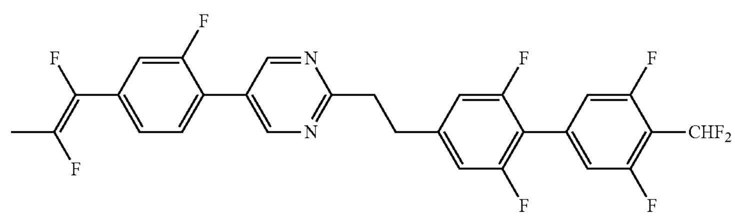 [SMILES: C/C(F)=C(\F)c1ccc(-c2cnc(CCc3cc(F)c(-c4cc(F)c(C(F)F)c(F)c4)c(F)c3)nc2)c(F)c1] |
| 1-2-232 | 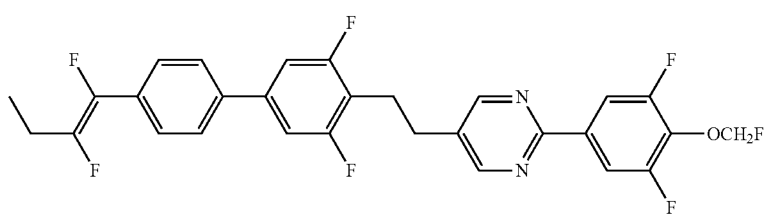 |
| 1-2-233 | 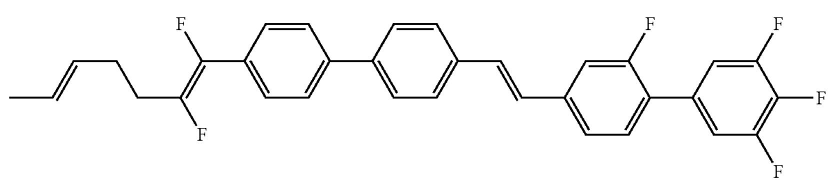 |
| 1-2-234 | 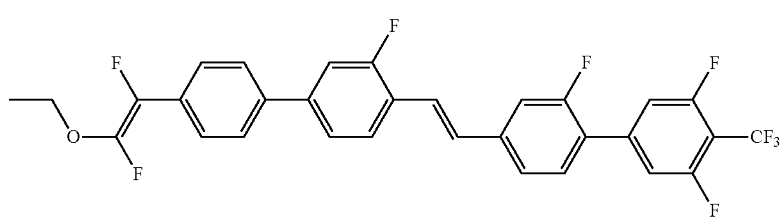 [SMILES: CCO/C(F)=C(\F)c1ccc(-c2ccc(/C=C/c3ccc(-c4cc(F)c(C(F)(F)F)c(F)c4)c(F)c3)c(F)c2)cc1] |
| 1-2-235 | 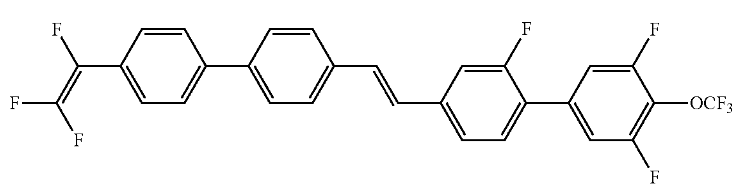 |

-continued
Formula 57
| No. | |
|---|---|
| 1-2-236 | 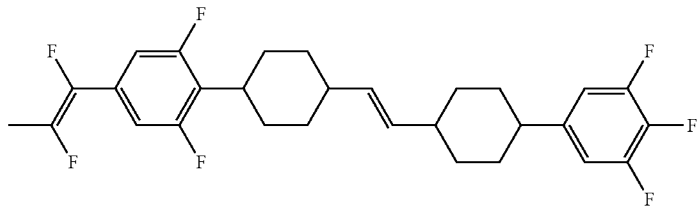 [SMILES: C/C(F)=C(\F)c1cc(F)c(C2CCC(/C=C/C3CCC(c4cc(F)c(F)c(F)c4)CC3)CC2)c(F)c1] |
| 1-2-237 | 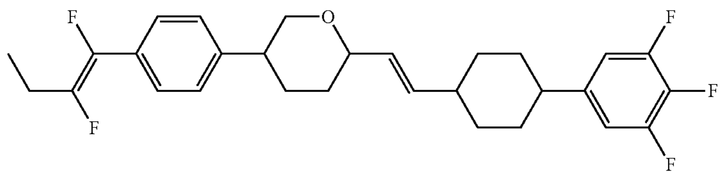 |
| 1-2-238 | 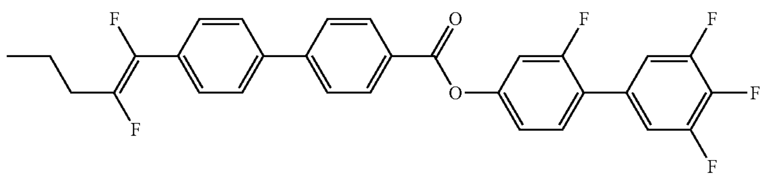 |
| 1-2-239 | 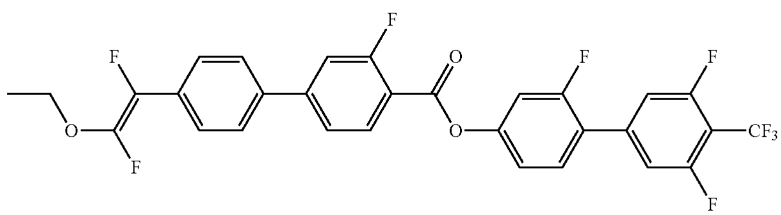 [SMILES: CCO/C(F)=C(\F)c1ccc(-c2ccc(C(=O)Oc3ccc(-c4cc(F)c(C(F)(F)F)c(F)c4)c(F)c3)c(F)c2)cc1] |
| 1-2-240 | 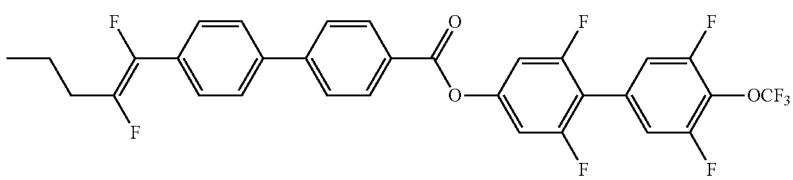 [SMILES: CCC/C(F)=C(\F)c1ccc(-c2ccc(C(=O)Oc3cc(F)c(-c4cc(F)c(OC(F)(F)F)c(F)c4)c(F)c3)cc2)cc1] |
Formula 58
| No. | |
|---|---|
| 1-2-241 | 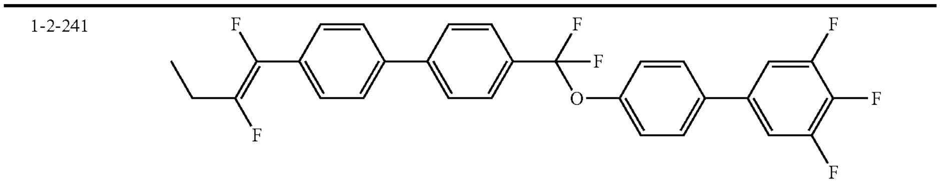 |
| 1-2-242 | 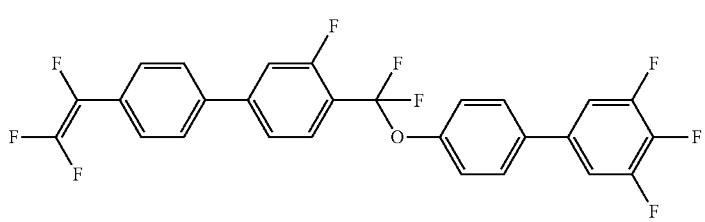 [SMILES: FC(F)=C(F)c1ccc(-c2ccc(C(F)(F)Oc3ccc(-c4cc(F)c(F)c(F)c4)cc3)c(F)c2)cc1] |

-continued
| Formula 58 | |
|---|---|
| No. | |
| 1-2-243 | 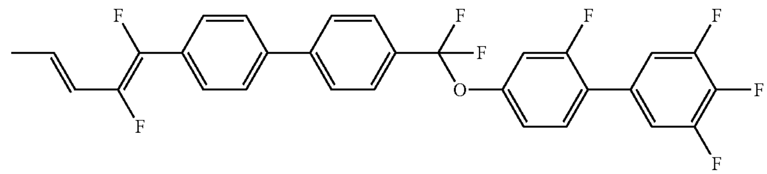 [SMILES: C/C=C/C(F)=C(\F)c1ccc(-c2ccc(C(F)(F)Oc3ccc(-c4cc(F)c(F)c(F)c4)c(F)c3)cc2)cc1] |
| 1-2-244 | 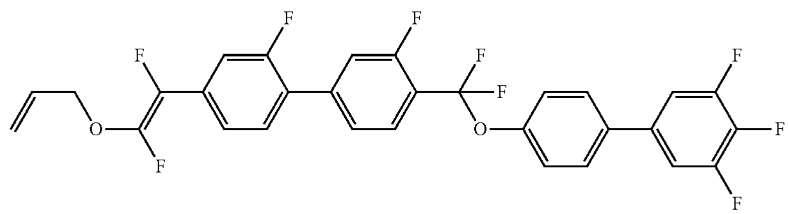 |
| 1-2-245 | 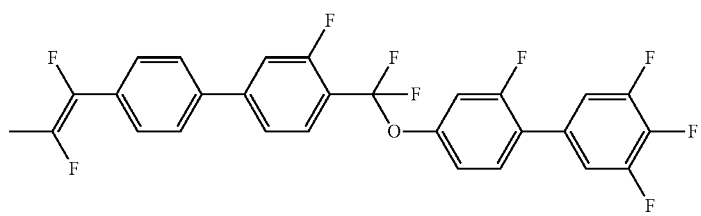 |
| 1-2-246 | 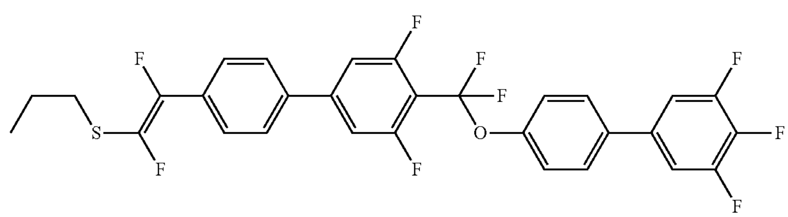 [SMILES: CCCS/C(F)=C(\F)c1ccc(-c2cc(F)c(C(F)(F)Oc3ccc(-c4cc(F)c(F)c(F)c4)cc3)c(F)c2)cc1] |
| 1-2-247 | 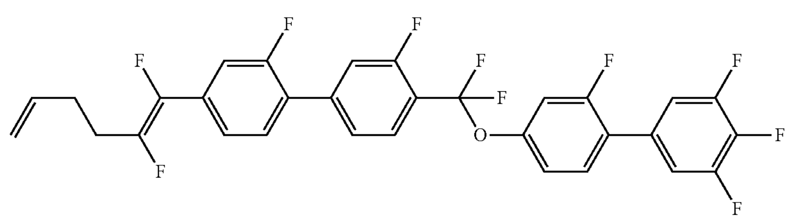 |
| 1-2-248 | 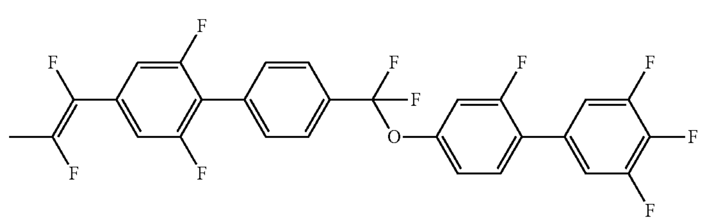 [SMILES: C/C(F)=C(\F)c1cc(F)c(-c2ccc(C(F)(F)Oc3ccc(-c4cc(F)c(F)c(F)c4)c(F)c3)cc2)c(F)c1] |
| 1-2-249 | 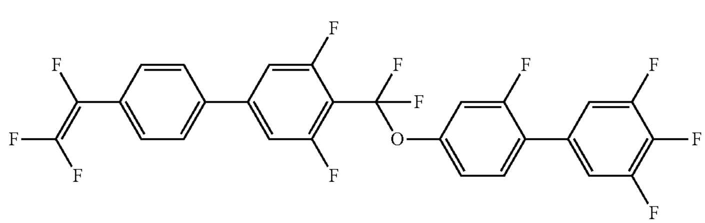 [SMILES: FC(F)=C(F)c1ccc(-c2cc(F)c(C(F)(F)Oc3ccc(-c4cc(F)c(F)c(F)c4)c(F)c3)c(F)c2)cc1] |

-continued
| Formula 58 |
| --- |
| No. |
1-2-250
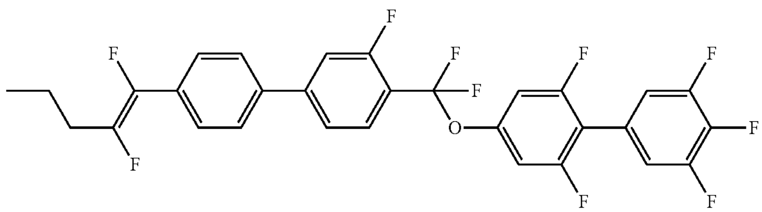 [SMILES: CCC/C(F)=C(\F)c1ccc(-c2ccc(C(F)(F)Oc3cc(F)c(-c4cc(F)c(F)c(F)c4)c(F)c3)c(F)c2)cc1]
1-2-251
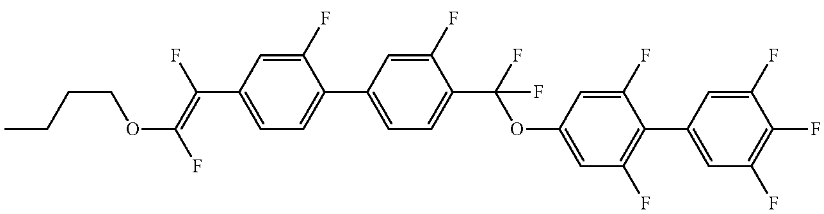 [SMILES: CCCCO/C(F)=C(\F)c1ccc(-c2ccc(C(F)(F)Oc3cc(F)c(-c4cc(F)c(F)c(F)c4)c(F)c3)c(F)c2)c(F)c1]
1-2-252
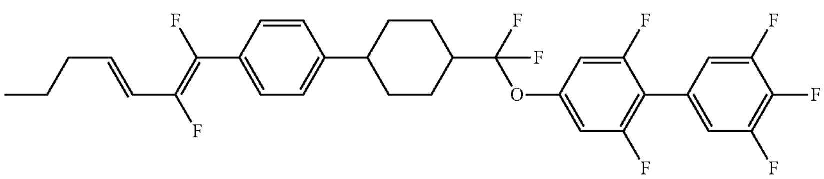
1-2-253
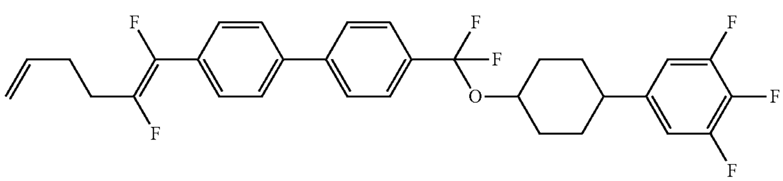 [SMILES: C=CCC/C(F)=C(\F)c1ccc(-c2ccc(C(F)(F)OC3CCC(c4cc(F)c(F)c(F)c4)CC3)cc2)cc1]
1-2-254
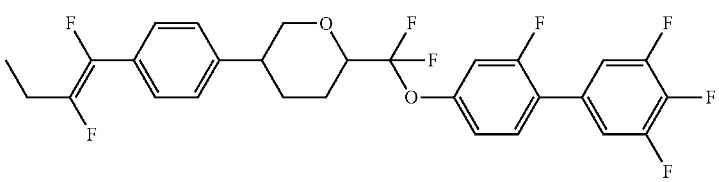 [SMILES: CC/C(F)=C(\F)c1ccc(C2CCC(C(F)(F)Oc3ccc(-c4cc(F)c(F)c(F)c4)c(F)c3)OC2)cc1]
1-2-255
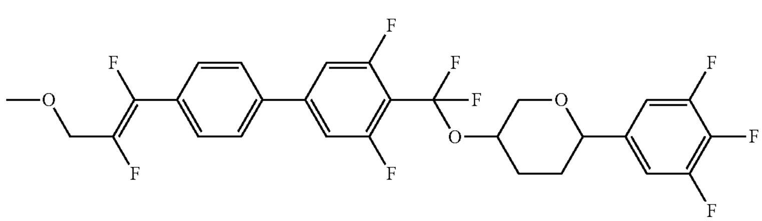 [SMILES: COC/C(F)=C(\F)c1ccc(-c2cc(F)c(C(F)(F)OC3CCC(c4cc(F)c(F)c(F)c4)OC3)c(F)c2)cc1]
1-2-256
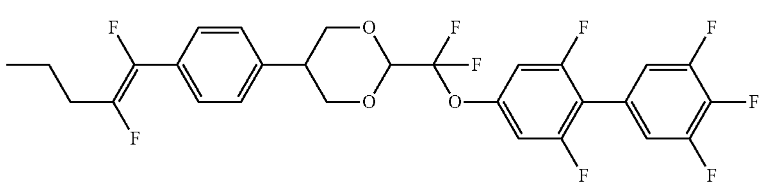 [SMILES: CCC/C(F)=C(\F)c1ccc(C2COC(C(F)(F)Oc3cc(F)c(-c4cc(F)c(F)c(F)c4)c(F)c3)OC2)cc1]

-continued
| Formula 58 | |
|---|---|
| No. | |
| 1-2-257 | 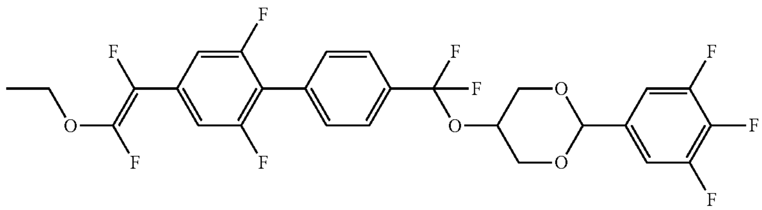 [SMILES: CCO/C(F)=C(\F)c1cc(F)c(-c2ccc(C(F)(F)OC3COC(c4cc(F)c(F)c(F)c4)OC3)cc2)c(F)c1] |
| 1-2-258 | 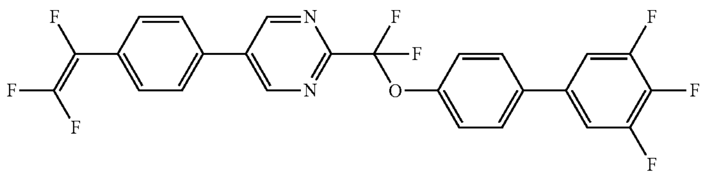 [SMILES: FC(F)=C(F)c1ccc(-c2cnc(C(F)(F)Oc3ccc(-c4cc(F)c(F)c(F)c4)cc3)nc2)cc1] |
| 1-2-259 | 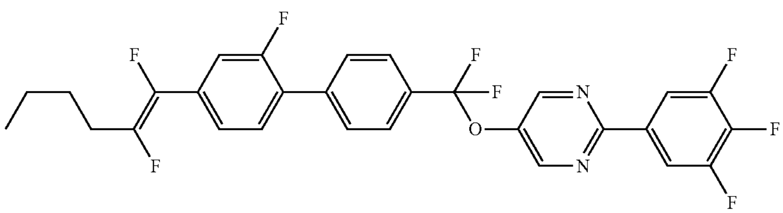 [SMILES: CCCC/C(F)=C(\F)c1ccc(-c2ccc(C(F)(F)Oc3cnc(-c4cc(F)c(F)c(F)c4)nc3)cc2)c(F)c1] |
| 1-2-260 | 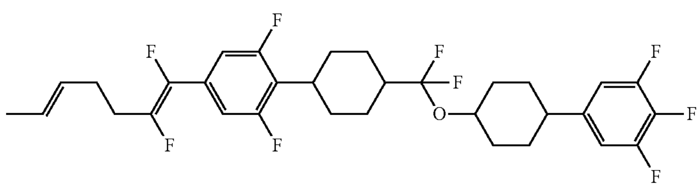 [SMILES: C/C=C/CC/C(F)=C(\F)c1cc(F)c(C2CCC(C(F)(F)OC3CCC(c4cc(F)c(F)c(F)c4)CC3)CC2)c(F)c1] |
| Formula 59 | |
|---|---|
| No. | |
| 1-2-261 | 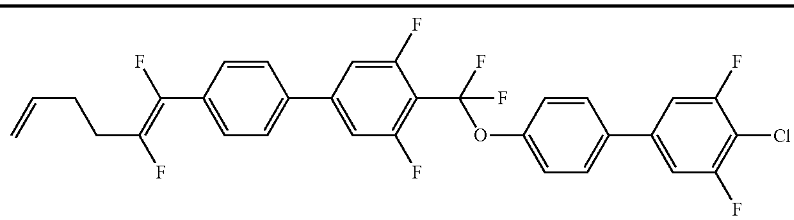 |
| 1-2-262 | 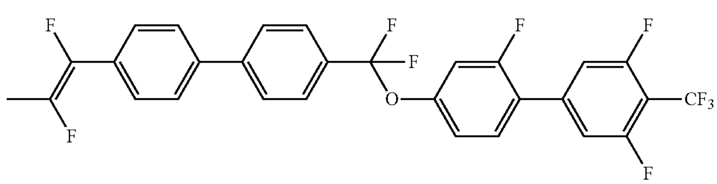 [SMILES: C/C(F)=C(\F)c1ccc(-c2ccc(C(F)(F)Oc3ccc(-c4cc(F)c(C(F)(F)F)c(F)c4)c(F)c3)cc2)cc1] |
| 1-2-263 | 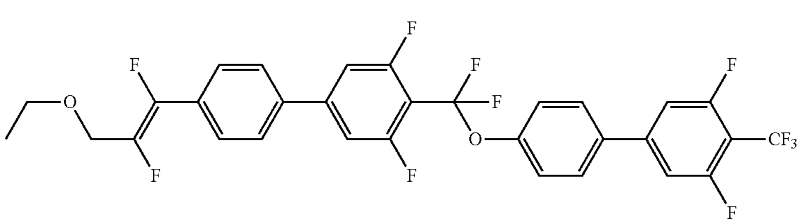 [SMILES: CCOC/C(F)=C(\F)c1ccc(-c2cc(F)c(C(F)(F)Oc3ccc(-c4cc(F)c(C(F)(F)F)c(F)c4)cc3)c(F)c2)cc1] |

-continued
Formula 59
| No. | |
|---|---|
| 1-2-264 | 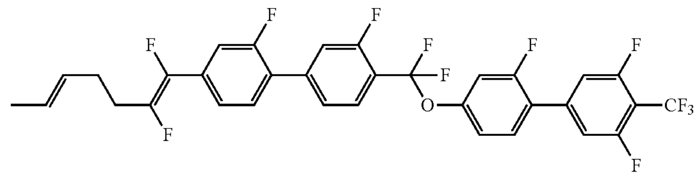 [SMILES: C/C=C/CC/C(F)=C(\F)c1ccc(-c2ccc(C(F)(F)Oc3ccc(-c4cc(F)c(C(F)(F)F)c(F)c4)c(F)c3)c(F)c2)c(F)c1] |
| 1-2-265 | 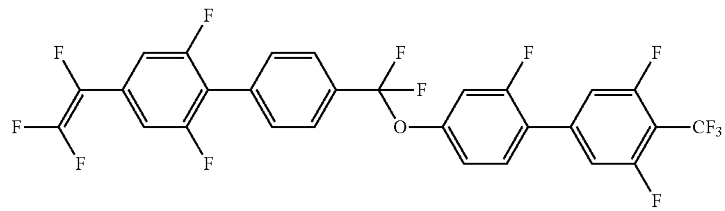 [SMILES: FC(F)=C(F)c1cc(F)c(-c2ccc(C(F)(F)Oc3ccc(-c4cc(F)c(C(F)(F)F)c(F)c4)c(F)c3)cc2)c(F)c1] |
| 1-2-266 | 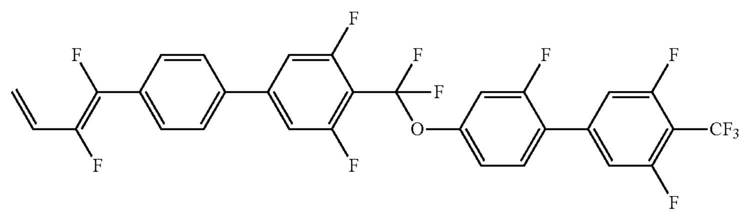 [SMILES: C=C/C(F)=C(\F)c1ccc(-c2cc(F)c(C(F)(F)Oc3ccc(-c4cc(F)c(C(F)(F)F)c(F)c4)c(F)c3)c(F)c2)cc1] |
| 1-2-267 | 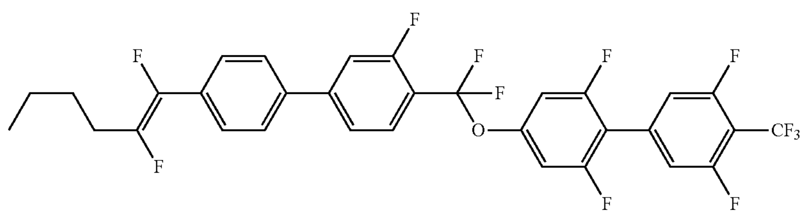 [SMILES: CCCC/C(F)=C(\F)c1ccc(-c2ccc(C(F)(F)Oc3cc(F)c(-c4cc(F)c(C(F)(F)F)c(F)c4)c(F)c3)c(F)c2)cc1] |
| 1-2-268 | 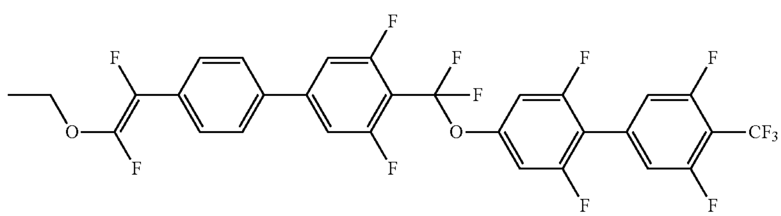 [SMILES: CCO/C(F)=C(\F)c1ccc(-c2cc(F)c(C(F)(F)Oc3cc(F)c(-c4cc(F)c(C(F)(F)F)c(F)c4)c(F)c3)c(F)c2)cc1] |
| 1-2-269 | 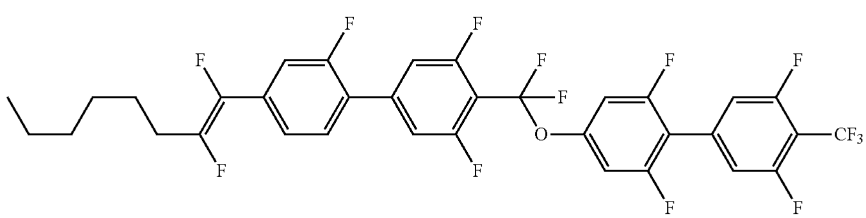 [SMILES: CCCCCC/C(F)=C(\F)c1ccc(-c2cc(F)c(C(F)(F)Oc3cc(F)c(-c4cc(F)c(C(F)(F)F)c(F)c4)c(F)c3)c(F)c2)c(F)c1] |
| 1-2-270 | 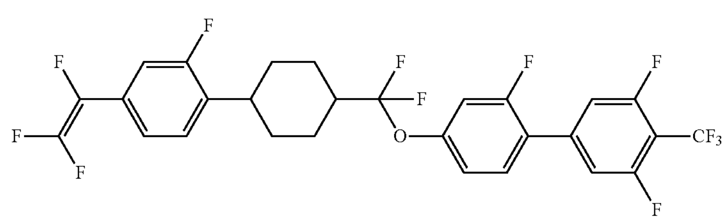 [SMILES: FC(F)=C(F)c1ccc(C2CCC(C(F)(F)Oc3ccc(-c4cc(F)c(C(F)(F)F)c(F)c4)c(F)c3)CC2)c(F)c1] |

-continued
| Formula 59 | |
|---|---|
| No. | |
| 1-2-271 | 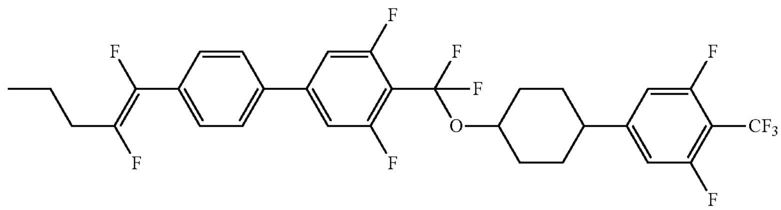 [SMILES: CCC/C(F)=C(\F)c1ccc(-c2cc(F)c(C(F)(F)OC3CCC(c4cc(F)c(C(F)(F)F)c(F)c4)CC3)c(F)c2)cc1] |
| 1-2-272 | 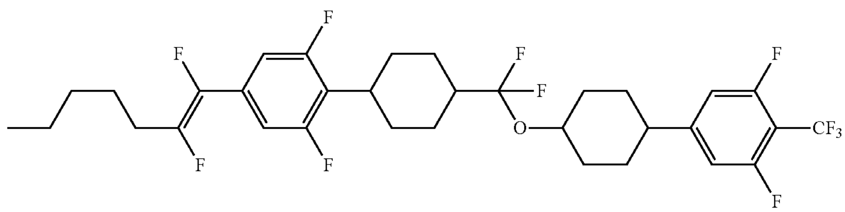 [SMILES: CCCCC/C(F)=C(\F)c1cc(F)c(C2CCC(C(F)(F)OC3CCC(c4cc(F)c(C(F)(F)F)c(F)c4)CC3)CC2)c(F)c1] |
| 1-2-273 | 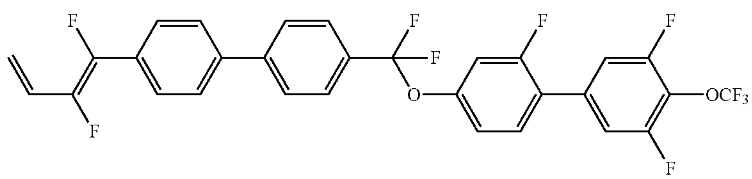 [SMILES: C=C/C(F)=C(\F)c1ccc(-c2ccc(C(F)(F)Oc3ccc(-c4cc(F)c(OC(F)(F)F)c(F)c4)c(F)c3)cc2)cc1] |
| 1-2-274 | 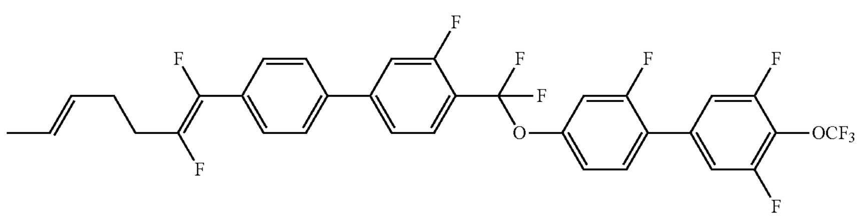 [SMILES: C/C=C/CC/C(F)=C(\F)c1ccc(-c2ccc(C(F)(F)Oc3ccc(-c4cc(F)c(OC(F)(F)F)c(F)c4)c(F)c3)c(F)c2)cc1] |
| 1-2-275 | 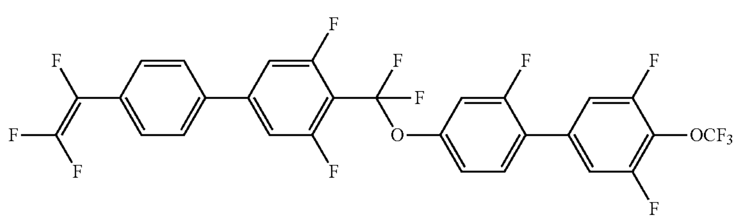 [SMILES: FC(F)=C(F)c1ccc(-c2cc(F)c(C(F)(F)Oc3ccc(-c4cc(F)c(OC(F)(F)F)c(F)c4)c(F)c3)c(F)c2)cc1] |
| 1-2-276 | 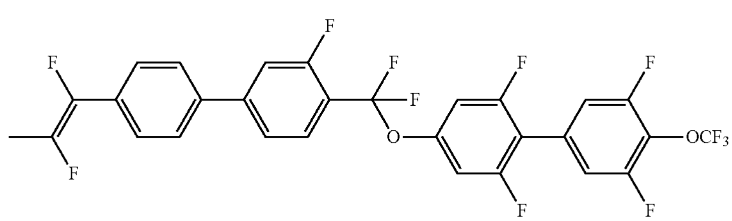 [SMILES: C/C(F)=C(\F)c1ccc(-c2ccc(C(F)(F)Oc3cc(F)c(-c4cc(F)c(OC(F)(F)F)c(F)c4)c(F)c3)c(F)c2)cc1] |
| 1-2-277 | 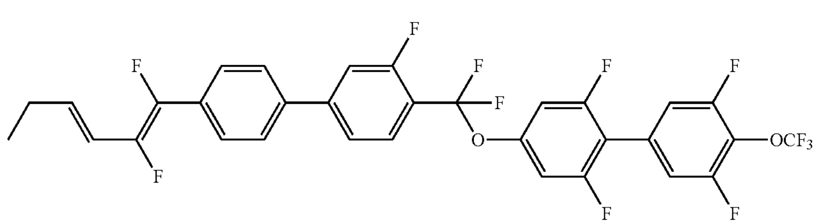 [SMILES: CC/C=C/C(F)=C(\F)c1ccc(-c2ccc(C(F)(F)Oc3cc(F)c(-c4cc(F)c(OC(F)(F)F)c(F)c4)c(F)c3)c(F)c2)cc1] |

-continued
| Formula 59 |
| --- |
| No. |
| 1-2-278 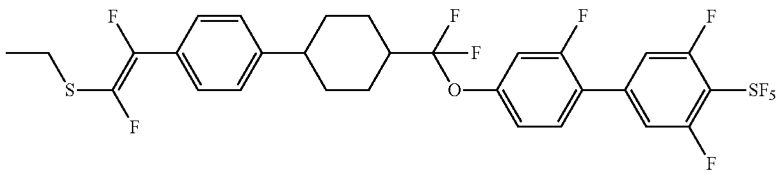 |
| 1-2-279 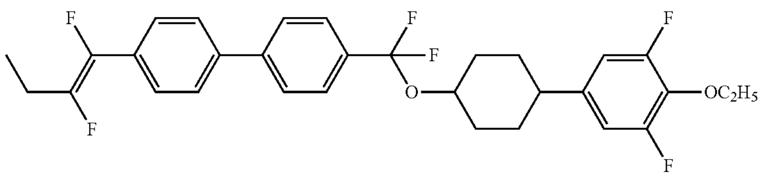 [SMILES: CCOc1c(F)cc(C2CCC(OC(F)(F)c3ccc(-c4ccc(/C(F)=C(\F)CC)cc4)cc3)CC2)cc1F] |
| 1-2-280 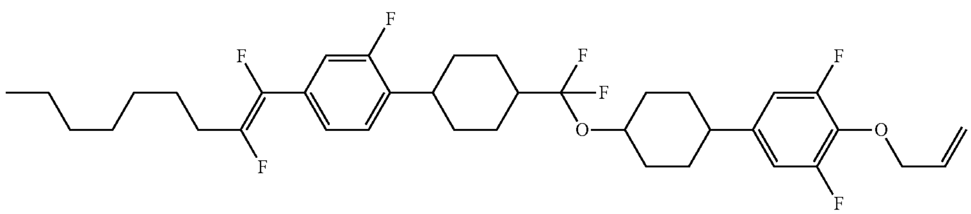 [SMILES: C=CCOc1c(F)cc(C2CCC(OC(F)(F)C3CCC(c4ccc(/C(F)=C(\F)CCCCCCC)cc4F)CC3)CC2)cc1F] |
| Formula 60 |
| --- |
| No. |
| 1-2-281 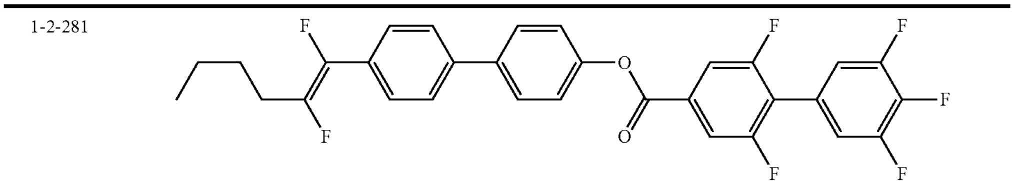 |
| 1-2-282 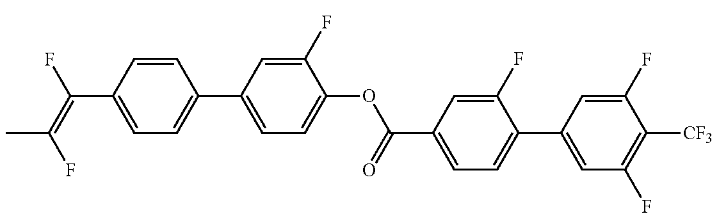 [SMILES: C/C(F)=C(\F)c1ccc(-c2ccc(OC(=O)c3ccc(-c4cc(F)c(C(F)(F)F)c(F)c4)c(F)c3)c(F)c2)cc1] |
| 1-2-283 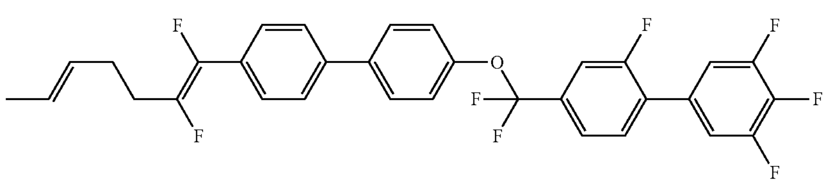 |
| 1-2-284 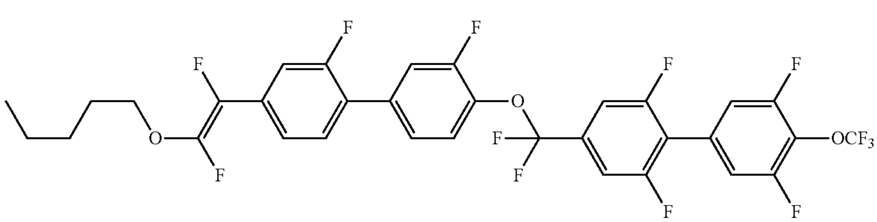 [SMILES: CCCCCO/C(F)=C(\F)c1ccc(-c2ccc(OC(F)(F)c3cc(F)c(-c4cc(F)c(OC(F)(F)F)c(F)c4)c(F)c3)c(F)c2)c(F)c1] |

-continued
| Formula 60 | |
|---|---|
| No. | |
| 1-2-285 | 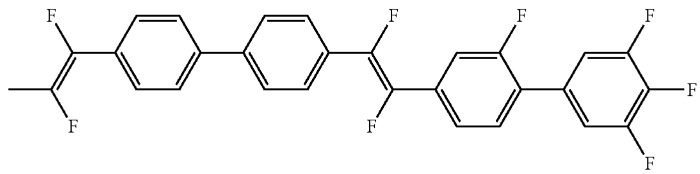 [SMILES: C/C(F)=C(\F)c1ccc(-c2ccc(/C(F)=C(\F)c3ccc(-c4cc(F)c(F)c(F)c4)c(F)c3)cc2)cc1] |
| 1-2-286 | 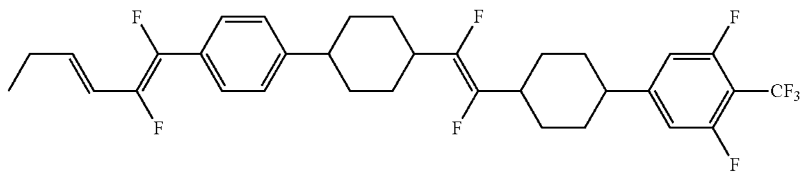 [SMILES: CC/C=C/C(F)=C(\F)c1ccc(C2CCC(/C(F)=C(\F)C3CCC(c4cc(F)c(C(F)(F)F)c(F)c4)CC3)CC2)cc1] |
| 1-2-287 | 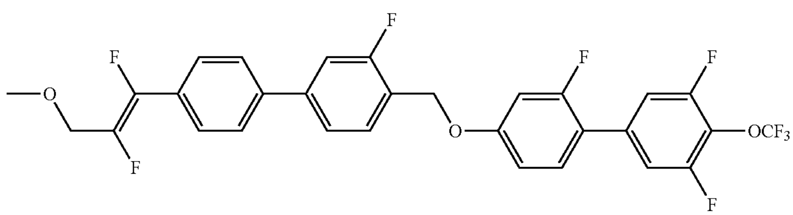 [SMILES: COC/C(F)=C(\F)c1ccc(-c2ccc(COc3ccc(-c4cc(F)c(OC(F)(F)F)c(F)c4)c(F)c3)c(F)c2)cc1] |
| 1-2-288 | 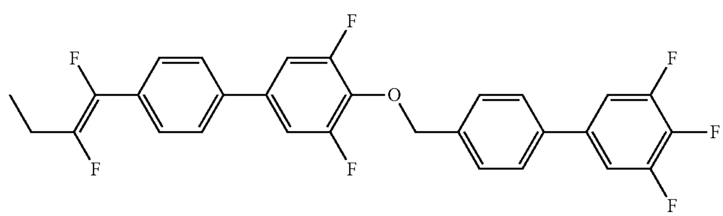 [SMILES: CC/C(F)=C(\F)c1ccc(-c2cc(F)c(OCc3ccc(-c4cc(F)c(F)c(F)c4)cc3)c(F)c2)cc1] |
| 1-2-289 | 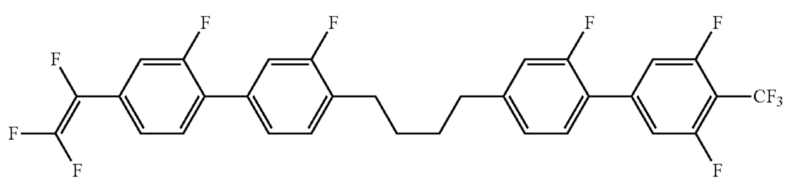 [SMILES: FC(F)=C(F)c1ccc(-c2ccc(CCCCc3ccc(-c4cc(F)c(C(F)(F)F)c(F)c4)c(F)c3)c(F)c2)c(F)c1] |
| 1-2-290 | 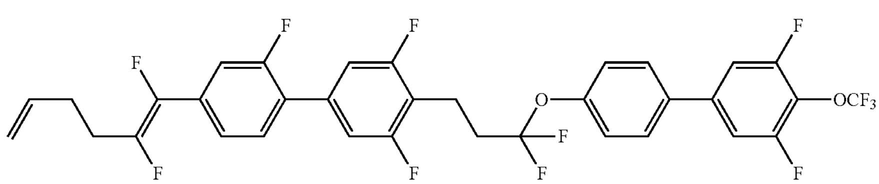 [SMILES: C=CCC/C(F)=C(\F)c1ccc(-c2cc(F)c(CCC(F)(F)Oc3ccc(-c4cc(F)c(OC(F)(F)F)c(F)c4)cc3)c(F)c2)c(F)c1] |
| 1-2-291 | 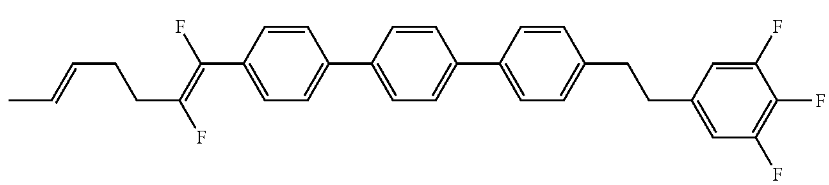 [SMILES: C/C=C/CC/C(F)=C(\F)c1ccc(-c2ccc(-c3ccc(CCc4cc(F)c(F)c(F)c4)cc3)cc2)cc1] |
| 1-2-292 | 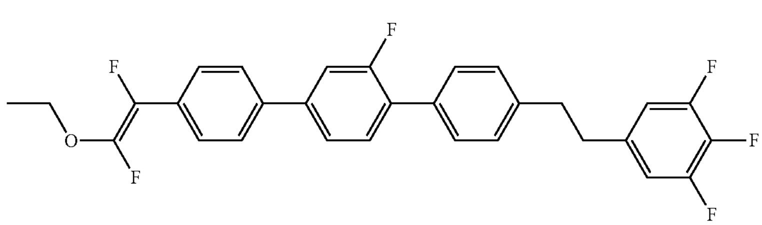 |

-continued
| Formula 60 | |
|---|---|
| No. | |
| 1-2-293 | 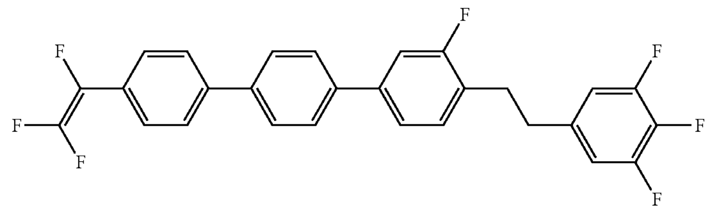 [SMILES: FC(F)=C(F)c1ccc(-c2ccc(-c3ccc(CCc4cc(F)c(F)c(F)c4)c(F)c3)cc2)cc1] |
| 1-2-294 | 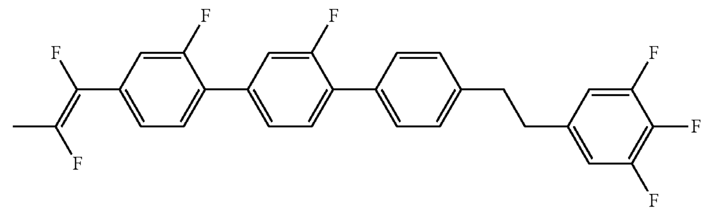 [SMILES: C/C(F)=C(\F)c1ccc(-c2ccc(-c3ccc(CCc4cc(F)c(F)c(F)c4)cc3)c(F)c2)c(F)c1] |
| 1-2-295 | 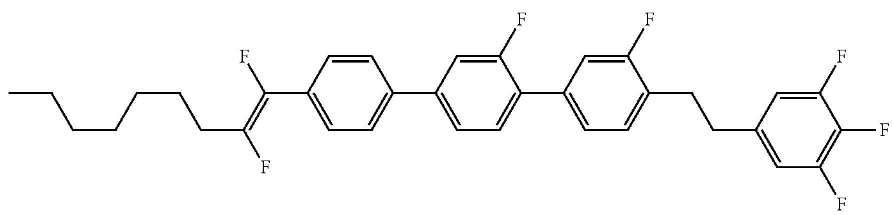 [SMILES: CCCCCCC/C(F)=C(\F)c1ccc(-c2ccc(-c3ccc(CCc4cc(F)c(F)c(F)c4)c(F)c3)c(F)c2)cc1] |
| 1-2-296 | 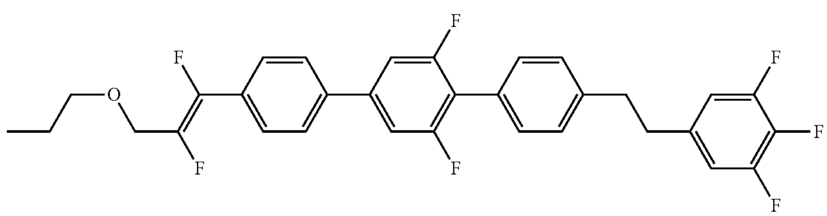 [SMILES: CCCOC/C(F)=C(\F)c1ccc(-c2cc(F)c(-c3ccc(CCc4cc(F)c(F)c(F)c4)cc3)c(F)c2)cc1] |
| 1-2-297 | 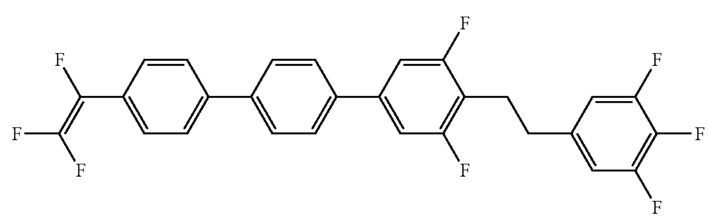 [SMILES: FC(F)=C(F)c1ccc(-c2ccc(-c3cc(F)c(CCc4cc(F)c(F)c(F)c4)c(F)c3)cc2)cc1] |
| 1-2-298 | 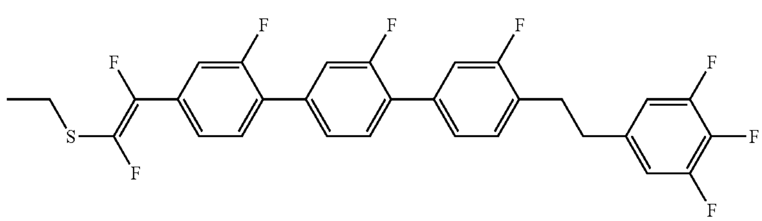 [SMILES: CCS/C(F)=C(\F)c1ccc(-c2ccc(-c3ccc(CCc4cc(F)c(F)c(F)c4)c(F)c3)c(F)c2)c(F)c1] |
| 1-2-299 | 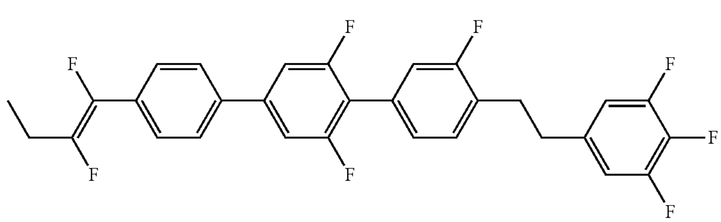 [SMILES: CC/C(F)=C(\F)c1ccc(-c2cc(F)c(-c3ccc(CCc4cc(F)c(F)c(F)c4)c(F)c3)c(F)c2)cc1] |

-continued
| Formula 60 | |
|---|---|
| No. | |
| 1-2-300 | 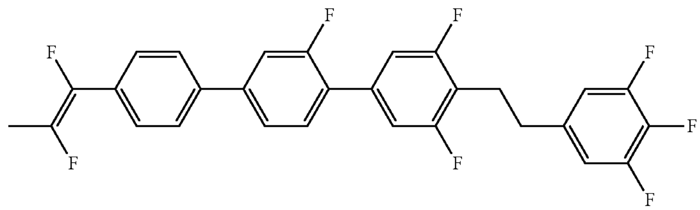 [SMILES: C/C(F)=C(\F)c1ccc(-c2ccc(-c3cc(F)c(CCc4cc(F)c(F)c(F)c4)c(F)c3)c(F)c2)cc1] |
| Formula 61 | |
|---|---|
| No. | |
| 1-2-301 | 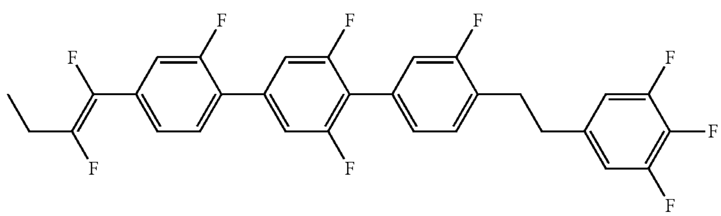 [SMILES: CC/C(F)=C(\F)c1ccc(-c2cc(F)c(-c3ccc(CCc4cc(F)c(F)c(F)c4)c(F)c3)c(F)c2)c(F)c1] |
| 1-2-302 | 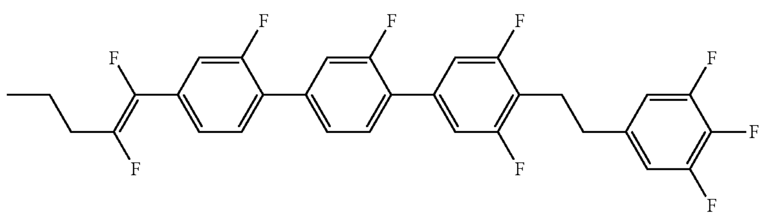 [SMILES: CCC/C(F)=C(\F)c1ccc(-c2ccc(-c3cc(F)c(CCc4cc(F)c(F)c(F)c4)c(F)c3)c(F)c2)c(F)c1] |
| 1-2-303 | 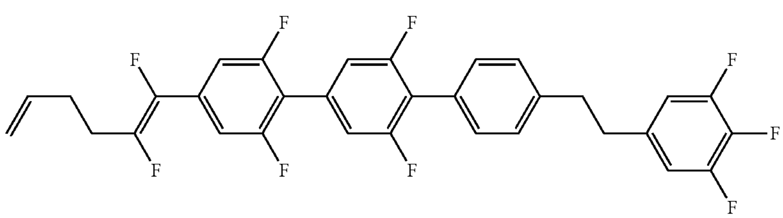 [SMILES: C=CCC/C(F)=C(\F)c1cc(F)c(-c2cc(F)c(-c3ccc(CCc4cc(F)c(F)c(F)c4)cc3)c(F)c2)c(F)c1] |
| 1-2-304 | 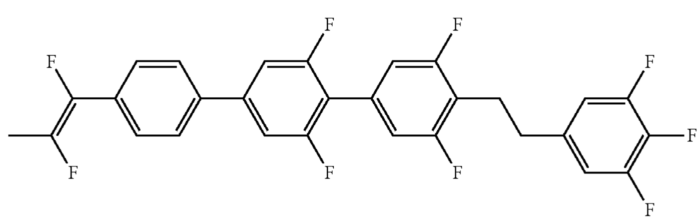 |
| 1-2-305 | 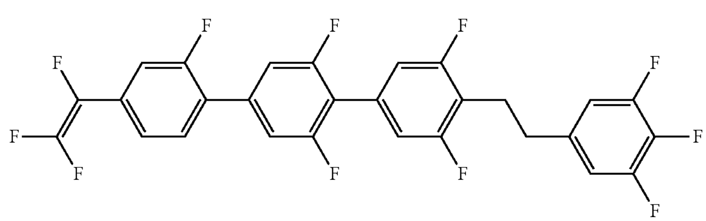 [SMILES: FC(F)=C(F)c1ccc(-c2cc(F)c(-c3cc(F)c(CCc4cc(F)c(F)c(F)c4)c(F)c3)c(F)c2)c(F)c1] |

-continued
| Formula 61 | |
|---|---|
| No. | |
| 1-2-306 | 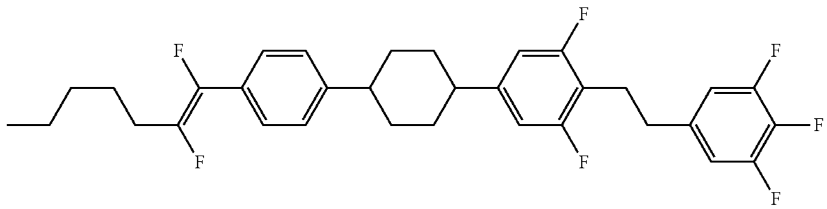 [SMILES: CCCCC/C(F)=C(\F)c1ccc(C2CCC(c3cc(F)c(CCc4cc(F)c(F)c(F)c4)c(F)c3)CC2)cc1] |
| 1-2-307 | 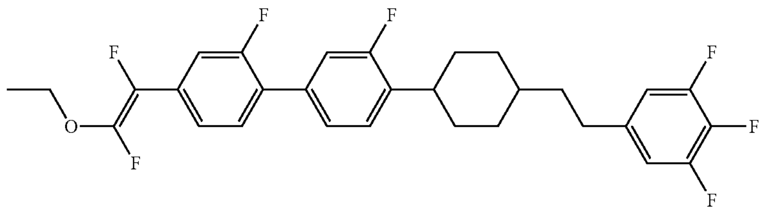 [SMILES: CCO/C(F)=C(\F)c1ccc(-c2ccc(C3CCC(CCc4cc(F)c(F)c(F)c4)CC3)c(F)c2)c(F)c1] |
| 1-2-308 | 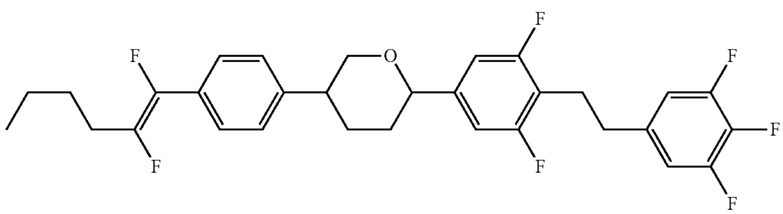 [SMILES: CCCC/C(F)=C(\F)c1ccc(C2CCC(c3cc(F)c(CCc4cc(F)c(F)c(F)c4)c(F)c3)OC2)cc1] |
| 1-2-309 | 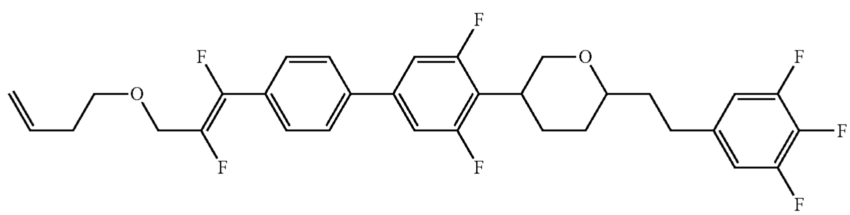 [SMILES: C=CCCOC/C(F)=C(\F)c1ccc(-c2cc(F)c(C3CCC(CCc4cc(F)c(F)c(F)c4)OC3)c(F)c2)cc1] |
| 1-2-310 | 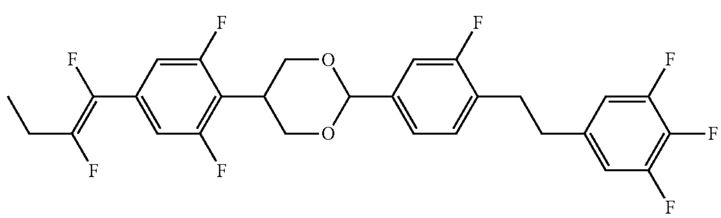 [SMILES: CC/C(F)=C(\F)c1cc(F)c(C2COC(c3ccc(CCc4cc(F)c(F)c(F)c4)c(F)c3)OC2)c(F)c1] |
| 1-2-311 | 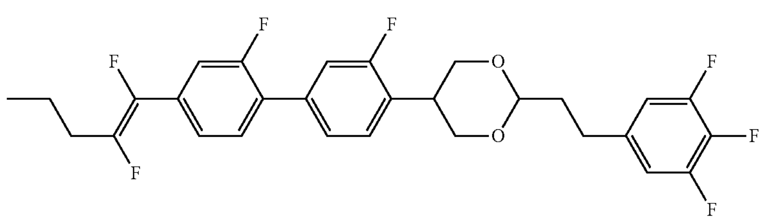 [SMILES: CCC/C(F)=C(\F)c1ccc(-c2ccc(C3COC(CCc4cc(F)c(F)c(F)c4)OC3)c(F)c2)c(F)c1] |
| 1-2-312 | 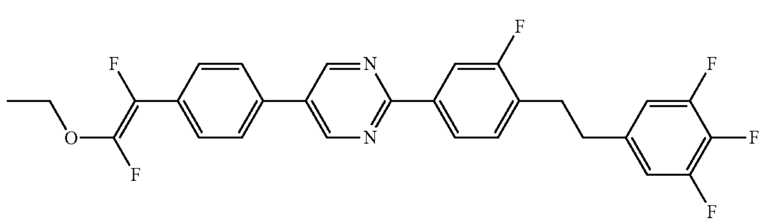 |

-continued
| Formula 61 | |
|---|---|
| No. | |
| 1-2-313 | 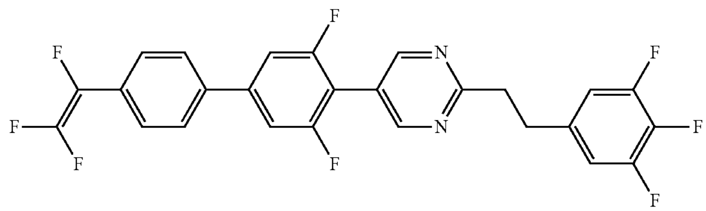 [SMILES: FC(F)=C(F)c1ccc(-c2cc(F)c(-c3cnc(CCc4cc(F)c(F)c(F)c4)nc3)c(F)c2)cc1] |
| 1-2-314 | 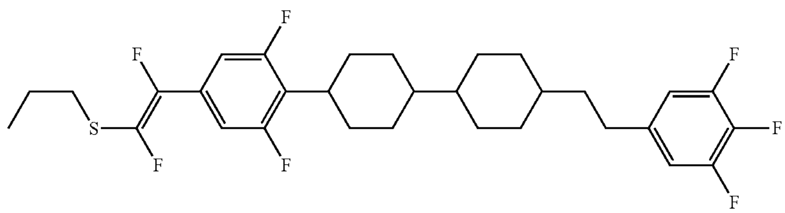 [SMILES: CCCS/C(F)=C(\F)c1cc(F)c(C2CCC(C3CCC(CCc4cc(F)c(F)c(F)c4)CC3)CC2)c(F)c1] |
| 1-2-315 | 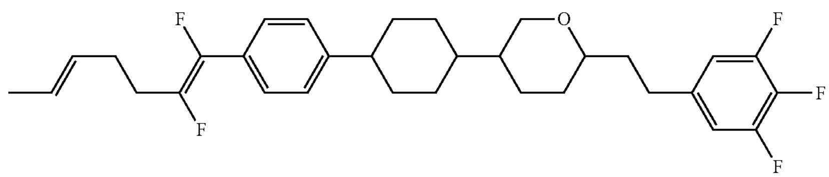 [SMILES: C/C=C/CC/C(F)=C(\F)c1ccc(C2CCC(C3CCC(CCc4cc(F)c(F)c(F)c4)OC3)CC2)cc1] |
| 1-2-316 | 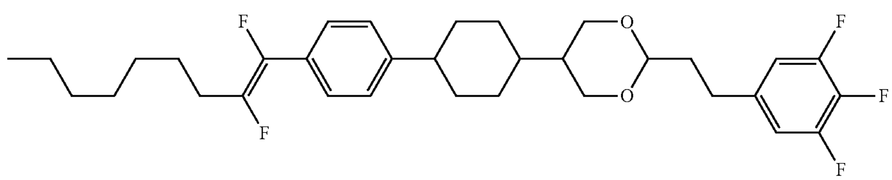 [SMILES: CCCCCCC/C(F)=C(\F)c1ccc(C2CCC(C3COC(CCc4cc(F)c(F)c(F)c4)OC3)CC2)cc1] |
| 1-2-317 | 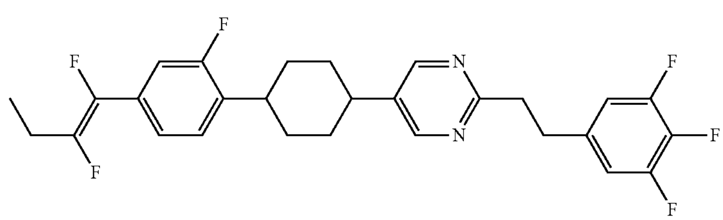 [SMILES: CC/C(F)=C(\F)c1ccc(C2CCC(c3cnc(CCc4cc(F)c(F)c(F)c4)nc3)CC2)c(F)c1] |
| 1-2-318 | 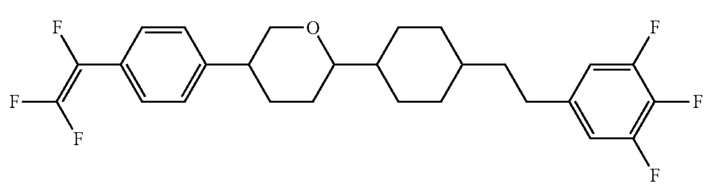 [SMILES: FC(F)=C(F)c1ccc(C2CCC(C3CCC(CCc4cc(F)c(F)c(F)c4)CC3)OC2)cc1] |
| 1-2-319 | 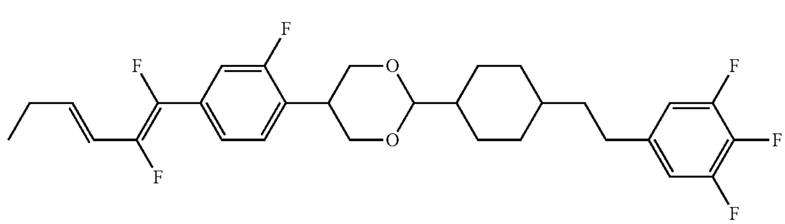 [SMILES: CC/C=C/C(F)=C(\F)c1ccc(C2COC(C3CCC(CCc4cc(F)c(F)c(F)c4)CC3)OC2)c(F)c1] |

-continued
| Formula 61 | |
|---|---|
| No. | |
| 1-2-320 | 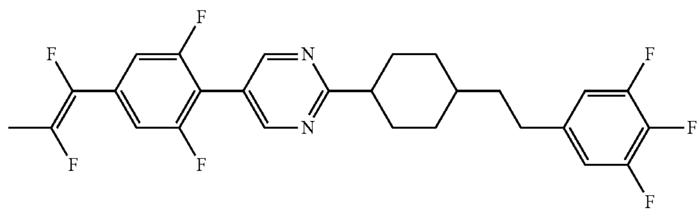 [SMILES: C/C(F)=C(\F)c1cc(F)c(-c2cnc(C3CCC(CCc4cc(F)c(F)c(F)c4)CC3)nc2)c(F)c1] |
| Formula 62 | |
|---|---|
| No. | |
| 1-2-321 | 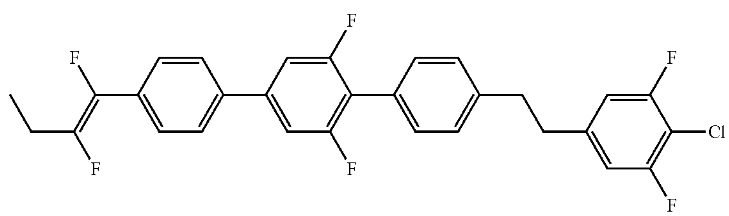 [SMILES: CC/C(F)=C(\F)c1ccc(-c2cc(F)c(-c3ccc(CCc4cc(F)c(Cl)c(F)c4)cc3)c(F)c2)cc1] |
| 1-2-322 | 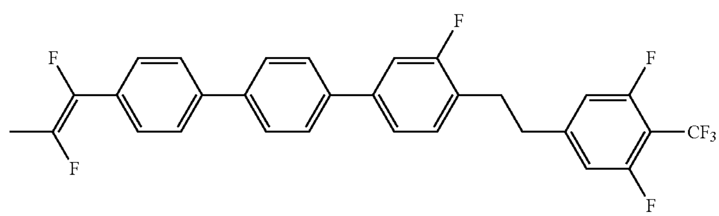 [SMILES: C/C(F)=C(\F)c1ccc(-c2ccc(-c3ccc(CCc4cc(F)c(C(F)(F)F)c(F)c4)c(F)c3)cc2)cc1] |
| 1-2-323 | 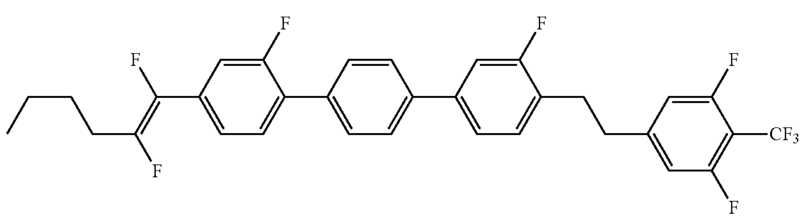 [SMILES: CCCC/C(F)=C(\F)c1ccc(-c2ccc(-c3ccc(CCc4cc(F)c(C(F)(F)F)c(F)c4)c(F)c3)cc2)c(F)c1] |
| 1-2-324 | 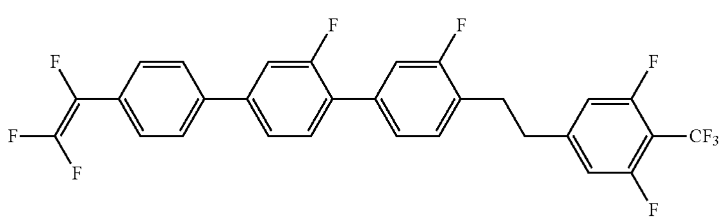 [SMILES: FC(F)=C(F)c1ccc(-c2ccc(-c3ccc(CCc4cc(F)c(C(F)(F)F)c(F)c4)c(F)c3)c(F)c2)cc1] |
| 1-2-325 | 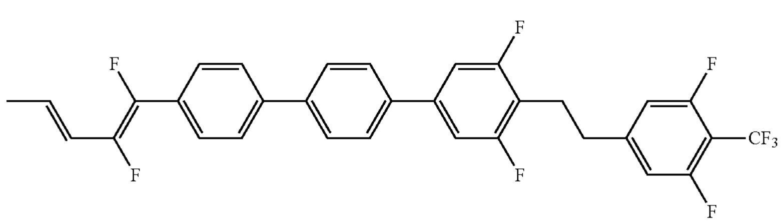 [SMILES: C/C=C/C(F)=C(\F)c1ccc(-c2ccc(-c3cc(F)c(CCc4cc(F)c(C(F)(F)F)c(F)c4)c(F)c3)cc2)cc1] |

-continued
| Formula 62 |
|---|
| No. |
1-2-326
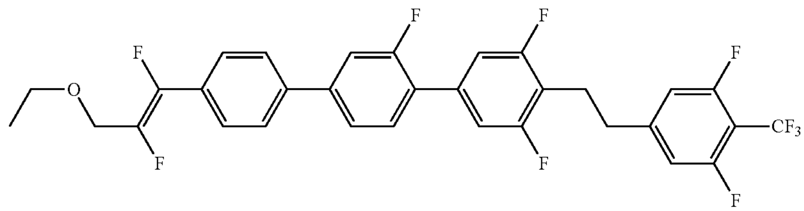 [SMILES: CCOC/C(F)=C(\F)c1ccc(-c2ccc(-c3cc(F)c(CCc4cc(F)c(C(F)(F)F)c(F)c4)c(F)c3)c(F)c2)cc1]
1-2-327
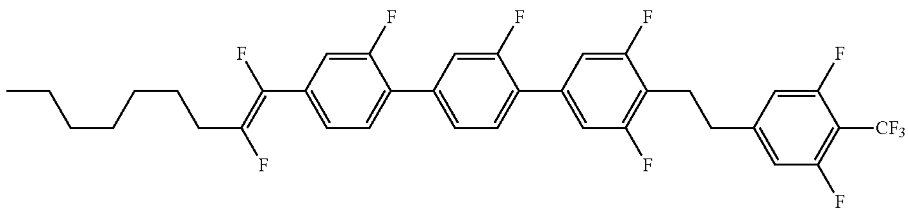 [SMILES: CCCCCCC/C(F)=C(\F)c1ccc(-c2ccc(-c3cc(F)c(CCc4cc(F)c(C(F)(F)F)c(F)c4)c(F)c3)c(F)c2)c(F)c1]
1-2-328
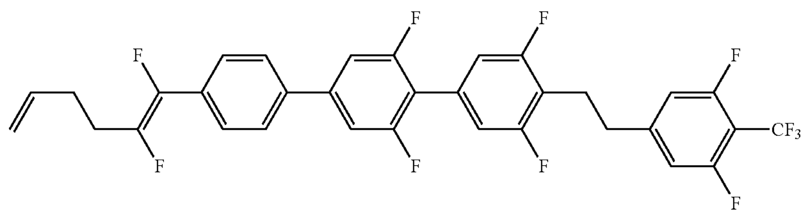 [SMILES: C=CCC/C(F)=C(\F)c1ccc(-c2cc(F)c(-c3cc(F)c(CCc4cc(F)c(C(F)(F)F)c(F)c4)c(F)c3)c(F)c2)cc1]
1-2-329
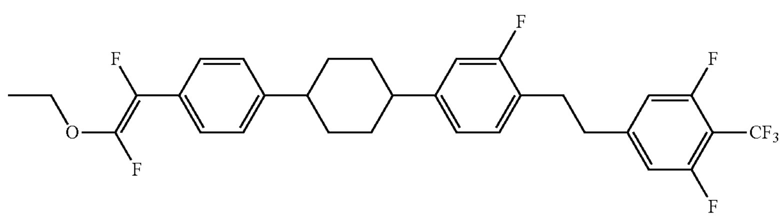 [SMILES: CCO/C(F)=C(\F)c1ccc(C2CCC(c3ccc(CCc4cc(F)c(C(F)(F)F)c(F)c4)c(F)c3)CC2)cc1]
1-2-330
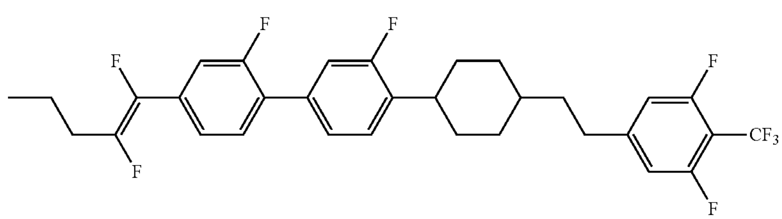 [SMILES: CCC/C(F)=C(\F)c1ccc(-c2ccc(C3CCC(CCc4cc(F)c(C(F)(F)F)c(F)c4)CC3)c(F)c2)c(F)c1]
1-2-331
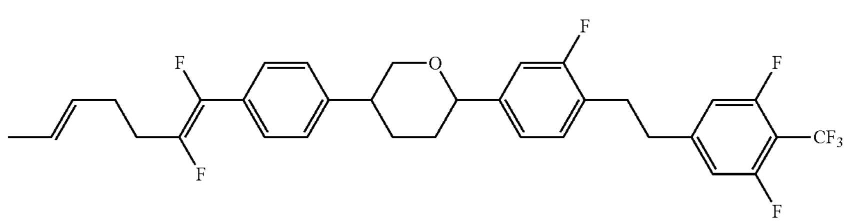 [SMILES: C/C=C/CC/C(F)=C(\F)c1ccc(C2CCC(c3ccc(CCc4cc(F)c(C(F)(F)F)c(F)c4)c(F)c3)OC2)cc1]
1-2-332
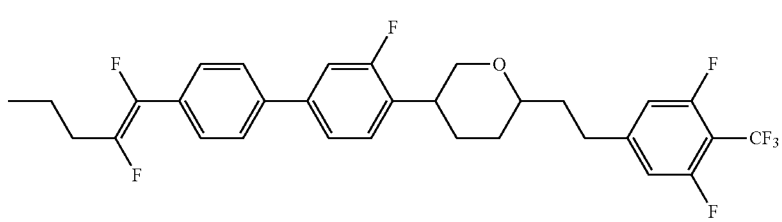 [SMILES: CCC/C(F)=C(\F)c1ccc(-c2ccc(C3CCC(CCc4cc(F)c(C(F)(F)F)c(F)c4)OC3)c(F)c2)cc1]

-continued
| Formula 62 | |
|---|---|
| No. | |
| 1-2-333 | 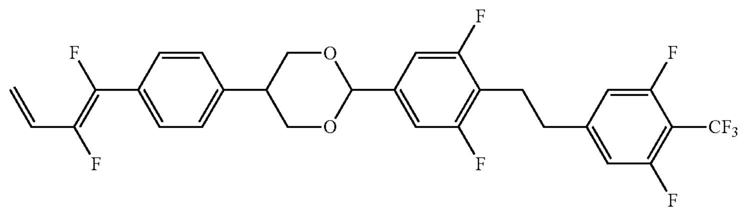 [SMILES: C=C/C(F)=C(\F)c1ccc(C2COC(c3cc(F)c(CCc4cc(F)c(C(F)(F)F)c(F)c4)c(F)c3)OC2)cc1] |
| 1-2-334 | 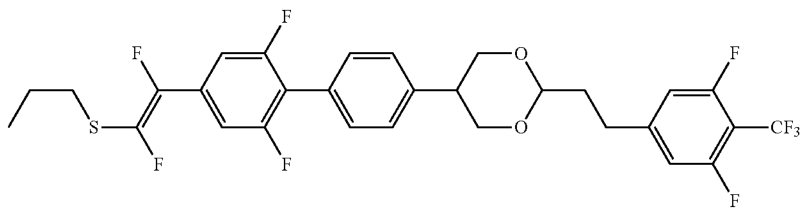 [SMILES: CCCS/C(F)=C(\F)c1cc(F)c(-c2ccc(C3COC(CCc4cc(F)c(C(F)(F)F)c(F)c4)OC3)cc2)c(F)c1] |
| 1-2-335 | 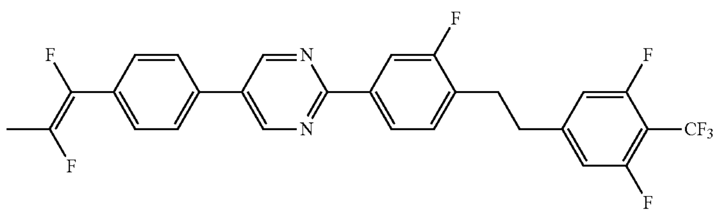 [SMILES: C/C(F)=C(\F)c1ccc(-c2cnc(-c3ccc(CCc4cc(F)c(C(F)(F)F)c(F)c4)c(F)c3)nc2)cc1] |
| 1-2-336 | 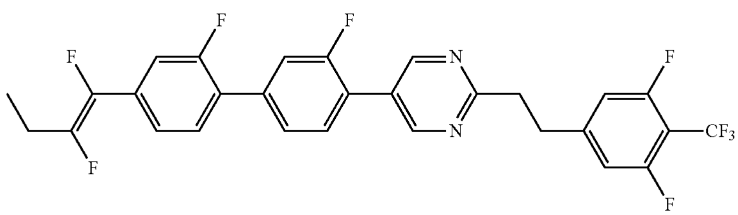 [SMILES: CC/C(F)=C(\F)c1ccc(-c2ccc(-c3cnc(CCc4cc(F)c(C(F)(F)F)c(F)c4)nc3)c(F)c2)c(F)c1] |
| 1-2-337 | 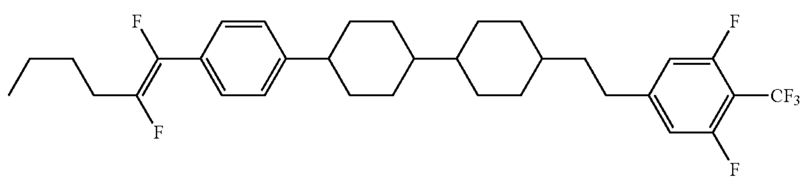 [SMILES: CCCC/C(F)=C(\F)c1ccc(C2CCC(C3CCC(CCc4cc(F)c(C(F)(F)F)c(F)c4)CC3)CC2)cc1] |
| 1-2-338 | 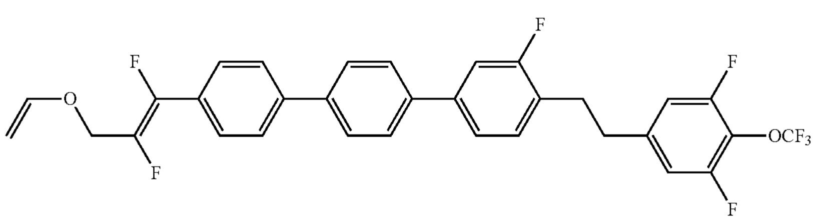 [SMILES: C=COC/C(F)=C(\F)c1ccc(-c2ccc(-c3ccc(CCc4cc(F)c(OC(F)(F)F)c(F)c4)c(F)c3)cc2)cc1] |
| 1-2-339 | 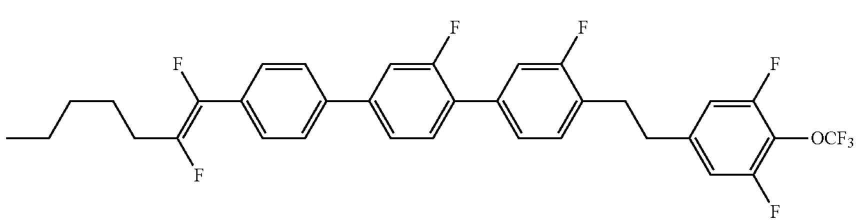 [SMILES: CCCCC/C(F)=C(\F)c1ccc(-c2ccc(-c3ccc(CCc4cc(F)c(OC(F)(F)F)c(F)c4)c(F)c3)c(F)c2)cc1] |

-continued
| Formula 62 | |
|---|---|
| No. | |
| 1-2-340 | 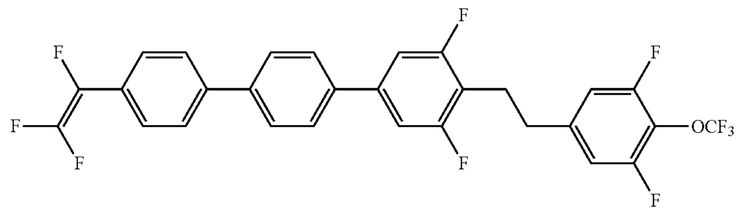 [SMILES: FC(F)=C(F)c1ccc(-c2ccc(-c3cc(F)c(CCc4cc(F)c(OC(F)(F)F)c(F)c4)c(F)c3)cc2)cc1] |
| Formula 63 | |
|---|---|
| No. | |
| 1-2-341 | 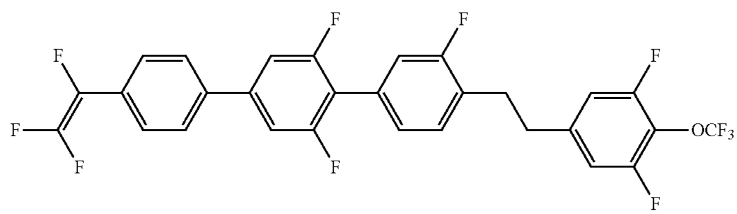 |
| 1-2-342 | 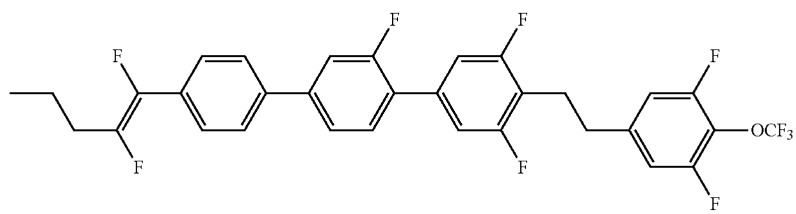 [SMILES: CCC/C(F)=C(\F)c1ccc(-c2ccc(-c3cc(F)c(CCc4cc(F)c(OC(F)(F)F)c(F)c4)c(F)c3)c(F)c2)cc1] |
| 1-2-343 | 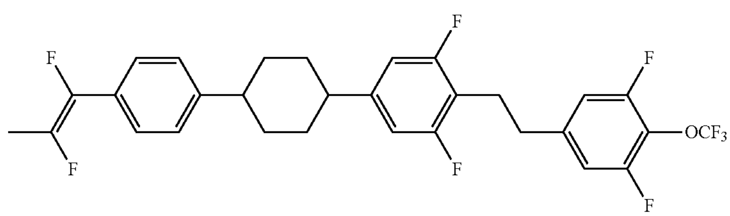 [SMILES: C/C(F)=C(\F)c1ccc(C2CCC(c3cc(F)c(CCc4cc(F)c(OC(F)(F)F)c(F)c4)c(F)c3)CC2)cc1] |
| 1-2-344 | 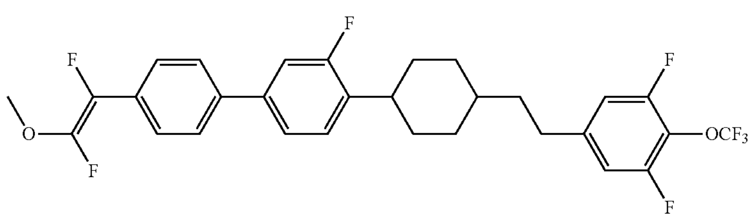 [SMILES: CO/C(F)=C(\F)c1ccc(-c2ccc(C3CCC(CCc4cc(F)c(OC(F)(F)F)c(F)c4)CC3)c(F)c2)cc1] |
| 1-2-345 | 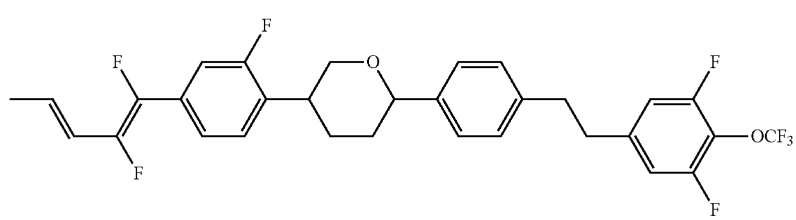 [SMILES: C/C=C/C(F)=C(\F)c1ccc(C2CCC(c3ccc(CCc4cc(F)c(OC(F)(F)F)c(F)c4)cc3)OC2)c(F)c1] |

-continued
| Formula 63 |
|---|
| No. |
1-2-346
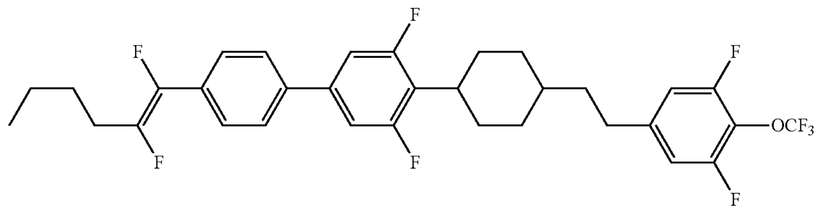 [SMILES: CCCC/C(F)=C(\F)c1ccc(-c2cc(F)c(C3CCC(CCc4cc(F)c(OC(F)(F)F)c(F)c4)CC3)c(F)c2)cc1]
1-2-347
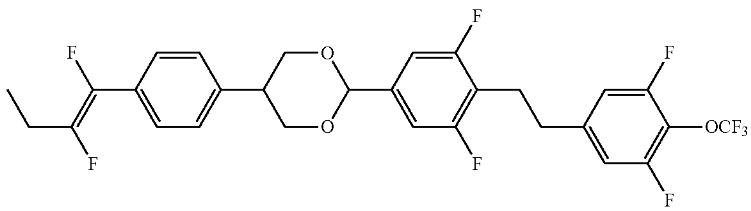 [SMILES: CC/C(F)=C(\F)c1ccc(C2COC(c3cc(F)c(CCc4cc(F)c(OC(F)(F)F)c(F)c4)c(F)c3)OC2)cc1]
1-2-348
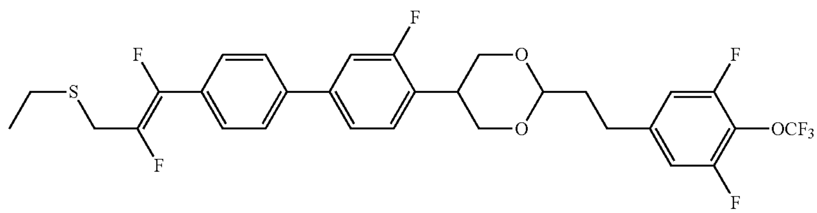
1-2-349
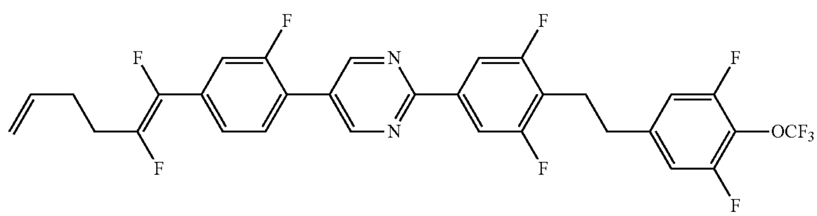 [SMILES: C=CCC/C(F)=C(\F)c1ccc(-c2cnc(-c3cc(F)c(CCc4cc(F)c(OC(F)(F)F)c(F)c4)c(F)c3)nc2)c(F)c1]
1-2-350
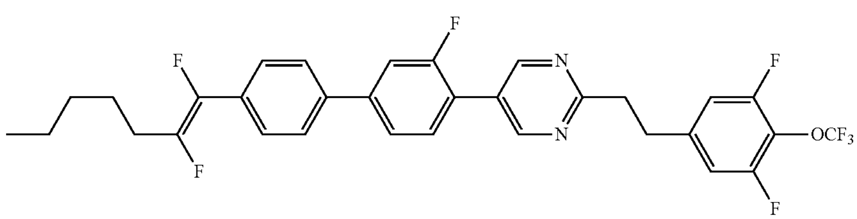 [SMILES: CCCCC/C(F)=C(\F)c1ccc(-c2ccc(-c3cnc(CCc4cc(F)c(OC(F)(F)F)c(F)c4)nc3)c(F)c2)cc1]
1-2-351
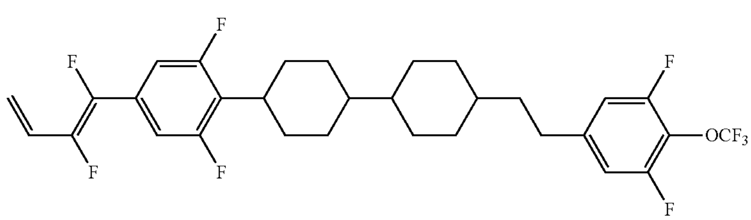 [SMILES: C=C/C(F)=C(\F)c1cc(F)c(C2CCC(C3CCC(CCc4cc(F)c(OC(F)(F)F)c(F)c4)CC3)CC2)c(F)c1]
1-2-352
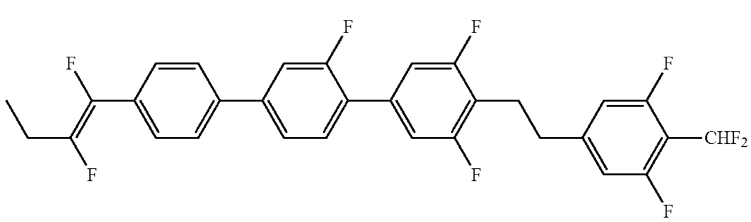 [SMILES: CC/C(F)=C(\F)c1ccc(-c2ccc(-c3cc(F)c(CCc4cc(F)c(C(F)F)c(F)c4)c(F)c3)c(F)c2)cc1]

-continued
| Formula 63 | |
|---|---|
| No. | |
| 1-2-353 | 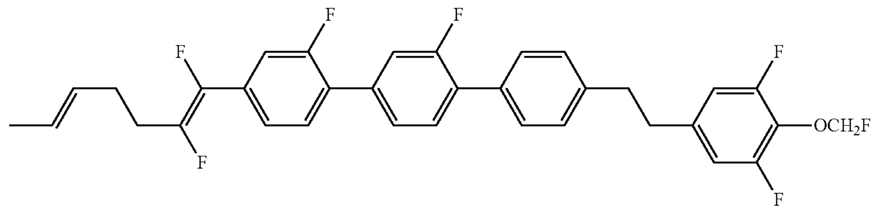 |
| 1-2-354 | 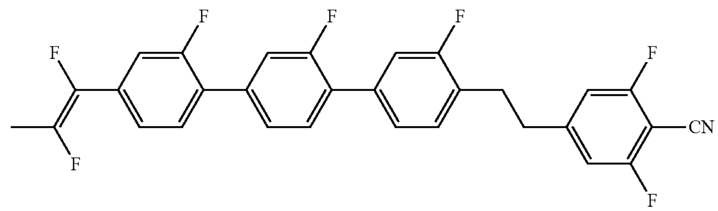 [SMILES: C/C(F)=C(\F)c1ccc(-c2ccc(-c3ccc(CCc4cc(F)c(C#N)c(F)c4)c(F)c3)c(F)c2)c(F)c1] |
| 1-2-355 | 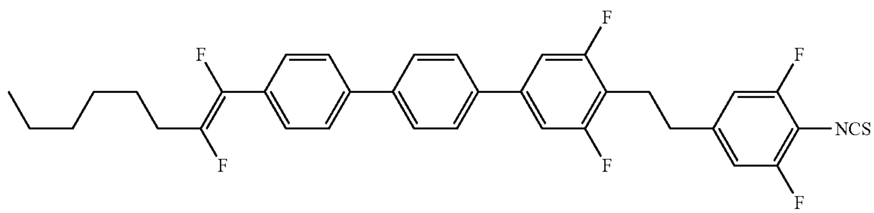 |
| 1-2-356 | 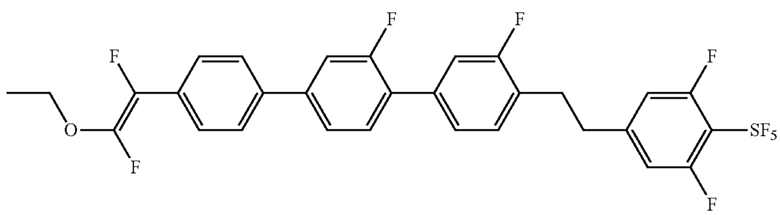 |
| 1-2-357 | 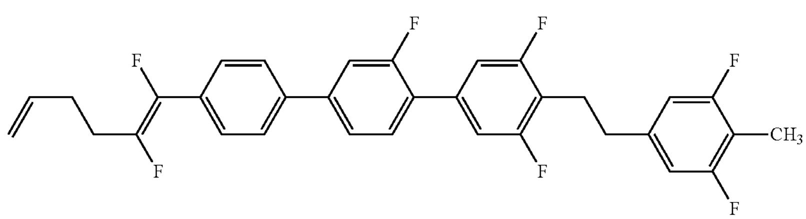 [SMILES: C=CCC/C(F)=C(\F)c1ccc(-c2ccc(-c3cc(F)c(CCc4cc(F)c(C)c(F)c4)c(F)c3)c(F)c2)cc1] |
| 1-2-358 | 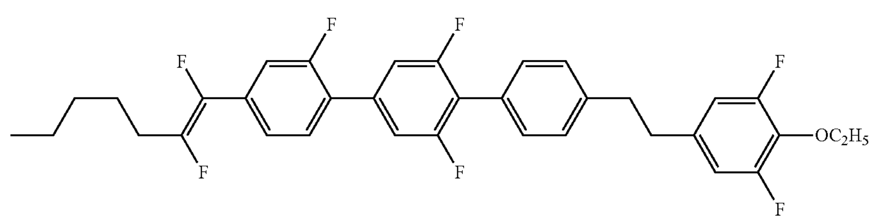 [SMILES: CCCCC/C(F)=C(\F)c1ccc(-c2cc(F)c(-c3ccc(CCc4cc(F)c(OCC)c(F)c4)cc3)c(F)c2)c(F)c1] |
| 1-2-359 | 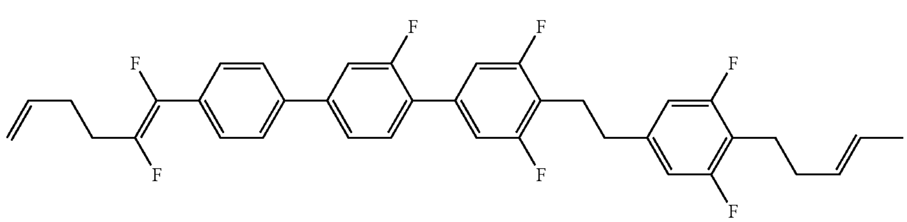 [SMILES: C=CCC/C(F)=C(\F)c1ccc(-c2ccc(-c3cc(F)c(CCc4cc(F)c(CC/C=C/C)c(F)c4)c(F)c3)c(F)c2)cc1] |

-continued
| Formula 63 |
|---|
| No. |
| 1-2-360 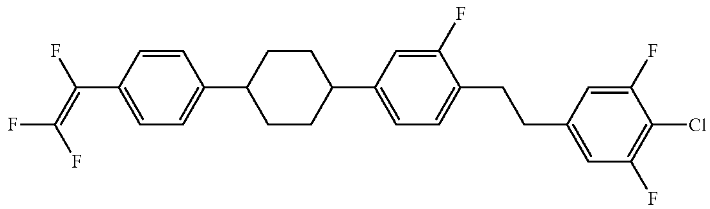 [SMILES: FC(F)=C(F)c1ccc(C2CCC(c3ccc(CCc4cc(F)c(Cl)c(F)c4)c(F)c3)CC2)cc1] |
| Formula 64 |
|---|
| No. |
| 1-2-361 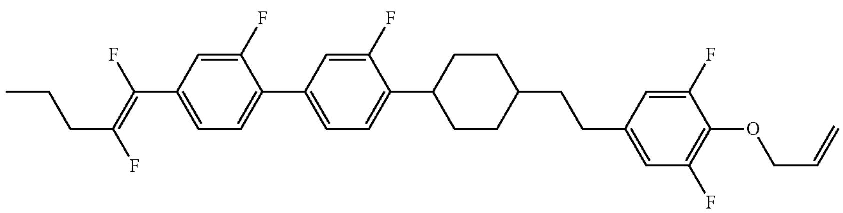 [SMILES: C=CCOc1c(F)cc(CCC2CCC(c3ccc(-c4ccc(/C(F)=C(\F)CCC)cc4F)cc3F)CC2)cc1F] |
| 1-2-362 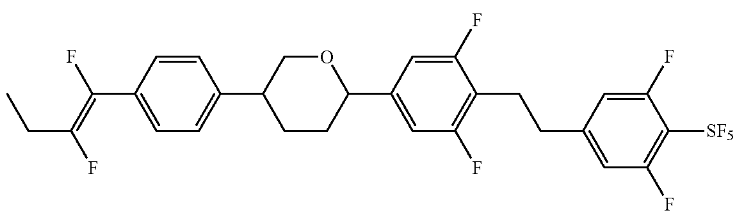 |
| 1-2-363 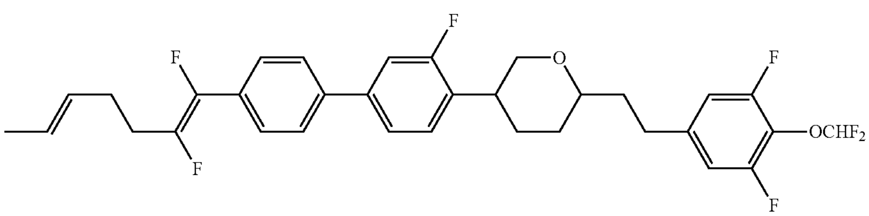 [SMILES: C/C=C/CC/C(F)=C(\F)c1ccc(-c2ccc(C3CCC(CCc4cc(F)c(OC(F)F)c(F)c4)OC3)c(F)c2)cc1] |
| 1-2-364 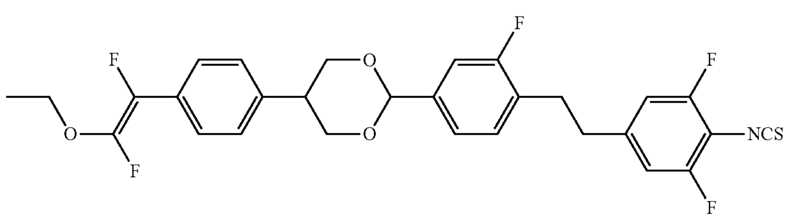 |
| 1-2-365 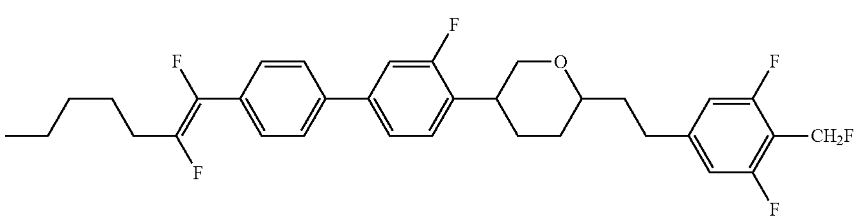 |

-continued
| Formula 64 | |
|---|---|
| No. | |
| 1-2-366 | 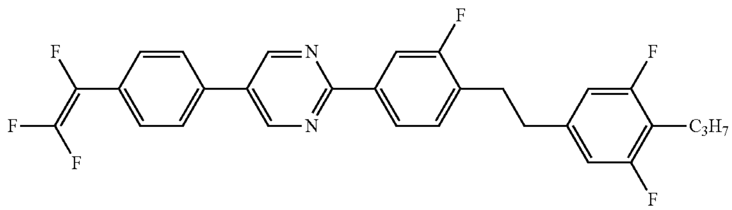 |
| 1-2-367 | 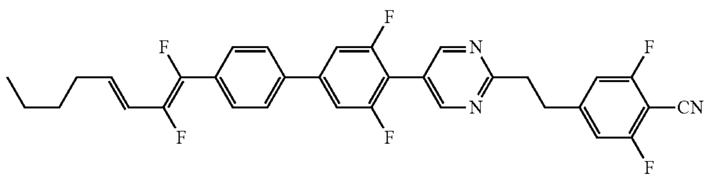 [SMILES: CCCC/C=C/C(F)=C(\F)c1ccc(-c2cc(F)c(-c3cnc(CCc4cc(F)c(C#N)c(F)c4)nc3)c(F)c2)cc1] |
| 1-2-368 | 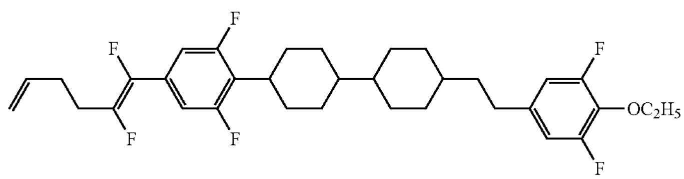 [SMILES: C=CCC/C(F)=C(\F)c1cc(F)c(C2CCC(C3CCC(CCc4cc(F)c(OCC)c(F)c4)CC3)CC2)c(F)c1] |
| 1-2-369 | 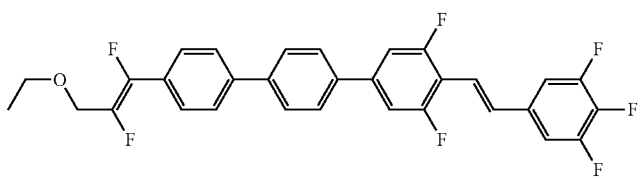 [SMILES: CCOC/C(F)=C(\F)c1ccc(-c2ccc(-c3cc(F)c(/C=C/c4cc(F)c(F)c(F)c4)c(F)c3)cc2)cc1] |
| 1-2-370 | 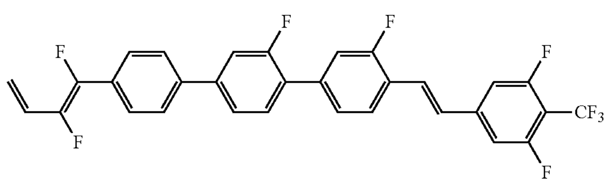 [SMILES: C=C/C(F)=C(\F)c1ccc(-c2ccc(-c3ccc(/C=C/c4cc(F)c(C(F)(F)F)c(F)c4)c(F)c3)c(F)c2)cc1] |
| 1-2-371 | 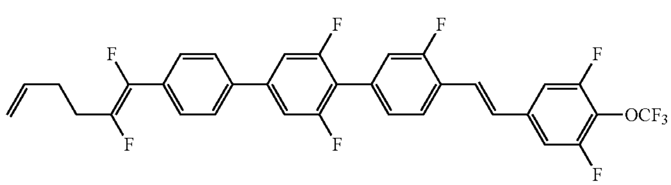 [SMILES: C=CCC/C(F)=C(\F)c1ccc(-c2cc(F)c(-c3ccc(/C=C/c4cc(F)c(OC(F)(F)F)c(F)c4)c(F)c3)c(F)c2)cc1] |
| 1-2-372 | 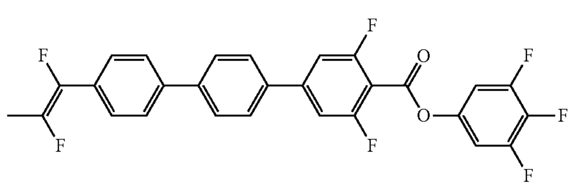 [SMILES: C/C(F)=C(\F)c1ccc(-c2ccc(-c3cc(F)c(C(=O)Oc4cc(F)c(F)c(F)c4)c(F)c3)cc2)cc1] |
| 1-2-373 | 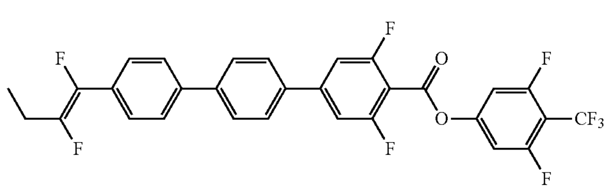 [SMILES: CC/C(F)=C(\F)c1ccc(-c2ccc(-c3cc(F)c(C(=O)Oc4cc(F)c(C(F)(F)F)c(F)c4)c(F)c3)cc2)cc1] |

-continued
| Formula 64 | |
|---|---|
| No. | |
| 1-2-374 | 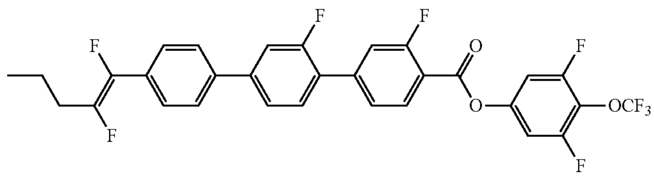 [SMILES: CCC/C(F)=C(\F)c1ccc(-c2ccc(-c3ccc(C(=O)Oc4cc(F)c(OC(F)(F)F)c(F)c4)c(F)c3)c(F)c2)cc1] |
| 1-2-375 | 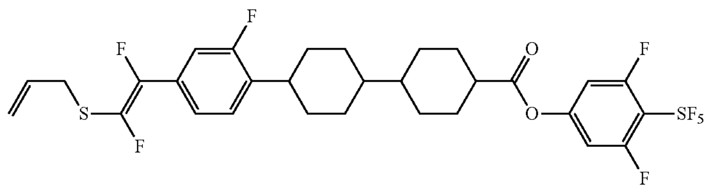 |
| 1-2-376 | 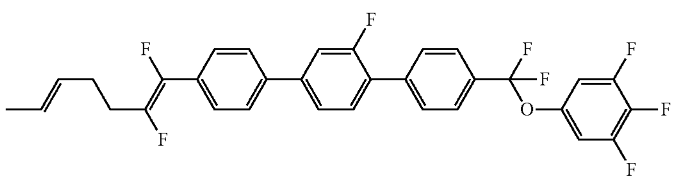 [SMILES: C/C=C/CC/C(F)=C(\F)c1ccc(-c2ccc(-c3ccc(C(F)(F)Oc4cc(F)c(F)c(F)c4)cc3)c(F)c2)cc1] |
| 1-2-377 | 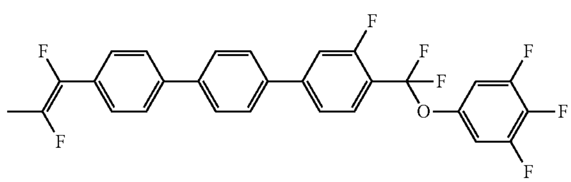 [SMILES: C/C(F)=C(\F)c1ccc(-c2ccc(-c3ccc(C(F)(F)Oc4cc(F)c(F)c(F)c4)c(F)c3)cc2)cc1] |
| 1-2-378 | 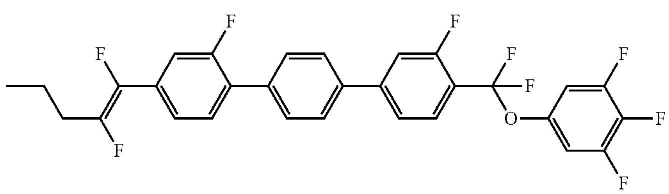 [SMILES: CCC/C(F)=C(\F)c1ccc(-c2ccc(-c3ccc(C(F)(F)Oc4cc(F)c(F)c(F)c4)c(F)c3)cc2)c(F)c1] |
| 1-2-379 | 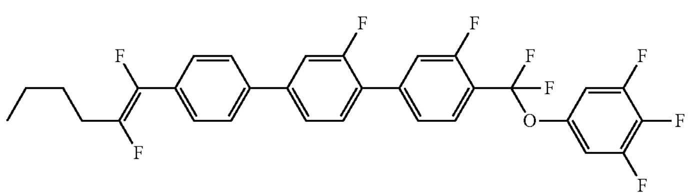 [SMILES: CCCC/C(F)=C(\F)c1ccc(-c2ccc(-c3ccc(C(F)(F)Oc4cc(F)c(F)c(F)c4)c(F)c3)c(F)c2)cc1] |
| 1-2-380 | 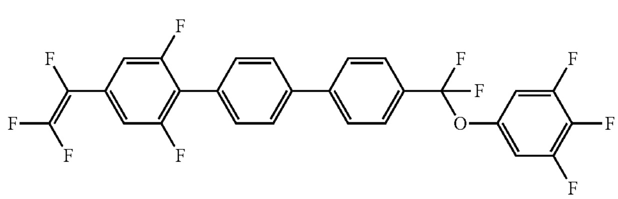 [SMILES: FC(F)=C(F)c1cc(F)c(-c2ccc(-c3ccc(C(F)(F)Oc4cc(F)c(F)c(F)c4)cc3)cc2)c(F)c1] |

| Formula 65 | |
|---|---|
| No. | |
| 1-2-381 | 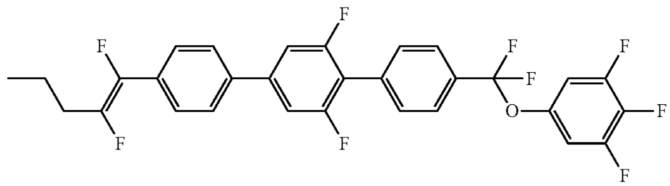 [SMILES: CCC/C(F)=C(\F)c1ccc(-c2cc(F)c(-c3ccc(C(F)(F)Oc4cc(F)c(F)c(F)c4)cc3)c(F)c2)cc1] |
| 1-2-382 | 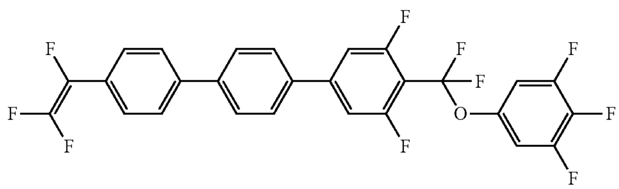 [SMILES: FC(F)=C(F)c1ccc(-c2ccc(-c3cc(F)c(C(F)(F)Oc4cc(F)c(F)c(F)c4)c(F)c3)cc2)cc1] |
| 1-2-383 | 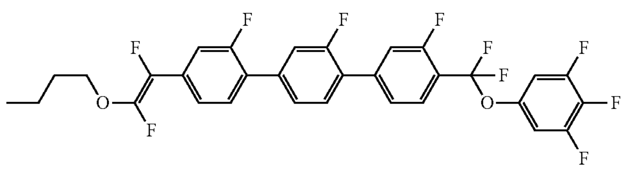 [SMILES: CCCCO/C(F)=C(\F)c1ccc(-c2ccc(-c3ccc(C(F)(F)Oc4cc(F)c(F)c(F)c4)c(F)c3)c(F)c2)c(F)c1] |
| 1-2-384 | 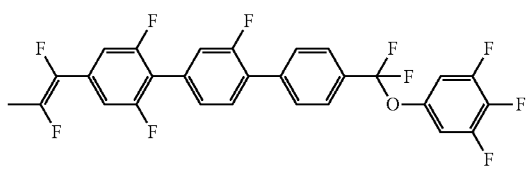 [SMILES: C/C(F)=C(\F)c1cc(F)c(-c2ccc(-c3ccc(C(F)(F)Oc4cc(F)c(F)c(F)c4)cc3)c(F)c2)c(F)c1] |
| 1-2-385 | 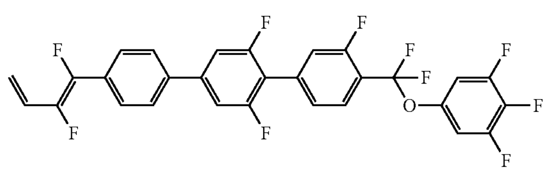 [SMILES: C=C/C(F)=C(\F)c1ccc(-c2cc(F)c(-c3ccc(C(F)(F)Oc4cc(F)c(F)c(F)c4)c(F)c3)c(F)c2)cc1] |
| 1-2-386 | 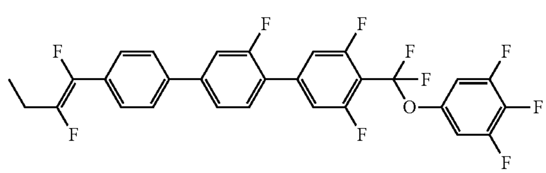 [SMILES: CC/C(F)=C(\F)c1ccc(-c2ccc(-c3cc(F)c(C(F)(F)Oc4cc(F)c(F)c(F)c4)c(F)c3)c(F)c2)cc1] |
| 1-2-387 | 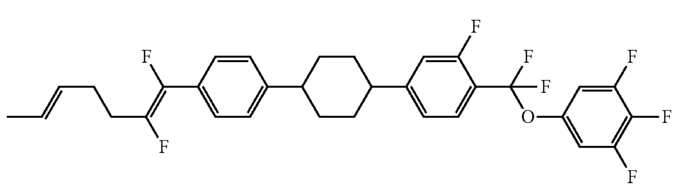 [SMILES: C/C=C/CC/C(F)=C(\F)c1ccc(C2CCC(c3ccc(C(F)(F)Oc4cc(F)c(F)c(F)c4)c(F)c3)CC2)cc1] |
| 1-2-388 | 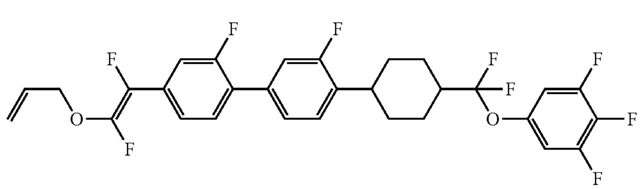 [SMILES: C=CCO/C(F)=C(\F)c1ccc(-c2ccc(C3CCC(C(F)(F)Oc4cc(F)c(F)c(F)c4)CC3)c(F)c2)c(F)c1] |

-continued
Formula 65
| No. | |
|---|---|
| 1-2-389 | 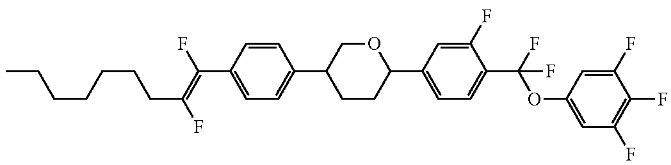 [SMILES: CCCCCCC/C(F)=C(\F)c1ccc(C2CCC(c3ccc(C(F)(F)Oc4cc(F)c(F)c(F)c4)c(F)c3)OC2)cc1] |
| 1-2-390 | 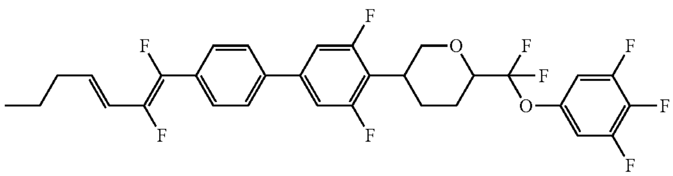 [SMILES: CCC/C=C/C(F)=C(\F)c1ccc(-c2cc(F)c(C3CCC(C(F)(F)Oc4cc(F)c(F)c(F)c4)OC3)c(F)c2)cc1] |
| 1-2-391 | 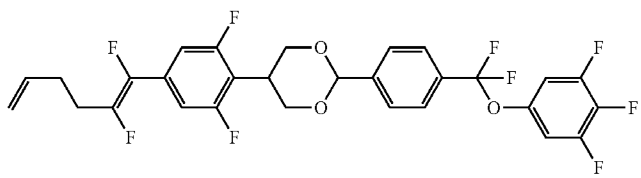 [SMILES: C=CCC/C(F)=C(\F)c1cc(F)c(C2COC(c3ccc(C(F)(F)Oc4cc(F)c(F)c(F)c4)cc3)OC2)c(F)c1] |
| 1-2-392 | 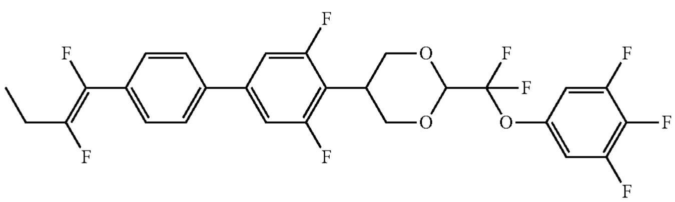 [SMILES: CC/C(F)=C(\F)c1ccc(-c2cc(F)c(C3COC(C(F)(F)Oc4cc(F)c(F)c(F)c4)OC3)c(F)c2)cc1] |
| 1-2-393 | 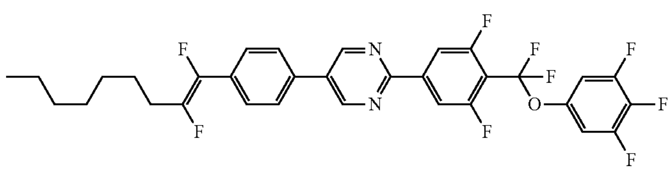 [SMILES: CCCCCCC/C(F)=C(\F)c1ccc(-c2cnc(-c3cc(F)c(C(F)(F)Oc4cc(F)c(F)c(F)c4)c(F)c3)nc2)cc1] |
| 1-2-394 | 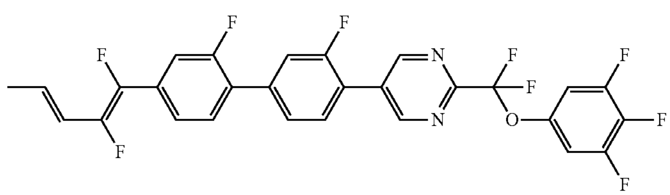 [SMILES: C/C=C/C(F)=C(\F)c1ccc(-c2ccc(-c3cnc(C(F)(F)Oc4cc(F)c(F)c(F)c4)nc3)c(F)c2)c(F)c1] |
| 1-2-395 | 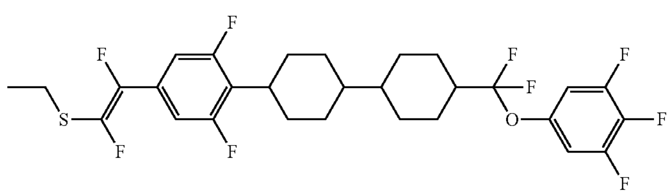 [SMILES: CCS/C(F)=C(\F)c1cc(F)c(C2CCC(C3CCC(C(F)(F)Oc4cc(F)c(F)c(F)c4)CC3)CC2)c(F)c1] |
| 1-2-396 | 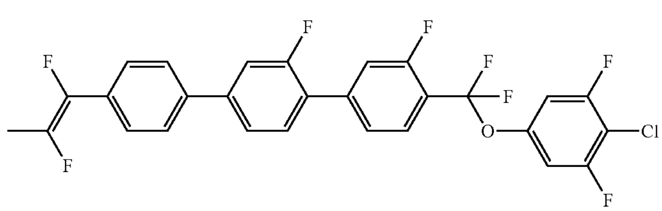 [SMILES: C/C(F)=C(\F)c1ccc(-c2ccc(-c3ccc(C(F)(F)Oc4cc(F)c(Cl)c(F)c4)c(F)c3)c(F)c2)cc1] |

-continued
| Formula 65 | |
|---|---|
| No. | |
| 1-2-397 | 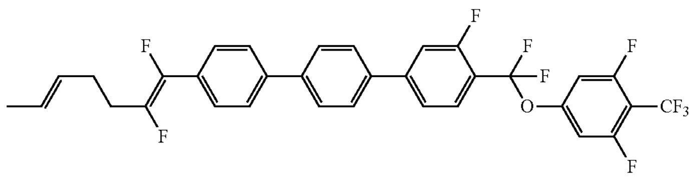 [SMILES: C/C=C/CC/C(F)=C(\F)c1ccc(-c2ccc(-c3ccc(C(F)(F)Oc4cc(F)c(C(F)(F)F)c(F)c4)c(F)c3)cc2)cc1] |
| 1-2-398 | 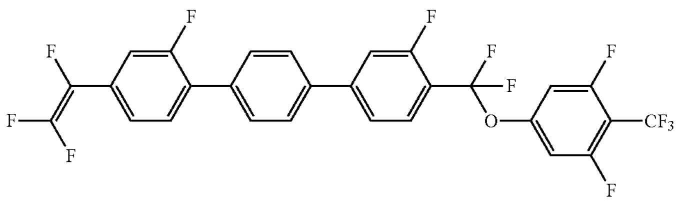 [SMILES: FC(F)=C(F)c1ccc(-c2ccc(-c3ccc(C(F)(F)Oc4cc(F)c(C(F)(F)F)c(F)c4)c(F)c3)cc2)c(F)c1] |
| 1-2-399 | 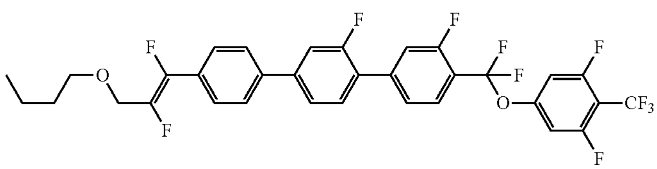 [SMILES: CCCCOC/C(F)=C(\F)c1ccc(-c2ccc(-c3ccc(C(F)(F)Oc4cc(F)c(C(F)(F)F)c(F)c4)c(F)c3)c(F)c2)cc1] |
| 1-2-400 | 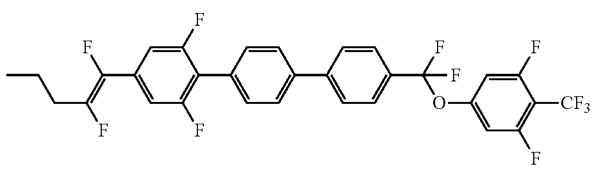 [SMILES: CCC/C(F)=C(\F)c1cc(F)c(-c2ccc(-c3ccc(C(F)(F)Oc4cc(F)c(C(F)(F)F)c(F)c4)cc3)cc2)c(F)c1] |
| Formula 66 | |
|---|---|
| No. | |
| 1-2-401 | 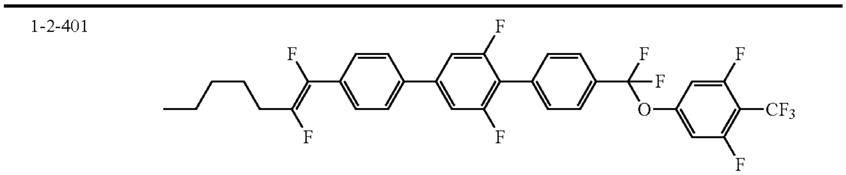 |
| 1-2-402 | 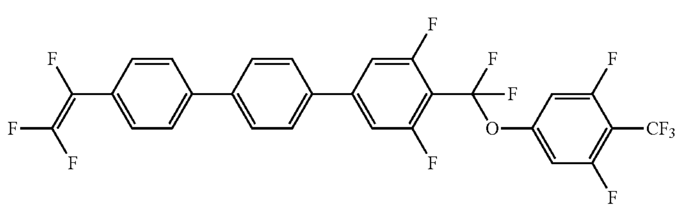 [SMILES: FC(F)=C(F)c1ccc(-c2ccc(-c3cc(F)c(C(F)(F)Oc4cc(F)c(C(F)(F)F)c(F)c4)c(F)c3)cc2)cc1] |
| 1-2-403 | 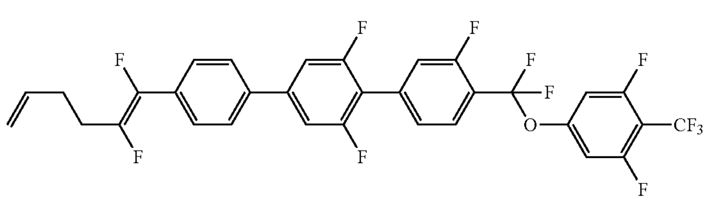 [SMILES: C=CCC/C(F)=C(\F)c1ccc(-c2cc(F)c(-c3ccc(C(F)(F)Oc4cc(F)c(C(F)(F)F)c(F)c4)c(F)c3)c(F)c2)cc1] |

-continued
| Formula 66 | |
|---|---|
| No. | |
| 1-2-404 | 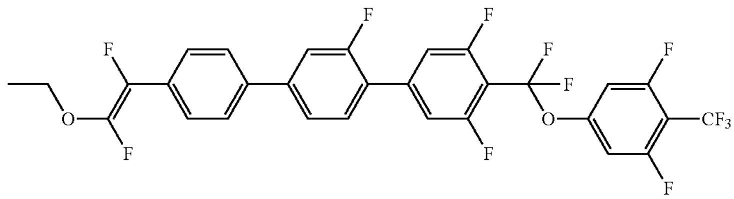 [SMILES: CCO/C(F)=C(\F)c1ccc(-c2ccc(-c3cc(F)c(C(F)(F)Oc4cc(F)c(C(F)(F)F)c(F)c4)c(F)c3)c(F)c2)cc1] |
| 1-2-405 | 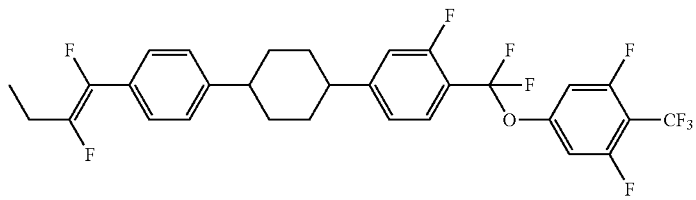 [SMILES: CC/C(F)=C(\F)c1ccc(C2CCC(c3ccc(C(F)(F)Oc4cc(F)c(C(F)(F)F)c(F)c4)c(F)c3)CC2)cc1] |
| 1-2-406 | 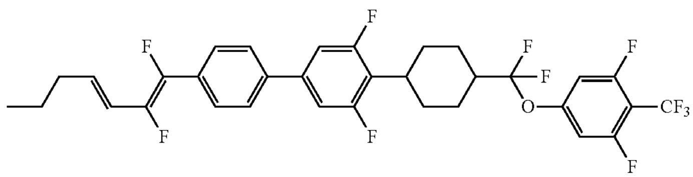 [SMILES: CCC/C=C/C(F)=C(\F)c1ccc(-c2cc(F)c(C3CCC(C(F)(F)Oc4cc(F)c(C(F)(F)F)c(F)c4)CC3)c(F)c2)cc1] |
| 1-2-407 | 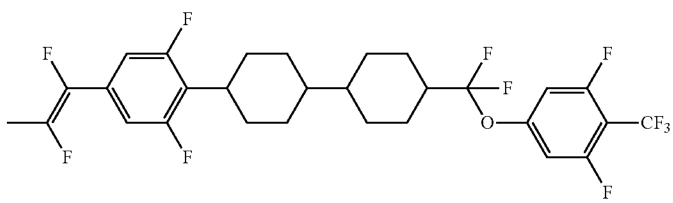 [SMILES: C/C(F)=C(\F)c1cc(F)c(C2CCC(C3CCC(C(F)(F)Oc4cc(F)c(C(F)(F)F)c(F)c4)CC3)CC2)c(F)c1] |
| 1-2-408 | 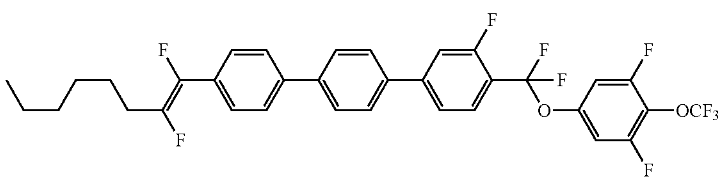 [SMILES: CCCCCC/C(F)=C(\F)c1ccc(-c2ccc(-c3ccc(C(F)(F)Oc4cc(F)c(OC(F)(F)F)c(F)c4)c(F)c3)cc2)cc1] |
| 1-2-409 | 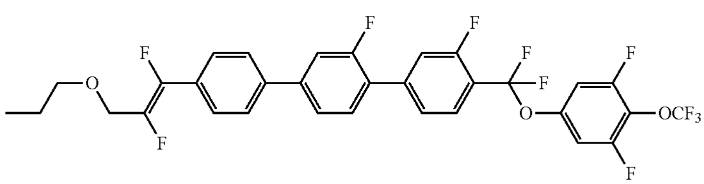 [SMILES: CCCOC/C(F)=C(\F)c1ccc(-c2ccc(-c3ccc(C(F)(F)Oc4cc(F)c(OC(F)(F)F)c(F)c4)c(F)c3)c(F)c2)cc1] |
| 1-2-410 | 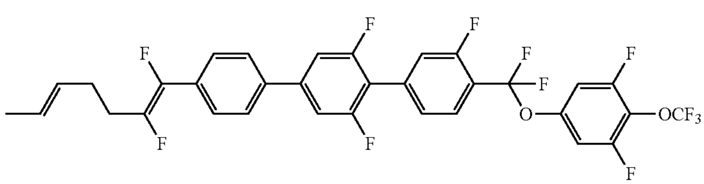 [SMILES: C/C=C/CC/C(F)=C(\F)c1ccc(-c2cc(F)c(-c3ccc(C(F)(F)Oc4cc(F)c(OC(F)(F)F)c(F)c4)c(F)c3)c(F)c2)cc1] |
| 1-2-411 | 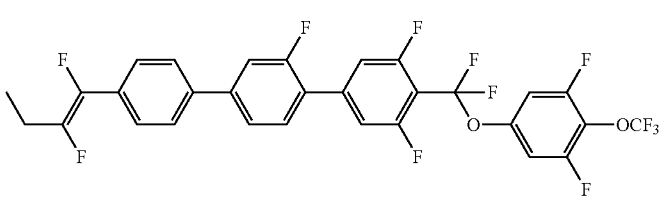 [SMILES: CC/C(F)=C(\F)c1ccc(-c2ccc(-c3cc(F)c(C(F)(F)Oc4cc(F)c(OC(F)(F)F)c(F)c4)c(F)c3)c(F)c2)cc1] |

-continued
| Formula 66 | |
|---|---|
| No. | |
| 1-2-412 | 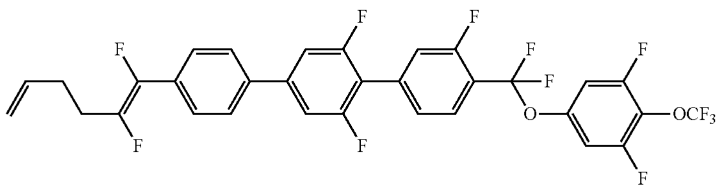 [SMILES: C=CCC/C(F)=C(\F)c1ccc(-c2cc(F)c(-c3ccc(C(F)(F)Oc4cc(F)c(OC(F)(F)F)c(F)c4)c(F)c3)c(F)c2)cc1] |
| 1-2-413 | 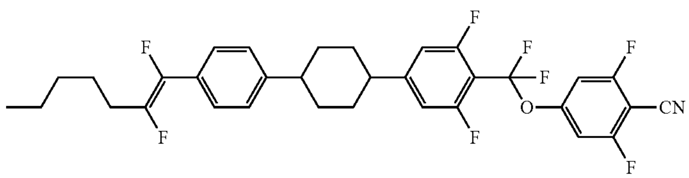 [SMILES: CCCCC/C(F)=C(\F)c1ccc(C2CCC(c3cc(F)c(C(F)(F)Oc4cc(F)c(C#N)c(F)c4)c(F)c3)CC2)cc1] |
| 1-2-414 | 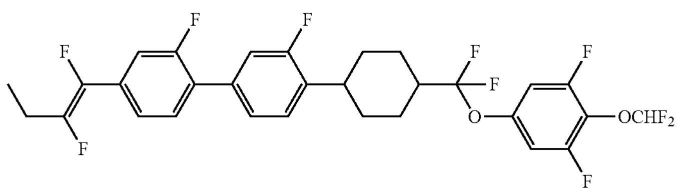 [SMILES: CC/C(F)=C(\F)c1ccc(-c2ccc(C3CCC(C(F)(F)Oc4cc(F)c(OC(F)F)c(F)c4)CC3)c(F)c2)c(F)c1] |
| 1-2-415 | 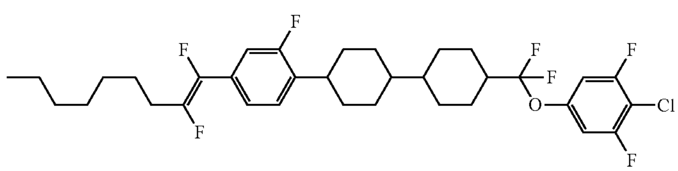 [SMILES: CCCCCCC/C(F)=C(\F)c1ccc(C2CCC(C3CCC(C(F)(F)Oc4cc(F)c(Cl)c(F)c4)CC3)CC2)c(F)c1] |
| 1-2-416 | 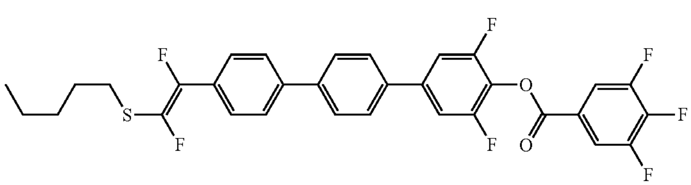 [SMILES: CCCCCS/C(F)=C(\F)c1ccc(-c2ccc(-c3cc(F)c(OC(=O)c4cc(F)c(F)c(F)c4)c(F)c3)cc2)cc1] |
| 1-2-417 | 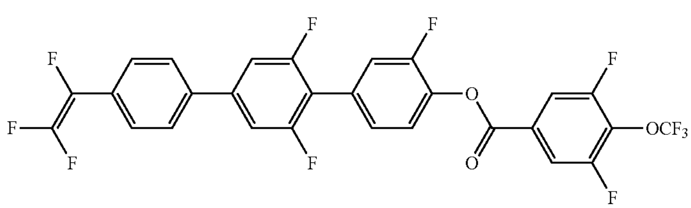 [SMILES: O=C(Oc1ccc(-c2c(F)cc(-c3ccc(C(F)=C(F)F)cc3)cc2F)cc1F)c1cc(F)c(OC(F)(F)F)c(F)c1] |
| 1-2-418 | 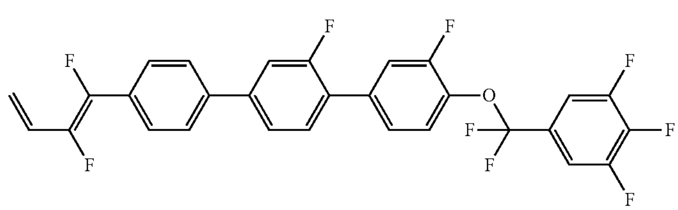 [SMILES: C=C/C(F)=C(\F)c1ccc(-c2ccc(-c3ccc(OC(F)(F)c4cc(F)c(F)c(F)c4)c(F)c3)c(F)c2)cc1] |
| 1-2-419 | 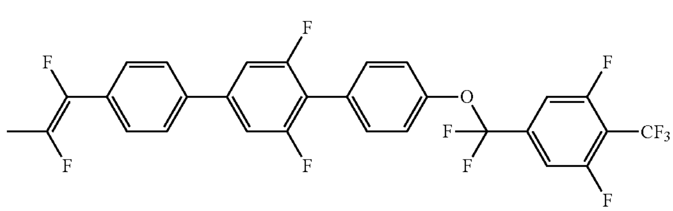 [SMILES: C/C(F)=C(\F)c1ccc(-c2cc(F)c(-c3ccc(OC(F)(F)c4cc(F)c(C(F)(F)F)c(F)c4)cc3)c(F)c2)cc1] |

-continued
Formula 66
| No. | |
|---|---|
| 1-2-420 | 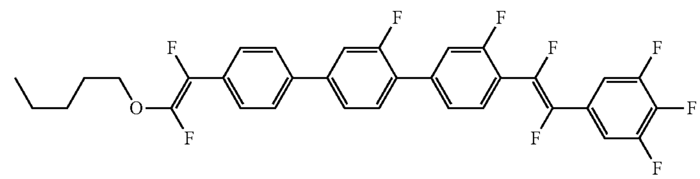 [SMILES: CCCCCO/C(F)=C(\F)c1ccc(-c2ccc(-c3ccc(/C(F)=C(\F)c4cc(F)c(F)c(F)c4)c(F)c3)c(F)c2)cc1] |
Formula 67
| No. | |
|---|---|
| 1-2-421 | 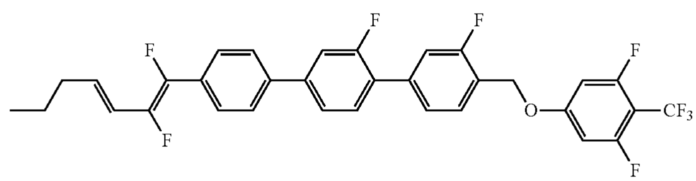 [SMILES: CCC/C=C/C(F)=C(\F)c1ccc(-c2ccc(-c3ccc(COc4cc(F)c(C(F)(F)F)c(F)c4)c(F)c3)c(F)c2)cc1] |
| 1-2-422 | 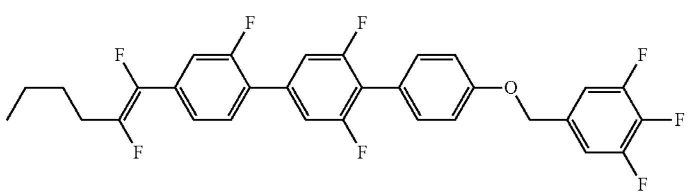 [SMILES: CCCC/C(F)=C(\F)c1ccc(-c2cc(F)c(-c3ccc(OCc4cc(F)c(F)c(F)c4)cc3)c(F)c2)c(F)c1] |
| 1-2-423 | 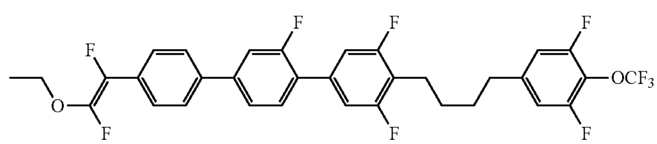 [SMILES: CCO/C(F)=C(\F)c1ccc(-c2ccc(-c3cc(F)c(CCCCc4cc(F)c(OC(F)(F)F)c(F)c4)c(F)c3)c(F)c2)cc1] |
| 1-2-424 | 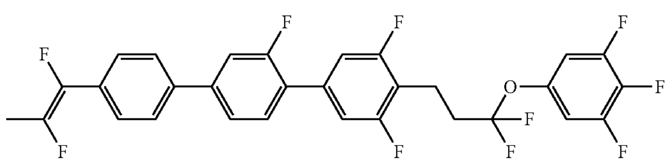 [SMILES: C/C(F)=C(\F)c1ccc(-c2ccc(-c3cc(F)c(CCC(F)(F)Oc4cc(F)c(F)c(F)c4)c(F)c3)c(F)c2)cc1] |
| 1-2-425 | 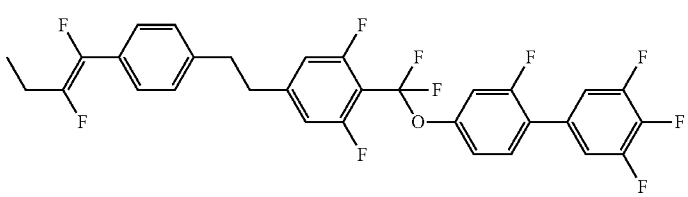 [SMILES: CC/C(F)=C(\F)c1ccc(CCc2cc(F)c(C(F)(F)Oc3ccc(-c4cc(F)c(F)c(F)c4)c(F)c3)c(F)c2)cc1] |
| 1-2-426 | 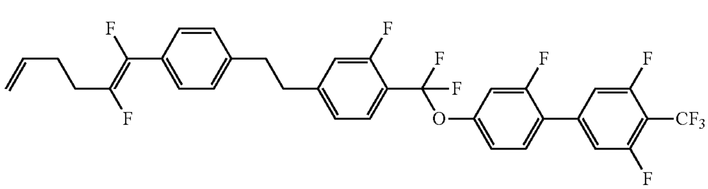 [SMILES: C=CCC/C(F)=C(\F)c1ccc(CCc2ccc(C(F)(F)Oc3ccc(-c4cc(F)c(C(F)(F)F)c(F)c4)c(F)c3)c(F)c2)cc1] |

-continued
Formula 67
| No. | |
|---|---|
| 1-2-427 | 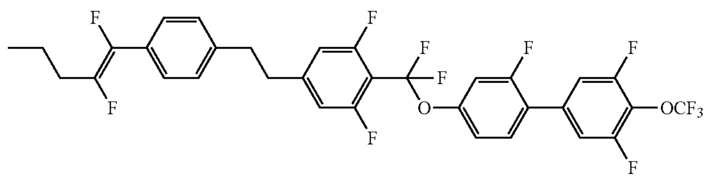 [SMILES: CCC/C(F)=C(\F)c1ccc(CCc2cc(F)c(C(F)(F)Oc3ccc(-c4cc(F)c(OC(F)(F)F)c(F)c4)c(F)c3)c(F)c2)cc1] |
| 1-2-428 | 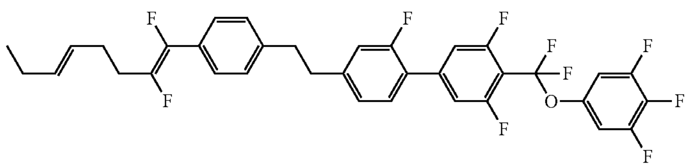 [SMILES: CC/C=C/CC/C(F)=C(\F)c1ccc(CCc2ccc(-c3cc(F)c(C(F)(F)Oc4cc(F)c(F)c(F)c4)c(F)c3)c(F)c2)cc1] |
| 1-2-429 | 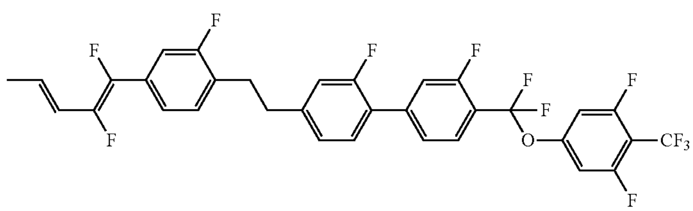 [SMILES: C/C=C/C(F)=C(\F)c1ccc(CCc2ccc(-c3ccc(C(F)(F)Oc4cc(F)c(C(F)(F)F)c(F)c4)c(F)c3)c(F)c2)c(F)c1] |
| 1-2-430 | 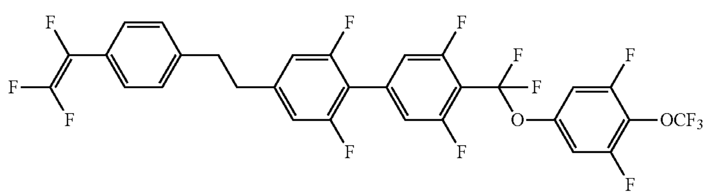 [SMILES: FC(F)=C(F)c1ccc(CCc2cc(F)c(-c3cc(F)c(C(F)(F)Oc4cc(F)c(OC(F)(F)F)c(F)c4)c(F)c3)c(F)c2)cc1] |
| 1-2-431 | 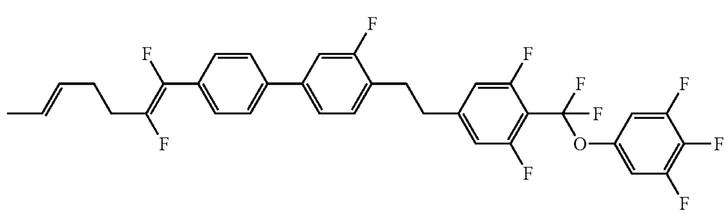 [SMILES: C/C=C/CC/C(F)=C(\F)c1ccc(-c2ccc(CCc3cc(F)c(C(F)(F)Oc4cc(F)c(F)c(F)c4)c(F)c3)c(F)c2)cc1] |
| 1-2-432 | 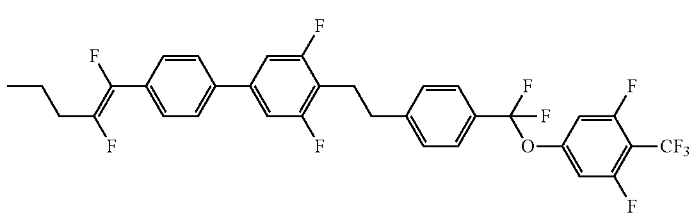 [SMILES: CCC/C(F)=C(\F)c1ccc(-c2cc(F)c(CCc3ccc(C(F)(F)Oc4cc(F)c(C(F)(F)F)c(F)c4)cc3)c(F)c2)cc1] |
| 1-2-433 | 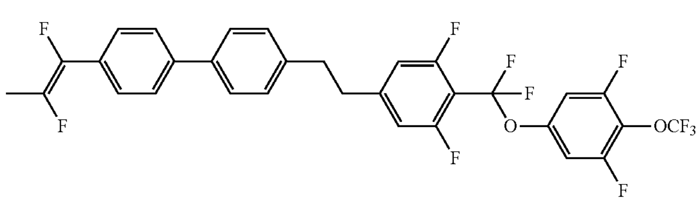 [SMILES: C/C(F)=C(\F)c1ccc(-c2ccc(CCc3cc(F)c(C(F)(F)Oc4cc(F)c(OC(F)(F)F)c(F)c4)c(F)c3)cc2)cc1] |

-continued
Formula 67
| No. | |
|---|---|
| 1-2-434 | 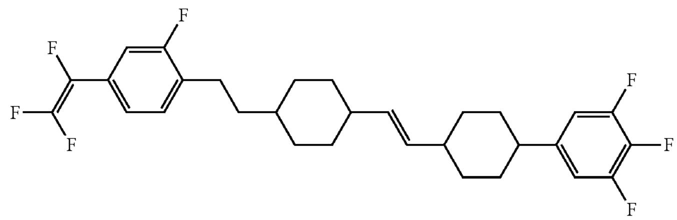 [SMILES: FC(F)=C(F)c1ccc(CCC2CCC(/C=C/C3CCC(c4cc(F)c(F)c(F)c4)CC3)CC2)c(F)c1] |
| 1-2-435 | 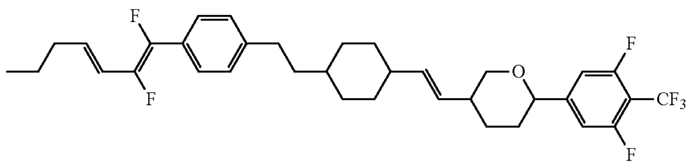 [SMILES: CCC/C=C/C(F)=C(\F)c1ccc(CCC2CCC(/C=C/C3CCC(c4cc(F)c(C(F)(F)F)c(F)c4)OC3)CC2)cc1] |
| 1-2-436 | 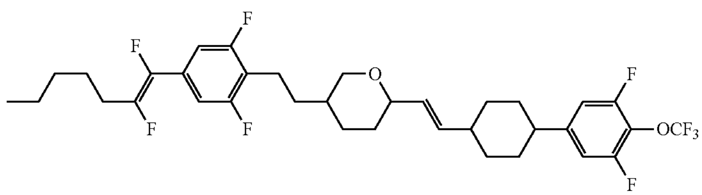 [SMILES: CCCCC/C(F)=C(\F)c1cc(F)c(CCC2CCC(/C=C/C3CCC(c4cc(F)c(OC(F)(F)F)c(F)c4)CC3)OC2)c(F)c1] |
| 1-2-437 | 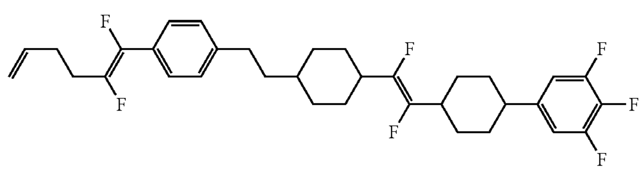 [SMILES: C=CCC/C(F)=C(\F)c1ccc(CCC2CCC(/C(F)=C(\F)C3CCC(c4cc(F)c(F)c(F)c4)CC3)CC2)cc1] |
| 1-2-438 | 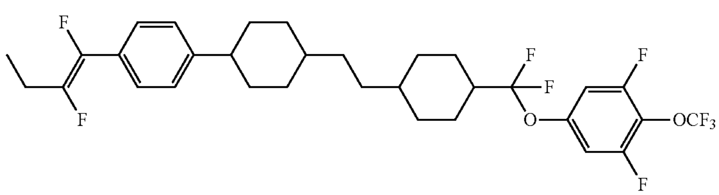 [SMILES: CC/C(F)=C(\F)c1ccc(C2CCC(CCC3CCC(C(F)(F)Oc4cc(F)c(OC(F)(F)F)c(F)c4)CC3)CC2)cc1] |
| 1-2-439 | 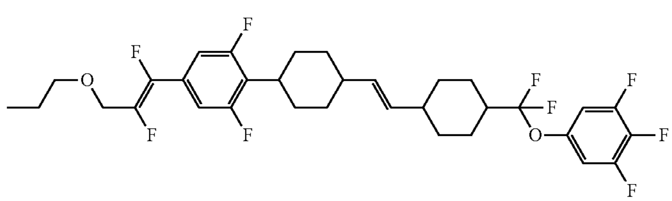 [SMILES: CCCOC/C(F)=C(\F)c1cc(F)c(C2CCC(/C=C/C3CCC(C(F)(F)Oc4cc(F)c(F)c(F)c4)CC3)CC2)c(F)c1] |
| 1-2-440 | 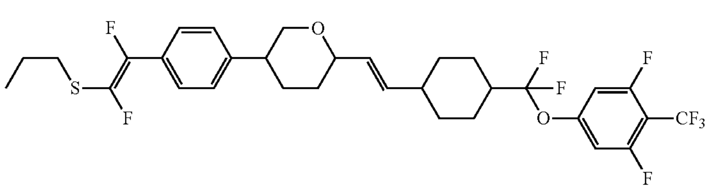 [SMILES: CCCS/C(F)=C(\F)c1ccc(C2CCC(/C=C/C3CCC(C(F)(F)Oc4cc(F)c(C(F)(F)F)c(F)c4)CC3)OC2)cc1] |

Formula 68
| No | |
|---|---|
| 1-3-1 | 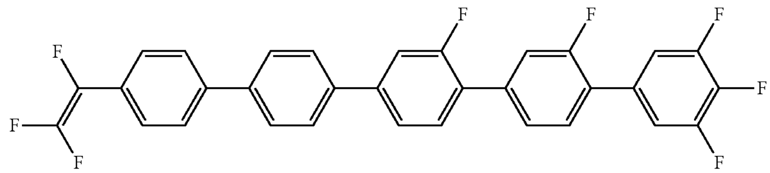 [SMILES: FC(F)=C(F)c1ccc(-c2ccc(-c3ccc(-c4ccc(-c5cc(F)c(F)c(F)c5)c(F)c4)c(F)c3)cc2)cc1] |
| 1-3-2 | 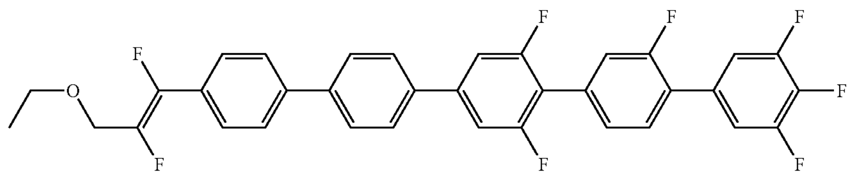 [SMILES: CCOC/C(F)=C(\F)c1ccc(-c2ccc(-c3cc(F)c(-c4ccc(-c5cc(F)c(F)c(F)c5)c(F)c4)c(F)c3)cc2)cc1] |
| 1-3-3 | 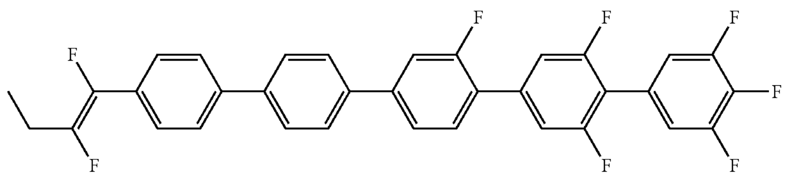 [SMILES: CC/C(F)=C(\F)c1ccc(-c2ccc(-c3ccc(-c4cc(F)c(-c5cc(F)c(F)c(F)c5)c(F)c4)c(F)c3)cc2)cc1] |
| 1-3-4 | 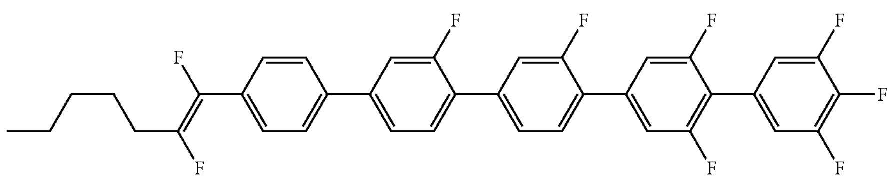 [SMILES: CCCCC/C(F)=C(\F)c1ccc(-c2ccc(-c3ccc(-c4cc(F)c(-c5cc(F)c(F)c(F)c5)c(F)c4)c(F)c3)c(F)c2)cc1] |
| 1-3-5 | 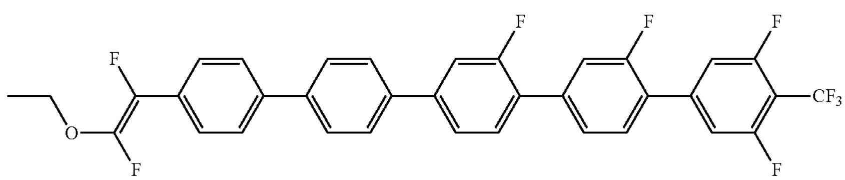 [SMILES: CCO/C(F)=C(\F)c1ccc(-c2ccc(-c3ccc(-c4ccc(-c5cc(F)c(C(F)(F)F)c(F)c5)c(F)c4)c(F)c3)cc2)cc1] |
| 1-3-6 | 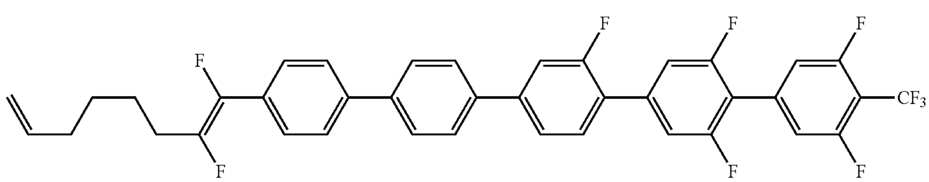 [SMILES: C=CCCCC/C(F)=C(\F)c1ccc(-c2ccc(-c3ccc(-c4cc(F)c(-c5cc(F)c(C(F)(F)F)c(F)c5)c(F)c4)c(F)c3)cc2)cc1] |
| 1-3-7 | 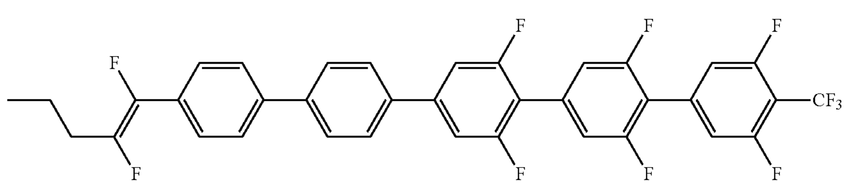 |
| 1-3-8 | 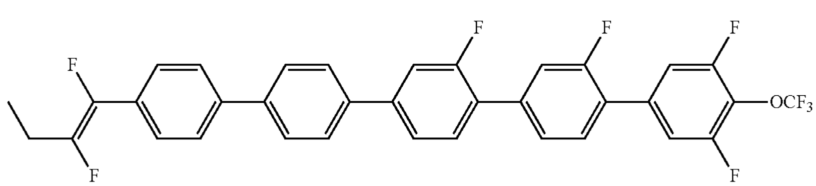 [SMILES: CC/C(F)=C(\F)c1ccc(-c2ccc(-c3ccc(-c4ccc(-c5cc(F)c(OC(F)(F)F)c(F)c5)c(F)c4)c(F)c3)cc2)cc1] |

-continued
| Formula 68 | |
|---|---|
| No | |
| 1-3-9 | 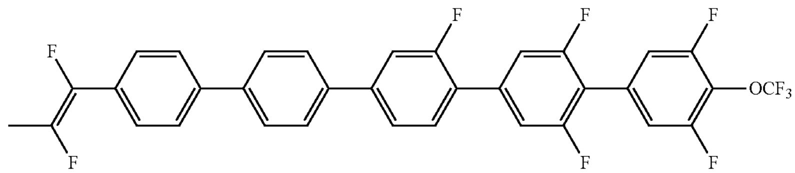 [SMILES: C/C(F)=C(\F)c1ccc(-c2ccc(-c3ccc(-c4cc(F)c(-c5cc(F)c(OC(F)(F)F)c(F)c5)c(F)c4)c(F)c3)cc2)cc1] |
| 1-3-10 | 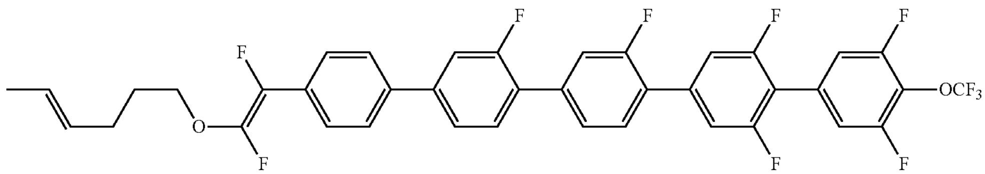 [SMILES: C/C=C/CCCO/C(F)=C(\F)c1ccc(-c2ccc(-c3ccc(-c4cc(F)c(-c5cc(F)c(OC(F)(F)F)c(F)c5)c(F)c4)c(F)c3)c(F)c2)cc1] |
| 1-3-11 | 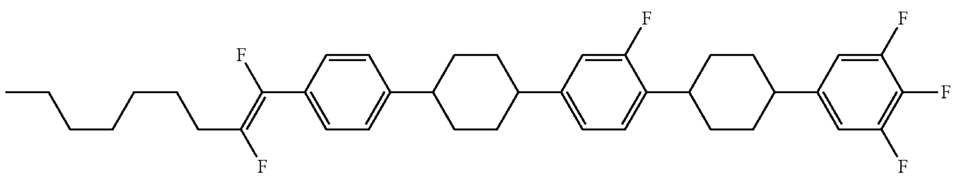 [SMILES: CCCCCCC/C(F)=C(\F)c1ccc(C2CCC(c3ccc(C4CCC(c5cc(F)c(F)c(F)c5)CC4)c(F)c3)CC2)cc1] |
| 1-3-12 | 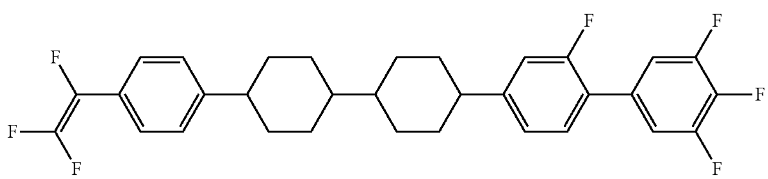 [SMILES: FC(F)=C(F)c1ccc(C2CCC(C3CCC(c4ccc(-c5cc(F)c(F)c(F)c5)c(F)c4)CC3)CC2)cc1] |
| 1-3-13 | 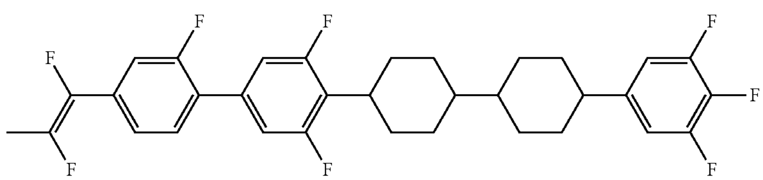 [SMILES: C/C(F)=C(\F)c1ccc(-c2cc(F)c(C3CCC(C4CCC(c5cc(F)c(F)c(F)c5)CC4)CC3)c(F)c2)c(F)c1] |
| 1-3-14 | 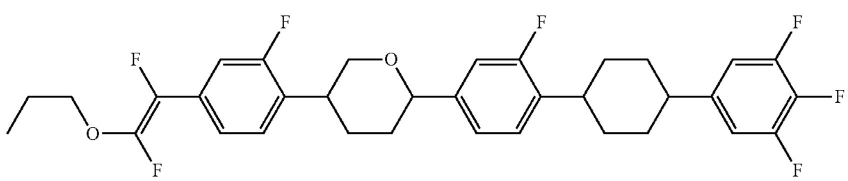 [SMILES: CCCO/C(F)=C(\F)c1ccc(C2CCC(c3ccc(C4CCC(c5cc(F)c(F)c(F)c5)CC4)c(F)c3)OC2)c(F)c1] |
| 1-3-15 | 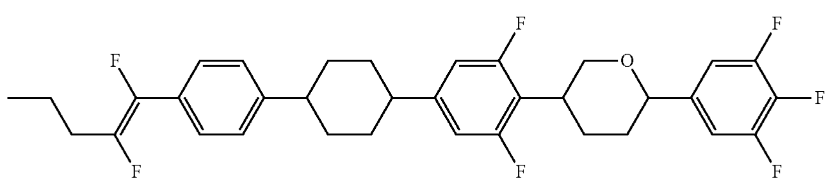 [SMILES: CCC/C(F)=C(\F)c1ccc(C2CCC(c3cc(F)c(C4CCC(c5cc(F)c(F)c(F)c5)OC4)c(F)c3)CC2)cc1] |
| 1-3-16 | 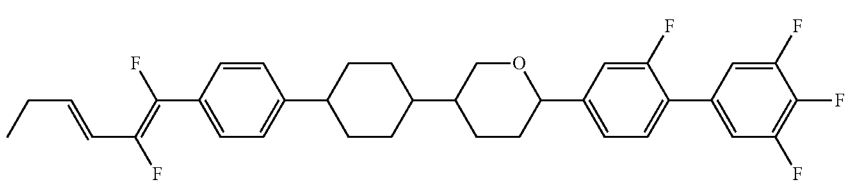 [SMILES: CC/C=C/C(F)=C(\F)c1ccc(C2CCC(C3CCC(c4ccc(-c5cc(F)c(F)c(F)c5)c(F)c4)OC3)CC2)cc1] |

-continued
| Formula 68 | |
|---|---|
| No | |
| 1-3-17 | 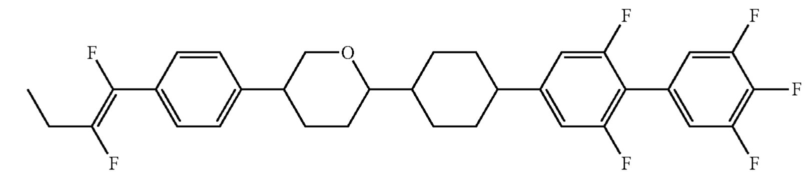 [SMILES: CC/C(F)=C(\F)c1ccc(C2CCC(C3CCC(c4cc(F)c(-c5cc(F)c(F)c(F)c5)c(F)c4)CC3)OC2)cc1] |
| 1-3-18 | 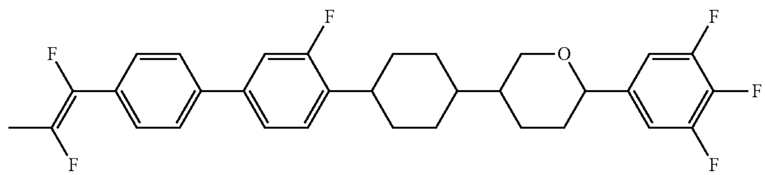 [SMILES: C/C(F)=C(\F)c1ccc(-c2ccc(C3CCC(C4CCC(c5cc(F)c(F)c(F)c5)OC4)CC3)c(F)c2)cc1] |
| 1-3-19 | 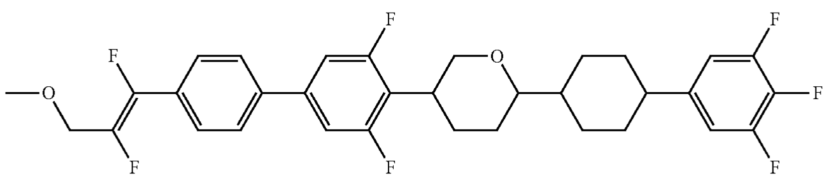 [SMILES: COC/C(F)=C(\F)c1ccc(-c2cc(F)c(C3CCC(C4CCC(c5cc(F)c(F)c(F)c5)CC4)OC3)c(F)c2)cc1] |
| 1-3-20 | 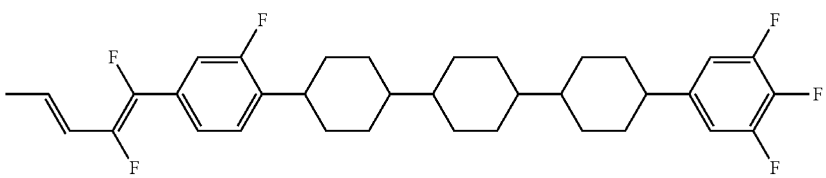 [SMILES: C/C=C/C(F)=C(\F)c1ccc(C2CCC(C3CCC(C4CCC(c5cc(F)c(F)c(F)c5)CC4)CC3)CC2)c(F)c1] |
| Formula 69 | |
|---|---|
| No. | |
| 1-3-21 | 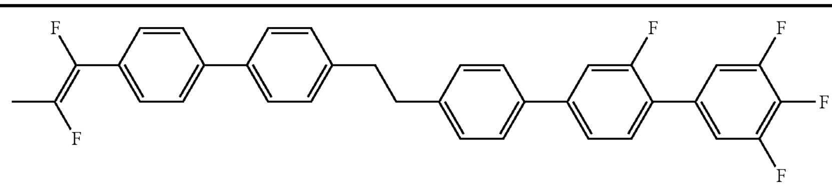 |
| 1-3-22 | 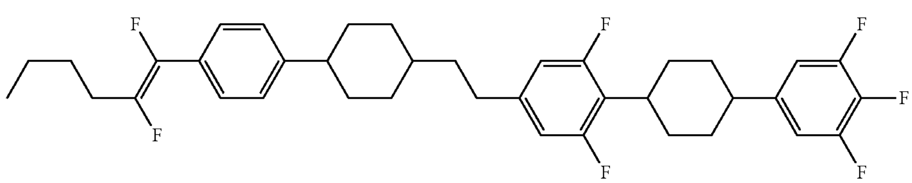 [SMILES: CCCC/C(F)=C(\F)c1ccc(C2CCC(CCc3cc(F)c(C4CCC(c5cc(F)c(F)c(F)c5)CC4)c(F)c3)CC2)cc1] |
| 1-3-23 | 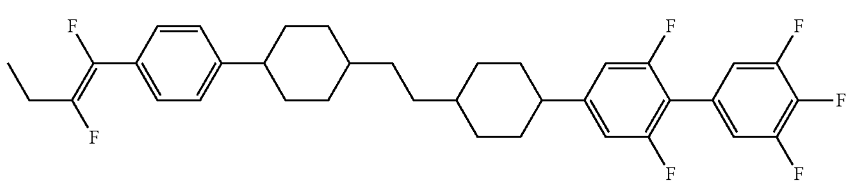 [SMILES: CC/C(F)=C(\F)c1ccc(C2CCC(CCC3CCC(c4cc(F)c(-c5cc(F)c(F)c(F)c5)c(F)c4)CC3)CC2)cc1] |

-continued
Formula 69
| No. | |
|---|---|
| 1-3-24 | 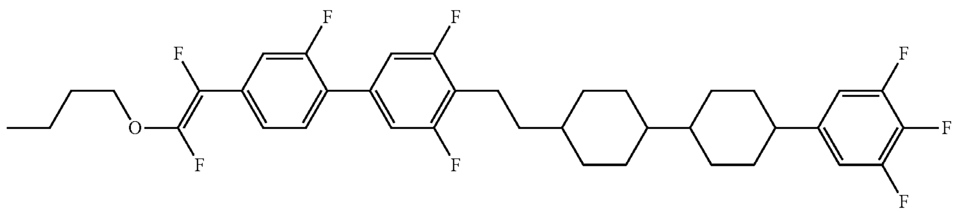 [SMILES: CCCCO/C(F)=C(\F)c1ccc(-c2cc(F)c(CCC3CCC(C4CCC(c5cc(F)c(F)c(F)c5)CC4)CC3)c(F)c2)c(F)c1] |
| 1-3-25 | 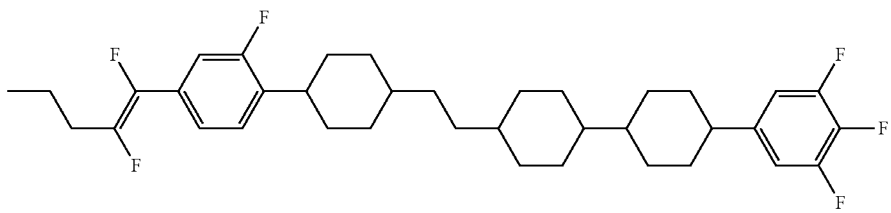 [SMILES: CCC/C(F)=C(\F)c1ccc(C2CCC(CCC3CCC(C4CCC(c5cc(F)c(F)c(F)c5)CC4)CC3)CC2)c(F)c1] |
| 1-3-26 | 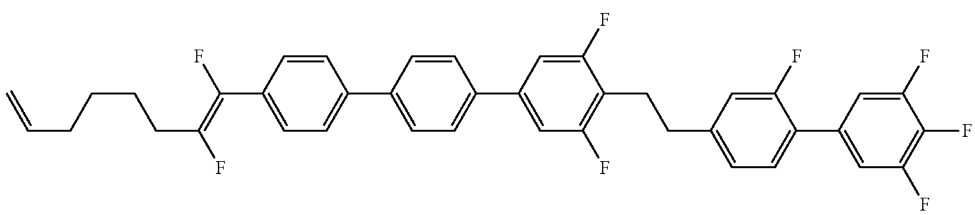 [SMILES: C=CCCCC/C(F)=C(\F)c1ccc(-c2ccc(-c3cc(F)c(CCc4ccc(-c5cc(F)c(F)c(F)c5)c(F)c4)c(F)c3)cc2)cc1] |
| 1-3-27 | 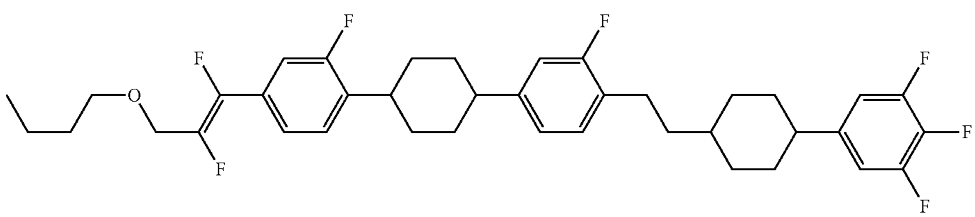 [SMILES: CCCCOC/C(F)=C(\F)c1ccc(C2CCC(c3ccc(CCC4CCC(c5cc(F)c(F)c(F)c5)CC4)c(F)c3)CC2)c(F)c1] |
| 1-3-28 | 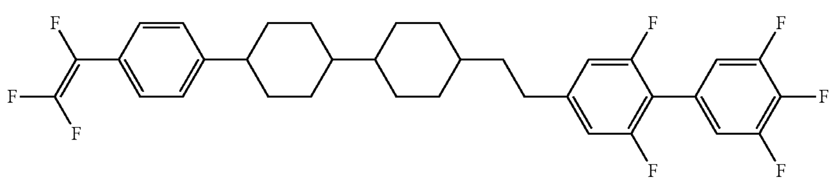 [SMILES: FC(F)=C(F)c1ccc(C2CCC(C3CCC(CCc4cc(F)c(-c5cc(F)c(F)c(F)c5)c(F)c4)CC3)CC2)cc1] |
| 1-3-29 | 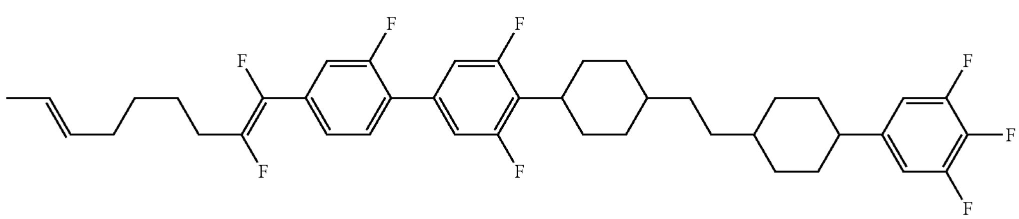 [SMILES: C/C=C/CCCC/C(F)=C(\F)c1ccc(-c2cc(F)c(C3CCC(CCC4CCC(c5cc(F)c(F)c(F)c5)CC4)CC3)c(F)c2)c(F)c1] |
| 1-3-30 | 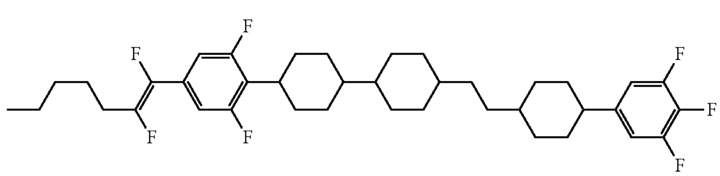 |

-continued
Formula 69
| No. | |
|---|---|
| 1-3-31 | 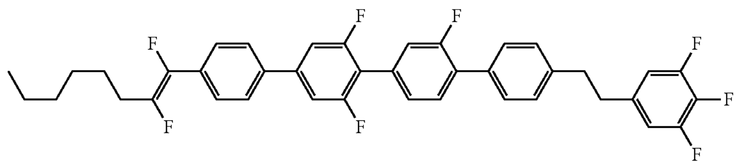 [SMILES: CCCCCC/C(F)=C(\F)c1ccc(-c2cc(F)c(-c3ccc(-c4ccc(CCc5cc(F)c(F)c(F)c5)cc4)c(F)c3)c(F)c2)cc1] |
| 1-3-32 | 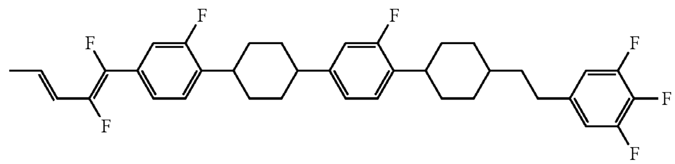 [SMILES: C/C=C/C(F)=C(\F)c1ccc(C2CCC(c3ccc(C4CCC(CCc5cc(F)c(F)c(F)c5)CC4)c(F)c3)CC2)c(F)c1] |
| 1-3-33 | 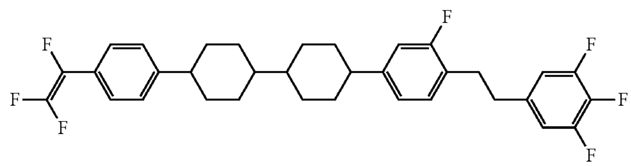 [SMILES: FC(F)=C(F)c1ccc(C2CCC(C3CCC(c4ccc(CCc5cc(F)c(F)c(F)c5)c(F)c4)CC3)CC2)cc1] |
| 1-3-34 | 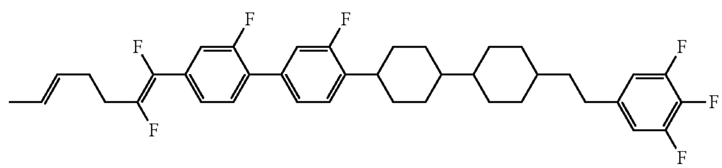 [SMILES: C/C=C/CC/C(F)=C(\F)c1ccc(-c2ccc(C3CCC(C4CCC(CCc5cc(F)c(F)c(F)c5)CC4)CC3)c(F)c2)c(F)c1] |
| 1-3-35 | 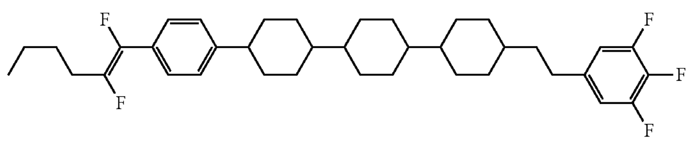 [SMILES: CCCC/C(F)=C(\F)c1ccc(C2CCC(C3CCC(C4CCC(CCc5cc(F)c(F)c(F)c5)CC4)CC3)CC2)cc1] |
| 1-3-36 | 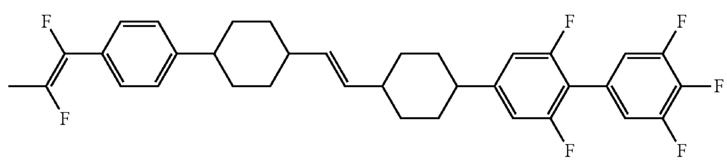 [SMILES: C/C(F)=C(\F)c1ccc(C2CCC(/C=C/C3CCC(c4cc(F)c(-c5cc(F)c(F)c(F)c5)c(F)c4)CC3)CC2)cc1] |
| 1-3-37 | 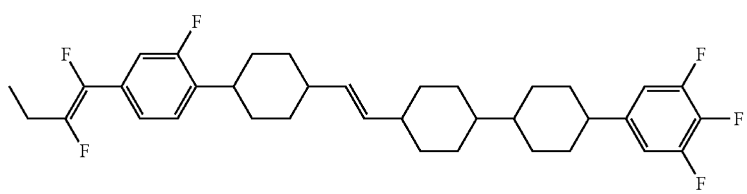 [SMILES: CC/C(F)=C(\F)c1ccc(C2CCC(/C=C/C3CCC(C4CCC(c5cc(F)c(F)c(F)c5)CC4)CC3)CC2)c(F)c1] |
| 1-3-38 | 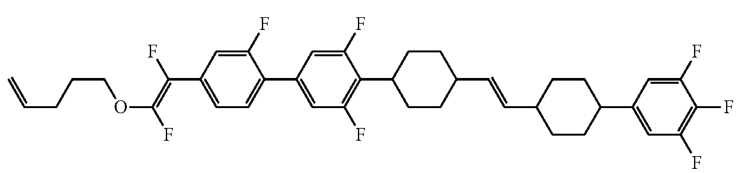 [SMILES: C=CCCCO/C(F)=C(\F)c1ccc(-c2cc(F)c(C3CCC(/C=C/C4CCC(c5cc(F)c(F)c(F)c5)CC4)CC3)c(F)c2)c(F)c1] |
| 1-3-39 | 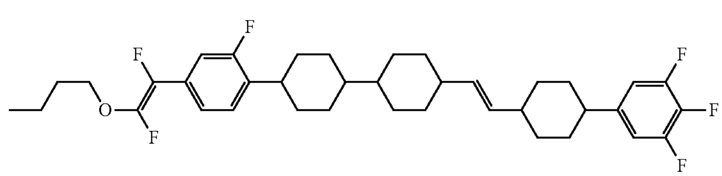 [SMILES: CCCCO/C(F)=C(\F)c1ccc(C2CCC(C3CCC(/C=C/C4CCC(c5cc(F)c(F)c(F)c5)CC4)CC3)CC2)c(F)c1] |

-continued
| Formula 69 | |
|---|---|
| No. | |
| 1-3-40 | 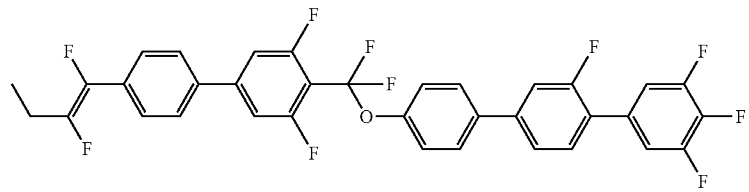 [SMILES: CC/C(F)=C(\F)c1ccc(-c2cc(F)c(C(F)(F)Oc3ccc(-c4ccc(-c5cc(F)c(F)c(F)c5)c(F)c4)cc3)c(F)c2)cc1] |
| Formula 70 | |
|---|---|
| No. | |
| 1-3-41 | 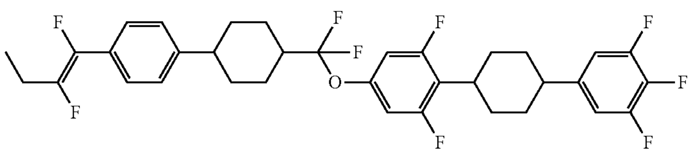 [SMILES: CC/C(F)=C(\F)c1ccc(C2CCC(C(F)(F)Oc3cc(F)c(C4CCC(c5cc(F)c(F)c(F)c5)CC4)c(F)c3)CC2)cc1] |
| 1-3-42 | 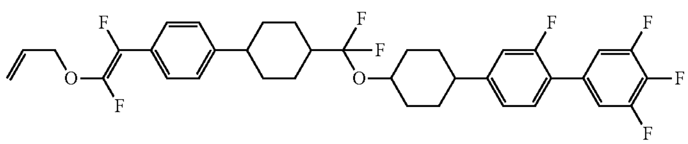 [SMILES: C=CCO/C(F)=C(\F)c1ccc(C2CCC(C(F)(F)OC3CCC(c4ccc(-c5cc(F)c(F)c(F)c5)c(F)c4)CC3)CC2)cc1] |
| 1-3-43 | 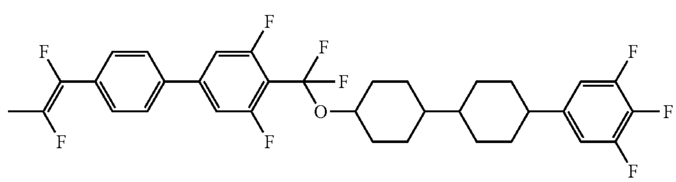 [SMILES: C/C(F)=C(\F)c1ccc(-c2cc(F)c(C(F)(F)OC3CCC(C4CCC(c5cc(F)c(F)c(F)c5)CC4)CC3)c(F)c2)cc1] |
| 1-3-44 | 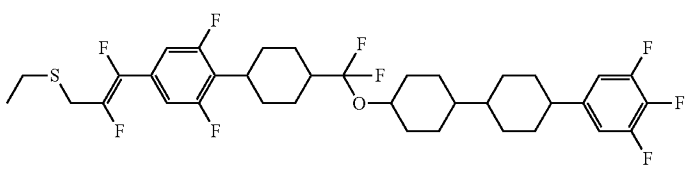 [SMILES: CCSC/C(F)=C(\F)c1cc(F)c(C2CCC(C(F)(F)OC3CCC(C4CCC(c5cc(F)c(F)c(F)c5)CC4)CC3)CC2)c(F)c1] |
| 1-3-45 | 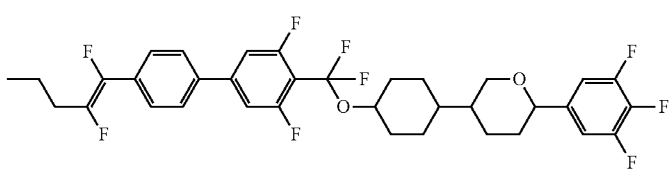 [SMILES: CCC/C(F)=C(\F)c1ccc(-c2cc(F)c(C(F)(F)OC3CCC(C4CCC(c5cc(F)c(F)c(F)c5)OC4)CC3)c(F)c2)cc1] |
| 1-3-46 | 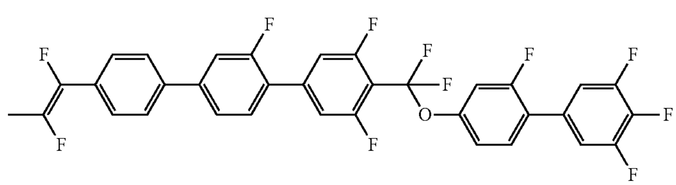 [SMILES: C/C(F)=C(\F)c1ccc(-c2ccc(-c3cc(F)c(C(F)(F)Oc4ccc(-c5cc(F)c(F)c(F)c5)c(F)c4)c(F)c3)c(F)c2)cc1] |
| 1-3-47 | 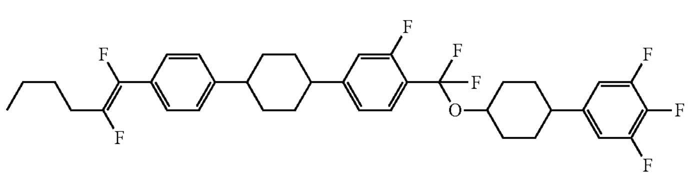 [SMILES: CCCC/C(F)=C(\F)c1ccc(C2CCC(c3ccc(C(F)(F)OC4CCC(c5cc(F)c(F)c(F)c5)CC4)c(F)c3)CC2)cc1] |

-continued
| Formula 70 | |
|---|---|
| No. | |
| 1-3-48 | 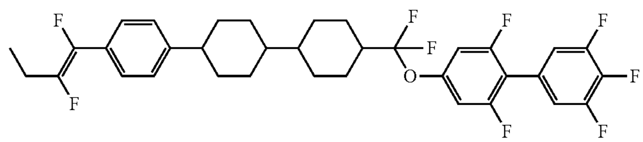 [SMILES: CC/C(F)=C(\F)c1ccc(C2CCC(C3CCC(C(F)(F)Oc4cc(F)c(-c5cc(F)c(F)c(F)c5)c(F)c4)CC3)CC2)cc1] |
| 1-3-49 | 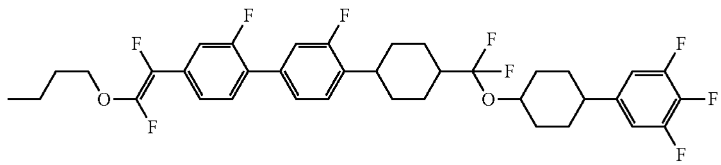 [SMILES: CCCCO/C(F)=C(\F)c1ccc(-c2ccc(C3CCC(C(F)(F)OC4CCC(c5cc(F)c(F)c(F)c5)CC4)CC3)c(F)c2)c(F)c1] |
| 1-3-50 | 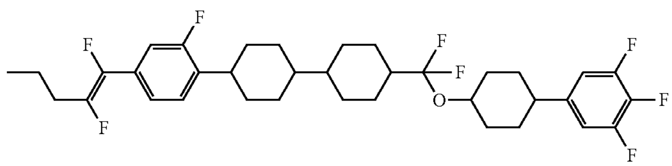 [SMILES: CCC/C(F)=C(\F)c1ccc(C2CCC(C3CCC(C(F)(F)OC4CCC(c5cc(F)c(F)c(F)c5)CC4)CC3)CC2)c(F)c1] |
| 1-3-51 | 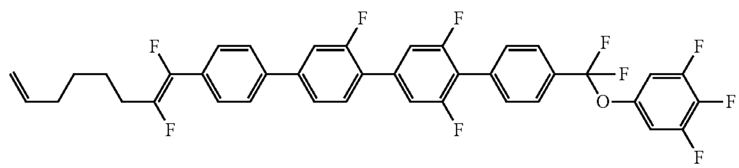 [SMILES: C=CCCCC/C(F)=C(\F)c1ccc(-c2ccc(-c3cc(F)c(-c4ccc(C(F)(F)Oc5cc(F)c(F)c(F)c5)cc4)c(F)c3)c(F)c2)cc1] |
| 1-3-52 | 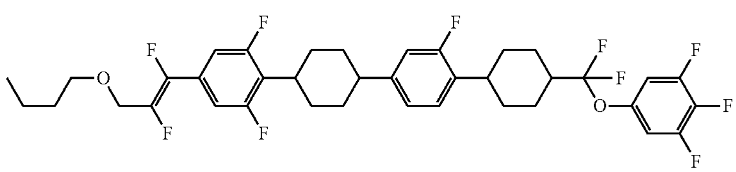 [SMILES: CCCCOC/C(F)=C(\F)c1cc(F)c(C2CCC(c3ccc(C4CCC(C(F)(F)Oc5cc(F)c(F)c(F)c5)CC4)c(F)c3)CC2)c(F)c1] |
| 1-3-53 | 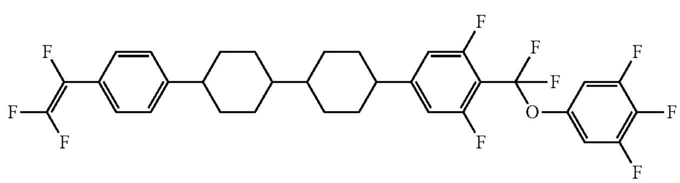 [SMILES: FC(F)=C(F)c1ccc(C2CCC(C3CCC(c4cc(F)c(C(F)(F)Oc5cc(F)c(F)c(F)c5)c(F)c4)CC3)CC2)cc1] |
| 1-3-54 | 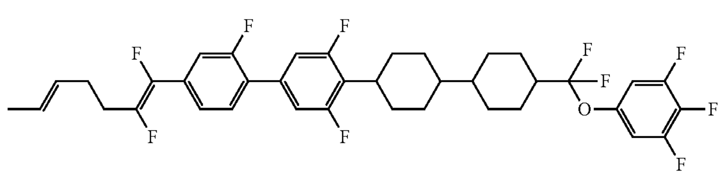 |
| 1-3-55 | 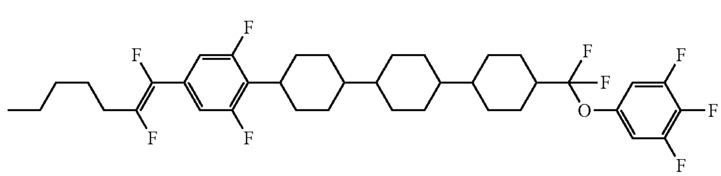 [SMILES: CCCCC/C(F)=C(\F)c1cc(F)c(C2CCC(C3CCC(C4CCC(C(F)(F)Oc5cc(F)c(F)c(F)c5)CC4)CC3)CC2)c(F)c1] |
| 1-3-56 | 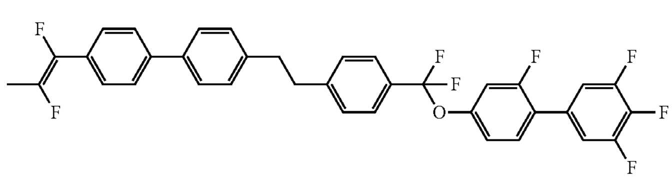 [SMILES: C/C(F)=C(\F)c1ccc(-c2ccc(CCc3ccc(C(F)(F)Oc4ccc(-c5cc(F)c(F)c(F)c5)c(F)c4)cc3)cc2)cc1] |

-continued
| Formula 70 | |
|---|---|
| No. | |
| 1-3-57 | 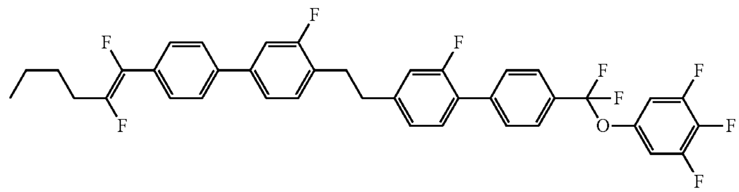 [SMILES: CCCC/C(F)=C(\F)c1ccc(-c2ccc(CCc3ccc(-c4ccc(C(F)(F)Oc5cc(F)c(F)c(F)c5)cc4)c(F)c3)c(F)c2)cc1] |
| 1-3-58 | 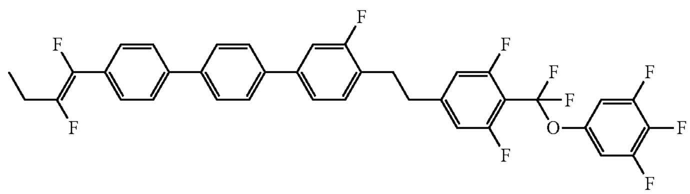 [SMILES: CC/C(F)=C(\F)c1ccc(-c2ccc(-c3ccc(CCc4cc(F)c(C(F)(F)Oc5cc(F)c(F)c(F)c5)c(F)c4)c(F)c3)cc2)cc1] |
| 1-3-59 | 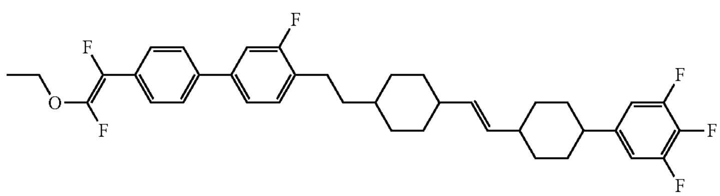 [SMILES: CCO/C(F)=C(\F)c1ccc(-c2ccc(CCC3CCC(/C=C/C4CCC(c5cc(F)c(F)c(F)c5)CC4)CC3)c(F)c2)cc1] |
| 1-3-60 | 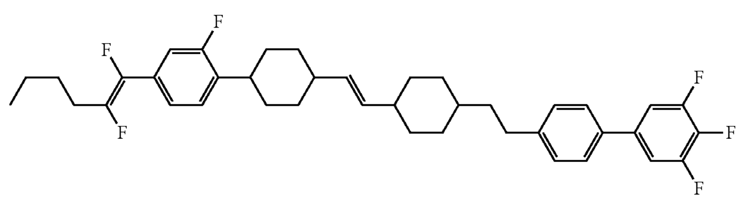 [SMILES: CCCC/C(F)=C(\F)c1ccc(C2CCC(/C=C/C3CCC(CCc4ccc(-c5cc(F)c(F)c(F)c5)cc4)CC3)CC2)c(F)c1] |
| Formula 71 | |
|---|---|
| No. | |
| 1-3-61 | 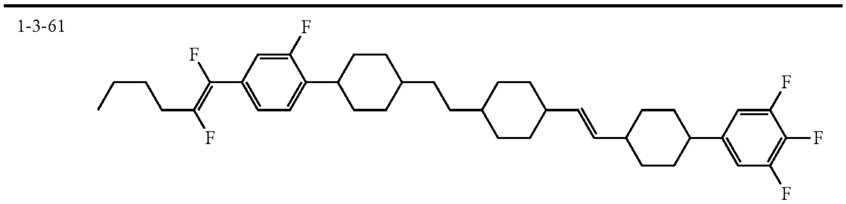 |
| 1-3-62 | 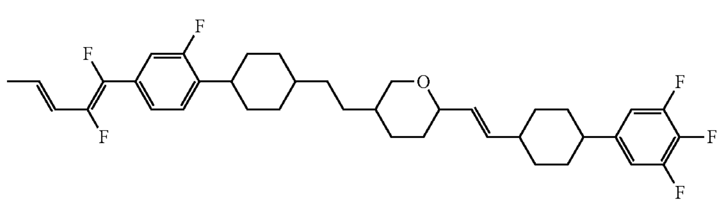 [SMILES: C/C=C/C(F)=C(\F)c1ccc(C2CCC(CCC3CCC(/C=C/C4CCC(c5cc(F)c(F)c(F)c5)CC4)OC3)CC2)c(F)c1] |
| 1-3-63 | 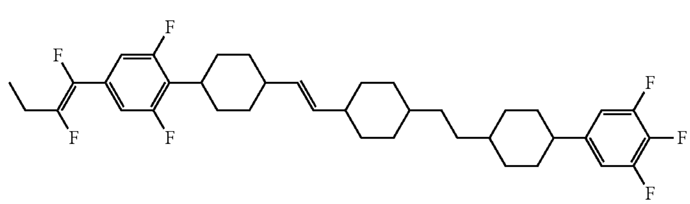 [SMILES: CC/C(F)=C(\F)c1cc(F)c(C2CCC(/C=C/C3CCC(CCC4CCC(c5cc(F)c(F)c(F)c5)CC4)CC3)CC2)c(F)c1] |

-continued
| Formula 71 | |
|---|---|
| No. | |
| 1-3-64 | 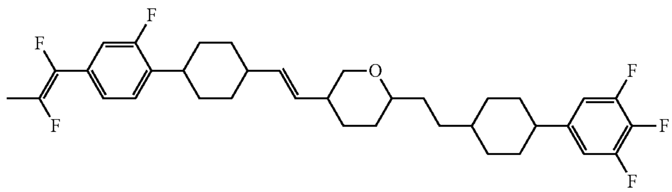 [SMILES: C/C(F)=C(\F)c1ccc(C2CCC(/C=C/C3CCC(CCC4CCC(c5cc(F)c(F)c(F)c5)CC4)OC3)CC2)c(F)c1] |
| 1-3-65 | 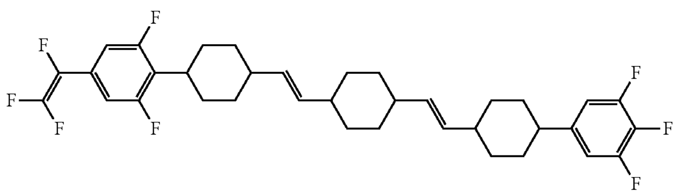 [SMILES: FC(F)=C(F)c1cc(F)c(C2CCC(/C=C/C3CCC(/C=C/C4CCC(c5cc(F)c(F)c(F)c5)CC4)CC3)CC2)c(F)c1] |
| 1-3-66 | 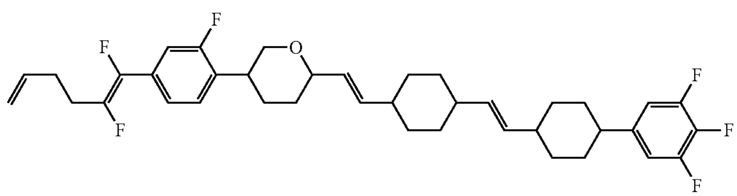 [SMILES: C=CCC/C(F)=C(\F)c1ccc(C2CCC(/C=C/C3CCC(/C=C/C4CCC(c5cc(F)c(F)c(F)c5)CC4)CC3)OC2)c(F)c1] |
| 1-3-67 | 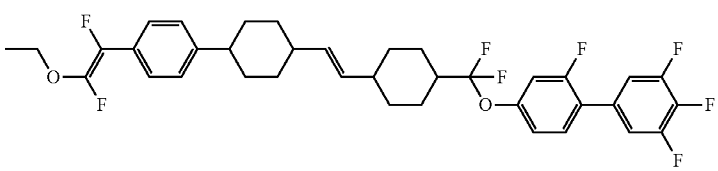 [SMILES: CCO/C(F)=C(\F)c1ccc(C2CCC(/C=C/C3CCC(C(F)(F)Oc4ccc(-c5cc(F)c(F)c(F)c5)c(F)c4)CC3)CC2)cc1] |
| 1-3-68 | 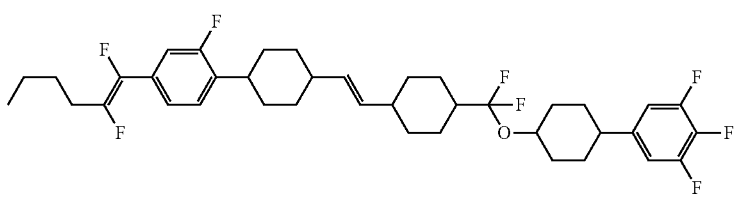 [SMILES: CCCC/C(F)=C(\F)c1ccc(C2CCC(/C=C/C3CCC(C(F)(F)OC4CCC(c5cc(F)c(F)c(F)c5)CC4)CC3)CC2)c(F)c1] |
| 1-3-69 | 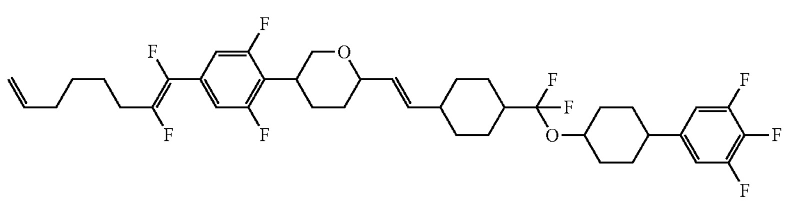 [SMILES: C=CCCCC/C(F)=C(\F)c1cc(F)c(C2CCC(/C=C/C3CCC(C(F)(F)OC4CCC(c5cc(F)c(F)c(F)c5)CC4)CC3)OC2)c(F)c1] |
| 1-3-70 | 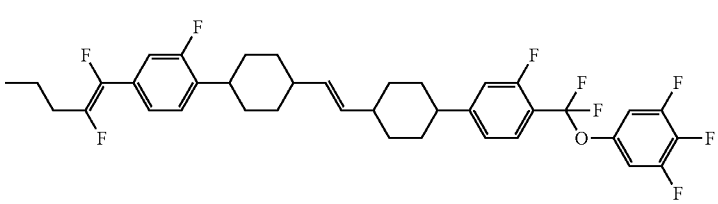 [SMILES: CCC/C(F)=C(\F)c1ccc(C2CCC(/C=C/C3CCC(c4ccc(C(F)(F)Oc5cc(F)c(F)c(F)c5)c(F)c4)CC3)CC2)c(F)c1] |

-continued

Formula 71

| No. | |
|---|---|
| 1-3-71 | 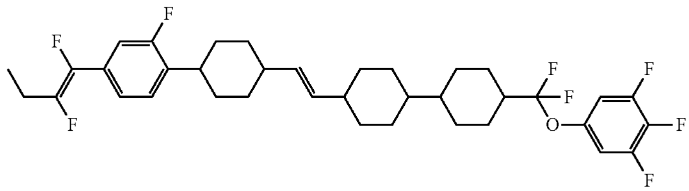 [SMILES: CC/C(F)=C(\F)c1ccc(C2CCC(/C=C/C3CCC(C4CCC(C(F)(F)Oc5cc(F)c(F)c(F)c5)CC4)CC3)CC2)c(F)c1] |
| 1-3-72 | 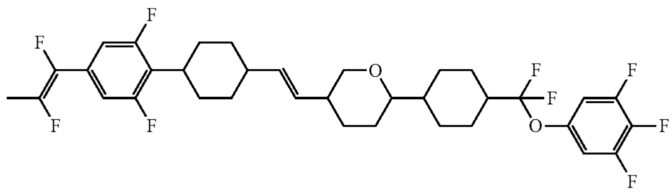 [SMILES: C/C(F)=C(\F)c1cc(F)c(C2CCC(/C=C/C3CCC(C4CCC(C(F)(F)Oc5cc(F)c(F)c(F)c5)CC4)OC3)CC2)c(F)c1] |
| 1-3-73 | 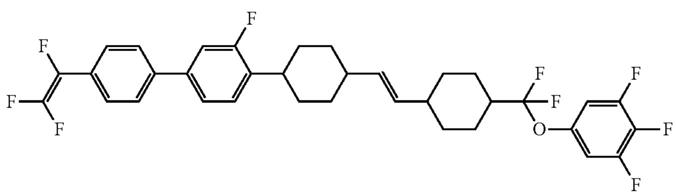 [SMILES: FC(F)=C(F)c1ccc(-c2ccc(C3CCC(/C=C/C4CCC(C(F)(F)Oc5cc(F)c(F)c(F)c5)CC4)CC3)c(F)c2)cc1] |
| 1-3-74 | 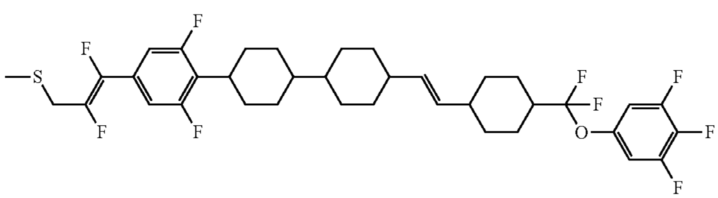 [SMILES: CSC/C(F)=C(\F)c1cc(F)c(C2CCC(C3CCC(/C=C/C4CCC(C(F)(F)Oc5cc(F)c(F)c(F)c5)CC4)CC3)CC2)c(F)c1] |
| 1-3-75 | 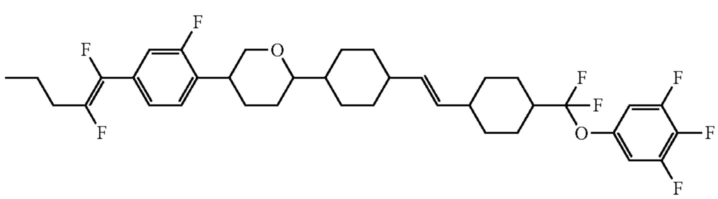 [SMILES: CCC/C(F)=C(\F)c1ccc(C2CCC(C3CCC(/C=C/C4CCC(C(F)(F)Oc5cc(F)c(F)c(F)c5)CC4)CC3)OC2)c(F)c1] |

Comparative Example 1

As a comparative compound, compound (S-1) was prepared. The reason is that the compound is included in compound (I) described in the specification of DE 4107120 A, and similar to the compound of the invention.

Formula 72

(S-1)

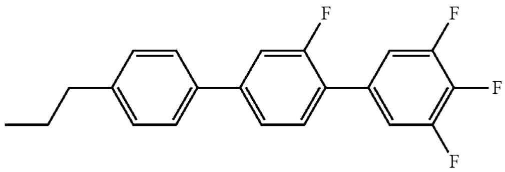

$^1$H-NMR (δ ppm; $CDCl_3$): 7.53 (d, 2H), 7.47-7.38 (m, 4H), 7.29 (d, 2H), 7.23 (dt, 2H), 2.65 (t, 2H), 1.69 (sex, 2H), 0.98 (t, 3H).

Physical properties of comparative compound (S-1) were as described below.

Transition temperature: C 64.8 I. $T_{NI}$=37.7° C.; η=52.9 mPa·s; Δn=0.190; Δ∈=22.2.

TABLE 1

| Physical properties of compound (1-1-12) and comparative compound (S-1) | | |
|---|---|---|
| | Compound (No. 1-1-12) | Comparative compound (S-1) |
| | 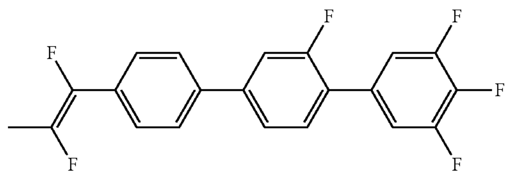 [SMILES: C/C(F)=C(\F)c1ccc(-c2ccc(-c3cc(F)c(F)c(F)c3)c(F)c2)cc1] | 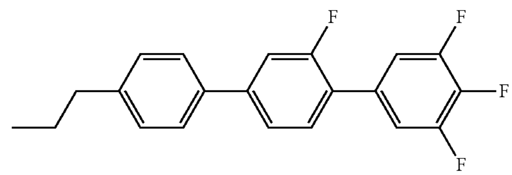 |
| Maximum temperature ($T_{NI}$) | 125.0° C. | 37.7° C. |
| Viscosity (η) | 73.7 mPa·s | 52.9 mPa·s |
| Optical anisotropy (Δn) | 0.270 | 0.190 |
| Dielectric anisotropy (Δϵ) | 22.1 | 22.2 |

Physical properties of compound (No. 1-1-12) obtained in Example 2 and comparative compound (S-1) were summarized in Table 1. Table 1 shows that compound (No. 1-1-12) is superior to comparative compound (S-1) in view of a higher maximum temperature and a larger optical anisotropy.

Comparative Example 2

As a comparative compound, compound (S-2) was prepared. The reason is that the compound is included in compound (I) described in the specification of DE 4107120 A, and similar to the compound of the invention.

Formula 73

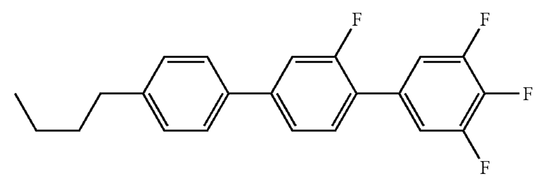 [SMILES: CCCCc1ccc(-c2ccc(-c3cc(F)c(F)c(F)c3)c(F)c2)cc1]

(S-2)

$^1$H-NMR (δ ppm; $CDCl_3$): 7.54 (d, 2H), 7.49-7.37 (m, 4H), 7.31 (d, 2H), 7.22 (dt, 2H), 2.62 (t, 2H), 1.59 (quin, 2H), 1.31 (sex, 2H), 0.90 (t, 3H).

Physical properties of comparative compound (S-2) were as described below.

Transition temperature: C 59.5 I. $T_{NI}$=30.4° C.; η=56.5 mPa·s; Δn=0.164; Δ∈=20.1.

TABLE 2

| Physical properties of compound (1-1-13) and comparative compound (S-2) | | |
|---|---|---|
| | Compound (No. 1-1-13) | Comparative compound (S-2) |
| | 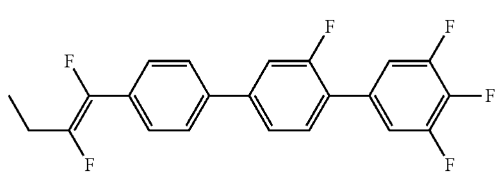 | 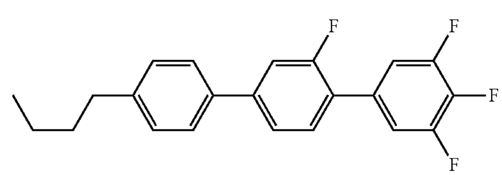 |
| Maximum temperature ($T_{NI}$) | 102.70° C. | 30.4° C. |
| Viscosity (η) | 66.2 mPa·s | 56.59 mPa·s |
| Optical anisotropy (Δn) | 0.267 | 0.164 |
| Dielectric anisotropy (Δϵ) | 21.1 | 20.1 |

Physical properties of compound (No. 1-1-13) obtained in Example 3 and comparative compound (S-2) were summarized in Table 2. Table 2 shows that compound (No. 1-1-13) is superior to comparative compound (S-2) in view of a higher maximum temperature and a larger optical anisotropy.

1-2. Examples of Composition (1)

Next, liquid crystal composition (1) of the invention will be explained in detail. Compounds in Examples are described using symbols based on definitions in Table 3 below. In Table 3, a configuration of 1,4-cyclohexylene is trans. In Examples, a parenthesized number next to a symbolized compound corresponds to the number of the compound. A symbol (-) means any other liquid crystal compound. A ratio (percentage) of the liquid crystal compounds is expressed in terms of weight percent (% by weight) based on the weight of the liquid crystal composition. Values of physical properties of the composition were summarized in a last part. Physical properties were measured according to the methods described above, and measured values were described as were without extrapolation of the measured values.

TABLE 3

| Method for Description of Compounds using Symbols<br>R—(A$_1$)—Z$_1$— . . . —Z$_n$—(A$_n$)—R' | |
|---|---|
| 1) Left-terminal Group R— | Symbol |
| $C_nH_{2n+1}$— | n- |
| $C_nH_{2n+1}O$— | nO— |
| $C_mH_{2m+1}OC_nH_{2n}$— | mOn- |
| $CH_2$═CH— | V— |
| $C_nH_{2n+1}$—CH═CH— | nV— |
| $CH_2$═CH—$C_nH_{2n}$— | Vn- |
| $C_mH_{2m+1}$—CH═CH—$C_nH_{2n}$— | mVn- |
| $CF_2$═CH— | FFV— |
| $CF_2$═CH—$C_nH_{2n}$— | FFVn- |
| $CF_2$═CF— | FFVF— |
| $C_nH_{2n+1}$—CF═CF— | nFVF— |
| 2) Right-terminal Group —R' | Symbol |
| —$C_nH_{2n+1}$ | -n |
| —$OC_nH_{2n+1}$ | —On |
| —$COOCH_3$ | —EMe |
| —CH═$CH_2$ | —V |
| —CH═CH—$C_nH_{2n+1}$ | —Vn |
| —$C_nH_{2n}$—CH═$CH_2$ | -nV |
| —$C_mH_{2m}$—CH═CH—$C_nH_{2n+1}$ | -mVn |
| —CH═$CF_2$ | —VFF |
| —F | —F |
| —Cl | —CL |
| —$OCF_3$ | —OCF3 |
| —$OCHF_2$ | —OCHF2 |
| —$CF_3$ | —CF3 |
| —CN | —C |
| 3) Bonding Group —Z$_n$— | Symbol |
| —$C_nH_{2n}$— | n |
| —$C_nF_{2n}$— | Fn |
| —COO— | E |
| —CH═CH— | V |
| —$CH_2O$— | 1O |
| —$OCH_2$— | O1 |
| —$CF_2O$— | X |
| —C≡C— | T |
| 4) Ring Structure —A$_n$— | Symbol |
| 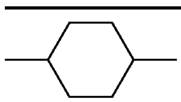 | H |
| 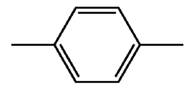 | B |
| 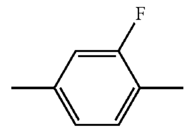 | B(F) |
| 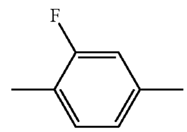 | B(2F) |
| 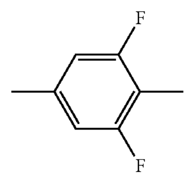 | B(F, F) |
| 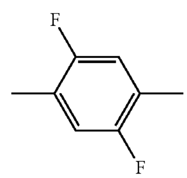 | B(2F, 5F) |
| 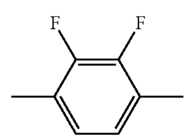 | B(2F, 3F) |
| 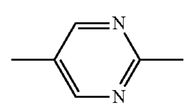 | Py |
| 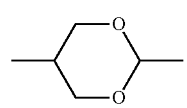 | G |

TABLE 3-continued

5) Examples of Description

Example 1 FFVF—BB(F)B(F,F)—F

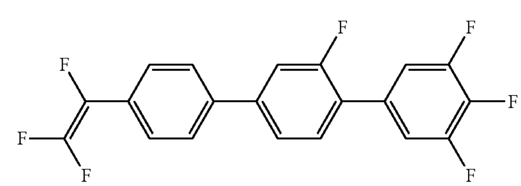 [SMILES: FC(F)=C(F)c1ccc(-c2ccc(-c3cc(F)c(F)c(F)c3)c(F)c2)cc1]

Example 2 2FVF—BB(F)B(F,F)—F

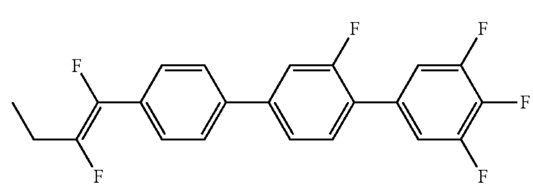 [SMILES: CC/C(F)=C(\F)c1ccc(-c2ccc(-c3cc(F)c(F)c(F)c3)c(F)c2)cc1]

TABLE 3-continued

Example 3 3-HH-4

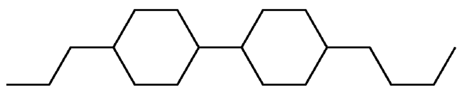 [SMILES: CCCCC1CCC(C2CCC(CCC)CC2)CC1]

Example 4 3-BB(F,F)XB(F,F)—F

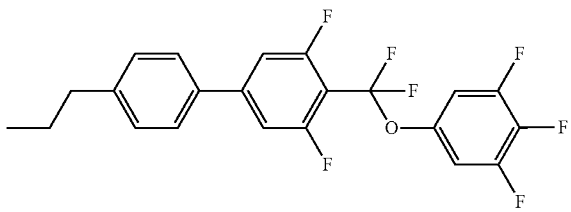 [SMILES: CCCc1ccc(-c2cc(F)c(C(F)(F)Oc3cc(F)c(F)c(F)c3)c(F)c2)cc1]

Example 4

| | | |
|---|---|---|
| FFVF-BB(F)B(F, F)-F | (1-1-11) | 3% |
| 1FVF-BB(F)B(F, F)-F | (1-1-12) | 3% |
| 5-HB-CL | (2-2) | 16% |
| 3-HH-4 | (12-1) | 12% |
| 3-HH-5 | (12-1) | 4% |
| 3-HHB-F | (3-1) | 4% |
| 3-HHB-CL | (3-1) | 3% |
| 4-HHB-CL | (3-1) | 4% |
| 3-HHB(F)-F | (3-2) | 10% |
| 4-HHB(F)-F | (3-2) | 3% |
| 5-HHB(F)-F | (3-2) | 9% |
| 7-HHB(F)-F | (3-2) | 8% |
| 5-HBB(F)-F | (3-23) | 4% |
| 1O1-HBBH-5 | (14-1) | 3% |
| 3-HHBB(F,F)-F | (4-6) | 2% |
| 4-HHBB(F,F)-F | (4-6) | 3% |
| 5-HHBB(F,F)-F | (4-6) | 3% |
| 3-HH2BB(F,F)-F | (4-15) | 3% |
| 4-HH2BB(F,F)-F | (4-15) | 3% |

NI = 113.9° C.; Δn = 0.101.

Example 5

| | | |
|---|---|---|
| 1FVF-BB(F)B(F,F)-F | (1-1-12) | 3% |
| 2FVF-BB(F)B(F,F)-F | (1-1-13) | 4% |
| 3-HHB (F,F)-F | (3-3) | 9% |
| 3-H2HB(F,F)-F | (3-15) | 8% |
| 4-H2HB (F,F)-F | (3-15) | 8% |
| 5-H2HB(F,F)-F | (3-15) | 8% |
| 3-HBB(F,F)-F | (3-24) | 21% |
| 5-HBB(F,F)-F | (3-24) | 20% |
| 3-H2BB(F,F)-F | (3-27) | 8% |
| 5-HHBB(F,F)-F | (4-6) | 3% |
| 5-HHEBB-F | (4-17) | 2% |
| 3-HH2BB(F,F)-F | (4-15) | 2% |
| 1O1-HBBH-5 | (14-1) | 4% |

NI = 93.1° C.; Δn = 0.106; Δε = 10.0; Vth = 1.53 V; η = 36.0 mPa · s.

A pitch when 0.2 part of Op-05 was added to 100 parts of the composition was 59.5 micrometers.

Example 6

| | | |
|---|---|---|
| FFVF-BB(F)B(F,F)-F | (1-1-11) | 3% |
| 2FVF-BB(F)B(F,F)-CF3 | (1-1-43) | 3% |
| 5-HB-F | (2-2) | 12% |
| 6-HB-F | (2-2) | 9% |
| 7-HB-F | (2-2) | 7% |

-continued

| | | |
|---|---|---|
| 2-HHB-OCF3 | (3-1) | 7% |
| 3-HHB-OCF3 | (3-1) | 7% |
| 4-HHB-OCF3 | (3-1) | 7% |
| 5-HHB-OCF3 | (3-1) | 5% |
| 3-HH2B-OCF3 | (3-4) | 4% |
| 5-HH2B-OCF3 | (3-4) | 4% |
| 3-HHB(F,F)-OCHF2 | (3-3) | 4% |
| 3-HHB(F,F)-OCF3 | (3-3) | 5% |
| 3-HH2B(F)-F | (3-5) | 3% |
| 3-HBB(F)-F | (3-23) | 7% |
| 5-HBB(F)-F | (3-23) | 7% |
| 5-HBBH-3 | (14-1) | 3% |
| 3-HB(F)BH-3 | (14-2) | 3% |

Example 7

| | | |
|---|---|---|
| 1FVF-BB(F)B(F,F)-F | (1-1-12) | 3% |
| 2FVF-BB(F,F)XB(F,F)-F | (1-1-176) | 3% |
| 5-HB-CL | (2-2) | 8% |
| 3-HH-4 | (12-1) | 8% |
| 3-HHB-1 | (13-1) | 4% |
| 3-HHB(F,F)-F | (3-3) | 8% |
| 3-HBB(F,F)-F | (3-24) | 20% |
| 5-HBB(F,F)-F | (3-24) | 15% |
| 3-HHEB(F,F)-F | (3-12) | 8% |
| 4-HHEB(F,F)-F | (3-12) | 3% |
| 5-HHEB(F,F)-F | (3-12) | 3% |
| 2-HBEB(F,F)-F | (3-39) | 3% |
| 3-HBEB(F,F)-F | (3-39) | 5% |
| 5-HBEB(F,F)-F | (3-39) | 3% |
| 3-HHBB(F,F)-F | (4-6) | 6% |

Example 8

| | | |
|---|---|---|
| 2FVF-BB(F)B(F,F)-F | (1-1-13) | 4% |
| 2FVF-BBB(F)B(F,F)-F | (1-2-8) | 4% |
| 3-HB-CL | (2-2) | 3% |
| 5-HB-CL | (2-2) | 4% |
| 3-HHB-OCF3 | (3-1) | 5% |
| 3-H2HB-OCF3 | (3-13) | 5% |
| 5-H4HB-OCF3 | (3-19) | 15% |
| V-HHB(F)-F | (3-2) | 5% |
| 3-HHB(F)-F | (3-2) | 5% |
| 5-HHB(F)-F | (3-2) | 5% |
| 3-H4HB(F,F)-CF3 | (3-21) | 8% |
| 5-H4HB(F,F)-CF3 | (3-21) | 10% |
| 5-H2HB(F,F)-F | (3-15) | 5% |
| 5-H4HB(F,F)-F | (3-21) | 7% |
| 2-H2BB(F)-F | (3-26) | 5% |
| 3-H2BB(F)-F | (3-26) | 5% |
| 3-HBEB(F,F)-F | (3-39) | 5% |

Example 9

| | | |
|---|---|---|
| 2FVF-BB(F)B(F,F)-F | (1-1-13) | 5% |
| 2FVF-BB(F)B(F,F)XB(F,F)-F | (1-2-386) | 5% |
| 5-HB-CL | (2-2) | 7% |
| 7-HB(F,F)-F | (2-4) | 3% |
| 3-HH-4 | (12-1) | 10% |
| 3-HH-5 | (12-1) | 5% |
| 3-HB-O2 | (12-5) | 15% |
| 3-HHB-1 | (13-1) | 8% |
| 3-HHB-O1 | (13-1) | 5% |
| 2-HHB(F)-F | (3-2) | 7% |
| 3-HHB(F)-F | (3-2) | 7% |

-continued

| | | |
|---|---|---|
| 5-HHB(F)-F | (3-2) | 7% |
| 3-HHB(F,F)-F | (3-3) | 6% |
| 3-H2HB(F,F)-F | (3-15) | 5% |
| 4-H2HB(F,F)-F | (3-15) | 5% |

Example 10

| | | |
|---|---|---|
| FFVF-BB(F)B(F,F)-F | (1-1-11) | 3% |
| 1FVF-BB(F)B(F,F)-F | (1-1-12) | 3% |
| 5-HB-CL | (2-2) | 3% |
| 7-HB(F)-F | (2-3) | 7% |
| 3-HH-4 | (12-1) | 9% |
| 3-HH-EMe | (12-2) | 23% |
| 3-HHEB-F | (3-10) | 8% |
| 5-HHEB-F | (3-10) | 8% |
| 3-HHEB(F,F)-F | (3-12) | 10% |
| 4-HHEB(F,F)-F | (3-12) | 5% |
| 5-HGB(F,F)-F | (3-103) | 6% |
| 2-H2GB(F,F)-F | (3-106) | 4% |
| 3-H2GB(F,F)-F | (3-106) | 4% |
| 5-GHB(F,F)-F | (3-109) | 7% |

NI = 80.8° C.; Δn = 0.074.

Example 11

| | | |
|---|---|---|
| 1FVF-BB(F)B(F,F)-F | (1-1-12) | 3% |
| 2FVF-BB(F)B(F,F)-F | (1-1-13) | 5% |
| 3-HB-O2 | (12-5) | 10% |
| 5-HB-CL | (2-2) | 13% |
| 3-HBB(F,F)-F | (3-24) | 7% |
| 3-PyB(F)-F | (2-15) | 10% |
| 5-PyB(F)-F | (2-15) | 10% |
| 3-PyBB-F | (3-80) | 10% |
| 4-PyBB-F | (3-80) | 10% |
| 5-PyBB-F | (3-80) | 10% |
| 5-HBB(F)B-2 | (14-5) | 6% |
| 5-HBB(F)B-3 | (14-5) | 6% |

NI = 89.5° C.; Δn = 0.192; Δε = 9.4; Vth = 1.64 V; η = 40.6 mPa · s.

Example 12

| | | |
|---|---|---|
| 1FVF-BB(F)B(F,F)-F | (1-1-12) | 3% |
| 2FVF-BB(F)B(F,F)-F | (1-1-13) | 5% |
| 3-HH-V | (12-1) | 25% |
| 3-BB(F,F)XB(F,F)-F | (3-97) | 18% |
| 3-HHB-1 | (13-1) | 2% |
| 2-HBB-F | (3-22) | 3% |
| 3-HBB-F | (3-22) | 4% |
| 3-HHB-CL | (3-1) | 7% |
| 1-BB(F)B-2V | (13-6) | 6% |
| 2-BB(F)B-2V | (13-6) | 6% |
| 3-BB(F)B-2V | (13-6) | 3% |
| 2-HHB(F,F)-F | (3-3) | 4% |
| 3-HHB(F,F)-F | (3-3) | 4% |
| 4-BB(F)B(F,F)XB(F,F)-F | (4-47) | 10% |

NI = 92.4° C.; Δn = 0.151; Δε = 9.4; Vth = 1.69 V; η = 25.3 mPa · s.

Example 13

| | | |
|---|---|---|
| 1FVF-BB(F)B (F,F)-F | (1-1-12) | 3% |
| 2FVF-BB(F)B(F,F)-F | (1-1-13) | 4% |
| 3-HB-C | (5-1) | 5% |
| 3-BEB(F)-C | (5-14) | 4% |
| 1V2-BEB(F)-C | (5-14) | 12% |
| 3-HHB-C | (5-28) | 6% |
| 3-HHB(F)-C | (5-29) | 6% |
| 3-HB-O2 | (12-5) | 11% |
| 2-HH-3 | (12-1) | 11% |
| 3-HH-4 | (12-1) | 10% |
| 3-HHB-1 | (13-1) | 8% |
| 3-HHB-O1 | (13-1) | 4% |
| 3-H2BTB-2 | (13-17) | 4% |
| 3-H2BTB-3 | (13-17) | 4% |
| 3-H2BTB-4 | (13-17) | 4% |
| 3-HB(F)TB-2 | (13-18) | 4% |

NI = 109.7° C.; Δn = 0.148; Δε = 11.8; Vth = 1.87 V; η = 25.9 mPa · s.

Example 14

| | | |
|---|---|---|
| 2FVF-BB(F)B(F,F)-F | (1-1-13) | 4% |
| 2FVF-BBB(F)B(F,F)-F | (1-2-8) | 4% |
| 3-HB-O1 | (12-5) | 15% |
| 3-HH-4 | (12-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 10% |
| 3-HHB(2F,3F)-O2 | (7-1) | 7% |
| 5-HHB(2F,3F)-O2 | (7-1) | 13% |
| 3-HHB-1 | (13-1) | 6% |

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

Industrial Applicability

A liquid crystal compound of the invention has a high stability to heat, light and so forth, a high clearing point, a low minimum temperature of a liquid crystal phase, a small viscosity, a suitable optical anisotropy, a large dielectric anisotropy, a suitable elastic constant and an excellent solubility in other liquid crystal compounds. A liquid crystal composition of the invention contains the compound, and has a high maximum temperature of a nematic phase, a low minimum temperature of the nematic phase, a small viscosity, a suitable optical anisotropy, a large dielectric anisotropy and a suitable elastic constant. The composition has a suitable balance regarding at least two of physical properties. A liquid crystal display device of the invention includes the composition, and has a wide temperature range in which the device can be used, a short response time, a large voltage holding ratio, a large contrast ratio and a long lifetime. Accordingly, the device can be widely utilized for a liquid crystal display device to be used for a personal computer, a television and so forth.

What is claimed is:

1. A compound represented by formula (1):

Formula 1

(1)

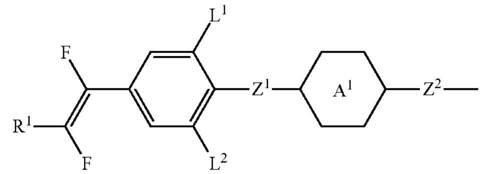

-continued

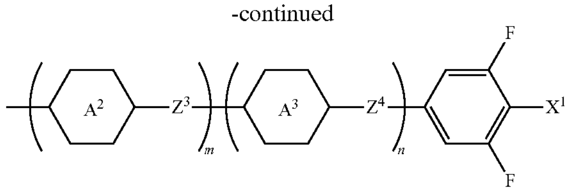

wherein, in formula (1), $R^1$ is halogen or alkyl having 1 to 20 carbons, and in the alkyl, at least one of —$CH_2$— may be replaced by —O— or —S—, at least one of —$(CH_2)_2$— may be replaced by —CH═CH—, and in the groups, at least one of hydrogen may be replaced by halogen;

ring $A^1$, ring $A^2$ and ring $A^3$ are independently 1,4-cyclohexylene, 1,4-phenylene, 1,4-phenylene in which at least one of hydrogen is replaced by halogen, tetrahydropyran-2,5-diyl, 1,3-dioxane-2,5-diyl, pyrimidine-2,5-diyl or pyridine-2,5-diyl;

$Z^1$, $Z^2$, $Z^3$ and $Z^4$ are independently a single bond, —$(CH_2)_2$—, —CH═CH—, —CF═CF—, —COO—, —OCO—, —$CF_2O$—, —$OCF_2$—, —$CH_2O$—, —$OCH_2$—, —$(CH_2)_4$—, —$(CH_2)_2CF_2O$—, —$(CH_2)_2OCF_2$—, —$CF_2O(CH_2)_2$—, —$OCF_2(CH_2)_2$—, —CH═CH—$(CH_2)_2$— or —$(CH_2)_2$—CH═CH—;

Formula 2

$L^1$ and $L^2$ are independently hydrogen or halogen;

$X^1$ is halogen, —C≡N, —N═C═S, —$SF_5$ or alkyl having 1 to 10 carbons, and in the alkyl, at least one of —$CH_2$— may be replaced by —O— or —S—, at least one of —$(CH_2)_2$— may be replaced by —CH═CH—, and in the groups, at least one of hydrogen may be replaced by halogen; and m and n are independently 0 or 1.

2. The compound according to claim 1, wherein, in formula (1), $R^1$ is halogen, alkyl having 1 to 15 carbons, alkenyl having 2 to 15 carbons, alkoxy having 1 to 14 carbons or alkenyloxy having 2 to 14 carbons; $Z^1$, $Z^2$, $Z^3$ and $Z^4$ are independently a single bond, —$(CH_2)_2$—, —CH═CH—, —CF═CF—, —COO—, —OCO—, —$CF_2O$—or —$OCF_2$—; $X^1$ is halogen, —C≡N, —N═C═S, —$SF_5$ or alkyl having 1 to 10 carbons, and in the alkyl, at least one of —$CH_2$— may be replaced by —O—or —S—, at least one of —$(CH_2)_2$— may be replaced by —CH═CH—, and in the groups, at least one of hydrogen may be replaced by halogen.

3. The compound according to claim 2, wherein $R^1$ is fluorine, alkyl having 1 to 15 carbons, alkenyl having 2 to 15 carbons, alkoxy having 1 to 14 carbons or alkenyloxy having 2 to 14 carbons; $Z^1$, $Z^2$, $Z^3$ and $Z^4$ are independently a single bond, —$(CH_2)_{2=}$, —CH═CH—, —COO— or —$CF_2O$—; $L^1$ and $L^2$ independently hydrogen or fluorine; and $X^1$ is fluorine, —$CF_3$, —$CHF_2$, —$CH_2F$, —$OCF_3$, —$OCHF_2$ or —$OCH_2F$.

4. The compound according to claim 3, wherein $R^1$ is fluorine, alkyl having 1 to 10 carbons or alkenyl having 2 to 10 carbons; ring $A^1$, ring $A^2$ and ring $A^3$ are independently 1,4-cyclohexylene, 1,4-phenylene, 1,4-phenylene in which at least one of hydrogen is replaced by fluorine, 1,3-dioxane-2,5-diyl or tetrahydropyran-2,5-diyl; $Z^1$, $Z^2$, $Z^3$ and $Z^4$ are independently a single bond, —$(CH_2)_2$—, —CH═CH—, —COO—or —$CF_2O$—; $L^1$ and $L^2$ are independently hydrogen or fluorine; and $X^1$ is fluorine, —$CF_3$ or —$OCF_3$.

5. The compound according to claim 4, represented by any one of formulas (1-1) and (1-2):

(1-1)

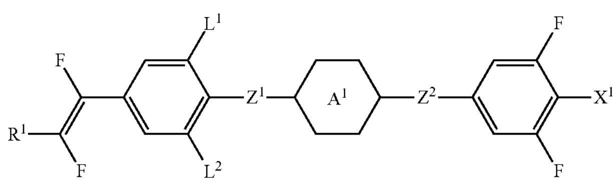

(1-2)

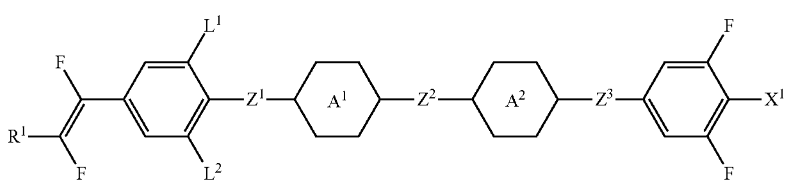

wherein, in formulas (1-1) and (1-2), $R^1$ is fluorine, alkyl having 1 to 10 carbons or alkenyl having 2 to 10 carbons;

ring $A^l$ and ring $A^2$ are independently 1,4-cyclohexylene, 1,4-phenylene, 1,4-phenylene in which at least one of hydrogen is replaced by fluorine, 1,3-dioxane-2,5-diyl or tetrahydropyran-2,5-diyl;

$Z^1$ , $Z^2$ and $Z^3$ are independent a single bond, —$(CH_2)_2$—, —CH═CH—, —COO—or —$CF_2O$—;

$L^1$ and $L^2$ are independently hydrogen or fluorine; and $X^1$ is fluorine, —$CF_3$ or —$OCF_3$.

6. The compound according to claim 5, represented by any one of formulas (1-1-1) to (1-1-5) and formulas (1-2-1) to (1-2-7):

Formula 3

(1-1-1)

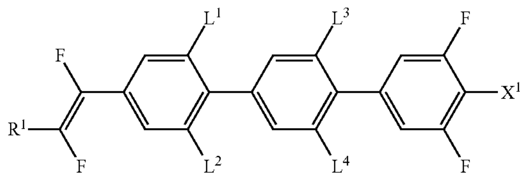

(1-1-2)

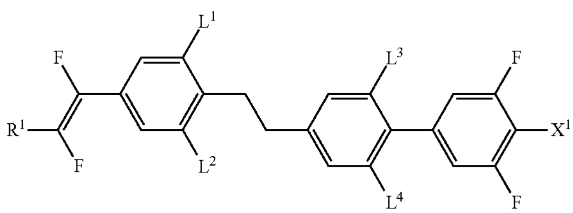

(1-1-3)

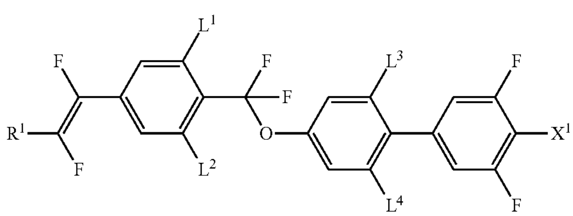

(1-1-4)

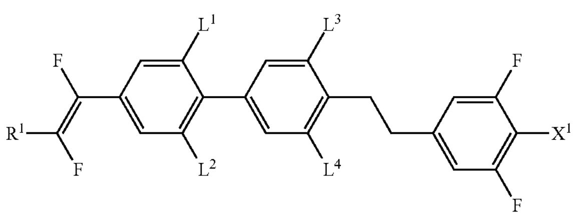

(1-1-5)

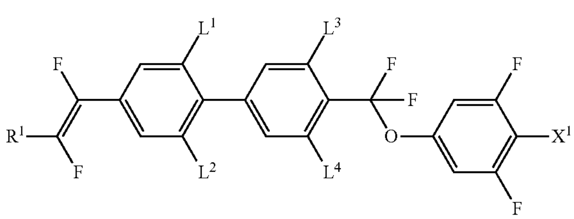

(1-2-1)

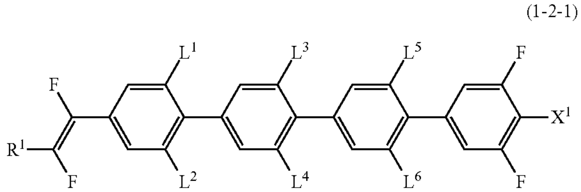

(1-2-2)

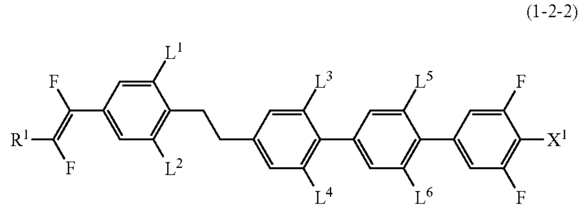

-continued (1-2-3)

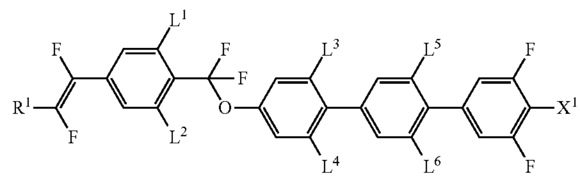

(1-2-4)

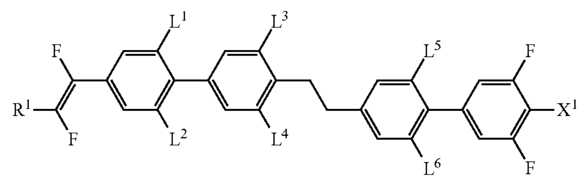

(1-2-5)

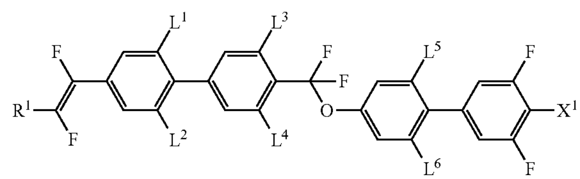

(1-2-6)

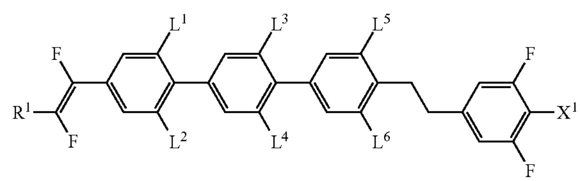

(1-2-7)

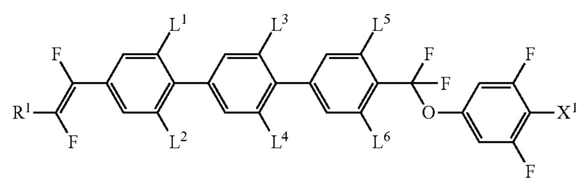

wherein, in formulas (1-1-1) to (1-1-5) and formulas (1-2-1) to (1-2-7), $R^1$ is fluorine, alkyl having 1 to 10 carbons or alkenyl having 2 to 10 carbons;

$L^1$, $L^2$, $L^3$, $L^4$, $L^5$ and $L^6$ are independently hydrogen or fluorine; and $X^1$ is fluorine, —$CF_3$ or —$OCF_3$.

7. A liquid crystal composition containing at least one compound according to claim 1.

8. The liquid crystal composition according to claim 7, further containing at least one compound selected from the group of compounds represented by formulas (2) to (4):

Formula 4

(2)

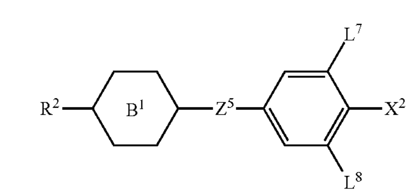

-continued (3)

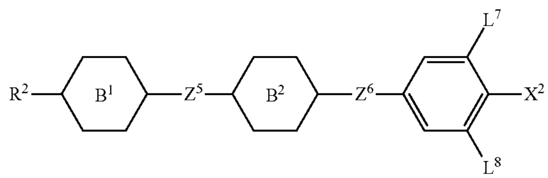

(4)

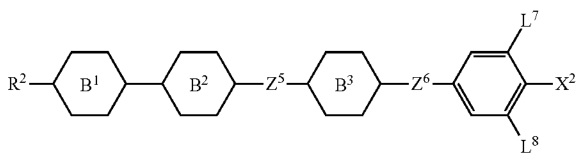

wherein, in formulas (2) to (4), $R^2$ is alkyl having 1 to 10 carbons or alkenyl having 2 to 10 carbons, and in the alkyl and the alkenyl, at least one of —$CH_2$— may be replaced by —O—;

$X^2$ is fluorine, chlorine, —$OCF_3$, —$OCHF_2$, —$CF_3$, —$CHF_2$, —$CH_2F$, —CF═$F_2$, —$OCF_2CHF_2$ or —$OCF_2CHFCF_3$;

ring $B^1$, ring $B^2$ and ring $B^3$ are independently 1,4-cyclohexylene, 1,4-phenylene, 2-fluoro-1,4-phenylene, 2,6-difluoro-1,4-phenylene, tetrahydropyran-2,5-diyl, 1,3-dioxane-2,5-diyl or pyrimidine-2,5-diyl;

$Z^5$ and $Z^6$ are independently a single bond, —$(CH_2)_2$—, —CH═CH—, —C≡C—, —COO—, —$CF_2O$—, —$OCF_2$—, —$CH_2O$— or —$(CH_2)_4$—; and $L^7$ and $L^8$ are independently hydrogen or fluorine.

9. The liquid crystal composition according to claim 7, further containing at least one compound selected from the group of compounds represented by formula (5):

Formula 5

(5)

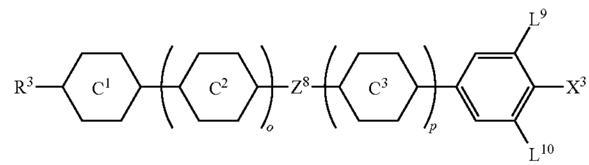

wherein, in formula (5), $R^3$ is alkyl having 1 to 10 carbons or alkenyl having 2 to 10 carbons, and in the alkyl and the alkenyl, at least one of —$CH_2$—may be replaced by —O—;

$X^3$ is —C≡N or —C≡C—C≡C—C≡N;

ring $C^1$, ring $C^2$ and ring $C^3$ are independently 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;

$Z^8$ is a single bond, —$(CH_2)_2$—, —C≡C—, —COO—, —$CF_2O$—, —$OCF_2$—or —$CH_2O$—;

$L^9$ and $L^{10}$ are independently hydrogen or fluorine; and o is 0, 1 or 2, p is 0 or 1, and a sum of o and p is 0, 1, 2 or 3.

10. The liquid crystal composition according to claim 7, further containing at least one compound selected from the group of compounds represented by formulas (6) to (11):

Formula 6

(6)

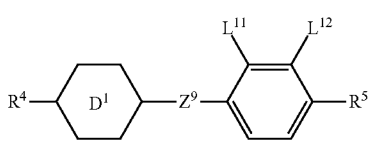

(7)

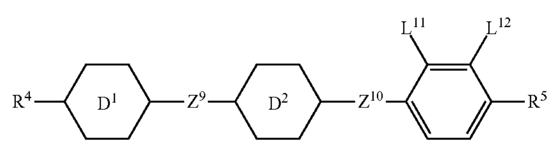

(8)

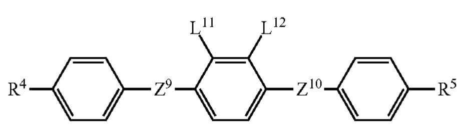

(9)

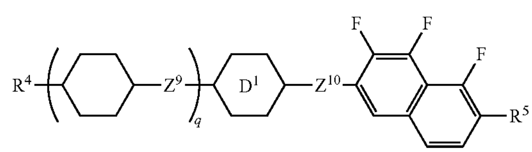

(10)

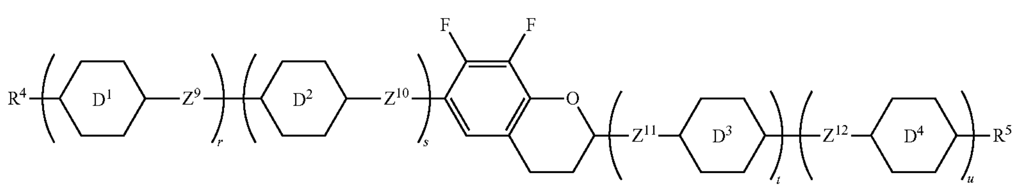

(11)

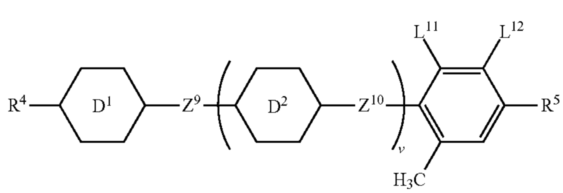

wherein, in formulas (6) to (11), $R^4$ and $R^5$ are independently alkyl having 1 to 10 carbons or alkenyl having 2 to 10 carbons, and in the alkyl and the alkenyl, at least one of —$CH_2$—may be replaced by —O—;

ring $D^1$, ring $D^2$, ring $D^3$ and ring $D^4$ are independently 1,4-cyclohexylene, 1,4-cyclohexenylene, 1,4-phenylene in which at least one of hydrogen may be replaced by fluorine, tetrahydropyran-2,5-diyl or decahydronaphthalene-2,6-diyl;

$Z^9$,$Z^{10}$,$Z^{11}$ and $Z^{12}$ are independently a single bond, —$(CH_2)_2$—, —COO—, —$CH_2O$—, —$OCF_2$— or —$OCF_2(CH_2)_2$—;

$L^{11}$ and $L^{12}$ are independently fluorine or chlorine; and q, r, s, t, u and v are independently 0 or 1, and a sum of r, s, t and u is 1 or 2.

11. The liquid crystal composition according to claim 7, further containing at least one compound selected from the group of compounds represented by formulas (12) to (14):

Formula 7

(12)

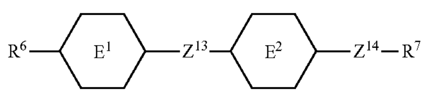

-continued (13)

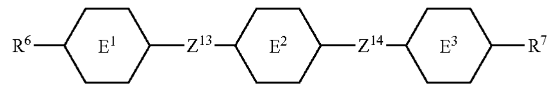

(14)

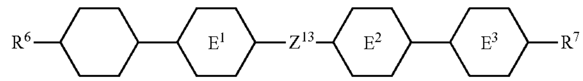

wherein, in formulas (12) to (14), $R^6$ and $R^7$ are independently alkyl having 1 to 10 carbons or alkenyl having 2 to 10 carbons, and in the alkyl and the alkenyl, at least one of —$CH_2$—may be replaced by —O—;

ring $E^1$, ring $E^2$ and ring $E^3$ are independently 1,4-cyclohexylene, 1,4-phenylene, 2-fluoro-1,4-phenylene, 2,5-difluoro-1,4-phenylene or pyrimidine-2,5-diyl; and $Z^{13}$ and $Z^{14}$ are independently a single bond, —$(CH_2)_2$—, —CH═CH—, —C≡C— or —COO—.

12. The liquid crystal composition according to claim 7, further containing at least one of optically active compound and/or polymerizable compound.

13. The liquid crystal composition according to claim 7, further containing at least one of antioxidant and/or ultraviolet absorber.

14. A liquid crystal display device including the liquid crystal composition according to claim 7.

* * * * *